United States Patent
Jay et al.

(10) Patent No.: US 11,790,418 B1
(45) Date of Patent: Oct. 17, 2023

(54) IMPACT RETAIL HUB

(71) Applicant: Hive and Hamlet Inc., Bozeman, MT (US)

(72) Inventors: Asher Jay, Bozeman, MT (US); David Householter, Bozeman, MT (US); Ivett Cser, Bozeman, MT (US)

(73) Assignee: HIVE AND HAMLET INC., Bozeman, MT (US)

( * ) Notice: Subject to any disclaimer, the term of this patent is extended or adjusted under 35 U.S.C. 154(b) by 0 days.

(21) Appl. No.: 17/720,866

(22) Filed: Apr. 14, 2022

Related U.S. Application Data

(63) Continuation of application No. 17/588,562, filed on Jan. 31, 2022.

(51) Int. Cl.
| | |
|---|---|
| *G06Q 30/0601* | (2023.01) |
| *H04L 9/00* | (2022.01) |
| *H04L 9/32* | (2006.01) |
| *G06Q 30/0211* | (2023.01) |

(52) U.S. Cl.
CPC ..... *G06Q 30/0603* (2013.01); *G06Q 30/0211* (2013.01); *G06Q 30/0609* (2013.01); *H04L 9/3213* (2013.01); *H04L 9/50* (2022.05)

(58) Field of Classification Search
CPC ..... G06Q 30/0211; G06Q 30/06–0645; G06Q 30/08; G16Y 10/00–90; H04L 9/3213; H04L 9/50
See application file for complete search history.

(56) References Cited

U.S. PATENT DOCUMENTS

| | | | |
|---|---|---|---|
| 9,767,474 B1* | 9/2017 | Ramalingam | G06Q 30/0239 |
| 11,113,754 B2* | 9/2021 | Andon | H04W 4/029 |
| 2019/0012660 A1 | 1/2019 | Masters | |
| 2019/0156363 A1* | 5/2019 | Postrel | H04L 67/04 |
| 2019/0370847 A1* | 12/2019 | Khan | G06Q 20/204 |
| 2019/0392489 A1 | 12/2019 | Tietzen et al. | |
| 2020/0160320 A1 | 5/2020 | Williams et al. | |
| 2020/0273048 A1 | 8/2020 | Andon et al. | |
| 2021/0082044 A1 | 3/2021 | Sliwka et al. | |

(Continued)

OTHER PUBLICATIONS

Sewpersadh, "Knowledge-mapping of blockchain technology applications fora banking institution," University of Johannesburg, May 2019 (Year: 2019).*

*Primary Examiner* — Adam L Levine
(74) *Attorney, Agent, or Firm* — Dave Law Group LLC; Raj S. Dave

(57) ABSTRACT

A digital platform is provided for reframing a trading experience, and creating and securely trading physical products and cryptographically secured digital assets through on-chain and off-chain communities. The platform's method comprises: receiving one of first product information and first service information, through a blockchain network, from a seller; creating one of a first product and a first service, on the blockchain network, on a digital platform; transparently listing product details of one of the first product and the first service, using the blockchain network, on the digital platform; and dynamically assigning and publishing a price of one of the first product, and the first service based on combination of one of an edition, and a launch, and one of a run size, and a volume of one of the first product and the first service using a smart contract.

12 Claims, 80 Drawing Sheets

(56) References Cited

U.S. PATENT DOCUMENTS

| | | |
|---|---|---|
| 2021/0201336 A1 | 7/2021 | Mallett et al. |
| 2021/0256070 A1 | 8/2021 | Tran et al. |
| 2021/0279695 A1 | 9/2021 | Rice |
| 2021/0319429 A1 | 10/2021 | Yantis et al. |

* cited by examiner

Investments by Size of Company

| Points | Individual | Family | Tribe | Village | City | Nation |
|---|---|---|---|---|---|---|
| 5 pts | 150 Hex | 300 Hex | 1,500 Hex | 3,000 Hex | 7,500 Hex | 15,000 Hex |
| 10 pts | 300 Hex | 1,500 Hex | 3,000 Hex | 7,500 Hex | 15,000 Hex | 25,000 Hex |
| 15 pts | 1,500 Hex | 3,000 Hex | 7,500 Hex | 15,000 Hex | 25,000 Hex | 50,000 Hex |
| 20 pts | 7,500 Hex | 7,500 Hex | 15,000 Hex | 25,000 Hex | 50,000 Hex | 100,000 Hex |
| 25 pts | 3,000 Hex | 15,000 Hex | 25,000 Hex | 50,000 Hex | 100,000 Hex | 250,000 Hex |

* 20 pts Bonus when you reach level 3

FIG. 19a

How To Level Up

BOE Sub Vault Investments

Investments by Spending Power

| Points | Individual | Family | Tribe | Village | City | Nation |
|---|---|---|---|---|---|---|
| 5 pts | 25 Hex | 75 Hex | 150 Hex | 300 Hex | 750 Hex | 1,500 Hex |
| 10 pts | 75 Hex | 150 Hex | 300 Hex | 750 Hex | 1500 Hex | 2,500 Hex |
| 15 pts | 150 Hex | 300 Hex | 750 Hex | 1,500 Hex | 2,500 Hex | 3,500 Hex |
| 20 pts | 750 Hex | 1,500 Hex | 2,500 Hex | 3,500 Hex | 5,000 Hex | 10,000 Hex |
| 25 pts | 1,500 Hex | 2,500 Hex | 3,500 Hex | 5,000 Hex | 10,000 Hex | 15,000 Hex |

* 20 pts Bonus when you reach level 3

FIG. 19b

Investments by Size of Company

| Points  | Individual | Family     | Tribe      | Village    | City        | Nation      |
|---------|------------|------------|------------|------------|-------------|-------------|
| 5 pts   | 150 Hex    | 300 Hex    | 1,500 Hex  | 3,000 Hex  | 7,500 Hex   | 15,000 Hex  |
| 10 pts  | 300 Hex    | 1,500 Hex  | 3,000 Hex  | 7,500 Hex  | 15,000 Hex  | 25,000 Hex  |
| 15 pts  | 1,500 Hex  | 3,000 Hex  | 7,500 Hex  | 15,000 Hex | 25,000 Hex  | 50,000 Hex  |
| 20 pts  | 7,500 Hex  | 7,500 Hex  | 15,000 Hex | 25,000 Hex | 50,000 Hex  | 100,000 Hex |
| 25 pts  | 3,000 Hex  | 15,000 Hex | 25,000 Hex | 50,000 Hex | 100,000 Hex | 250,000 Hex |

* 20 pts Bonus when you reach level 3.

FIG. 19c

Investments by Spending Power

| Points  | Individual | Family    | Tribe     | Village   | City       | Nation     |
|---------|------------|-----------|-----------|-----------|------------|------------|
| 5 pts   | 25 Hex     | 75 Hex    | 150 Hex   | 300 Hex   | 750 Hex    | 1,500 Hex  |
| 10 pts  | 75 Hex     | 150 Hex   | 300 Hex   | 750 Hex   | 1,500 Hex  | 2,500 Hex  |
| 15 pts  | 150 Hex    | 300 Hex   | 750 Hex   | 1,500 Hex | 2,500 Hex  | 3,500 Hex  |
| 20 pts  | 750 Hex    | 1,500 Hex | 2,500 Hex | 3,500 Hex | 5,000 Hex  | 10,000 Hex |
| 25 pts  | 1,500 Hex  | 2,500 Hex | 3,500 Hex | 5,000 Hex | 10,000 Hex | 15,000 Hex |

* 20 pts Bonus when you reach level 3.

FIG. 19d

Investments by Size of Company

| Points | Individual | Family | Tribe | Village | City | Nation |
|---|---|---|---|---|---|---|
| 5 pts | 150 Hex | 300 Hex | 1,500 Hex | 3,000 Hex | 7,500 Hex | 15,000 Hex |
| 10 pts | 300 Hex | 1,500 Hex | 3,000 Hex | 7,500 Hex | 15,000 Hex | 25,000 Hex |
| 15 pts | 1,500 Hex | 3,000 Hex | 7,500 Hex | 15,000 Hex | 25,000 Hex | 50,000 Hex |
| 20 pts | 7,500 Hex | 7,500 Hex | 15,000 Hex | 25,000 Hex | 50,000 Hex | 100,000 Hex |
| 25 pts | 3,000 Hex | 15,000 Hex | 25,000 Hex | 50,000 Hex | 100,000 Hex | 250,000 Hex |

* 20 pts Bonus when you reach level 3

FIG. 19e

Investments by Spending Power

| Points | Individual | Family | Tribe | Village | City | Nation |
|---|---|---|---|---|---|---|
| 5 pts | 25 Hex | 75 Hex | 150 Hex | 300 Hex | 750 Hex | 1,500 Hex |
| 10 pts | 75 Hex | 150 Hex | 300 Hex | 750 Hex | 1500 Hex | 2,500 Hex |
| 15 pts | 150 Hex | 300 Hex | 750 Hex | 1,500 Hex | 2,500 Hex | 3,500 Hex |
| 20 pts | 750 Hex | 1,500 Hex | 2,500 Hex | 3,500 Hex | 5,000 Hex | 10,000 Hex |
| 25 pts | 1,500 Hex | 2,500 Hex | 3,500 Hex | 5,000 Hex | 10,000 Hex | 15,000 Hex |

* 20 pts Bonus when you reach level 3

FIG. 19f

IMPACT RETAIL HUB

CROSS-REFERENCE TO RELATED APPLICATIONS

The present application is the Continuation of U.S. patent application Ser. No. 17/588,562, filed on Jan. 31, 2022, the disclosure of which is incorporated herein by reference in its entirety as a part of the present application.

FIELD OF THE INVENTION

The present disclosure relates generally to distributed computing systems and more particularly to a digital platform for reframing a trading experience and creating and trading cryptographically secured digital assets.

BACKGROUND

"NFT (Non-Fungible Tokens) are a digital certificate of authenticity. In the present times, NFTs are known to be the most popular things. NFTs can be easily understood as digital tokens that can include digital arts, digital assets, music, video, or any other asset in the digital world that is built based on blockchain technology.

There are high chances of damage to the digital assets and the investors buying and selling NFTs in the market. Even though there is a vast potential for the NFT market, there are certain risks that one needs to consider.

The main challenge faced in the NFT market is the uncertainty in determining the price of the NFT. Now, the price of any NFT will depend on the creativity, uniqueness, scarcity of the buyers and owners, and a lot more. There are considerable fluctuations in the prices of NFT because there is no fixed standard for any particular type of NFT. People cannot determine the factors that might drive the price of NFT. Due to this, the fluctuations in prices remain constant, and evaluation of NFT becomes a big challenge.

The popularity of NFT has also increased the chances of cyber threats to the NFT market. Plenty of cases are visible where replicas of the original NFT stores are put up on the internet. These stores look authentic because of the original logo and content. These fake NFT stores are a massive risk because they might sell NFTs not even present in the digital world. On top of that, there are chances of counterfeit NFTs being sold on a fake NFT store.

Another risk is where someone is impersonating a famous NFT artist and selling fake NFTs. The risk of online fraud is enormous due to copyright theft, fake airdrops, fake NFT giveaways, and replication of popular NFTs. Some people even promote such giveaways on social media to gain more attraction. While they are promoting NFT, some people are scammed at such fake stores.

The ownership of any NFT is another important topic to consider. When you are attempting to purchase an NFT from the market, you should find out whether the seller owns that NFT or not. There are scenarios where people are posing as sellers while they only have replicas. Here, you will only receive the right to use that NFT but not the intellectual property rights." [Source: Challenges and Risks Associated with Non-Fungible Tokens (NFTs); by Dhruv Parmar; published on 12 Oct. 2021]

Therefore, there is a long felt need for a digital platform for reframing a trading experience, and creating and securely trading physical products and cryptographically secured digital assets through on-chain and off-chain communities.

SUMMARY OF INVENTION

Disclosed herein is a system and method for reframing a trading experience.

A method is described herein. The method comprises: receiving one of first product information and first service information, through a blockchain network, from a seller; creating one of a first product and a first service, on the blockchain network, on a digital platform based on the first product information; transparently listing product details of one of the first product and the first service, using the blockchain network, on the digital platform; and dynamically assigning and publishing a price of one of the first product, and the first service based on a combination of one of an edition, and a launch, and one of a run size, and a volume of one of the first product and the first service using a smart contract. The first product comprises one of a first physical product, and a first digital product. The first service comprises one of a first physical service, and a first digital service.

In an embodiment, the method comprises: enabling the seller to sell one of the first product and the first service through the blockchain network.

In another embodiment, creating one of the first product and the first service, on the blockchain network, on the digital platform based on the first product information comprises: creating one of the first product and the first service with a cryptographically secured serial number on the blockchain network based on the edition and a sequence, the first product and the first service minted.

In yet another embodiment, the first product information comprises an image of the first product, a product type, a product title, a product caption, product collection details, a product anatomy uniform resource identifier (URI), a product specification, size variations available for the first product, price variations available for the first product, one of product launch information and product edition information, product class information, and one of run size information and the volume of the first product available for sale.

In yet another embodiment, the first service information comprises a description of the first service, a service type, a service title, a service caption, service collection details, service class information, structured metadata, and service launch information.

In yet another embodiment, the method comprises one of: linking at least two products on the blockchain network by linking a cryptographically secured serial number of the at least two products; and linking at least two services on the blockchain network by linking the cryptographically secured serial number of the at least two services.

In yet another embodiment, creating one of the first product and the first service, on the blockchain network, on the digital platform based on the first product information comprises: storing one of the first product and the first service cryptographically on the blockchain network.

In yet another embodiment, storing cryptographically one of the first product and the first service on the blockchain network comprises: storing one of the first product and the first service cryptographically on the blockchain network with a decentralized metadata.

In yet another embodiment, the method comprises: receiving impact information from the seller through the blockchain network; creating an impact focus and linking the impact focus to one of the first product, and the first service based on the impact information; and publishing the impact focus on the digital platform.

In yet another embodiment, linking one of at least two products and at least two services on the blockchain network enables: creating an impact focus based on received impact information; linking the impact focus to one of the at least two products linked and at least two services linked; and publishing the impact focus on the digital platform.

In yet another embodiment, the method further comprises: publishing a fund received by the impact focus on the blockchain network; and transparently publishing the fund on the digital platform using the blockchain network.

In yet another embodiment, linking one of at least two products and at least two services on the blockchain network comprises: rendering products linked to the first product when a buyer purchases the first product when one of the first product and the products linked to the first product comprises same product attributes, and the first product and the products linked to the first product are independent of each other.

In yet another embodiment, the method further comprises: receiving one of second product information and second service information from the seller; and creating one of a second product and a second service on the digital platform based on the second product information. The second product information comprises an image of the second product, a product type, a product title, a product caption, product collection details, a product anatomy uniform resource identifier (URI), a product specification, size variations available for the second product, price variations available for the second product, one of product launch information and product edition information, product class information, and one of a volume and run size information of the second product available for sale. The second service information comprises a description of the second service, a service type, a service title, a service caption, service collection details, service class information, structured metadata, and service launch information.

In yet another embodiment, the method further comprises: transparently listing product details of one of the second product and the second service, through the blockchain network, on the digital platform, wherein the second product comprises independent product details; and dynamically assigning and publishing a price of one of the second product and the second service based on a combination of one of an edition and a launch, and one of a run size, and the volume of the second product using the smart contract. The second product comprises one of a second physical product, and a second digital product. The second service comprises one of a second physical service, and a second digital service.

In yet another embodiment, creating one of the second product and the second service on the digital platform comprises: creating one of the second product and the second service with a cryptographically secured serial number on the blockchain network based on one of a launch and an edition, and a sequence minted.

In yet another embodiment, the method further comprises: receiving impact information from the seller through the blockchain network; creating an impact focus and linking the impact focus to the second product based on the impact information; and publishing the impact focus on the digital platform. The second product, and the products linked to the second product are linked to the impact focus. The second product, and the products linked to the second product contribute to the impact focus.

In yet another embodiment, the method further comprises: creating an interactive outcome pipeline to a user, wherein the interactive outcome pipeline enables the seller to create a sequence of tasks to the user; enabling the user to execute the sequence of tasks; verifying the execution and completion of the sequence of tasks by the user; and documenting and recording the sequence of tasks executed by the user using the blockchain network.

In yet another embodiment, the method further comprises: providing an impact oriented (IO) reward upon confirming the execution and completion of the sequence of tasks by the user.

In yet another embodiment, the method further comprises: enabling the seller to create a purchase mechanism to incentivize a buyer, wherein the purchase mechanism defines a smart contract that incentivizes the buyer when the buyer executes a purchase action as defined in the smart contract.

In yet another embodiment, the method further comprises: creating a product link between the first product and the second product; and publishing a cryptographically secured product identification serial number of the first product listing in conjunction with a cryptographically secured serial number of the second product on the digital platform.

In yet another embodiment, creating the product link between the first product and the second product, in one of an intentional and a randomized sequence, is performed by one of but not limited to one to one relationship linking, many to few relationship linking, and order of purchase relationship linking.

In yet another embodiment, the one to one relationship linking is performed where a volume of inventory of the first product is directly proportional to, and equal to, a volume of inventory of the second product.

In yet another embodiment, the one to one relationship linking is performed by one of but not limited to a one to one relationship sequential linking, a one to one relationship customized linking, and a one to one relationship random linking.

In yet another embodiment, the one to one relationship sequential linking is performed where a first item of the first product matches with a first item of the second product, a second item of the first product matches with a second item of the second product, and a third item of the first product matches with a third item of the second product.

In yet another embodiment, the one to one relationship customized linking is performed by establishing non-sequential links between the first product and the second product at the discretion of the seller.

In yet another embodiment, the one to one relationship random linking is performed by establishing truly randomized links between the first product and the second product.

In yet another embodiment, the many to few relationship linking is performed where a volume of inventory of the first product is inversely proportional to the volume of inventory of the second product.

In yet another embodiment, the order of purchase relationship linking dictates allocation of the second product linked with the first product when the first product is purchased.

In yet another embodiment, the method further comprises: creating an interactive e-catalog; splitting the interactive e-catalog into at least one of but not limited to a collection category, a cluster category, a relisting category, a product category, recommendation category, NFT category, favorites category, a trending category, an IO score category, and an history category; and enabling the seller to interact with the interactive e-catalog and sort at least one category of the interactive e-catalog. The interactive e-catalog holds a list of products.

In yet another embodiment, the method comprises minting an impact oriented (IO) token through the blockchain network.

In yet another embodiment, minting the IO token comprises: minting a cost for creating one of the first product and the first service on the digital platform through a stable payment mechanism. The stable payment mechanism reduces the minting cost when the seller lists large volumes of products on a seller's inventory.

In yet another embodiment, the method further comprises: enabling the seller to purchase the IO token; crediting the IO token to an account of the seller when the seller purchases the IO token; and enabling the seller to add an additional product in a seller's inventory.

In yet another embodiment, the method further comprises: enabling creating a countdown timer on the digital platform; synchronizing the countdown timer to one of a seller's inventory, and a collection within the seller inventory; dynamically publishing the price for one of the first product and the first service throughout a countdown of the countdown timer; and publishing the countdown timer and advertising a flash sale offer for one of the first product and the first service.

In yet another embodiment, the method further comprises: creating a countdown timer on the digital platform based on an input from the seller; synchronizing the countdown timer to one of a seller's inventory, a collection within the seller inventory, and one of a specific product and a specific service within the seller inventory; dynamically assigning and publishing the price for one of the first product and the first service throughout a countdown of the countdown timer; and publishing the countdown timer and advertising a flash sale offer for the first product. The input comprises a start time, an end time, a timer title, a start date, and an end date.

In yet another embodiment, dynamically assigning and publishing the price for one of the first product and the first service throughout the countdown of the countdown timer comprises: dynamically assigning and publishing a variable price for one of the first product and the first service throughout the countdown of the countdown timer.

In yet another embodiment, the method further comprises: determining incentives at different time instants throughout the countdown of the countdown timer; and providing the incentives to a buyer when the seller purchases.

In yet another embodiment, the method further comprises: issuing an impact oriented (IO) punch card to an account of the seller.

In yet another embodiment, the method further comprises: launching the IO punch card upon receiving an input from the seller; defining an activity to be performed by a buyer by launching the IO punch card; crediting a punch to the IO punch card at a predefined position upon completing the activity defined by the IO punch card; verifying an execution and completion of the activity defined by the IO punch card by systematically monitoring the punch in the IO punch card and generating a non-fungible token (NFT) as an IO reward outcome to the buyer.

In yet another embodiment, creating one of the first product and the first service on the digital platform comprises creating a product anatomy for one of the first product and the first service.

In yet another embodiment, creating the product anatomy of one of the first product and the first service comprises: creating a systematic diagram of one of the first product and the first service; dissecting the systematic diagram to various parts; creating interactive labels that directly overlay on the various parts; and hyperlinking the interactive labels with at least one of an activity, an impact, a description, a research material, a report, a study, a recommendation, and an end user recommendation manual relevant to one of the first product and the first service.

In yet another embodiment, the method further comprises: creating an impact oriented (IO) profile for the seller based on at least one of valid public data available, contents submitted by the seller, and seller's activity upon creating a shop on the digital platform; tracking an activity by the seller that alters information in the IO profile; recording the activity, through the blockchain network; and updating the IO profile based on the activity.

In yet another embodiment, the method further comprises: enabling a buyer to add a review to the IO profile of the seller.

In yet another embodiment, the method further comprises: rendering the IO profile to at least one of a buyer, a third party, and a community member; performing an impact oriented (IO) audit on the activity performed by the seller, and the IO profile in real-time; and determining an impact oriented (IO) metrics achieved by the IO profile as IO footprints based on the IO audit. The IO footprints comprise at least one of a planetary footprint, a people footprint, a problems without borders footprint, a community footprint, a product footprint, an offset footprint, an ethical footprint, and a company footprint.

In yet another embodiment, the method further comprises: determining the activity performed by the seller; determining the IO footprints achieved by the seller based on the determination of the activity; and providing an impact oriented (IO) seal to the seller based on the IO footprints achieved.

In yet another embodiment, the method further comprises: creating a non-fungible token (NFT); minting the NFT on the blockchain network; assigning the NFT to a product class of the seller; dynamically fixing a price for an edition of the NFT; and allocating the NFT to contribute to one of an impact wallet and a digital platform wallet.

In yet another embodiment, creating the non-fungible token comprises: enabling the seller to create the NFT; and assigning the NFT to contribute to the impact wallet. The NFT comprises one of a symbolic association, an artistic association, and a reference to an impact focus name of the impact wallet, wherein the NFT contributes to the impact wallet.

In yet another embodiment, the method further comprises: minting an impact oriented (IO) market smart contract through the blockchain network; and defining a purchase action for a non-fungible token (NFT) listed through the IO market smart contract. The purchase action is configured to debit one percent of price of the NFT and credits into a wallet based on a focus created.

In another aspect, a system comprises: a server that comprises a memory, and a processor communicatively coupled to the memory, the processor is operable to receive one of first product information and first service information, through a blockchain network, from a seller; create one of a first product and a first service on a digital platform based on one of the first product information and the first service information; transparently list product details of one of the first product and the first service, through the blockchain network, on the digital platform; and dynamically assign and publish a price of one of the first product and the first service based on a combination of one of an edition and a launch, and one of a run size and a volume using a smart contract. The first product comprises one of a first physical product, and a first digital product. The first service comprises one of a first physical service, and a first digital service.

In yet another aspect, a non-transitory storage medium is described herein. The non-transitory storage medium stores a sequence of instructions, which when executed by a processor causes it to: receive one of first product information and first service information, through a blockchain network, from a seller; create one of a first product and a first service on a digital platform based on one of the first product information and the first service information; transparently list product details of one of the first product and the first service, through the blockchain network, on the digital platform; and dynamically assign and publish a price of one of the first product and the first service based on a combination of one of an edition and a launch, and a run size and a volume using a smart contract. The first product comprises one of a first physical product, and a first digital product. The first service comprises one of a first physical service, and a first digital service.

In yet another aspect, a method is described herein. The method comprises: receiving, from a computing device associated with a buyer, an indication that the buyer has executed an activity through a digital platform; receiving, from the computing device, a cryptographically secured owner identification (ID) code associated with the buyer; receiving, from the computing device, confirmation of completion of the activity executed by the buyer; determining a cryptographically secured digital asset ID code corresponding to the completion of the activity, the cryptographically secured digital asset ID code representative of a cryptographically secured digital asset; and transmitting a cryptographic block to a distributed blockchain ledger to record transfer of the cryptographically secured digital asset to the buyer, the cryptographic block comprising the cryptographically secured digital asset ID code and the cryptographically secured owner ID code.

In an embodiment, the cryptographically secured digital asset comprises a non-fungible token (NFT).

In another embodiment, the cryptographically secured digital asset comprises one of an access code to unique offering, and a coupon.

In yet another embodiment, the method further comprises: rendering an interactive outcome pipeline to the buyer, wherein the interactive outcome pipeline enables the buyer to execute a sequence of tasks; verifying the execution and completion of the sequence of tasks by the buyer; and documenting and recording the sequence of tasks executed by the buyer using the blockchain distributed ledger.

In yet another embodiment, the sequence of tasks comprises at least one of but not limited to an image submission task, raise a question task, tell a story task, submit an answer to the question task, take an action and submit proof task, buy a product task, and take a quiz task.

In yet another embodiment, the method further comprises: creating an interactive e-catalog, wherein the interactive e-catalog holds a list of products; splitting the interactive e-catalog into at least one of a collection category, a cluster category, a relisting category, a product category, recommendation category, NFT category, favorites category, a trending category, an IO score category, and an history category; and enabling the buyer to interact with the interactive e-catalog and sort at least one category of the interactive e-catalog.

In yet another embodiment, the method further comprises: issuing an impact oriented (IO) punch card; defining the activity to be performed by the buyer by launching the IO punch card; crediting a punch to the IO punch card at a predefined position upon completing the activity defined by the IO punch card; verifying an execution and completion of the activity, defined by the IO punch card, by monitoring the punch in the IO punch card; and generating a non-fungible token (NFT) as an IO reward outcome to the buyer.

In yet another embodiment, the method further comprises: creating an impact oriented (IO) profile for the buyer based on the activity executed by the buyer on the digital platform; tracking the activity by the buyer that alters information in the IO profile; recording the activity, through the blockchain distributed ledger; and updating the IO profile of the buyer based on the activity.

In yet another embodiment, the method further comprises: performing an impact oriented (IO) audit on the activity performed by the buyer, and on the IO profile of the buyer in real-time; and determining an impact oriented (IO) metrics achieved by the IO profile as IO handprints based on the IO audit, wherein the IO handprints comprise at least one of a planetary handprint, a people handprint, a problems without handprint, a community handprint, a product handprint, an offset handprint, an ethical handprint, and a company handprint.

In yet another embodiment, the method further comprises: creating a quiz relevant to a business of a seller based on at least one of valid public data available, and contents submitted by the seller; and rendering the quiz to the buyer. The quiz comprises a first part, and a second part.

In yet another embodiment, the method further comprises: receiving a response to at least one of the first part and the second part of the quiz from the buyer.

In yet another embodiment, the method further comprises: enabling the buyer to manually customize a non-fungible token (NFT) upon receiving the response to the first part of the quiz.

In yet another embodiment, the method further comprises: automatically customizing an NFT upon receiving the response to the second part of the quiz based on the response received.

In yet another embodiment, automatically customizing the NFT upon receiving the response to the second part of the quiz comprises: creating a unique series of the NFT based on the response to the quiz and time taken by the buyer to complete the quiz.

In yet another embodiment, the method further comprises: crediting the unique series of the NFT to an account of the buyer when the buyer responds to the quiz correctly and within optimal time.

In yet another embodiment, the method further comprises: providing an IO reward to the buyer upon participating and receiving the response to the quiz from the buyer, wherein the IO reward comprises an access code to a unique offering, the NFT, generated NFT, a discount, and a coupon.

In yet another embodiment, the method further comprises: providing an impact oriented (IO) reward to the buyer upon verifying the execution and completion of the activity by the buyer. The impact oriented (IO) reward comprises an access code to a unique offering, the NFT, generated NFT, a discount, and a coupon.

In yet another embodiment, the method further comprises enabling the buyer to: view one of an impact oriented (IO) profile of a seller and the buyer, comment on contents of the digital platform, make a purchase.

In yet another embodiment, the method further comprises enabling the buyer to: evaluate the IO profile of the seller in real-time; and calculate an impact oriented (IO) metrics associated with the IO profile based on the evaluation of the IO profile in real-time.

In yet another embodiment, the method further comprises: creating an IO survey relevant to a business of a seller using one of a template and customized based on one of first product information and first service information. The IO survey comprises a plurality of questions that provides quality insights to the buyer.

In yet another aspect, a system is described herein. The system comprises a memory, and a processor communicatively coupled to the memory. The processor is operable to receive, from a computing device associated with a buyer, an indication that the buyer has executed an activity through a digital platform; to receive, from the computing device, a cryptographically secured owner identification (ID) code associated with the buyer; to receive, from the computing device, confirmation of completion of the activity executed by the buyer; to determine a cryptographically secured digital asset ID code corresponding to the completion of the activity, the cryptographically secured digital asset ID code representative of a cryptographically secured digital asset; and to transmit a cryptographic block to a distributed blockchain ledger to record transfer of the cryptographically secured digital asset to the buyer, the cryptographic block comprising the cryptographically secured digital asset ID code and the cryptographically secured owner ID code.

In yet another aspect, a non-transitory storage medium stores a sequence of instructions, which when executed by a processor causes it to: receive, from a computing device associated with a buyer, an indication that the buyer has executed an activity through a digital platform; receive, from the computing device, a cryptographically secured owner identification (ID) code associated with the buyer; receive, from the computing device, confirmation of completion of the activity executed by the buyer; determine a cryptographically secured digital asset ID code corresponding to the completion of the activity, the cryptographically secured digital asset ID code representative of a cryptographically secured digital asset; transmit a cryptographic block to a distributed blockchain ledger to record transfer of the cryptographically secured digital asset to the buyer, the cryptographic block comprising the cryptographically secured digital asset ID code and the cryptographically secured owner ID code.

In yet another aspect, a method is described herein. The method comprises: receiving, from a computing device associated with a buyer, an indication that the buyer has executed an activity through a digital platform; receiving, from the computing device, a cryptographically secured owner identification (ID) code associated with the buyer; receiving, from the computing device, confirmation of completion of the activity executed by the buyer; determining a cryptographically secured digital asset ID code corresponding to the completion of the activity, the cryptographically secured digital asset ID code representative of a cryptographically secured digital asset; and transmitting a cryptographic block to a distributed blockchain ledger to record transfer of the cryptographically secured digital asset to the buyer, the cryptographic block comprising the cryptographically secured digital asset ID code and the cryptographically secured owner ID code.

In an embodiment, the cryptographically secured digital asset comprises one of a non-fungible token (NFT), an access code to unique offering, and a coupon.

In another embodiment, the method comprises: rendering an interactive outcome pipeline to the buyer; verifying the execution and completion of the sequence of tasks by the buyer; and documenting and recording the sequence of tasks executed by the buyer using the blockchain distributed ledger. The interactive outcome pipeline enables the buyer to execute a sequence of tasks.

In yet another embodiment, the method comprises: creating an interactive e-catalog, wherein the interactive e-catalog holds a list of products; splitting the interactive e-catalog into at least one of a collection category, a cluster category, a relisting category, a product category, recommendation category, NFT category, favourites category, a trending category, an IO score category, and an history category; and enabling the buyer to interact with the interactive e-catalog and sort at least one category of the interactive e-catalog.

In yet another embodiment, the method comprises: issuing an impact oriented (IO) punch card; defining the activity to be performed by the buyer by launching the IO punch card; crediting a punch to the IO punch card at a predefined position upon completing the activity defined by the IO punch card; verifying an execution and completion of the activity, defined by the IO punch card, by monitoring the punch in the IO punch card; and generating a non-fungible token (NFT) as an IO reward outcome to the buyer.

In yet another embodiment, the method comprises: creating an impact oriented (IO) profile for the buyer based on the activity executed by the buyer on the digital platform; tracking the activity by the buyer that alters information in the IO profile; recording the activity, through the blockchain distributed ledger; and updating the IO profile of the buyer based on the activity'

In yet another embodiment, the method comprises: performing an impact oriented (IO) audit on the activity performed by the buyer, and the IO profile of the buyer in real-time; and determining impact oriented (IO) metrics achieved by the IO profile as IO handprints based on the IO audit. The IO handprints comprise at least one of a planetary handprint, a people handprint, a problems without borders handprint, a community handprint, a product handprint, an offset handprint, an ethical handprint, and a company handprint.

In yet another embodiment, the method comprises: creating a quiz relevant to a business of a seller based on at least one of valid public data available, and contents submitted by the seller; and rendering the quiz to the buyer, wherein the quiz comprises a first part, and a second part; and receiving a response to at least one of the first part and the second part of the quiz from the buyer.

In yet another embodiment, the method comprises: enabling the buyer to manually customize a non-fungible token (NFT) upon receiving the response to the first part of the quiz; and automatically customizing an NFT upon receiving the response to the second part of the quiz based on the response received.

In yet another embodiment, automatically customizing the NFT upon receiving the response to the second part of the quiz comprises: creating a unique series of the NFT based on the response to the quiz and time taken by the buyer to complete the quiz.

In yet another embodiment, the method further comprises: providing an IO reward to the buyer upon receiving the response to the quiz from the buyer. The IO reward comprises an access code to unique offering, the NFT, generated NFT, a discount, and a coupon.

In yet another embodiment, the method further comprises: enabling the buyer to view one of an impact oriented (IO) profile of a seller and the buyer, comment on contents of the digital platform, and make a purchase.

In yet another embodiment, the method further comprises: enabling the buyer to evaluate the IO profile of the seller in real-time; and calculating impact oriented (IO) metrics associated with the IO profile based on the evaluation of the IO profile in real-time.

In yet another embodiment, the method further comprises: creating an IO survey relevant to a business of a seller obtained from one of a template, and a customized based on one of first product information and first service information. The IO survey comprises a plurality of questions that provides quality insights to the buyer.

In yet another aspect, a system is described herein. The system comprises a server. The server comprises a memory, and a processor communicatively coupled to the memory. The processor is operable to receive, from a computing device associated with a buyer, an indication that the buyer has executed an activity through a digital platform; receive, from the computing device, a cryptographically secured owner identification (ID) code associated with the buyer; receive, from the computing device, confirmation of completion of the activity executed by the buyer; determine a cryptographically secured digital asset ID code corresponding to the completion of the activity, the cryptographically secured digital asset ID code representative of a cryptographically secured digital asset; and transmit a cryptographic block to a distributed blockchain ledger to record transfer of the cryptographically secured digital asset to the buyer. The cryptographic block comprises the cryptographically secured digital asset ID code and the cryptographically secured owner ID code.

In yet another aspect, a method is described herein. The method receiving one of first product information and first service information, through a blockchain network, from a seller; creating one of a first product and a first service, on the blockchain network, on a digital platform based on the first product information; transparently listing product details of one of the first product and the first service, using the blockchain network, on the digital platform; and dynamically assigning and publishing a price of one of the first product, and the first service based on a combination of one of an edition, and a launch, and one of a run size, and a volume of one of the first product and the first service using a smart contract. The first product comprises one of a first physical product, and a first digital product. The first service comprises one of a first physical service, and a first digital service.

In an embodiment, the method comprises one of: linking at least two products on the blockchain network by linking a cryptographically secured serial number of the at least two products; and linking at least two services on the blockchain network by linking the cryptographically secured serial number of the at least two services.

In another embodiment, the method comprises: receiving impact information from the seller through the blockchain network; creating an impact focus and linking the impact focus to one of the first product, and the first service based on the impact information; and publishing the impact focus on the digital platform.

In yet another embodiment, the method comprises: creating an interactive outcome pipeline to a user, wherein the interactive outcome pipeline enables the seller to create a sequence of tasks to the user; enabling the user to execute the sequence of tasks; verifying the execution and completion of the sequence of tasks by the user; documenting and recording the sequence of tasks executed by the user using the blockchain network; and providing an impact oriented (IO) reward upon confirming the execution and completion of the sequence of tasks by the user.

In yet another embodiment, the method comprises: creating a countdown timer on the digital platform based on an input from the seller, wherein the input comprises a start time, an end time, a timer title, a start date, and an end date; synchronizing the countdown timer to one of a seller's inventory, a collection within the seller inventory, and one of a specific product and a specific service within the seller inventory; dynamically assigning and publishing the price for one of the first product and the first service throughout a countdown of the countdown timer; and publishing the countdown timer and advertising a flash sale offer for the first product.

The methods and systems disclosed herein may be implemented in any means for achieving various aspects and may be executed in a form of a non-transitory machine-readable medium embodying a set of instructions that, when executed by a machine, causes the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIGS. 9a-9m illustrate a smart contract based clearing house associated with a digital marketplace, according to one or more embodiments.

Figure 1:
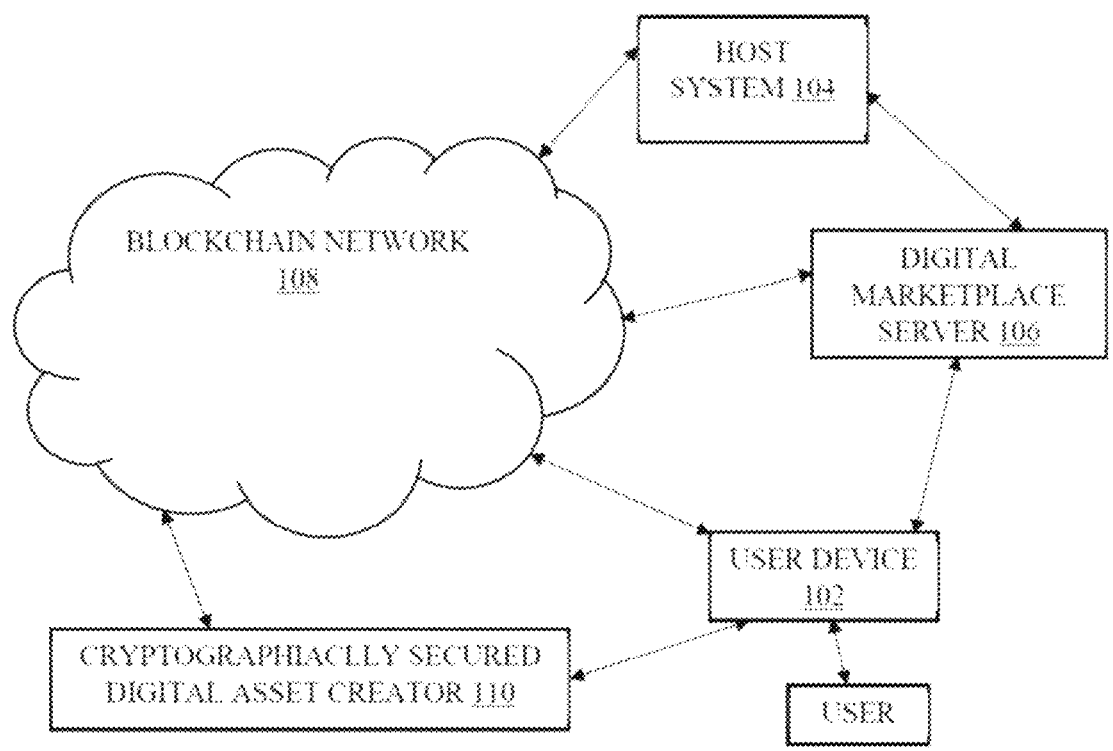
FIG. 1 illustrates a schematic view of a system, according to one or more embodiments.

Other features of the present embodiments will be apparent from the accompanying drawings and from the detailed description that follows.

DETAILED DESCRIPTION

For simplicity and clarity of illustration, the drawing figures illustrate the general manner of construction. Descriptions and details of well-known features and techniques may be omitted to avoid unnecessarily obscuring the present disclosure. The dimensions of some of the elements in the figures may be exaggerated relative to other elements to help improve understanding of embodiments of the present disclosure. The same reference numeral in different figures denotes the same elements.

Although the following detailed description contains many specifics for the purpose of illustration, a person of ordinary skill in the art will appreciate that many variations and alterations to the following details can be made and are considered to be included herein.

Accordingly, the following embodiments are set forth without any loss of generality to, and without imposing limitations upon, any claims set forth. It is also to be understood that the terminology used herein is for the purpose of describing particular embodiments only and is not intended to be limiting. Unless defined otherwise, all technical and scientific terms used herein have the same meaning as commonly understood by one with ordinary skill in the art to which this disclosure belongs.

The articles "a" and "an" are used herein to refer to one or to more than one (i.e., to at least one) of the grammatical object of the article. By way of example, "an element" means one element or more than one element.

The terms "first", "second", "third", and the like in the description and in the claims, if any, are used for distinguishing between similar elements and not necessarily for describing a particular sequence or chronological order. It is to be understood that the terms so used are interchangeable under appropriate circumstances such that the embodiments described herein are, for example, capable of operation in sequences other than those illustrated or otherwise described herein. Furthermore, the terms "include", "have", and any variations thereof, are intended to cover a non-exclusive inclusion, such that a process, method, system, article, device, or apparatus that comprises a list of elements is not necessarily limited to those elements but may include other elements not expressly listed or inherent to such process, method, system, article, device, or apparatus.

The terms "left", "right", "front", "back", "top", "bottom", "over", "under" and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

No element act, or instruction used herein should be construed as critical or essential unless explicitly described as such. Furthermore, as used herein, the term "set" is intended to include items (e.g., related items, unrelated items, a combination of related items and unrelated items, etc.), and may be used interchangeably with "one or more". Where only one item is intended, the term "one" or similar language is used. Also, as used herein, the terms "has", "have", "having", or the like are intended to be open-ended terms. Further, the phrase "based on" is intended to mean "based, at least in part, on" unless explicitly stated otherwise.

The terms "couple" "coupled", "couples", "coupling", and the like should be broadly understood and referred to as connecting two or more elements mechanically, electrically, and/or otherwise. Two or more electrical elements may be electrically coupled together, but not mechanically or otherwise coupled together. Coupling may be for any length of time, e.g., permanent, or semi-permanent or only for an instant. "Electrical coupling" includes electrical coupling of all types. The absence of the word "removably", "removable", and the like near the word "coupled", and the like does not mean that the coupling, etc. in question is or is not removable.

As defined herein, two or more elements or modules are "integral" or "integrated" if they operate functionally together. As defined herein, two or more elements are "non-integral" if each element can operate functionally independently.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time"

can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All variations which come within the meaning and range of equivalency of the claims are to be embraced within their scope.

As defined herein, "approximately" can mean within a specified or unspecified range of the specified or unspecified stated value. In some embodiments, "approximately" can mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As used herein, the term component is intended to be broadly construed as hardware, firmware, and/or a combination of hardware and software.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products i.e., one or more modules of computer program instructions encoded on a computer-readable medium for execution by, or to control the operation of, data processing apparatus. The computer-readable medium may be a machine-readable storage device, a machine-readable storage substrate, a memory device, a composition of matter affecting a machine-readable propagated signal, or a combination of one or more of them. The term "computing system" encompasses all apparatus, devices, and machines for processing data, including by way of example, a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to a suitable receiver apparatus.

The actual specialized control hardware or software code used to implement these systems and/or methods is not limiting of the implementations. Thus, the operation and behavior of the systems and/or methods described herein without reference to specific software code, it being understood that any software and any hardware can be designed to implement the systems and/or methods based on the description herein.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, for example, without limitation, a Field Programmable Gate Array (FPGA), an Application Specific Integrated Circuit (ASIC), Application Specific Standard Products (ASSPs), System-On-a-Chip (SOC) systems, Complex Programmable Logic Devices (CPLDs), etc.

Processors suitable for the execution of a computer program include, by way of example, both general and special purpose microprocessors, and any one or more processors of any appropriate kind of digital computer. Generally, a processor will receive instructions and data from a read-only memory or a random-access memory or both. Elements of a computer can include a processor for performing instructions and one or more memory devices for storing instructions and data. Generally, a computer will also include, or be operatively coupled to receive data, transfer data or both, to/from one or more mass storage devices for storing data e.g., magnetic disks, magneto optical disks, optical disks, or solid-state disks. However, a computer need not have such devices. Moreover, a computer may be embedded in another device, e.g., a mobile telephone, a personal digital assistant (PDA), a mobile audio player, a Global Positioning System (GPS) receiver, etc. Computer-readable media suitable for storing computer program instructions and data include all forms of non-volatile memory, media and memory devices, including, by way of example, semiconductor memory devices (e.g., Erasable Programmable Read-Only Memory (EPROM), Electronically Erasable Programmable Read-Only Memory (EEPROM), and flash memory devices), magnetic disks (e.g., internal hard disks or removable disks), magneto optical disks (e.g. Compact Disc Read-Only Memory (CD ROM) disks, Digital Versatile Disk-Read-Only Memory (DVD-ROM) disks) and solid-state disks. The processor and the memory may be supplemented by, or incorporated in, special purpose logic circuitry.

To provide for interaction with a user, implementations may be realized on a computer having a display device, e.g., a Cathode Ray Tube (CRT) or Liquid Crystal Display (LCD) monitor, for displaying information to the user, and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back-end component, e.g., a data server, or that includes a middleware component, e.g., an application server, or that includes a front-end component, e.g., a client computer having a graphical user interface or a Web browser through which a user may interact with an implementation, or any appropriate combination of one or more such back-end, middleware, or front-end components. The components of the system may be interconnected by any appropriate form or medium of digital data communication, e.g., a communication network. Examples of communication networks include a Local Area Network (LAN) and a Wide Area Network (WAN), e.g., Intranet and Internet.

The computing system may include clients and servers. A client and server are generally remote from each other and typically interact through a communication network. The relationship of the client and server arises by virtue of computer programs running on the respective computers and having a client-server relationship to each other.

Embodiments of the present invention may comprise or utilize a special purpose or general purpose computer including computer hardware. Embodiments within the scope of the present invention may also include physical and other computer-readable media for carrying or storing computer-executable instructions and/or data structures. Such computer-readable media can be any media that can be accessed by a general purpose or special purpose computer system. Computer-readable media that store computer-executable instructions are physical storage media. Computer-readable media that carry computer-executable instructions are transmission media. Thus, by way of example and not limitation, embodiments of the invention can comprise at least two distinctly different kinds of computer-readable media: physical computer-readable storage media and transmission computer-readable media.

Although the present embodiments have been described with reference to specific example embodiments, it will be evident that various modifications and changes may be made to these embodiments without departing from the broader spirit and scope of the various embodiments. For example, the various devices, units, and modules described herein may be enabled and operated using hardware circuitry (e.g., Complementary Metal Oxide Semiconductor (CMOS) based logic circuitry), firmware, software (e.g., embodied in a non-transitory machine-readable medium), or any combination of hardware, firmware, and software. For example, the various electrical structures and methods may be embodied using transistors, logic gates, and electrical circuits (e.g., Application Specific Integrated Circuit (ASIC) and/or Digital Signal Processor (DSP) circuit).

In addition, it will be appreciated that the various operations, processes, and methods disclosed herein may be embodied in a non-transitory machine-readable medium and/or a system. Accordingly, the specification and drawings are to be regarded in an illustrative rather than a restrictive sense.

Physical computer-readable storage media includes RAM, ROM, EEPROM, CD-ROM or other optical disk storage (such as CDs, DVDs, etc.), magnetic disk storage or other magnetic storage devices, solid-state disks or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures, and which can be accessed by a general purpose or special purpose computer. Combinations of the above, that enable the transport of electronic data between computer systems and/or modules and/or other electronic devices, are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (NIC), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binary, intermediate format instructions such as assembly language, or even source code. Although the subject matter has been described in language specific to structural features and/or methodological acts, it is to be understood that the subject matter defined in the claims is not necessarily limited to the described features or acts described. Rather, the described features and acts are disclosed as example forms of implementing the claims.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order to achieve desired results, this should not be understood as requiring that such operations be performed in the particular order shown or in sequential order or that all illustrated operations be performed, to achieve desirable results. In certain circumstances, multitasking and parallel processing may be advantageous. Moreover, the separation of various system components in the implementations should not be understood as requiring such separation in all implementations, and it should be understood that the described program components and systems may generally be integrated together in a single software product or packaged into multiple software products.

Even though particular combinations of features are recited in the claims and/or disclosed in the specification, these combinations are not intended to limit the disclosure of possible implementations. Other implementations are within the scope of the following claims. For example, the actions recited in the claims may be performed in a different order and still achieve desirable results. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

Further, the methods may be practiced by a computer system including one or more processors and computer-readable media such as computer memory. In particular, the computer memory may store computer-executable instructions that when executed by one or more processors cause various functions to be performed such as the acts recited in the embodiments.

The disclosure provides illustration and description but is not intended to be exhaustive or to limit the implementations to the precise form disclosed. Modifications and variations are possible in light of the above disclosure or may be acquired from practice of the implementations.

Those skilled in the art will appreciate that the invention may be practiced in network computing environments with many types of computer system configurations including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, etc. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The following terms and phrases, unless otherwise indicated, shall be understood to have the following meanings:

As used herein, the term "impact focus" refers to an event or program that can contribute to environment or social cause. The term "impact focus" may also refer to an awareness program.

As used herein, the term "IO profile" refers to a profile associated with at least one of a buyer and a seller. The IO profile is a page which records any activities executed by the user (e.g., seller and buyer). The IO profile is a page that also records achievements, contributions etc. done by the user. Upon viewing the IO profile, one may get to know the status, achievements, contributions, bio, etc. of the user.

As used herein, the term "product information" refers to information of the product. The product information comprises an image of the first product, a product type, a product title, a product caption, product collection details, a product anatomy uniform resource identifier (URI), a product specification, size variations available for the first product, price variations available for the first product, one of product launch information and product edition information, product class information, and one of run size information and the volume of the first product available for sale, etc. The product information comprises information that is required to create a product listing on a digital platform.

As used herein, the term "service information" refers to information of the service. The service information comprises a description of the first service, a service type, a service title, a service caption, service collection details, service class information, structured metadata, and service launch information, etc. The service information comprises information that is required to create a product listing on a digital platform.

As used herein, the term "blockchain network" refers to a network of distributed computing systems. The blockchain network is a technical infrastructure that provides ledger and smart contract (chain code) services to applications. The term blockchain refers to a distributed database that is shared among the nodes of a computer network.

As used herein, the term "launch" refers to an event of bringing a new product into the market. In an embodiment, the launch further refers to listing a product for sale on the digital platform.

As used herein, the term "edition" refers to particular version of a product such as a digital product or an artistical work. In an embodiment, the term "edition" may also refer to all the copies of the digital product or the artistical work that are published/created at one time. In another embodiment, the term "edition" may refer to one of the several versions of the digital product or the artistical work that are printed or broadcast each day, each week, or on some other regular schedule.

As used herein, the term "digital product" refers to a product that is created, recorded, stored, and transferred digitally. The digital product may be an intangible product. The digital product comprises a non-fungible token, digital currency, digital smell, etc.

As used herein, the term "physical product" refers to a retail product that is manufactured, stored, and shipped physically. The physical product is a tangible product. The primary product comprises at least one of but not limited to an electronic item, apparels, jewels, etc.

As used herein, the term "digital service" refers to a service that can be executed digitally and does not require physical interaction. The digital service comprises at least one of but not limited to a digital banking, a digital verification, etc.

As used herein, the term "physical service" refers to a service that has to be executed physically. The physical service comprises at least one of but not limited to a delivery service, a transport service, etc.

As used herein, the term "digital platform" refers to a digital marketplace where the products are listed for sale to the consumers. The digital platform further refers to the digital marketplace where the buyers can view the product details and buy products.

As used herein, the term "run size" refers to a current count of the product listed for sale currently among the total number of products listed for sale.

As used herein, the term "cryptographically secured" refers to an encrypted data that is extremely hard for a third party to decrypt and predict what the encrypted data might be.

As used herein, the term "serial number" refers to an identification number assigned to each individual item in order to distinguish that item from all others.

As used herein, the term "item" refers to at least one of but not limited to a first product, a second product, a first service, and a second service listed on the digital platform. The item further encompasses physical products, as well as digital products and services.

As used herein, the term "impact contribution" refers to a fund contributed to the impact by the users. The impact contribution further refers to percent of money debited automatically by the smart contract.

As used herein, the term "anatomy" refers to a layout of a product that is created to dissect into various parts.

As used herein, the term "product linking" refers to a process of linking products. The products that are linked together may or may not be listed together. The product linking may be performed via one of one to one linking, one to many linking, many to few linking, and order of purchase linking.

As used herein, the term "impact information" refers to information related to creating an impact. The term "impact information" may comprise information related to the product that can impact environment or society.

As used herein, the term "interactive outcome (IO) pipeline" refers to an activity that defines a sequence of tasks to be executed by the user to get rewards or incentives. The user may define the sequence of tasks while creating the IO pipeline. The sequence of tasks may include any tasks that are capable of being executed by the user.

As used herein, the term "footprint" refers to a mark of achievement of the seller/brand. The footprint may be computed by size of the company, investments, contribution to society or impact, etc. The footprints comprise at least one of planetary, people, problems without border, ethical, company, offset, product, and cradle to cradle. The footprint comprises various levels. The IO profile comprises information about the footprints.

As used herein, the term "handprint" refers to a mark of achievement of a consumer on the digital platform. The handprint may be computed based on contribution of the consumer towards the impact, purchase of a product, execution of the sequence of tasks defined, etc. The IO profile comprises information about the handprints.

As used herein, the term "impact oriented (IO) seal" refers to a status of achievement by the consumer or seller on the digital platform. The IO seal may be computed based on IO metrics calculated from the IO profile.

As used herein, the term "impact oriented (IO) audit" refers to an auditing conducted on the IO profile based on the activities executed by the user, purchases, contributions towards, impacts, lifecycle, etc. The IO audit is performed to analyze the IO profile for the predefined time period and to update the IO profile.

As used herein, the term "catalog" refers to a list or record of items. The list or record of items may be categorized as a collection. The list or record of items may comprise at least one unique attribute.

As used herein, the term "NFT" refers to a non-fungible token that is non-replicable. The NFT can be generated, stored, and transferred digitally via a blockchain network. The NFT may be a unique item. The NFT may comprise one of a custom impact NFT, and smart contract based clearing house NFT. The custom impact NFT is the NFT created by local artisans. In case of sale of the custom impact NFT, a seller can contribute to an impactful nonprofit program associated with that custom impact NFT or make a value chain contribution to empower local artisans. The smart contract based clearing house NFT may be associated with impact focus wallets of the smart contract based clearing house. During the product creation process, the seller can set up the product around committing a substantial contribution to the impact focus wallets of the smart contract based clearing house.

As used herein, the term "impact oriented (IO) token" refers to a token which is a combination of both listing fees and minting fees of a product. The digital platform requires an IO token to list the product onto the digital platform. The IO tokens may be purchased by the user as bundles based on the inventory and listing requirements.

As used herein, the term "countdown timer" refers to a timer that is set to run for a predefined time period. The countdown timer indicates the current time running out of the total time of the predefined time period and the remaining time left. The countdown timer may be set for a flash sale, a launch of a product, etc.

As used herein, the term "listing fees" refers to a fee that is incurred for listing a product onto the digital platform for a predefined time period.

As used herein, the term "minting fees" refers to a fee that is incurred for minting tokens, or NFT onto the digital platform for a predefined time period.

As used herein, the term "inventory" refers to products and items that a brand holds for sale, resale, or utilization, etc.

As used herein, the term "punch card" refers to a card in which holes are punched in designated positions to represent data. The punch card may receive a punch in a predefined position upon executing an activity as defined by at least one of an IO pipeline, digital marketplace, the buyer, etc. The punch card upon receiving the appropriate punches at the appropriate position may communicate to the IO rewarding unit to incentivize the buyer.

As used herein, the term "cryptographically secured digital asset" refers to a digital asset that is secured cryptographically via a blockchain network. The cryptographically secured digital asset may be an NFT, a digital currency, a cryptocurrency, etc.

FIG. 1 illustrates a schematic view of a system, according to one or more embodiments. The system comprises a user device 102, a host system 104, a digital marketplace server 106, a blockchain network 108, and a cryptographically secured digital asset creator 110. The user device 102 may be associated with a user. The user is at least one of a seller, a buyer, and a visitor. The visitor is the one who scrolls and navigates a digital marketplace. The visitor may be the buyer in the future. The user device 102 comprises one of a laptop, a computer, a tablet, a smart watch, and an internet enabled device. The user device 102 may be utilized by the user to interact with the system. The user device 102 may assist the user to execute at least one activity. The user may possess a wallet. The user can access the wallet via the user device. The wallet comprises a private cryptographic key that permits the user device to access encrypted data associated with the cryptographically secured digital asset (e.g., coupon, a non-fungible token (NFT)). The key also enables the data to transfer the cryptographically secured digital asset.

The blockchain network 108 may comprise at least one cryptographically secured digital asset (e.g., a non-fungible token (NFT)). The cryptographically secured digital asset can be transferred between a first party and a second party via the blockchain network 108. The blockchain network 108 is an immutable distributed ledger that can record activities that happened via the blockchain network 108. The cryptographically secured digital asset can be traded between parties via the blockchain network 108.

The host system 104 is communicatively coupled to the blockchain network 108. The host system 104 is configured to initially create and store the cryptographically secured digital assets for trading purposes. The host system 104 is also configured to provision the cryptographically secured digital assets. The host system 104 is also configured to handle data processing and coordinating transactions. The host system 104 is responsible for administrative activities. The host system 104 is communicatively coupled to the cryptographically secured digital asset creator 110. The host system 104 instructs the cryptographically secured digital asset creator 110 based on predefined rules and predefined styles to generate a cryptographically secured digital asset (e.g., NFT).

The cryptographically secured digital asset creator 110 receives instructions from the host system 104, and creates the cryptographically secured digital asset. In an embodiment, the user, via the user device 102, may provide inputs to the cryptographically secured digital asset creator 110 to create the cryptographically secured digital asset (e.g., NFT). The cryptographically secured digital asset may be a unique series of the cryptographically secured digital asset. In an embodiment, the cryptographically secured digital asset comprises a unique series of NFTs. The unique series of NFTs generated may not be available for sale. Instead, the unique series of NFTs can be earned only when executing the activities defined by the system.

The digital marketplace server 106 receives inputs from a user (e.g., a seller, a buyer, and a visitor). The digital marketplace server 106 receives one of first product information and first service information through the blockchain network from the seller. The digital marketplace server 106 then creates one of product listing of a first product and a first service on a digital platform based on the first product information. The digital marketplace server 106 transparently lists product details of the first product, through the blockchain network, on the digital platform. The digital marketplace server 106 then dynamically assigns and publishes a price of one of the first product and the first service based on at least one of an edition, a run size, a launch, and a volume of the first product using a smart contract. The first product comprises one of a physical product, and a digital product. The first product information comprises an image of the first product, a product type, a product title, a product caption, product collection details, a product anatomy, a product specification, size variations available for the first product, price variations available for the first product, product launch information, product edition information, product class information, and the volume of the first product available for sale.

Figure 2:
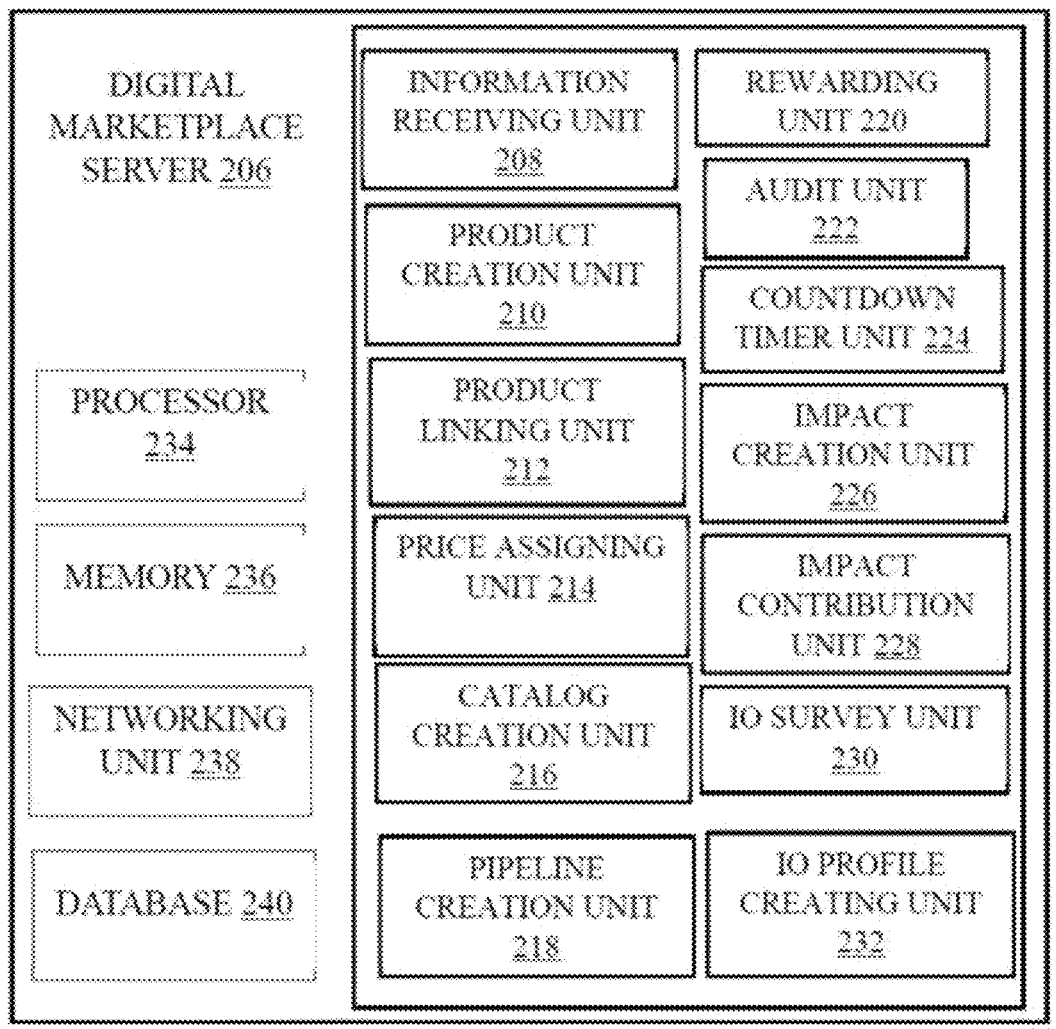
FIG. 2 illustrates an exploded view of a digital marketplace server 206, according to one or more embodiments.

FIG. 2 illustrates an exploded view of a digital marketplace server 206, according to one or more embodiments. The digital marketplace server 206 comprises an information receiving unit 208, a product creation unit 210, a product linking unit 212, a price assigning unit 214, a catalog creating unit 216, a pipeline creation unit 218, a rewarding unit 220, an audit unit 222, a countdown timer unit 224, an impact creation unit 226, and an impact focus contribution unit 228. The digital marketplace server 206 further comprises a processor 234, and a memory 236. The digital marketplace server 206 further comprises a networking unit 238, and a database 240.

The information receiving unit 208 comprises receiving information from a user. The user may be at least one of a seller, a buyer, and a visitor. The information receiving unit 208 receives at least one of first product information, second product information, third product information, first service information, second service information, and third service information. The first product information comprises an image of the first product, a product type, a product title, a product caption, product collection details, a product anatomy, a product specification, size variations available for the first product, price variations available for the first product, product launch information, product edition information, product class information, and the volume of the first product available for sale.

The information receiving unit 208 is also configured to receive impact information from the seller through the blockchain network. The information receiving unit 208 may further receive at least one of second product information, and third product information. The second product information comprises an image of the second product, a product type, a product title, a product caption, product collection details, a product anatomy, a product specification, size variations available for the second product, price variations available for the second product, product launch information, product edition information, product class information, and a volume of the second product available for sale. The third product information comprises information similar to the first product information, and the second product information, but with respect to the third product.

The product creation unit 210 creates one of the first product and the first service based on the first product information received. The product creation unit 210 transparently lists product details of one of the first product and the first service on the digital platform. The first product comprises one of a physical product and a digital product. The product creation unit 210 creates a product anatomy of the first product. The product creation unit 210 creates the product anatomy of one of the first product and the first service by creating a systematic diagram of the first product. The product creation unit 210 then dissects the systematic diagram to various parts and creates interactive labels that directly overlay the various parts. The product creation unit 210 then hyperlinks the interactive labels with at least one of an activity, an information, a research material, a report, a study, a recommendation, and a do it yourself (DIY) recipe relevant to the first product. The product creation unit 210 is configured to establish and create two or more product types (e.g., a physical product type, a digital product type, etc.).

In an embodiment, the product creation unit 210 creates at least one of the second product, and the third product when at least one of the second product information and the third product information are received from the seller. The product creation unit 210 then creates product anatomy of the second product and the third product and hyperlinks the interactive labels of the second product and the third product.

The product linking unit 212 links the first product, the second product, and the third product. The first product may be a physical product (e.g., a retail product). The second product may be a digital product (e.g., an NFT). The NFT may be a custom impact NFT, and a smart contract based clearing house NFT. The product linking unit 212 creates a custom link between the first product and the second product. The product linking unit 212 links the products of several types and enables the digital platform to sell the physical product in conjunction with the NFT and vice versa. The product linking unit 212 gives the seller the ability to link the digital products with the physical products to incentivize and sell more inventory.

The product linking unit 212 links the products to one another in an intentional or randomized sequence. The product linking unit 212 links the products and creates purchase incentives by building relationship threads between two or more inventory volumes based on unique, product-specific serial numbers/SKUs for e-commerce. The product linking unit 212 executes the product linking via at least one of one to one relationship linking, many to few relationship linking, and an order of purchase relationship linking.

The product linking unit 212 executes the one to one relationship linking where the volume of a first product inventory is directly proportional, and equals, the volume of a second product inventory, a tertiary product inventory, etc. and the serial numbers/stock keeping units get matched. The product linking unit 212 executes the one to one relationship linking where the serial numbers get matched in one of a sequential linking, a custom linking, and a random linking. The one to one relationship linking comprises at least one of a one to one sequential relationship linking, a one to one customized relationship linking, and a one to one randomized relationship linking.

The product linking unit 212 executes the one to one sequential relationship linking where a first item of the first product gets matched with a first item of the second product and so on. In the one to one sequential relationship linking, an option to purchase a specific linked product is always disclosed to an end-consumer. The product linking unit 212 executes the one to one customized relationship linking based on the seller's inputs. The one to one customized relationship linking is performed where the seller can create custom links between the established product types. The custom links will be non-sequentially established at brand's discretion between the established product types. An option to purchase a specific linked product is optional to be disclosed to the end-consumer determined by the seller in the one to one customized relationship linking. The product linking unit 212 enables the seller to generate truly randomized connections between the number of established product types in the one to one randomized relationship linking. The product linking unit 212 executes the one to one randomized relationship linking by computationally making the randomized connections. An option to purchase a specific linked product is never disclosed to the end-consumer in the one to one randomized relationship linking.

The product linking unit 212 executes the many to few relationship linking where the volume of a first product inventory is inversely proportional to one of the volume of a second product inventory, and the volume of a third product inventory. The product linking unit 212 executes the many to few relationship via at least one of a many to few sequential relationship linking, a many to few customized relationship linking, and a many to few randomized relationship linking. The product linking unit 212 executes the many to few sequential relationship linking by incentivizing and highlighting first of and last of the first product large volume inventory with a second product smaller volume inventory. An option to purchase a specific linked product is always disclosed to the end-consumer (e.g., buyer). The product linking unit 212 executes the many to few customized relationship linking by incentivizing the entire larger volume of the first product inventory with non-sequential link allocation of the smaller second product inventory to select product links in the larger inventory. The disclosure of the product links to the end-customer is optional. The product linking unit 212 executes the many to few randomized relationship linking by allowing the smaller inventory volumes to link up to the larger primary inventory volume through computationally generated randomization. An option to purchase a specific linked product is never disclosed to the end-consumer.

The product linking unit 212 executes the order of purchase relationship linking. The order of purchase relationship linking dictates allocation of linked products of the primary product when the primary product is purchased. The product linking unit 212 executes the order of purchase relationship linking through at least one of an order of purchase sequential relationship linking, an order of purchase randomized relationship linking, and an order of purchase customized relationship linking. The order of purchase sequential relationship linking entitles the buyer to buy the first of the volume (e.g., first item of the second product, I/N item of the second product) when the buyer is the first to purchase the first product. The order of purchase sequential relationship linking entitles the buyer to buy the product which has greater perceived value than a later purchase tethered to a later volume number, creating an incentive to buy early. An option to purchase a specific linked product is always disclosed to the end-consumer in the order of purchase sequential relationship linking. The order of purchase randomized relationship linking entitles the buyer not to buy one of a first item of a second product and a third product when the buyer is first and buying the first product. The order of purchase randomized relationship linking entitles the buyer to buy any number in the volume of one of the second product and the third product when the buyer is first and buying the first product. The order of purchase customized relationship linking entitles the buyer not to even receive any volume number of the second product, as product links are allocated entirely at random through the entire first product volume. The order of purchase customized relationship linking is like a guessing game of not knowing which buyer is even going to end up getting a bonus product from a second or third product. An option to purchase a specific linked product is never disclosed to the end-consumer (e.g., buyer).

One-to-One Sequential product linking: The brand process flow of One-to-One Sequential product linking is described below for better understanding. Consider a physical product type, a shoe, with a specific volume, 100 is created. The digital product type, a NFT, with a specific volume, 100 is also created. During the Product Link Step, the product linking unit enables the brand to link the specific products together sequentially, automatically. The product linking unit enables the brand to automatically link products together sequentially through a call to action button "Auto Link". The first product from the primary product, the shoe, would be linked to the first product of the secondary product, the NFT. The shoe and the NFT link will be applied to all 100 products sequentially automatically. The option to disclose the links to customers on the products' details screen cannot be changed by the brand. The product linking unit locks the "Disclose Links to Customer" label. The product linking unit displays all the linked products listed on the page in a table view and provides the seller the ability to set the price for each linked product, and confirm the links established.

The brand process flow of One-to-One Sequential product linking is as follows. The product linking unit shows the specific linked product offerings along with the product details, impact, IO pipeline, IO profile, and more detailed information about the brand to the consumer. The product linking unit enables the user to choose the specific item in the volume of product offerings from the available linked products. The product linking unit adds both products to the user's cart when the user clicks the "Buy" button for a linked product offerings. The only option for linked products would be for the user to purchase both products at the same time.

One-to-One Customized product linking: The brand process flow of One-to-One Customized product linking is described below for better understanding. Consider a physical product type, a shoe, with a specific volume, 100 is created. The digital product type, a NFT, with a specific volume, 100 is also created. During the Product Link Step, the product linking unit enables the brand to link the specific products together in a custom manner.

The product linking unit enables the brand to choose the specific product from the volume of the primary products and choose the specific product from the volume of the secondary products. The product linking unit enables the brand to select the first product from the primary product, the shoe, by a checkbox. This specific product will now appear as the primary product for the linked product they are establishing. The product linking unit enables the brand to select the second product, the NFT, by a checkbox. This specific product will now appear as the secondary product for the linked product they are establishing. For instance, the product linking unit establishes the link between the 12th shoe and the first NFT. The product linking unit enables the brand to repeat the linking for all the 100 primary products (the shoe), and link them to all 100 of the secondary products (the NFT). Each link is chosen by the brand. The product linking unit enables the brand to disclose the order that the products were linked. The product linking unit enables the brand to set to the active state "Disclose Links to Customer". The product linking unit enables the brand to set "Do not Disclose to Customer". The product linking unit enables the brand to see all the custom linked products listed on the page in a list view with the ability to set the price for each linked product. The product linking unit further enables the brand to remove the link established if needed, and confirm the links established.

The purchase process flow of One-to-One Customized product linking is described below: The product linking unit shows the linked product offerings along with the product details, impact, IO pipeline, IO profile, and more detailed information about the brand. The linked product offerings are shown based on how the brand configured the links disclosure when the product was created. The product linking unit shows the specific linked product offerings when "Disclose Links to Customer" is selected by the brand. The product linking unit does not show the specific linked product offerings when "Do not Disclose Links to Customer" is selected by the brand. The product linking unit makes the customer aware that secondary product offerings are guaranteed with the purchase of the product, just not the specific number in the volume of secondary product offerings.

The product linking unit enables the buyer to choose the specific item in the volume of product offerings from the available linked products. When the user clicks the "Buy" button for a linked product offerings under "Disclose Links to Customer", the product linking unit adds both products to the user's cart. The specific secondary product offering in the run of product offering will be made available for the customer at the time of purchase. When the user clicks the "Buy" button for a linked product offerings under "Do not Disclose Links to Customer", the product linking unit adds both products to the user's cart. The specific secondary product offering in the run of product offering will not be made available until after purchase.

One-to-One Randomized product linking: The brand process flow of One-to-One Randomized product linking is described below for better understanding. Consider a physical product type, a shoe, with a specific volume, 100 is created. The digital product type, a NFT, with a specific volume, 100 is also created. During the Product Link Step, the product linking unit enables the brand to link the specific products together randomly. The product linking unit enables the brand to automatically link products together through a call to action button "randomized product Link". The product linking unit computationally randomizes the links between all the products for each of the 100 primary products with one of the secondary products, linking them together in a randomized order.

The option to disclose the links to customers on the products' details screen cannot be changed by the brand. The product linking unit locks the "Disclose Links to Customer" label. The product linking unit displays all the randomized linked products listed on the page in a list view. The product linking unit further provides the seller with the ability to set the price for each linked product. Once complete, the product linking unit displays all the auto linked products listed on the page in a list view. The product linking unit further provides the seller the ability to set the price for each linked product, and confirm the links established.

The purchase process flow of One-to-One Sequential randomized linking is as follows. The product linking unit shows the specific linked product offerings and the non-linked product offerings. The product linking unit shows the specific linked product offerings along with the product details, impact, IO pipeline, IO profile, and more detailed information about the brand to the consumer. The product linking unit enables the user to choose the specific item in the volume of product offerings from the available linked products. The product linking unit shows details to the customer about the secondary product offering being randomly linked to the product being purchased. The product linking unit does not display specific details. The product linking unit adds both products to the user's cart when the user clicks the "Buy" button for a linked product offerings. The secondary product offering in the run of product offering will not be made available until after purchase. The only option for linked products would be for the user to purchase both products at the same time.

One-to-Many Sequential product linking: The brand process flow of One-to-Many Sequential product linking is described below for better understanding. Consider a physical product type, a shoe, with a specific volume, 100 is created using the production creation unit. The digital product type, a NFT, with a specific volume, 10 is also created using the production creation unit. During the Product Link Step, the product linking unit enables the brand to link the specific products together sequentially, automatically. The product linking unit enables the brand to automatically link products together sequentially through a call to action button "Auto Link". The first product from the primary product (the shoe), would be linked to the first product of the secondary product (the NFT). The shoe and the NFT link will be applied to first 10 products of the primary product and linked to all 10 of the secondary products sequentially and automatically. The option to disclose the links to customers on the products' details screen cannot be changed by the brand. The product linking unit locks the "Disclose Links to Customer" label. The product linking unit displays all the linked products listed on the page in a list view and provides the seller the ability to set the price for each linked product.

The purchase process flow of One-to-many Sequential product linking is as follows. The product linking unit shows the specific linked product offerings and the non-linked product offerings along with the product details, impact, IO pipeline, IO profile, and more detailed information about the brand to the consumer. The product linking unit enables the user to choose the specific item in the volume of product offerings from the available linked products or non-linked product offerings available. The product linking unit adds both products to the user's cart when the user clicks the "Buy" button for a linked product offerings. The product linking unit adds only one product to the user's cart when the user clicks the "Buy" button for the product offerings not linked. The product linking unit displays both linked products and non-linked products to the user.

One-to-Many customized product linking: The brand process flow of One-to-Many customized product linking is described below for better understanding. Consider a physical product type, a shoe, with a specific volume, 100 is created using the production creation unit. The digital product type, a NFT, with a specific volume, 10 is also created using the production creation unit. During the Product Link Step, the product linking unit enables the brand to choose the specific product from the volume of the primary products and choose the specific product from the volume of the secondary products. The product linking unit enables the brand to select the first product from the primary product, the shoe, by a checkbox. This specific product will now appear as the primary product for the linked product they are establishing. The product linking unit enables the brand to select the second product, the NFT, by a checkbox. This specific product will now appear as the secondary product for the linked product they are establishing. For instance, the product linking unit establishes the link between the 12th shoe and the first NFT when the "12th man" is coined by the Brand. The product linking unit enables the brand to repeat the linking for all the 10 secondary products (the NFT), and link them to just 10 of the primary products (the shoe). Each link is chosen by the brand. The product linking unit enables the brand to disclose the order that the products were linked. The product linking unit enables the brand to set to the active state "Disclose Links to Customer". The product linking unit enables the brand to set "Do not Disclose to Customer". The product linking unit enables the brand to see all the custom linked products listed on the page in a list view with the ability to set the price for each linked product. The product linking unit further enables the brand to remove the link established if needed, and confirm the links established The purchase process flow of One-to-many customized product linking is as follows. The product linking unit shows the specific linked product offerings along with the product details, impact, IO pipeline, IO profile, and more detailed information about the brand to the consumer. The product linking unit shows the specific linked product offerings based on how the brand configured the links. The product linking unit shows the specific linked product offerings when "Disclose Links to Customer" option is selected by the brand. The product linking unit does not show the specific linked product offerings when "Do not Disclose Links to Customer" is selected by the brand. The product linking unit makes the customer aware that secondary product offerings are guaranteed with the purchase of the product, just not the specific number in the volume of secondary product offerings. The product linking unit enables the buyer to choose the specific item in the volume of product offerings from the available linked products and non-linked products. When the user clicks the "Buy" button for a linked product offerings under "Disclose Links to Customer", the product linking unit adds both products to the user's cart. The specific secondary product offering in the run of product offering will be made available for the customer at the time of purchase. When the user clicks the "Buy" button for a non-linked product offerings under "Do not Disclose Links to Customer", the product linking unit adds only the primary product to the user's cart.

Many-to-few randomized product linking: The brand process flow of many-to-few randomized product linking is described below for better understanding. Consider a physical product type, a shoe, with a specific volume, 100 is created using the production creation unit. The digital product type, a NFT, with a specific volume, 10 is also created using the production creation unit. During the Product Link Step, the product linking unit enables the brand to link the specific products together randomly. The product linking unit enables the brand to automatically link products together through a call to action button "randomized product Link". The product linking unit computationally randomizes the links between all 10 secondary products, the NFT, which will be linked to just 10 of the primary products, the shoe, distributed randomly amongst the 100 primary products.

The option to disclose the links to customers on the product details screen cannot be changed by the brand. The product linking unit locks the "Do not Disclose Links to Customer" label. The product linking unit displays all the randomized linked products listed on the page in a list view. The product linking unit further provides the seller with the ability to set the price for each linked product. Once complete, the product linking unit displays all the auto linked products listed on the page in a list view. The product linking unit further provides the seller the ability to set the price for each linked product, and confirm the links established. When the customer purchases the product, they will not be shown what secondary products are linked to the primary products but will be aware the primary product does have 10 total product links, and the secondary product details.

The purchase process flow of many-to-few randomized linking is as follows. The product linking unit shows the specific linked product offerings and the non-linked product offerings. The product linking unit shows the specific linked product offerings on the product details screen. The product details screen will show the details of the second product offering along with the product details, impact, IO pipeline, IO profile, and more detailed information about the brand to the consumer. The product linking unit enables the user to choose the specific item in the volume of product offerings from the available linked products. The product linking unit shows details to the customer about the secondary product offering being randomly linked to the product being purchased. The product linking unit does not display specific details. The product linking unit adds both products to the user's cart when the user clicks the "Buy" button for a linked product offerings. The secondary product offering in the run of product offering will not be made available until after purchase. The only option for linked products would be for the user to purchase both products at the same time.

Order of Purchase product linking: The product linking unit automatically links the product during the time of purchase in the order of purchase product linking. Consider a physical product type, a shoe, with a specific volume, 100 is created using the production creation unit. The digital product type, a NFT, with a specific volume, 10 is also created using the production creation unit. During the Product Link Step, the product linking unit enables the brand to select the option, "Order of Purchase". The product linking unit provides the following three options that automatically link the products together at the time of purchase.

Sequential: The product linking unit, via the sequential order of purchase, provides the first of the volume or run of the secondary and or tertiary (i.e., #1 or 1/N) when the buyer is first to buy a primary product. Random Purchase Order: The product linking unit, via the random order of purchase, provides any number from the volume or run of the secondary and or tertiary (i.e., #1 or 1/N) product, when the buyer is first to buy a primary product. The random purchase order is like creating a guessing game of who is going to end up with the 1st of the run. Customize Purchase Order: No matter when the buyer buys the first product, the buyer may or may not receive a secondary product. Like Golden Tickets, the secondary product is randomly linked to the primary product, so anyone can receive the hidden secondary product at any point.

The price assigning unit 214 dynamically assigns a price for at least one of the first product, the second product, and the third product. The price assigning unit 214 dynamically assigns the price based on at least one of an edition, a run size, a launch, and a volume of the first product using a smart contract. The price assigning unit 214 dynamically assigns the price for each edition and run size. For example, consider the NFT having a volume of 200 published for sale. The price assigning unit 214 dynamically assigns and publishes a price for each edition and each run size (i.e., for each edition and run size of the NFT, the price varies). The price assigning unit 214 publishes the price for at least one of the first product, the second product, and the third product when the price assigning is done. The price assigning unit 214 further publishes the product details for the products.

The catalog creating unit 216 creates an interactive e-catalog for at least one of the first product, the second product, and the third product. The interactive e-catalog holds a list of products. The catalog creating unit 216 creates the interactive e-catalog split into at least one of a collection category, a cluster category, a relisting category, a product category, recommendation category, NFT category, favorites category, a trending category, an IO score category, and an history category. The catalog creating unit 216 further enables the user (e.g., buyer, seller) to interact with the interactive e-catalog and sort at least one category of the interactive e-catalog. The interactive e-catalog enables the user to filter and retrieve the desired products. The interactive e-catalog is a compendium of all product listings in their respective collections in a user-friendly digital book.

The interactive e-catalog enables the user to quickly access and notice conveniently what collectibles and products they own. The interactive e-catalog enables the user to quickly access what is available to them still given their past purchase behavior and preferences. The interactive e-catalog enables the user to interactively customize their offering based on a buying behavior. The interactive e-catalog is capable of personalization based on purchase preferences and behaviors exhibited on the platform by the users (e.g., consumers and collectors). The interactive e-catalog also offers consumers and collectors the opportunity to view a responsive checklist that discloses which items they own. The interactive e-catalog further enables users to view which items would be worth owning, given their previous purchases, and which items are similar to their prior acquisitions that are still available. The checklist also helps a collector discern in a glimpse what items within a collection are up for resale that will help them complete the collection they began buying up.

The interactive e-catalog comprises at least one of a product section, a collection section, a cluster section, a relisting section, a recommendation section, an NFT section, my favorite section, and my history section. The product section comprises the products created and listed by the seller. Each product listing shows whether the user has purchased the item and how many they own for each edition. The collection section comprises the collections created by the seller. Each collection will show a summary of the Collection and the user will be able to open each collection and view detailed results. The cluster section comprises the clusters created by the seller. The user has the ability to make an offer if the seller did not make the cluster available for sale or make an offer on individual items in the cluster. The relisting section on the account profile contains products based on the account that owns the shop, and the NFTs purchased under this account if chosen to relist them. The NFT being relisted and the account who created the NFT are shown. For example, John Doe buys Hive & Hamlet NFT, Hive & Hamlet will show under John Doe's relisting's once he has chosen to sell the Hive & Hamlet NFT. The recommendation section comprises account specific recommendations based on related items purchased for the specific shop. The NFT section comprises account specific NFTs purchased from the shop (i.e., seller). The favorites section comprises account specific NFTs added to the favorites list for the specific seller. The history section comprises account specific history of the item they have viewed in the specific shop. Each listing in the interactive e-catalog comprises the listing image, listing name, listing edition, and the number of NFTs owned in the listing edition.

The profile creating unit 232 creates an impact oriented (IO) profile for at least one of the seller, and the buyer. The profile creating unit 232 creates the IO profile of the seller based on at least one of valid public data available, contents submitted by the seller, and the seller creating a shop on the digital platform. The profile creating unit 232 is configured to create the IO profile just based on the valid and authenticated information from the valid public sources. The valid public data comprises preferences of the seller. The preferences of the seller may be extracted based on purchase history or search history of the seller. The contents submitted by the seller comprises the information provided by the seller. The profile creating unit 232 utilizes the information collected from public sources to initially populate the digital marketplace with the IO profiles of the sellers (i.e., brands). The profile creating unit 232 seeds an IO Profile database with companies that exist currently using public data sources to create the IO Profiles of established brands. The IO Profiles of established brands are used to catalog established brands that exist.

The profile creating unit 232 further enables the user (e.g., buyer, seller, visitor, etc.) to start contributing to the IO profile of the seller with contents such as gratitude, complaints, hacks, etc. The profile creating unit 232 further enables the user to add reviews in the form of IO Audits. The profile creating unit 232 further updates the IO profile based on the user contributed contents. The profile creating unit 232 further dynamically updates the IO profile as soon as there is an update in the user contributed contents. As the user contributes content, the profile creating unit 232 updates the IO profile in parallel. The profile creating unit 232 assigns an ownership of an IO profile to a brand as soon as the brand submits the proof of the brand ownership. The profile creating unit 232 enables only enterprises to submit the proof of the brand ownership. The profile creating unit 232 assigns the ownership of the IO profile to the brand when Secure Identity verification, and uploading supporting documentation, and business licenses, etc. are completed by the brand. In an embodiment, profile creating unit 232 assigns management of the IO profile to the digital marketplace server 206. The IO Profile and ownership are used in any future endeavors of the digital marketplace that are related to needing a brand profile and ownership/management in any way.

The profile creating unit 232 updates the IO profile of at least one of the seller, and the buyer. The profile creating unit 232 tracks an activity performed by the seller that can alter information in the IO profile. The profile creating unit 232 then records the activity through the blockchain network and updates the IO profile based on the activity executed. The profile creating unit 232 utilizes a utilitarian function at the end of quarter or on a regular basis to create updates on the IO profile of the brands and consumers alike. The IO profile is rendered to at least one of a buyer, a third party, and a community member. The IO profile shows the public view of the shop's IO Profile, and it is standing on and off the platform. The IO profile offers an overview of the seller's (i.e., brand's) footprints and their overall value to society, planet, consumers. The IO profile of the user enables the user to quickly access the favorites. The IO profile is a place where a user can describe things about their individual selves to others in the community. The IO profile comprises form fields such as: "About Me" "Favorite Shops" "Avatar" "Location" "Interests" "Birthdate" "Websites" "Gender" "Social Media Links" "Faith". The IO profile further enables the user to customize their profile with a cover photo and profile picture. The IO profile further comprises impact oriented (IO) seals, reviews, etc.

The IO profile of the seller is different from the IO profile of the buyer. The profile creating unit 232 creates the IO profile of the buyer based on at least one of a search history, a purchase history, and a Wishlist of the buyer. The IO profile of the seller is created when any public information can be found on a brand (i.e., seller or shop) name. The IO profile of the seller exists and builds out on the digital platform based on third party audits and consumer feedback irrespective of the seller claiming his profile. If the user signs up with a username that matches a username from the brand profile, then the digital marketplace server 206 may prompt the user to claim the brand. The seller can also sign up for an account to manage the brand profile. The seller may be a brand. The profile creating unit 232 enables the seller to claim the brand that has begun to build from public domain information once the seller signs up. For example, NIKE® can claim its Nike profile, and begin to build on, rehabilitate or evolve their engagement through that profile in an effort to own their whole story. The sellers who are not in the public domain may need to create the IO profile.

The profile creating unit 232 further enables the seller, who has the ownership of their brand profile on the digital marketplace via a valid account and proof of ownership, to edit the IO profile. The profile creating unit 232 further enables the seller to add to the record (similar to WIKIPEDIA® edits) in ways only with source justification (cite source of content) with a minimum of two validations from the public. The profile creating unit 232 enables the user to submit a stream of subsequent submissions. The profile creating unit 232 enables the user to view the IO profile in a single thread, along with the edit history of each IO profile field.

The IO profile enables the user to search within the entire directory of IO profiles and shows a dashboard. The dashboard comprises trending IO profiles, most recently added IO profiles, corrections to IO profiles, shop levels, and review ratings. The IO profile enables the user to access more details when the user performs one of searching the IO profile, selects the IO profile that appeared, and opens a link to the IO profile. The IO profile for a specific profile displays IO Seals, IO Review Rating (e.g., the aggregate 5 star rating from Human Inbox User Generated Content reviews). The IO profile also shows a list of brief details of the recent reviews of the IO Profile. The profile creating unit 232 enables the user to add a Review for the IO Profile they are viewing. The IO profile appears as easily accessible in all pages referencing the brand including Shop homepage, and Product Details Page.

The pipeline creation unit 218 defines an activity to the user. The user may execute the activity. The activity may be at least one of taking a quiz activity, an image submission activity, raise a question activity, tell a story activity, submit an answer to the question activity, take an action and submit proof activity, and buy a product activity. The pipeline creation unit 218 may define any activity that may advertise the products and increase the sale of the products.

The rewarding unit 220 is configured to provide an impact oriented (IO) reward to the user. The rewarding unit 220 may provide the IO reward upon verifying and confirming the completion of the activity by the user. The rewarding unit 220 may provide the IO reward upon ensuring the correctness of the response received from the user. The rewarding unit 220 may provide a cryptographically secured digital asset as the IO reward. The cryptographically secured digital asset comprises one of a non-fungible token, a coupon, etc. The rewarding unit 220 may also reward a unique reward upon completion of the defined activity within an optimal time. The unique reward is not available for sale.

The rewarding unit 220 may also generate and reward the unique reward (e.g., a unique series of NFT) upon verifying and confirming the completion of the activity by the user. The rewarding unit 220 rewards the unique series of NFT to the user as a token of appreciation for the completion of the activity by the user. The rewarding unit 220 may also reward the user upon completion of a sequence of tasks defined by an interactive outcome (IO) pipeline or responding to the IO survey/quiz. The rewards comprise at least one of NFT, generated NFTs, access codes, discounts, coupons, and badges. The badge is earned as a proof of participation and acts as social currency. The badge cannot be listed for sale. A collectible is an NFT that can be listed for sale and used to raise money for self.

The IO rewarding unit 220 also provides rewards by launching an impact oriented (IO) punch card. The impact oriented (IO) punch card comprises parameters for participation and for providing a punch to the IO punch card. The parameters define a purchase action that needs to be taken by the seller. The parameters further define the number of times the purchase action needs to occur before the consumer can build up enough "punches" toward being able to claim the "freebie" reward. The IO rewarding unit 220 provides each punch to the punch card when the purchase action has been fully executed. The IO rewarding unit 220 may reward the consumer with a unique limited edition NFT. The unique limited edition NFT is equivalent to a 10% discount.

The audit unit 222 is configured to perform an impact oriented (IO) audit on the IO profile. The audit unit 222 performs the IO audit on at least one of the IO profile of the seller and the buyer. The audit unit 222 performs the IO audit on the activity performed by the buyer and the IO profile of the buyer in real-time. The audit unit 222 determines impact oriented (IO) metrics achieved by the IO profile of the buyer as IO handprints based on the IO audit. The IO handprints comprise at least one of a planetary handprint, a people handprint, a problems without handprint, a community handprint, a product handprint, an offset handprint, an ethical handprint, and a company handprint. The first three handprints are earned based on contribution quotas. The fourth handprint is earned based on activity quotas. Fifth, sixth, seventh and eighth handprints are calculated as a percentage of total purchases made in favor of each footprint. As the buyer earns their handprints, the audit unit 222 shows impact oriented (IO) seals on their profile with their IO Level and IO score. The audit unit 222 determines the IO handprints achieved by the buyer based on the determination of the activity performed by the buyer. The audit unit 222 provides an impact oriented (IO) seal to the buyer based on the IO handprints.

The audit unit 222 performs the IO audit on the activity performed by the seller, and the IO profile of the seller in real-time. The audit unit 222 determines impact oriented (IO) metrics achieved by the IO profile of the seller as IO footprints based on the IO audit. The IO footprints comprise at least one of a planetary footprint, a people footprint, a problems without footprint, a community footprint, a product footprint, an offset footprint, an ethical footprint, and a company footprint. The audit unit 222 determines the IO footprints achieved by the seller based on the determination of the activity performed by the seller. The audit unit 222 provides an impact oriented (IO) seal to the seller based on the IO footprints. The seller cannot earn the IO seals through "making commitments" but rather through taking consistent actions. The audit unit 222 renders the IO seal to the brand of the seller when the brand has hit predetermined targets for their respective company size. The audit unit 222 determines whether the brand has met the criteria requested by each seal for each of the five levels. The audit unit 222 then credits the IO seal at that level to the brand upon confirming that the brand has met the criteria. The brand can always level up by creating greater transparency, participating in creating more impact in the world, or engaging the digital marketplace community of consumers more frequently. The audit unit 222 systematically analyzes the IO profile through the IO seals.

The audit unit 222 is configured to evaluate brands. In an embodiment, the audit unit 222 is configured to evaluate brands based on how they are showing up in real time. The audit unit 222 is configured to appraise brands on their conduct. The audit unit 222 performs a systematic data evaluation done quarterly on the digital marketplace in the form of an audit.

The audit unit 222 enables the seller to "Accept" "Refute" and "Flag for Review", as soon as content is submitted by brands/sellers on their IO Profile, consumers, and all other community members on the digital marketplace. The audit unit 222 enables the seller to submit a short form, fields include: "Reason" "Sources (upload articles, documents and cited material) that support the assertion" when the seller refutes a claim made by the brand. The audit unit 222 provides the IO Profile content submissions for consumer's evaluation in real time. The audit unit 222 further enables accredited auditors to click on "Independent Audit" and submit a third party audit. The third party audit may be submitted by filling the following form fields: "Name of Auditor" "Date" "Address" "Accreditation Agency" "Accreditation Type or Level" "Accreditation Title" "Clause" "Context" "Context of Organization" "Audit Outline" and then tabulating findings under three columns "Audit Question" "Audit Evidence" "Audit Summary."

The audit unit 222 evaluates the first four footprints solely based on numbers and can be ascertained based on in-platform activity. The audit unit 222 systematically evaluates the fifth and sixth footprints based on both community and auditor validations and verifications. The audit unit 222 is further configured to calculate IO metrics as footprints across eight categories such as planetary, people, problems without borders, community, product, offset, ethical and company. The first three footprints are earned based on contribution quotas, and the fourth is based on engagement quotas. The fifth and sixth are based on actions. The seventh and eighth footprints are based on disclosures. As a company earns their footprints, the IO seals will show up on their profile with their IO level and IO score.

The IO Seal is the value the brands get assigned at the end of each year, in seven areas of focus, based on how they have shown up on the digital platform. The value is appraised across 5 defined categories, qualified as IO Audit metrics. The audit unit 222 monitors and collects data on how every brand shows up over the past year and credits the IO seal. The IO seal is acquired by hitting quotas and fulfilling deliverables. The IO seals comprise five levels to their expression. The audit unit 222 shows the first IO seal once the first level has been achieved, there on the level will increase, 1 through 5, sequentially based on brand disclosures or actions. The audit unit 222 registers the IO seal level increase in real time beneath the seal in the form of levels and points scored. The audit unit 222 donates the IO seal to the brand when all aspects or quotas of each seal are met, the level achieved, the overall score. The audit unit 222 reviews the IO seals and updates the IO seals over a predefined time period (e.g., a year) when the actions based activity targets are continually met.

The countdown timer unit 224 creates a countdown timer on the digital platform. The countdown timer unit 224 creates the countdown timer based on an input from the seller. The input comprises a start time, an end time, a timer title, a start date, and an end date. The countdown timer unit 224 synchronizes the countdown timer to one of a seller's inventory, a collection within the seller inventory, and a specific product within the seller inventory. The countdown timer unit 224 dynamically publishes the price for the products throughout a countdown of the countdown timer. In an embodiment, the countdown timer unit 224 dynamically publishes a variable price for the first product throughout the countdown of the countdown timer. For example, the price of the first product at a first instance (e.g., within an hour from the start of the flash sale) is less, when compared to the price of the first product at a second instance (e.g., after 5 hours from the start of the flash sale). The time and the discount can be directly or inversely proportional. The countdown timer unit 224 then publishes the countdown timer. The countdown timer unit 224 publishes the countdown timer as one of days, hours, minutes, etc. The countdown timer unit 224 then creates a flash sale for at least one of the first product, the second product, and the third product. The flash sale may provide details regarding the product kept for sale. The countdown timer unit 224 records the timing at which the purchase has been made. The countdown timer unit 224 then determines incentives based on the purchase timing recorded and renders the incentives to the buyer.

The flash sale may be entitled with an attractive name (e.g., deal of the day, etc.). The flash sale enables the buyer to buy products from the selective and entire inventory at a discounted rate for a limited time only as defined by the seller. The countdown timer unit 224 enables the buyer to create the flash sale and push the products under the premise of creating a limited time offer on their inventory. The countdown timer unit 224 enables the seller to choose specific listings, collections(s) or the whole inventory that will have the countdown timers. The flash sale provides the feel of "limited time offers" on retail goods in the digital marketplace. The countdown timer unit 224 enables the seller to select by the listing, collection or elect to put the entire shop under the countdown timer. The countdown timer unit 224 receives inputs from the user to define the countdown timer for the flash sale. The inputs from the user comprise at least one of a start time, an end time, a time zone, a start date, and an end date. The inputs from the user comprise discount value caps based on the timeline. The countdown timer unit 224 also enables the seller to change the discount as the sale closes out. The flash sale enables the seller to ensure all inventory under the timer gets sold by rendering incentives to the buyer at various times of the countdown.

The impact creation unit 226 creates an impact focus and links the impact focus to the products based on the information received from the seller. The information received from the seller may comprise the impact focus information. The impact focus information may be the information from the seller that indicates to which impact focus the product should be linked. The impact focus may be defined by the digital platform. The impact focus may be a fundraising program for a particular purpose. The impact focus may create an impact on the society. The impact focus may comprise one of an impact focus wallet. The impact focus wallet may be associated with the impact focus program. The money credited to the impact focus wallet is contributed towards the impact focus associated therewith.

The impact focus wallet comprises one of a planetary pillar wallet, a people pillar wallet, and problems without borders pillar wallet. The planetary pillar wallet comprises a climate action wallet, a fauna wallet, a flora wallet, an ocean wallet, a land wallet, and a freshwater wallet. The people pillar wallet comprises a hunger wallet, a poverty wallet, a renewable energy wallet, an economic empowerment wallet, a public health wallet, an education wallet, a social equity wallet, a cultural equity wallet, a clean water wallet, a waste management and sanitation wallet, an innovative infrastructure wallet, and a resource resilience and recovery wallet. The problems without borders pillar wallet comprises partnership and industry wallet; a politics, policy, and legislation wallet; an enabling access wallet; an international crises wallet; a religious charities wallet; and a cradle to cradle wallet.

The impact focus contribution unit 228 executes an impact oriented smart contract. The impact oriented smart contract may execute a purchase function for every transaction of the product created using the product creation process via the digital marketplace. The purchase function debits one percent of the price of the product at the time of purchase of the product. The remaining amount (other than debited one percent) gets credited to the seller. The impact focus contribution unit 228 credits the debited one percent of the price of the product to the impact focus wallet associated with that product (e.g., standard product created using the product creation process). The NFTs may be one of the custom impact NFT and the smart contract based clearing house NFT. The impact focus contribution unit 228 credits a predefined contribution to impact focus wallets, associated with the smart contract based clearing house, for the transaction related to the smart contract based clearing house NFT. The predefined contribution may be the substantial contribution. The impact focus contribution unit 228 enables the seller to contribute to an impactful nonprofit program (or make a value chain contribution to empower local artisans) for the transactions related to the custom impact NFT. The custom impact NFTs may be created by local artisans and associated with the impactful non-profit program. The impact focus contribution unit 228 shows the current balance of the impact focus wallet of each Impact Focus. The impact focus contribution unit 228 further shows a map of Impacts funded each year, any additional details needed to be accountable, funding, and usage. The impact focus contribution unit 228 further displays total funds raised, total number of times funding contributions were done, and top contributions. The impact focus contribution unit 228 further displays a timeline of funding contributions. The impact focus contribution unit 228 further depicts details of the buyer who purchased the product, the seller who created the product, sale price of the product, percentage of price of the product contributed to the impact focus, and total amount of Hex funds.

Figure 3:
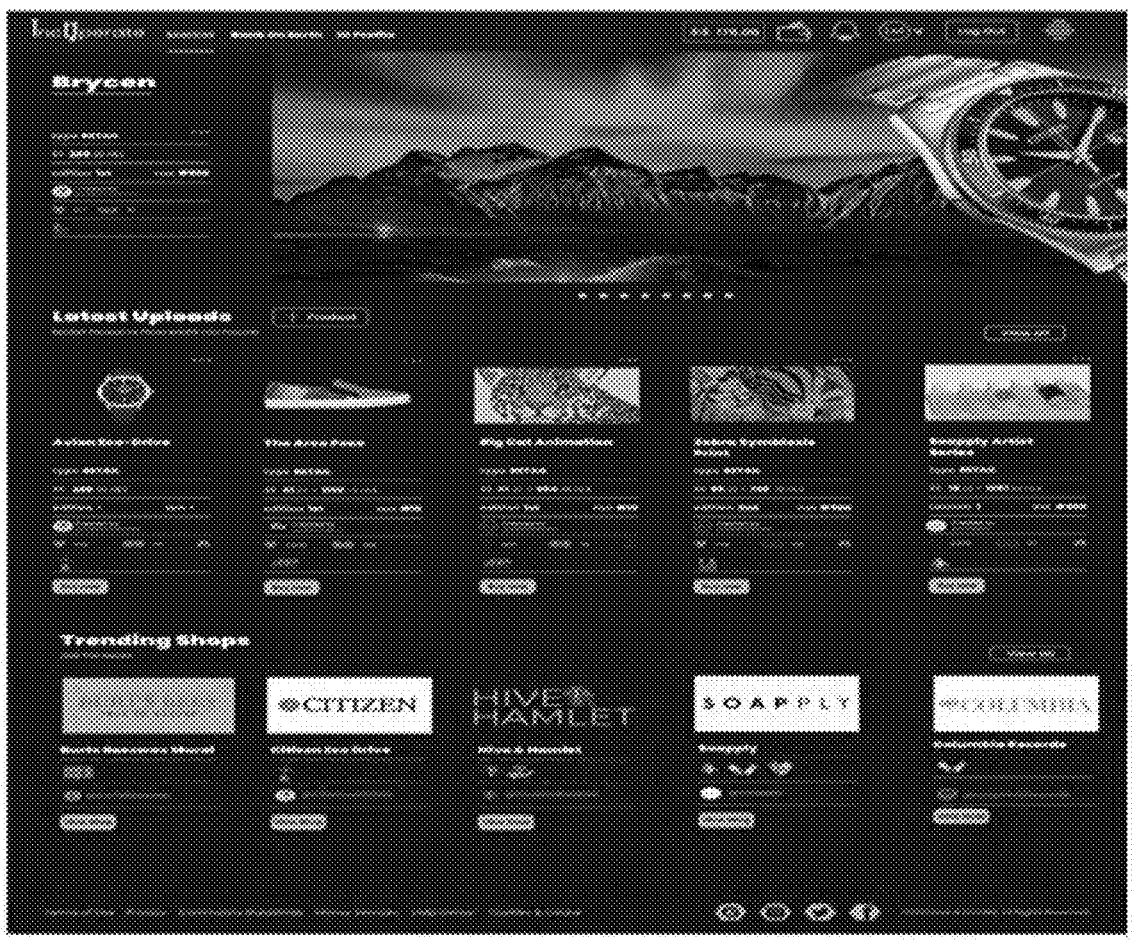
FIG. 3 illustrates a digital marketplace landing page, according to one or more embodiments.

FIG. 3 illustrates a digital marketplace landing page, according to one or more embodiments. The digital marketplace landing page is a page where every logged in user lands upon signing in. The digital marketplace landing page is the page where the visitors also land upon accessing the digital marketplace through one of a web portal and an application. The market landing comprises a carousel banner comprising rotating banners. The rotating banners act as featured spots for brands, products, impact, IO Profiles and any upcoming products launching on the digital marketplace. The host system sets up the featured spots based on footprints, participating in offsets, and contributing significantly to the wallet, etc. The host system sets up the featured spots based on the IO score of the seller.

The digital marketplace lists the products uploaded under different tags beneath the carousel banner. The tags comprise at least one of "Latest Uploads" "Trending Shops", "Popular Products", "Admin Hits", "Top Impacts", "Generated NFTs", etc.

For the general public (i.e., the users who are not logged in), the digital marketplace provides the ability to navigate the main marketplace page, general product page, detailed product page and even see a brand/seller's shop inventory. For the logged in user, the digital marketplace provides the ability to view both brand and consumer IO profiles, comment on content and most importantly make purchases, depending on whether they are a consumer or brand/seller. The digital marketplace restricts the user from buying products unless the user has an account and a wallet.

The digital marketplace lets the user hold a consumer account, a business account or both. The digital marketplace prompts the user to verify their identity before they can purchase stable coin (Hex), IO Tokens, or NFTs, when the user chooses to be an individual. The digital marketplace prompts the user to verify their business information before they can purchase stable coin (Hex), IO Tokens, or create NFTs, when the user chooses to sign up as a business. The digital marketplace provides "My shop" on the seller's account. Both the seller and the buyer can see "My Profile" on their screen as its visibility settings are separate, determined by the users from their public profile. The public profile of the user comprises "@username Profile". Further both the seller and the buyer can see "My IO Profile" on their screen. The IO profile of the seller displays the shop's footprints. The IO profile of the buyer displays the consumer's handprints.

The digital marketplace displays the following "My Shop", "Catalog", "IO Profile", "IO Quiz/Survey", "Inventory", "Orders", "Claims", and "Settings". The digital marketplace also comprises a side navigation. The side navigation comprises "Products", "Collections", "Generated", "Impacts", "Favorites", "Watched", "Relisting". The digital marketplace also comprises filters "Collections", "Price", "Product Types", "Size", and "Color". The digital marketplace also enables the user to search for specific listings, product names, and or SKUs using "search by" filters.

Figure 4:
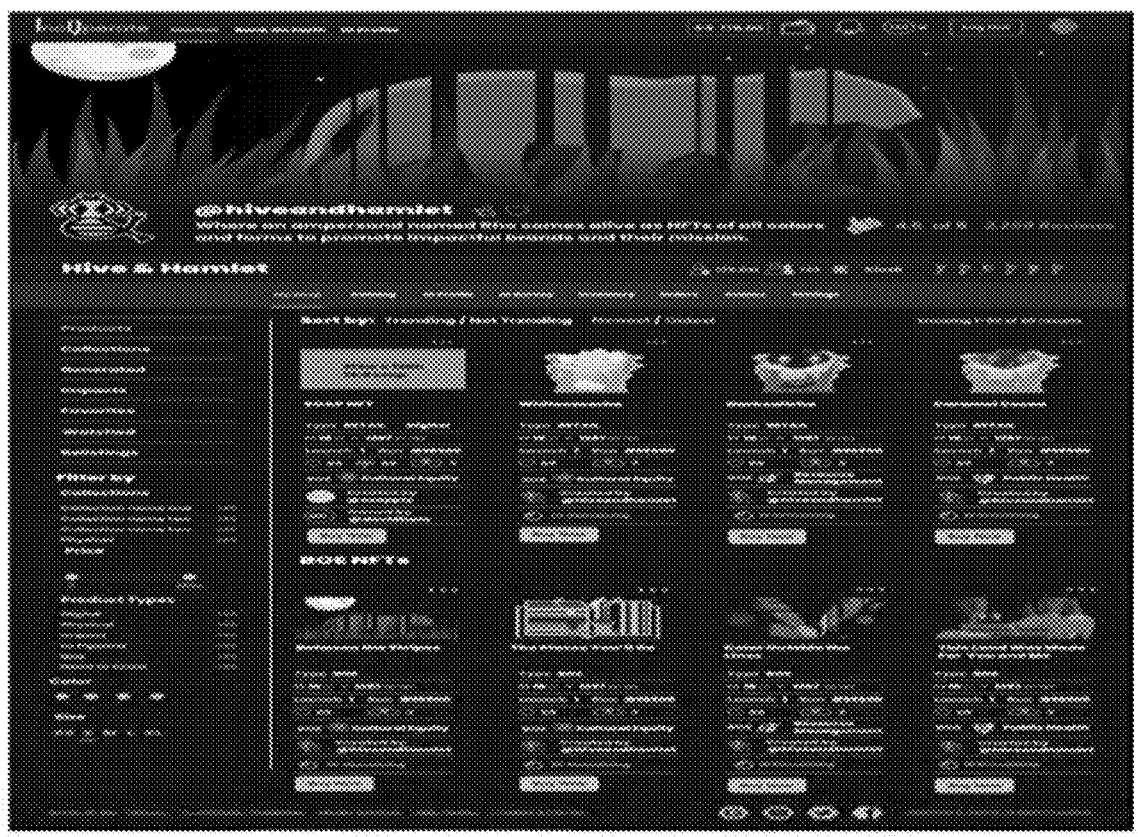
FIG. 4 illustrates a shop dashboard navigation of a digital marketplace from a seller's perspective, according to one or more embodiments.

FIG. 4 illustrates a shop dashboard navigation of a digital marketplace from a seller's perspective, according to one or more embodiments. The shop dashboard comprises "My shop" that enables the seller to upload new products and view their live listings. The "My shop" is rendered as "shop" to the buyers. The buyers can see all the seller's products and click through to purchase any of the listings. The shop dashboard navigation further comprises listings such as "catalog", "IO profile", "IO survey", "inventory", "orders", "claims", and "settings". The "catalog" is a quick interactive view for consumers into the shop's entire inventory including items that are no longer available, discontinued or sold out. The "catalog" calculates and lists out to the seller which items from the shop they already own and what else there is to purchase. The "IO profile" listing is an overview of the brand's footprints and their overall value to society, planet, consumers, and the digital marketplace community. The "IO profile" lists out the Metrics and insights into the brand's behavior.

The "IO Quiz/survey" lists quizzes and surveys, run by the shop, with their corresponding status. The status comprises one of Active, Closed, Pending Results. The users can participate in Active Quizzes/surveys. The users can also see cumulative/collective results for Closed quizzes/surveys. The users can also further see which quizzes/surveys just closed out and the ones that just ended but are pending results being published for public view. The "Inventory" listing enables the seller to look at their stock by listing and SKU. The "Inventory" listing further enables the seller to make changes, view availability and discern restock timings and levels. The "Inventory" listing further helps the seller monitor, manage, and modify the inventory. The "orders" listing enables the seller to view the latest incoming orders and track fulfillment (shipping, tracking, etc.). The "claims" listing is a direct message portal which enables the seller to address consumer complaints, issues with orders, checkout process and other matters. The "claims" listing further enables the seller to respond to, address, flag as spam, and delete messages. The "setting" listings enables the seller to edit their account information, adjust visibility, visit their wallet to add product credits, etc.

The shop dashboard further comprises side navigation listings such as "products", "collections", "generated", "impacts", "favorites", "watched", and "relisting". The "products" enables the seller to filter the content by the products listed in the shop such as Retail: Physical or Digital, IO Pipelines, Action: Generated or Impact, Need to Know: Info Bytes and DIY. The "collections" enables the seller to organize the products into theme based groups, called Collections. The items within the group belong to the same narrative. The "Generated" listings comprises products that are rewarded at the end of quizzes/surveys to participants based on their response.

The "Impacts" listings comprise NFTs associated with impact focus wallets and offsets wallets or other impact facing initiatives that the product creator sets up as one of their product contributors. The "favorites" listing enables the seller to view and quickly access products, evidence on each listing that are loved by the community of users on the digital platform. The "watched" listing enables the seller to see how many are watching that particular product. The "watched" listing, under the dashboard list, further enables the seller to see which items are being watched most and who are all watching it. The "relisting" lists the NFTs that are relisted from the shop.

The shop dashboard navigation further provides "filter by" and "sort by" tools. The "filter by" tool provides three options such as Collections, price, and product type. Depending on the product and the shops being displayed and how the shop owner created the product, options such as size and color filters would change. For example, if Jane Doe created a t-shirt and listed it on her shop, all the options to filter by the t-shirt options would appear on her shop and any marketplace pages where filtering by common product types, if required for a user to quickly browse product listings, would appear. The "collections" option enables the user to filter the collections within the shop. The "price" option enables the user/seller to filter the products based on the preferred range of price. The consumers will know how many product types the store offers based on shop type. The "product type" option to filter the product based on the product type they want to buy. The "size" option enables the seller to search by sizes available in the shop inventory. The "color" option enables the seller to search by color styles available in the shop inventory.

The "sort by" tool provides two options such as "trending" and "IO score". The "trending" option lists out the highest trending product when the user chooses this option. In an embodiment, the user has the option to sort by the inverse of trending and not trending product appears first. The "IO score" option lists out the highest IO score of product creator's shop IO profile, when the user chooses this option. In an embodiment, the user has the option to sort by the inverse of highest IO score, the shops with lowest IO score appears first.

Figure 5:
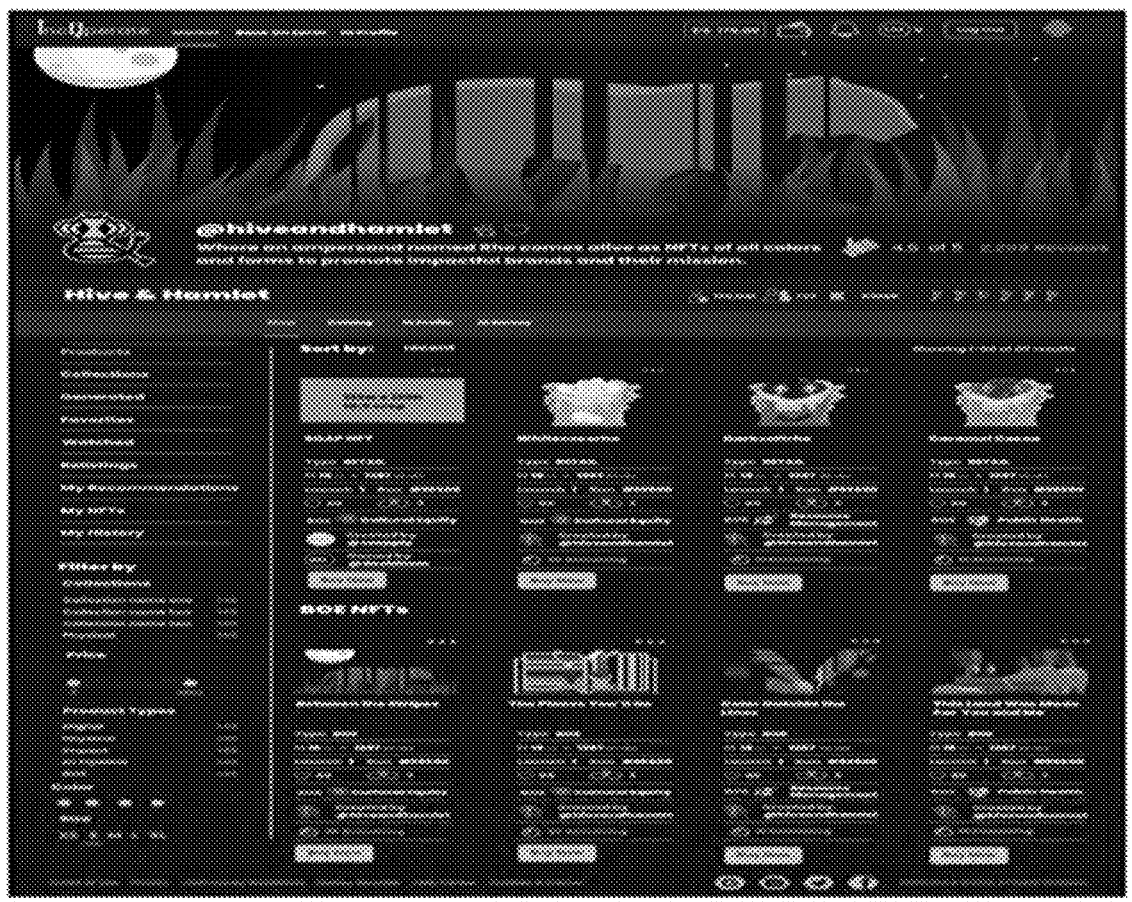
FIG. 5 illustrates a shop dashboard navigation of a digital marketplace from a buyer's perspective, according to one or more embodiments.

FIG. 5 illustrates a shop dashboard navigation of a digital marketplace from a buyer's perspective, according to one or more embodiments. The shop dashboard comprises "shop" that enables the buyer to view all purchase listings and purchase products on the shop. The shop dashboard navigation further comprises listings such as "catalog", "IO profile", and "IO survey". The "catalog" is a quick interactive view for consumers into the shop's entire inventory including items that are no longer available, discontinued or sold out. The "catalog" calculates and lists out to the buyers which items from the shop they already own and what else there is to purchase. The "IO profile" listing shows the public view of the shop's IO Profile, and it is standing on and off the platform. The "IO profile" listing is an overview of the brand's footprints and their overall value to society, planet, consumers, and the digital marketplace community. The "IO profile" lists out the Metrics and insights into the brand's behavior.

The "IO Quiz/survey" lists quizzes and surveys, run by the shop, with their corresponding status. The status comprises one of Active, Closed, Pending Results. The users can participate in Active Quizzes/surveys. The users can also see cumulative/collective results for Closed quizzes/surveys. The users can also further see which quizzes/surveys just closed out and the ones that just ended but are pending results being published for public view.

The shop dashboard further comprises side navigation listings such as "products", "collections", "generated", "impacts", "favorites", "watched", and "relisting". The "products" enables the buyer to filter and view all of the shop products. The "collections" enables the buyer to view the items within the group belonging to the same narrative. The "Generated" listings comprises products that are rewarded from the IO pipeline and at the end of quizzes/surveys to participants. The "Impacts" listing enables the buyer to view NFTs associated with impact focus wallets and offsets wallet. The "favorites" listing enables the buyer to view and quickly access favorite products. The "watched" listing enables the buyer to view NFTs that are being watched. The "relisting" lists the NFTs that are relisted from the shop for sale.

The shop dashboard navigation further provides "filter by" and "sort by" tools. The "filter by" tool provides three options such as "Collections", "price", and "product type". Depending on the product and the shops being displayed, and how the shop owner created the product, options such as size and color filters would change. For example, if Jane Doe created a t-shirt and listed it on her shop, all the options to filter by the t-shirt options would appear on her shop and any marketplace pages where filtering by common product types, if required for a user to quickly browse product listing, would appear. The "collections" option enables the user to filter the collections within the shop. The "price" option enables the buyer to filter the products based on the preferred range of price. The consumers will know how many product types the store offers based on shop type. The "product type" option enables the buyer to filter the product based on the product type they want to buy. The "size" option enables the buyer to search by sizes available in the shop inventory. The "color" option enables the buyer to search by color styles available in the shop inventory.

The "sort by" tool provides two options such as "trending" and "IO score". The "trending" option lists out the highest trending product when the user chooses this option. In an embodiment, the user has the option to sort by the inverse of trending and not trending product appears first. The "IO score" option lists out the highest IO score of product creator's shop IO profile, when the user chooses this option. In an embodiment, the user has the option to sort by the inverse of highest IO score, the shops with lowest IO score appears first.

Figure 6A:
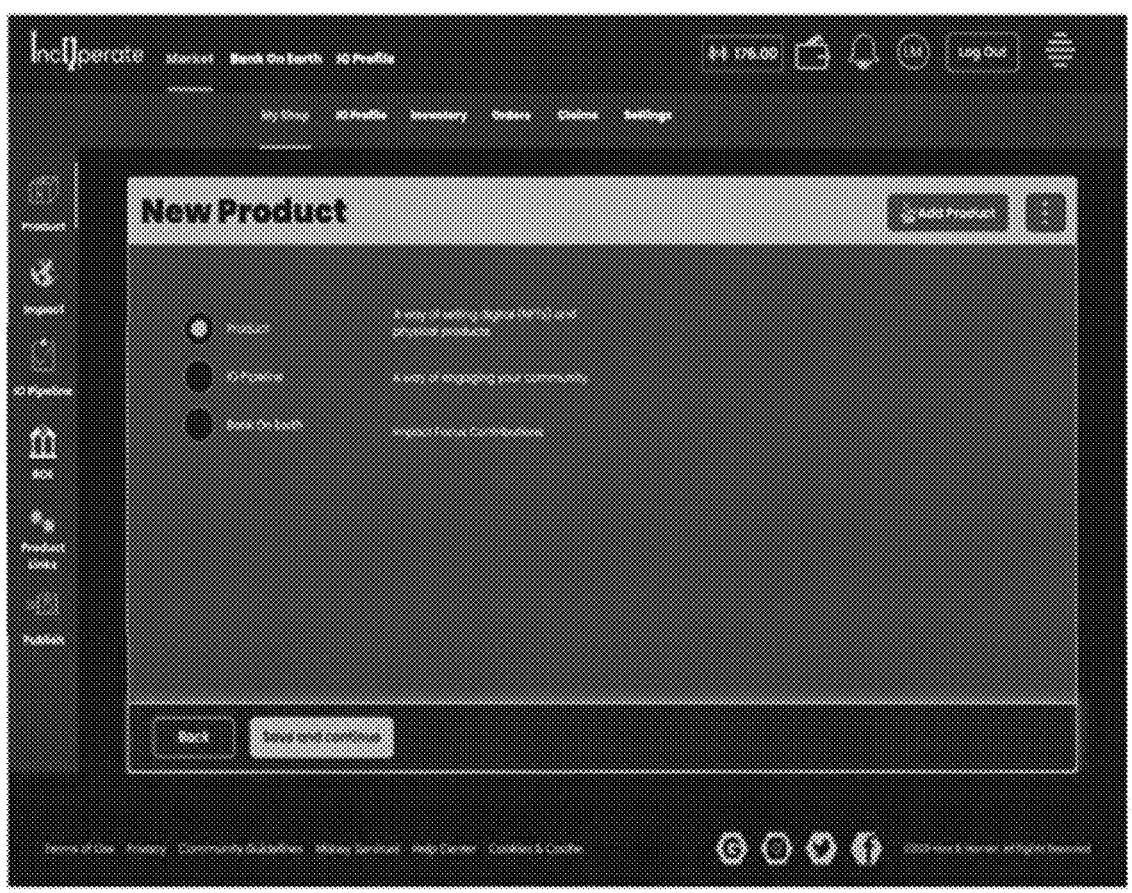
FIGS. 6a to 6x illustrate a process of product creation, according to one or more embodiments.
Figure 6B:
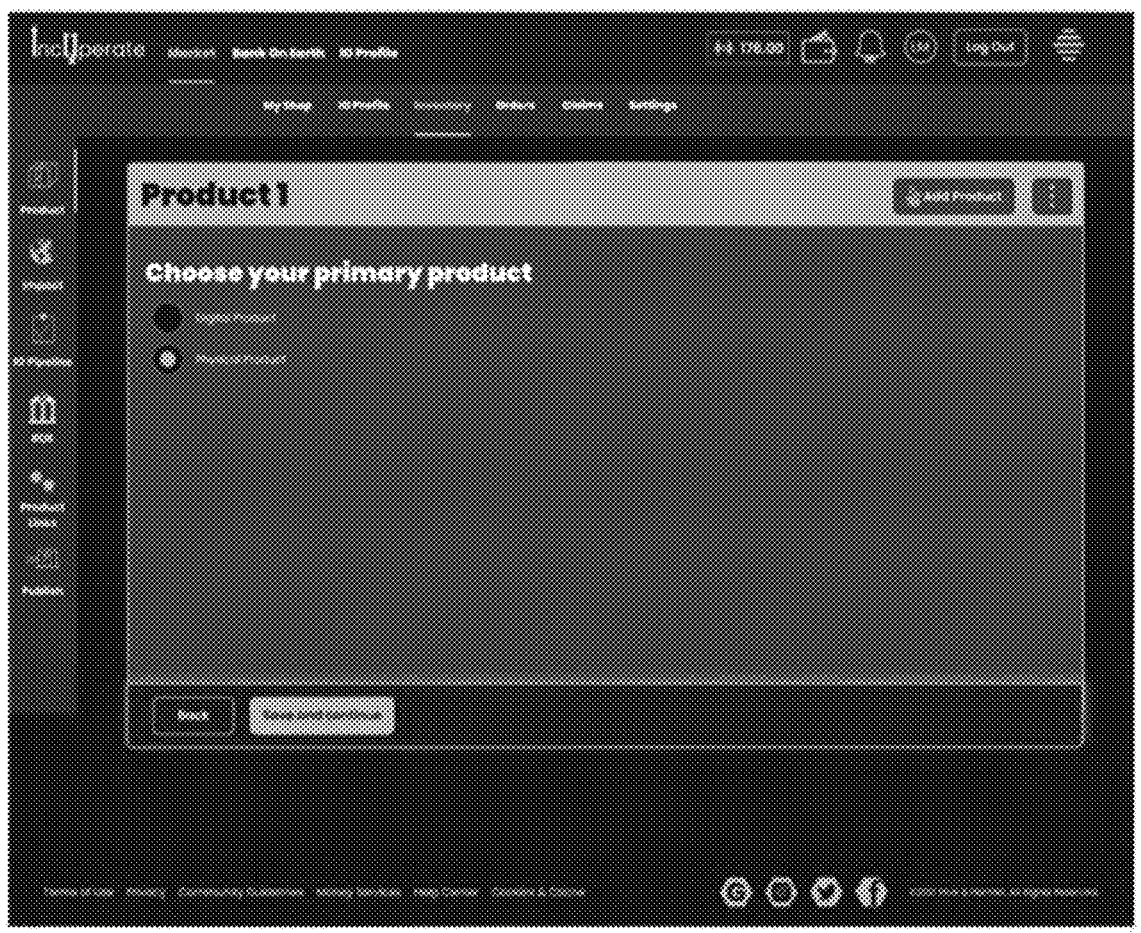
Figure 6C:
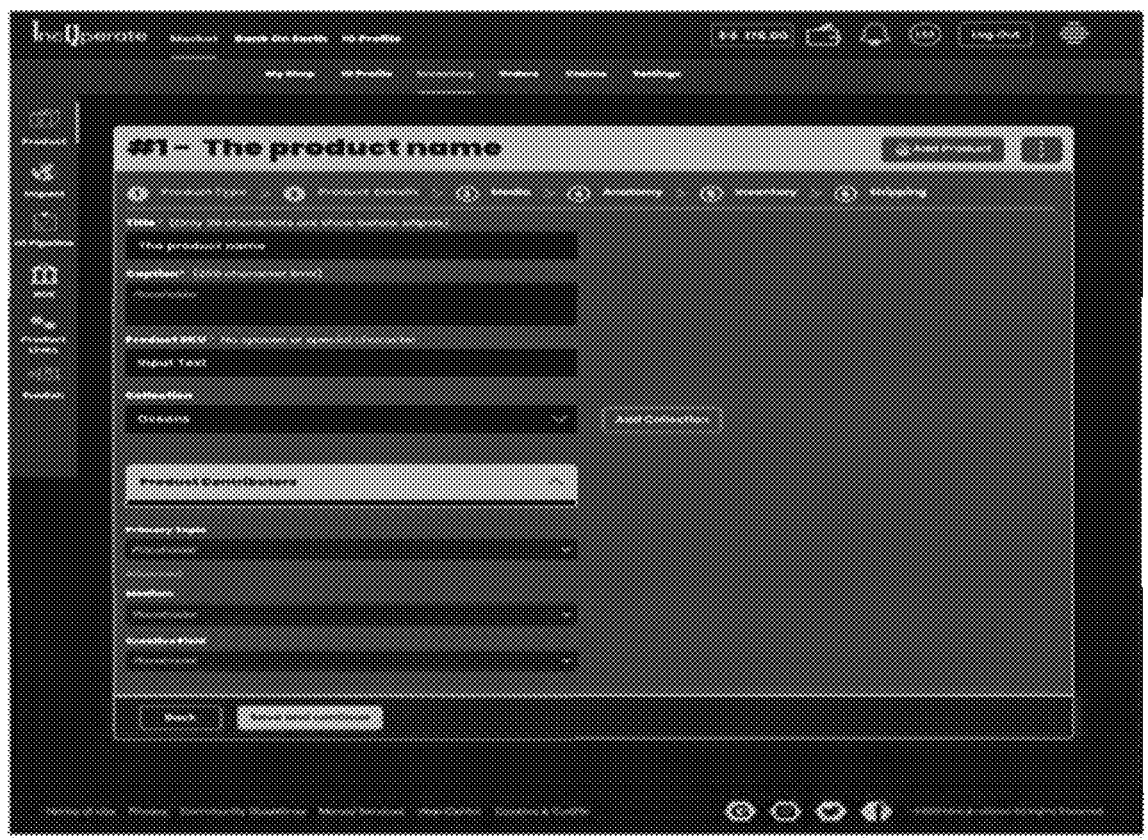
Figure 6D:
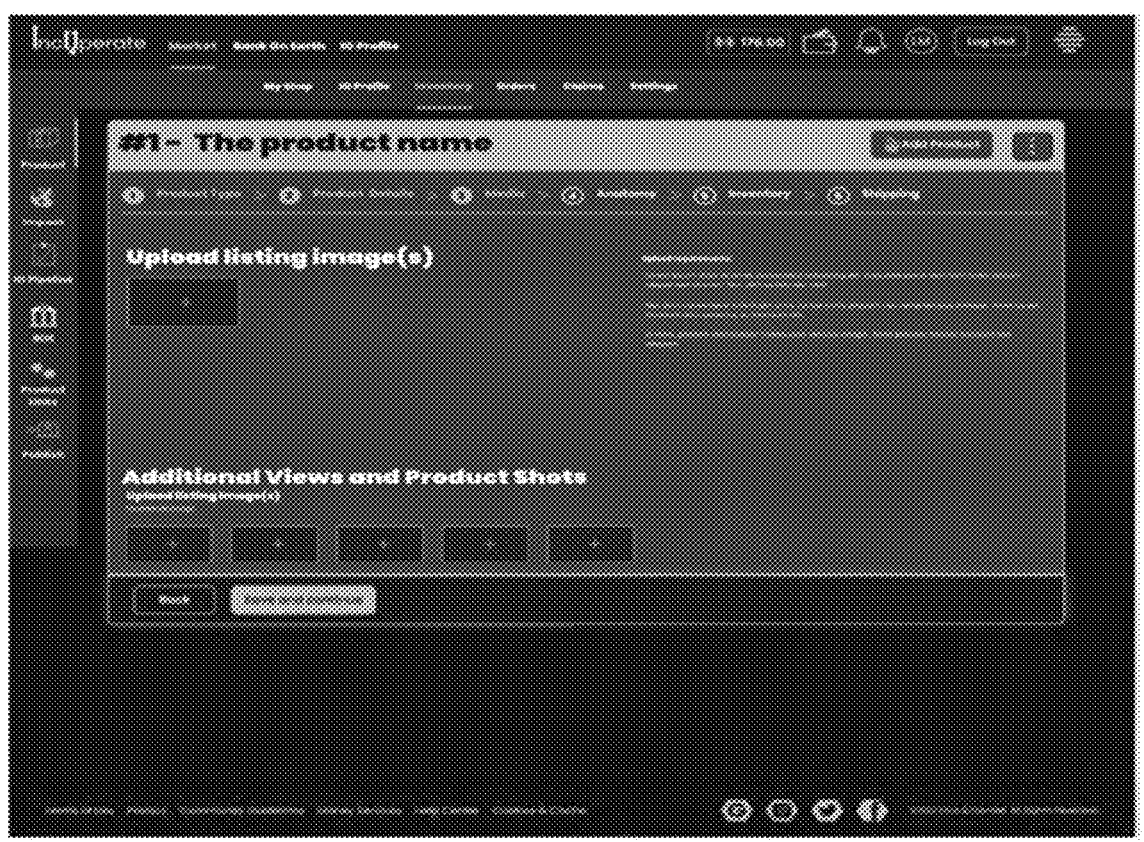
Figure 6E:
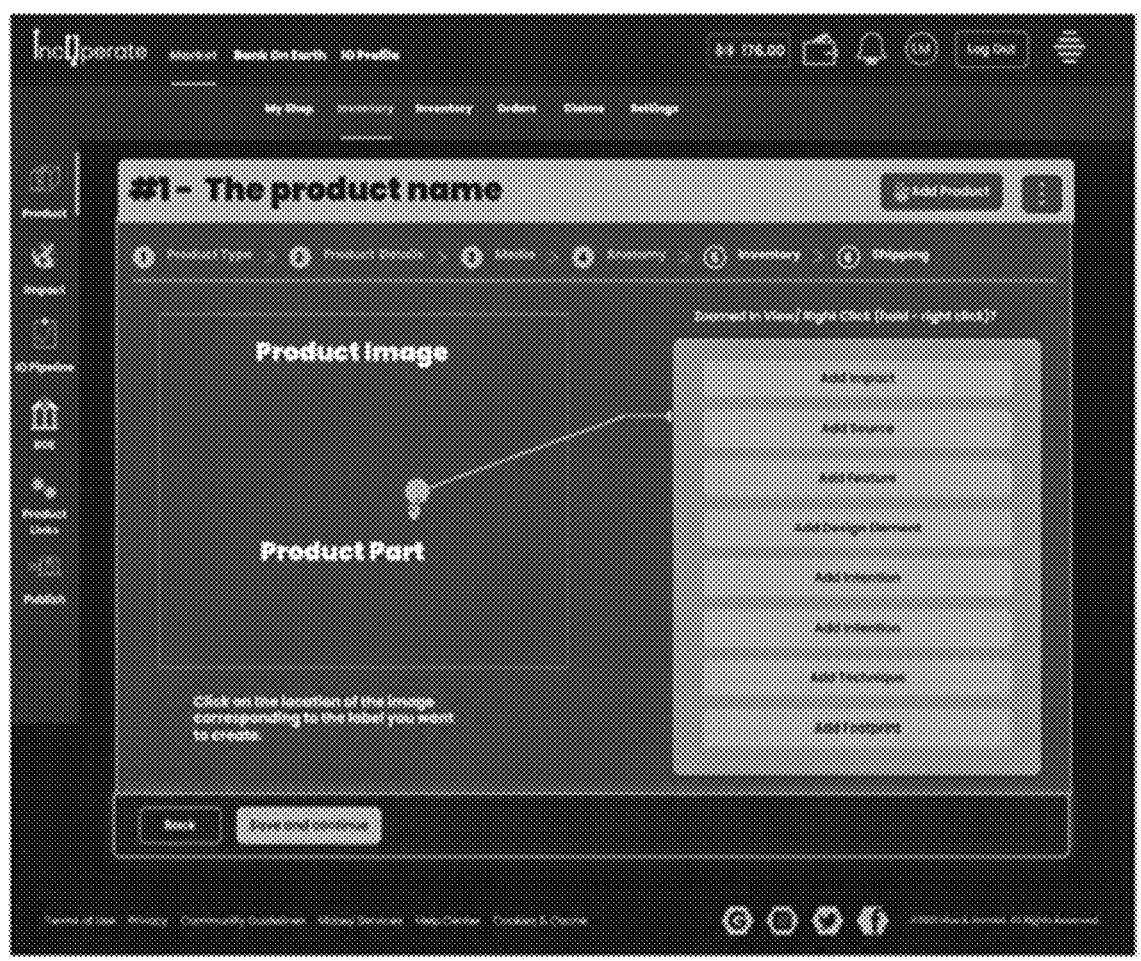
Figure 6F:
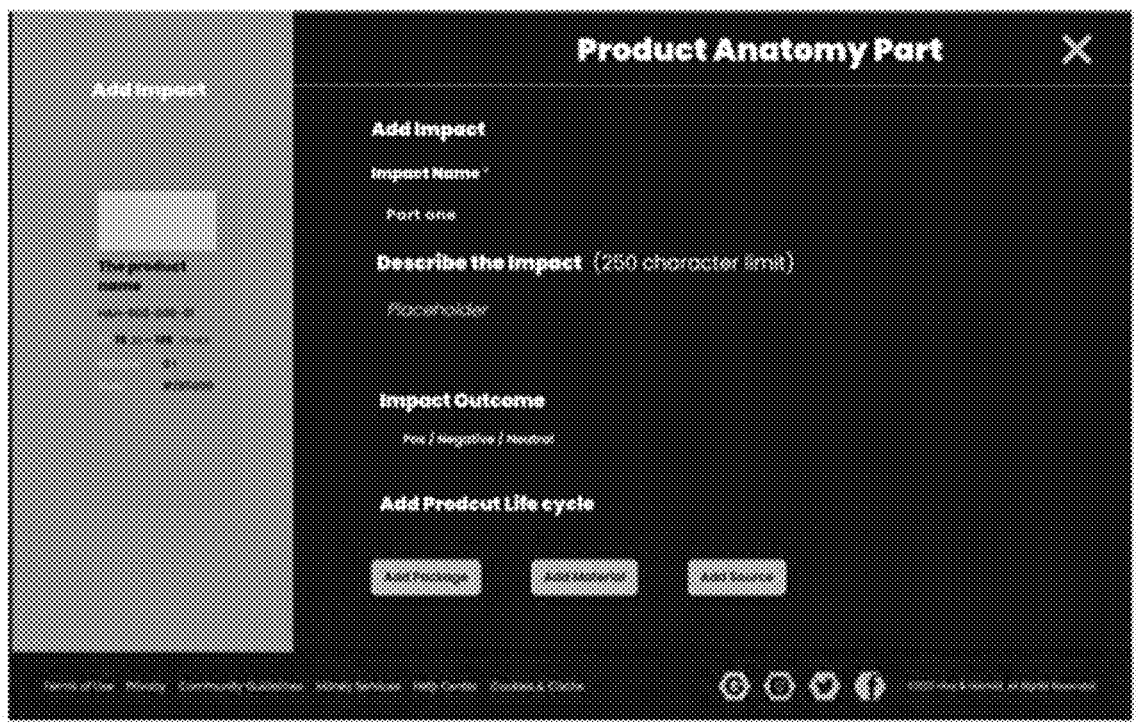
Figure 6G:
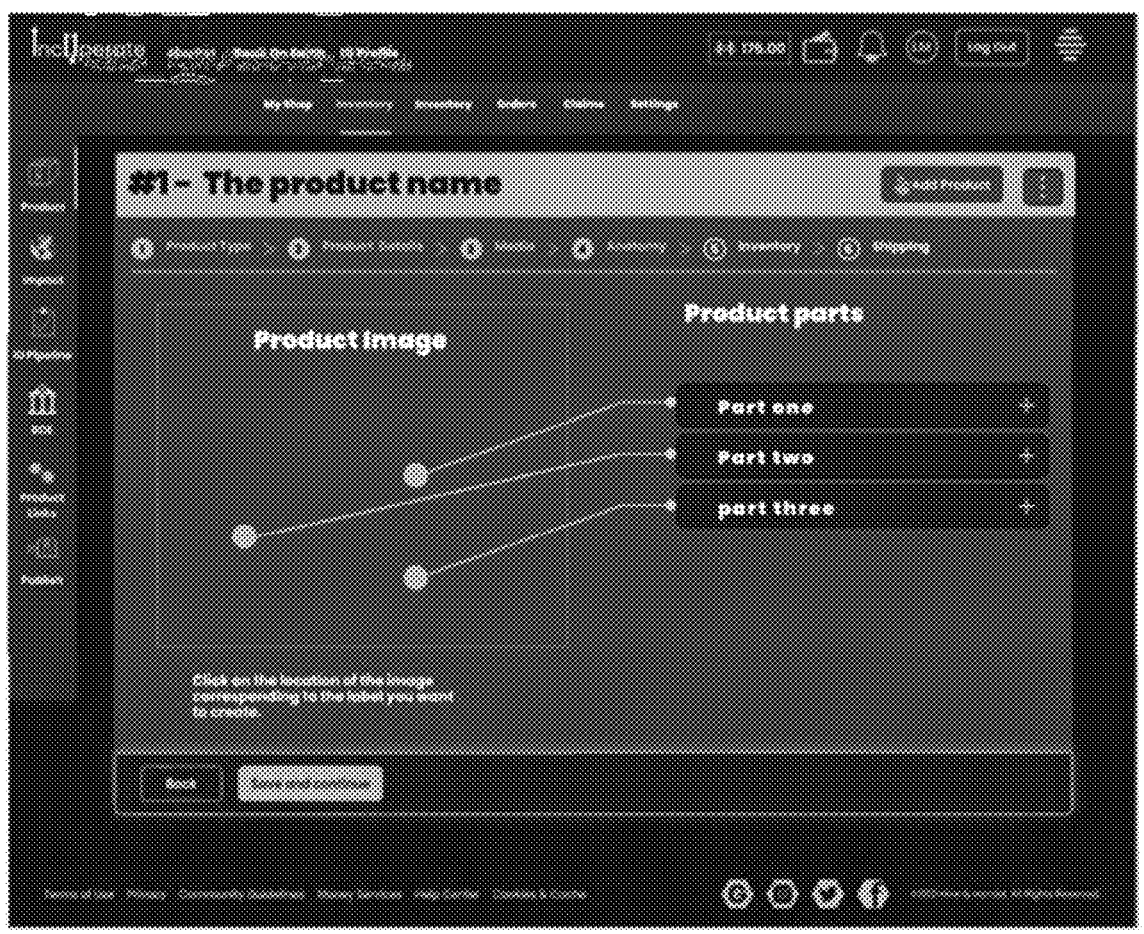
Figure 6H:
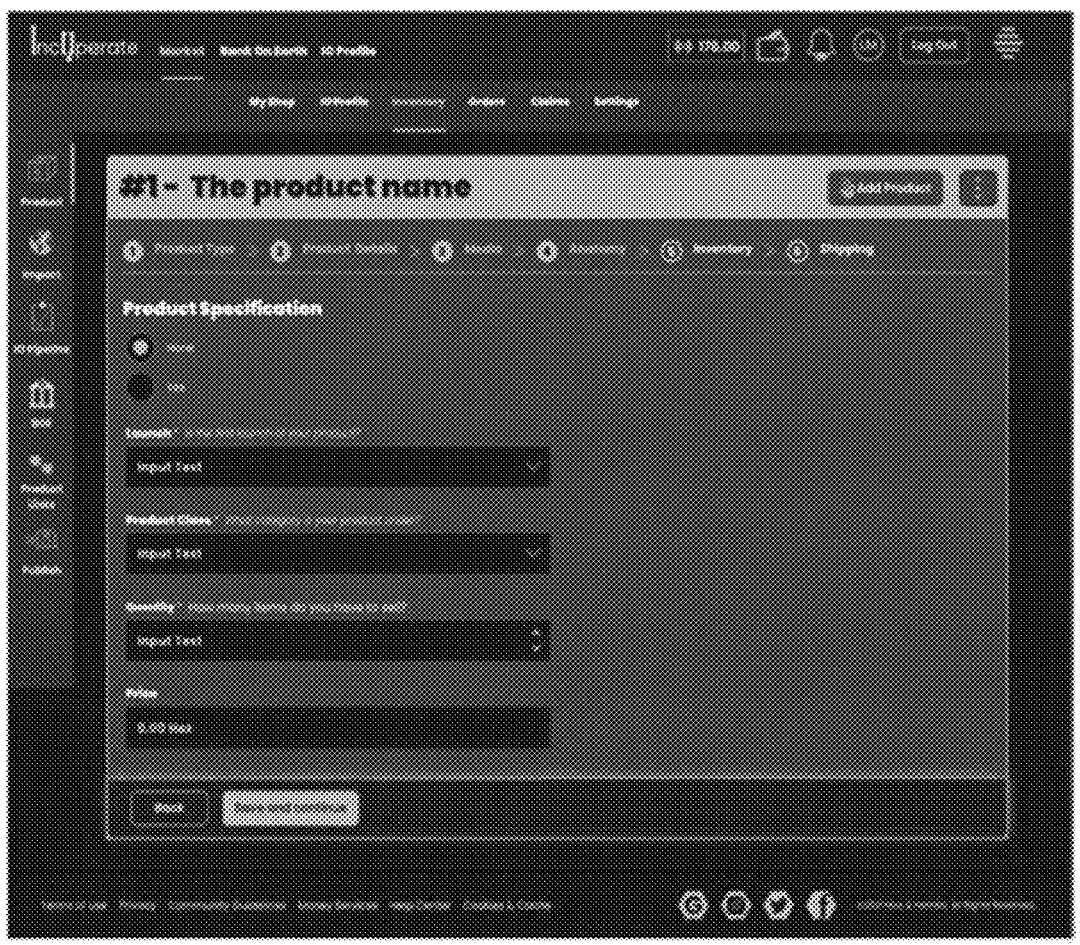
Figure 6:
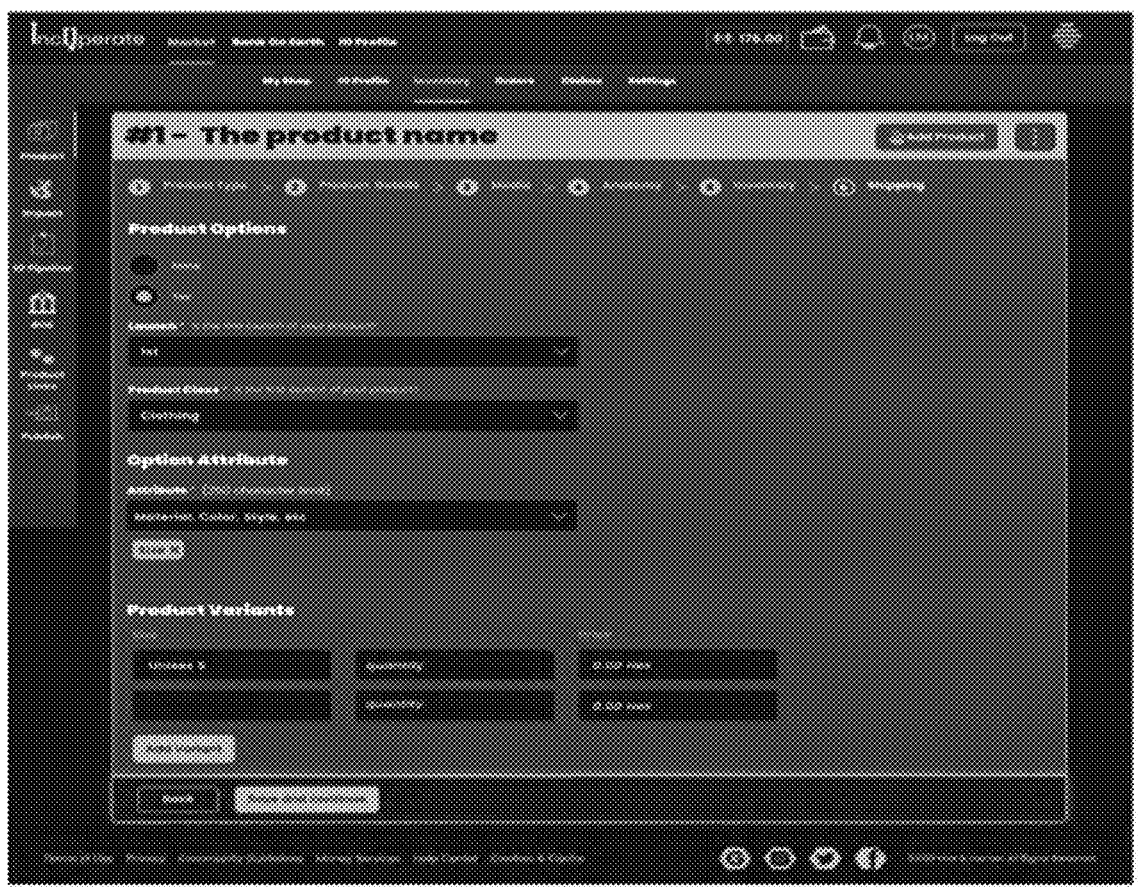
Figure 6J:
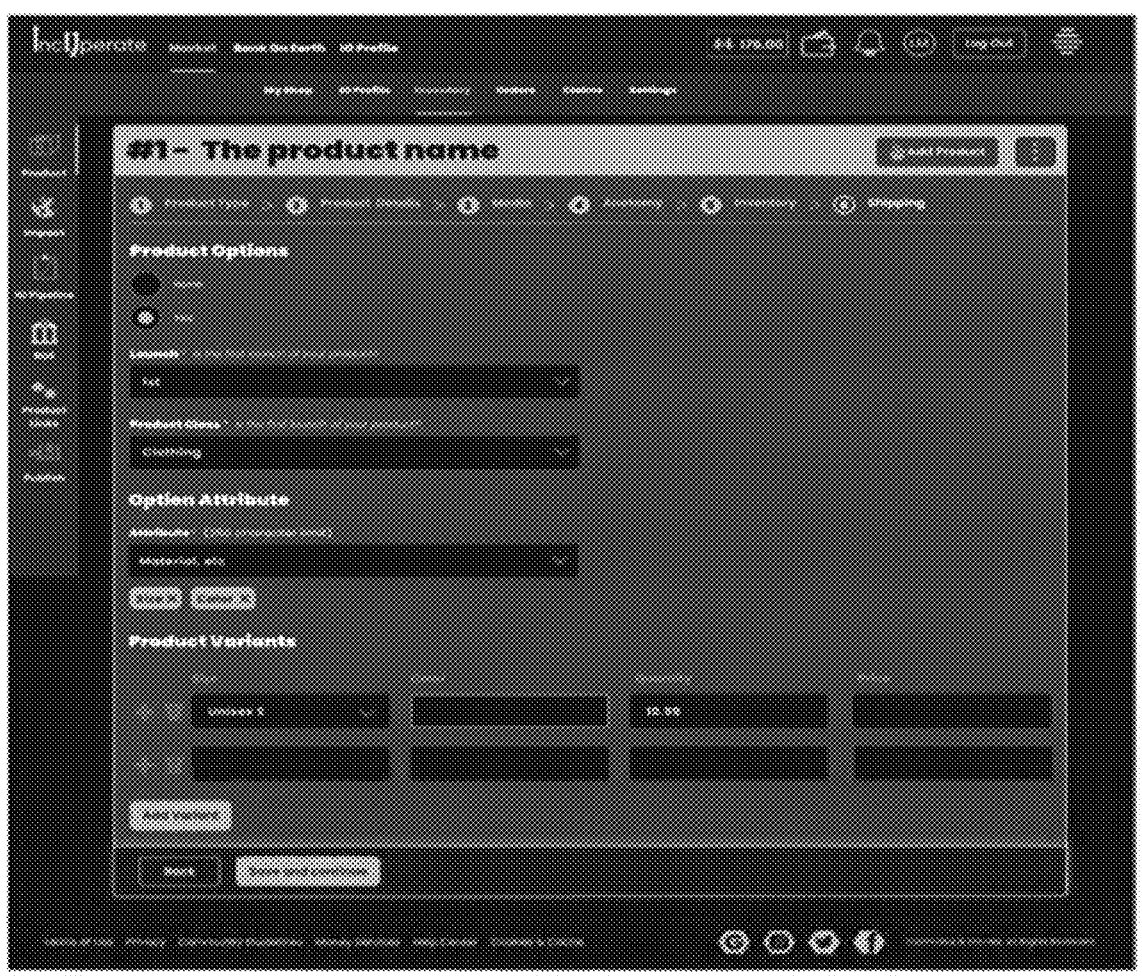
Figure 6K:
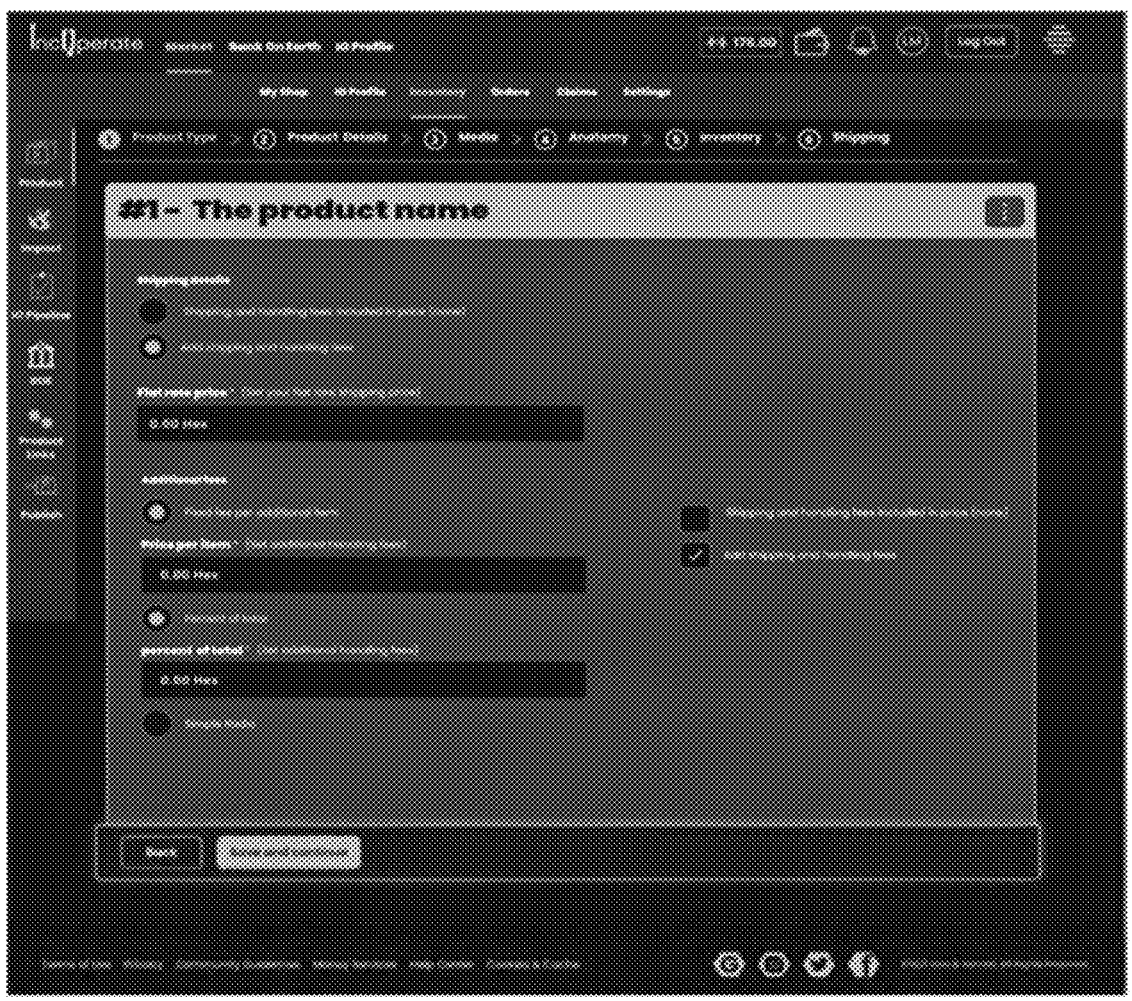
Figure 61:
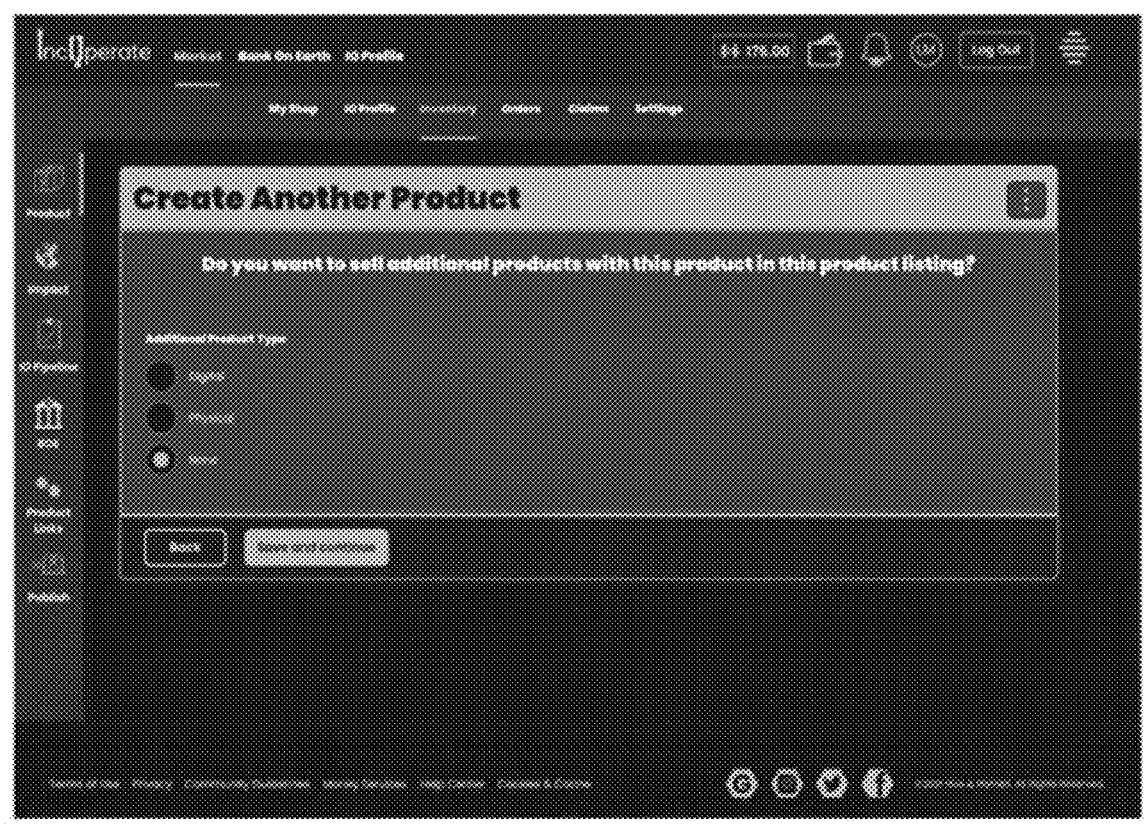
Figure 6M:
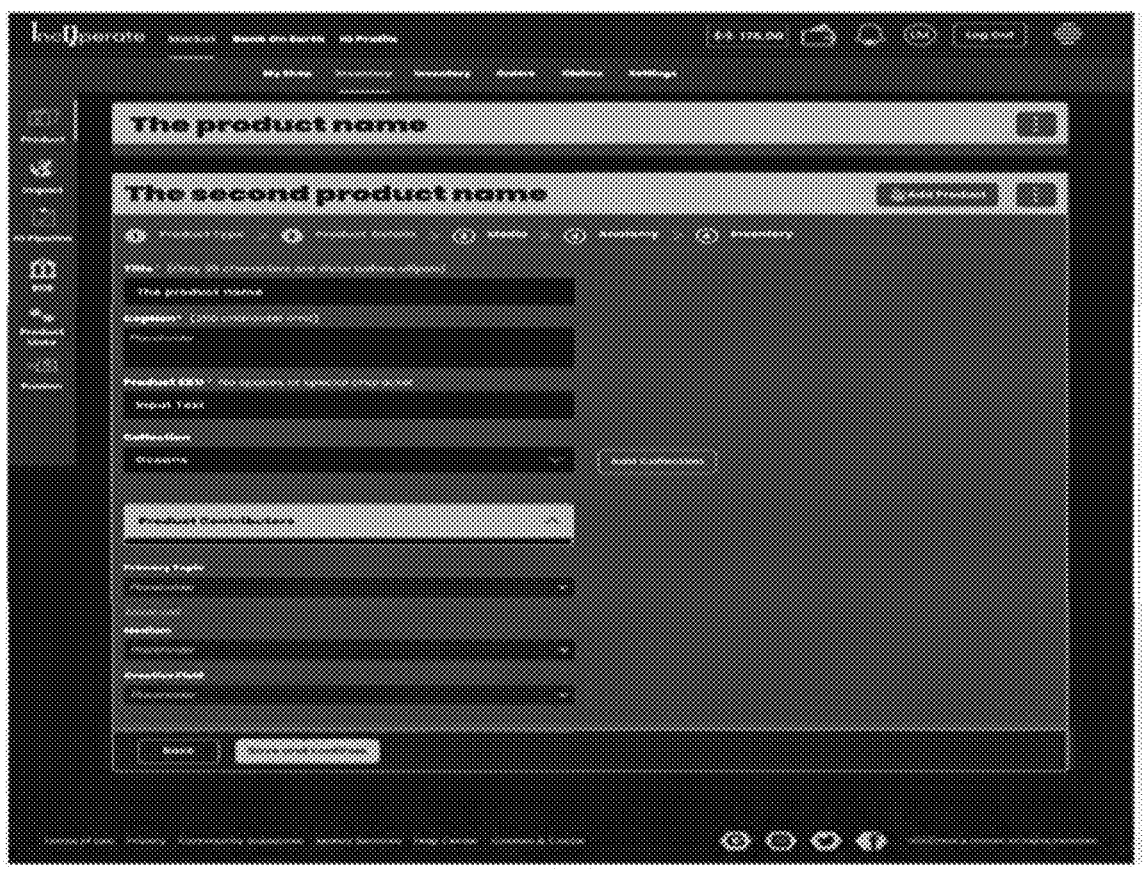
Figure 6A:
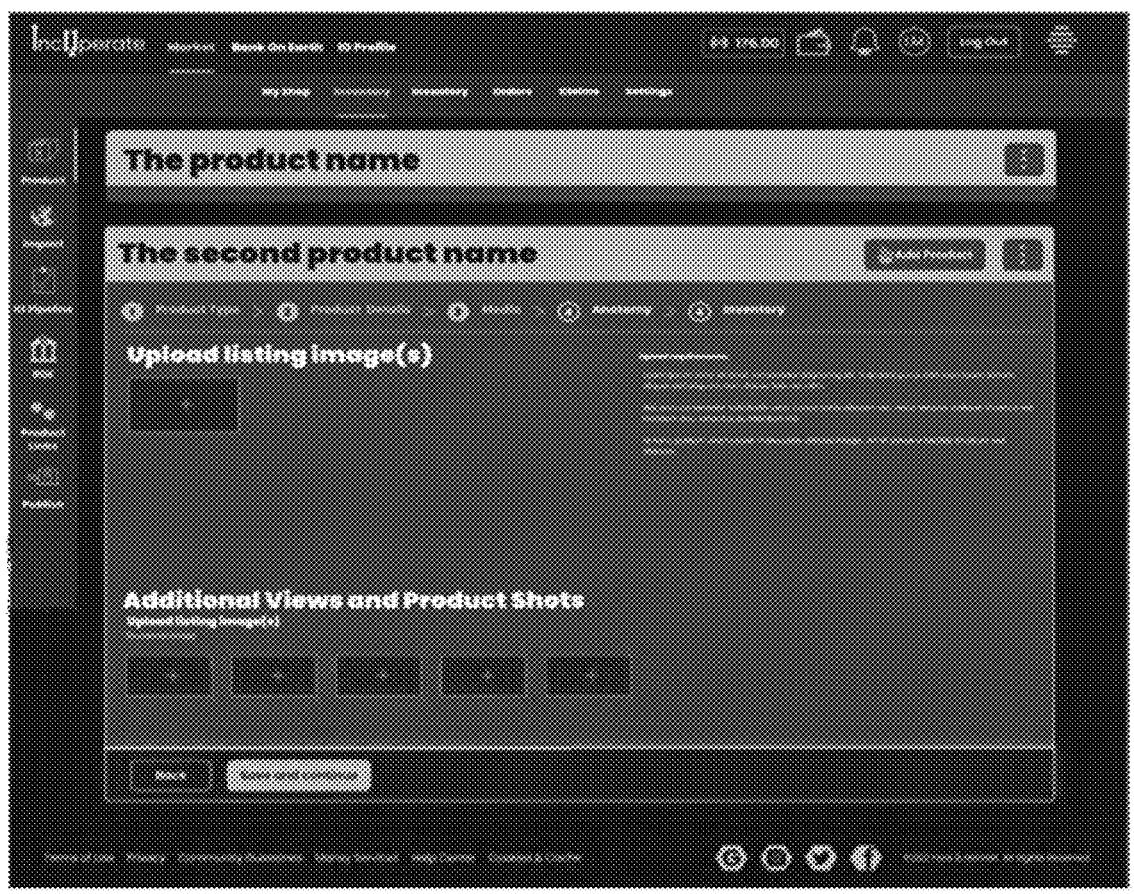
Figure 6O:
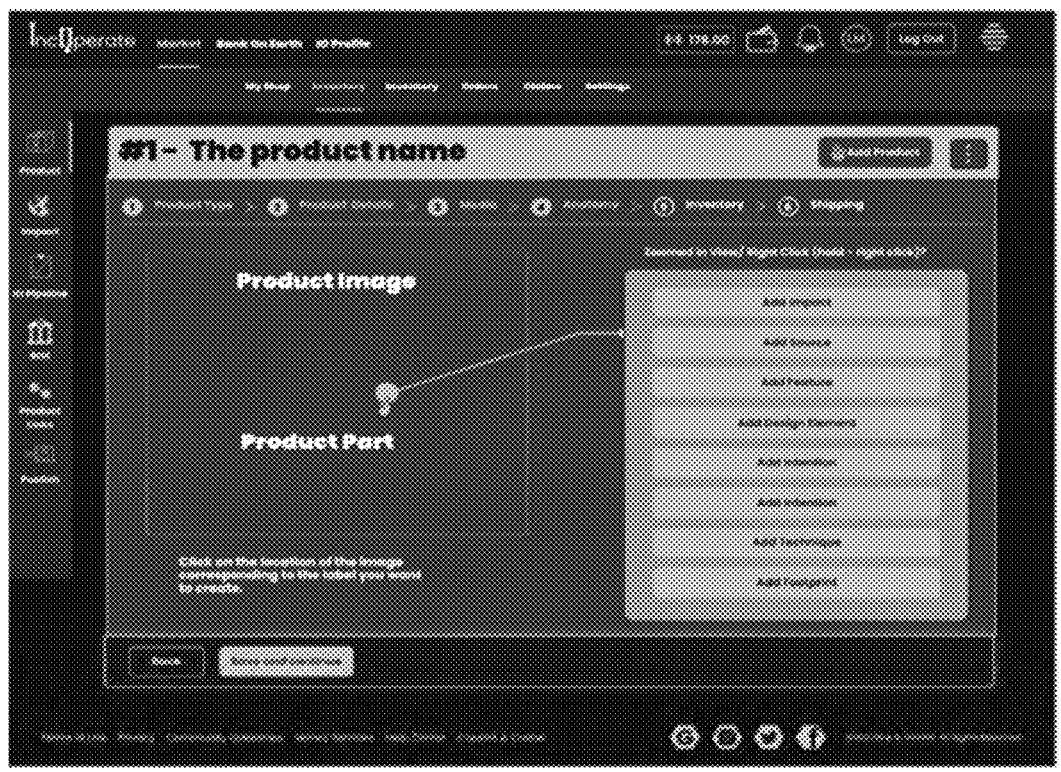
Figure 6P:
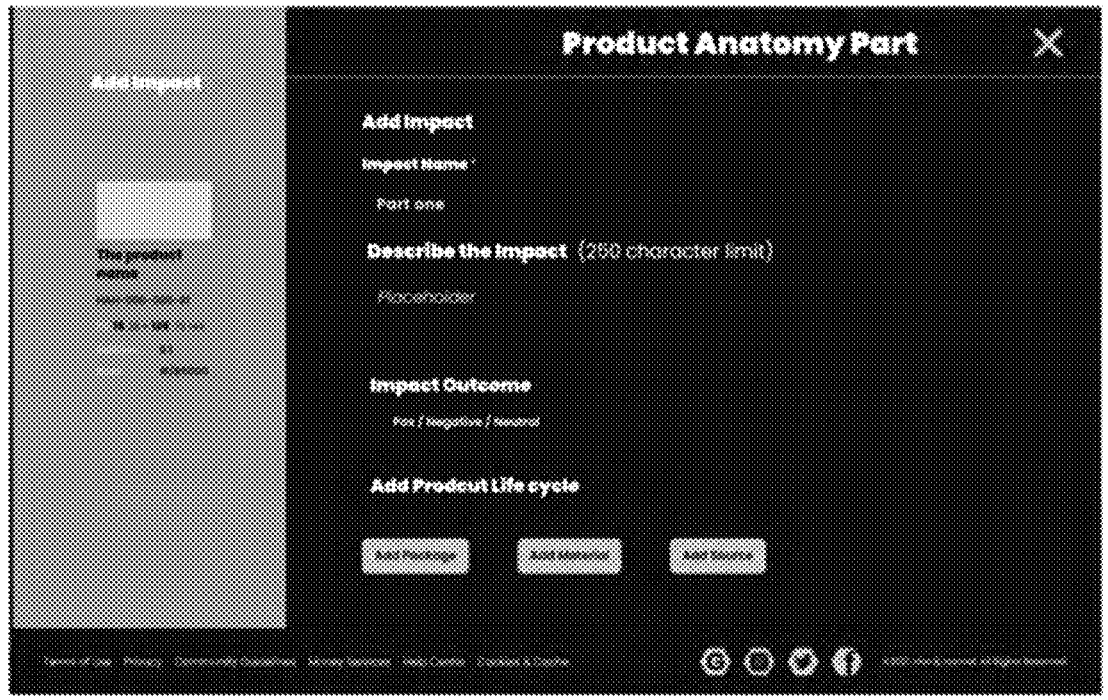
Figure 6Q:
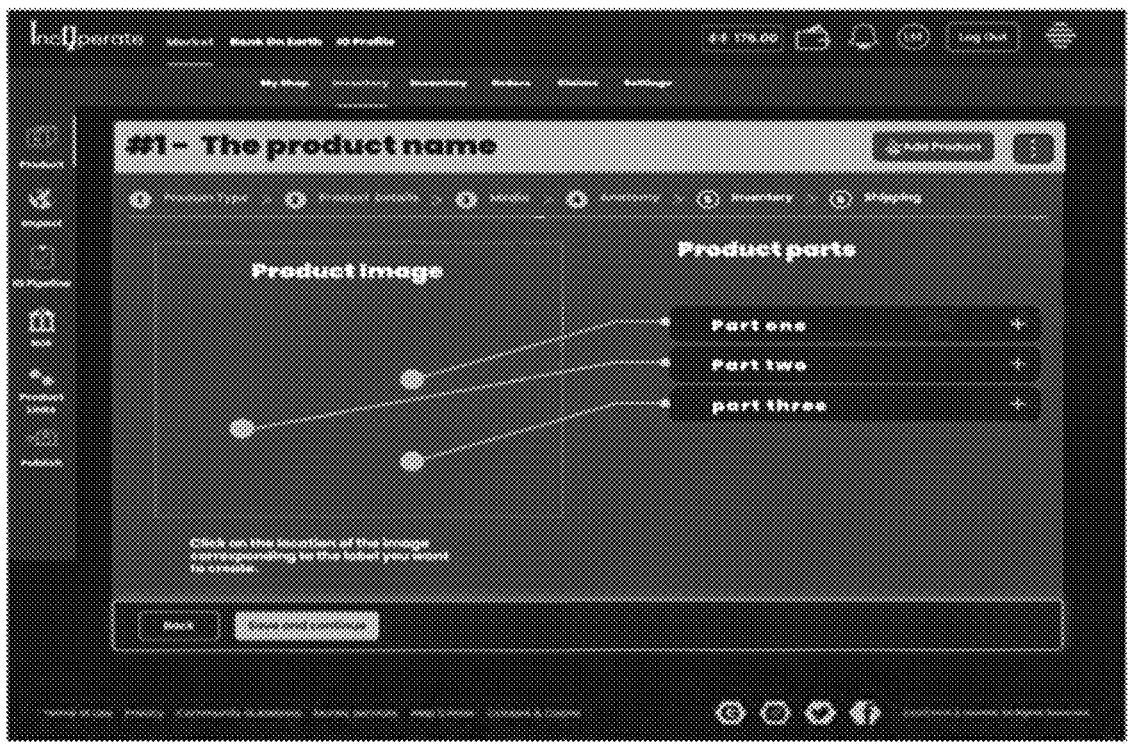
Figure 6R:
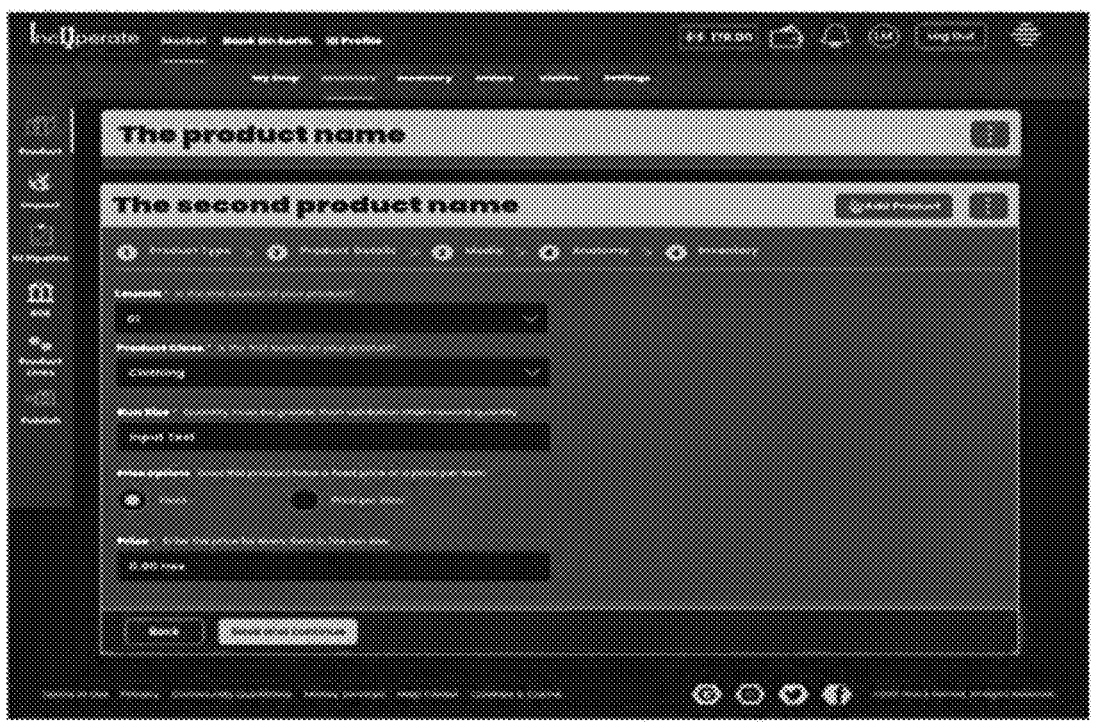
Figure 6S:
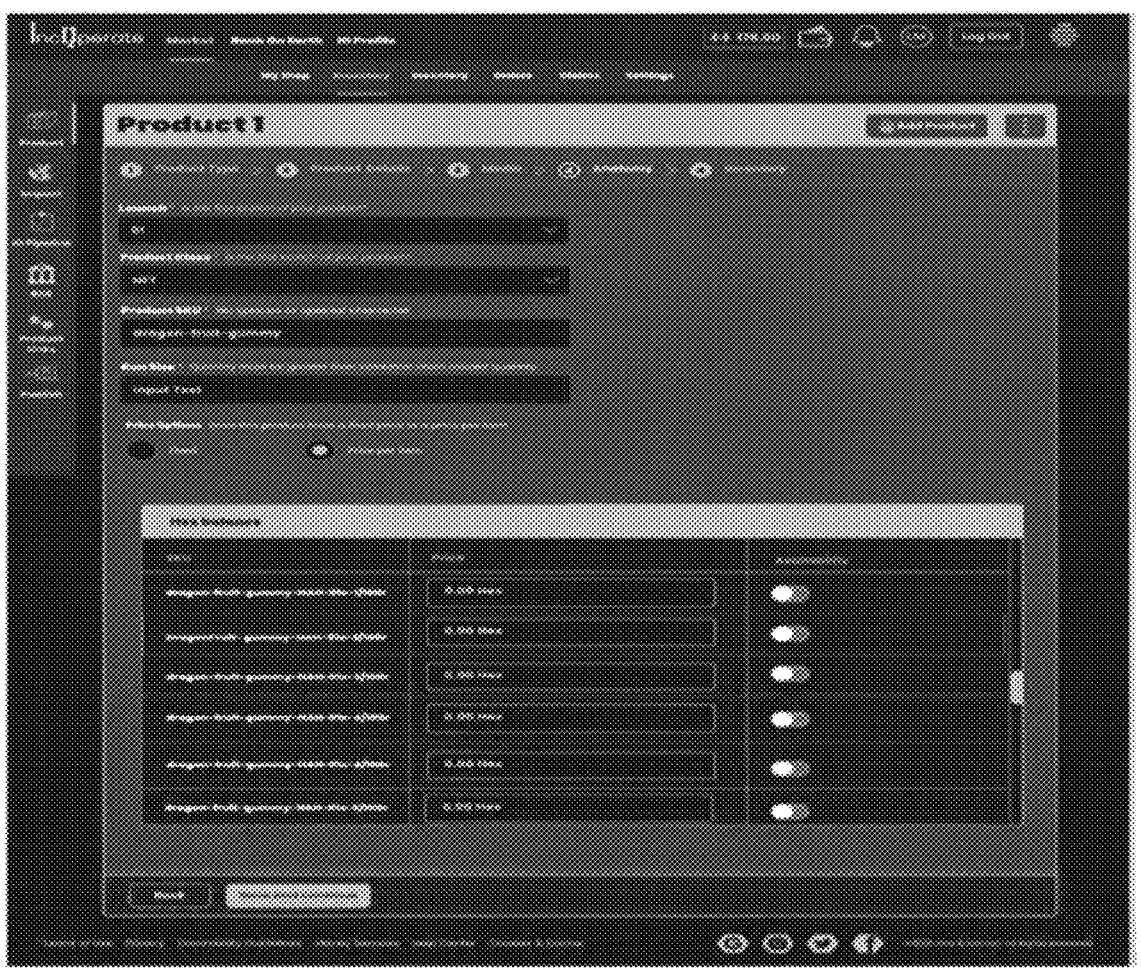
Figure 6T:
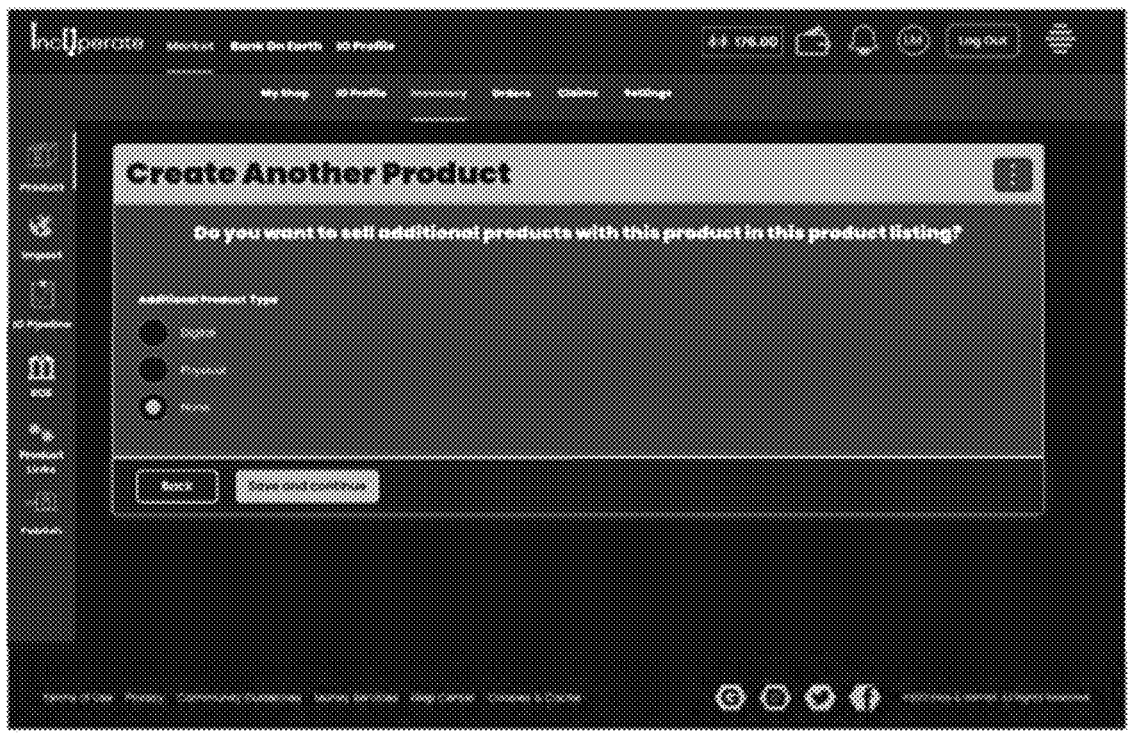
Figure 6U:
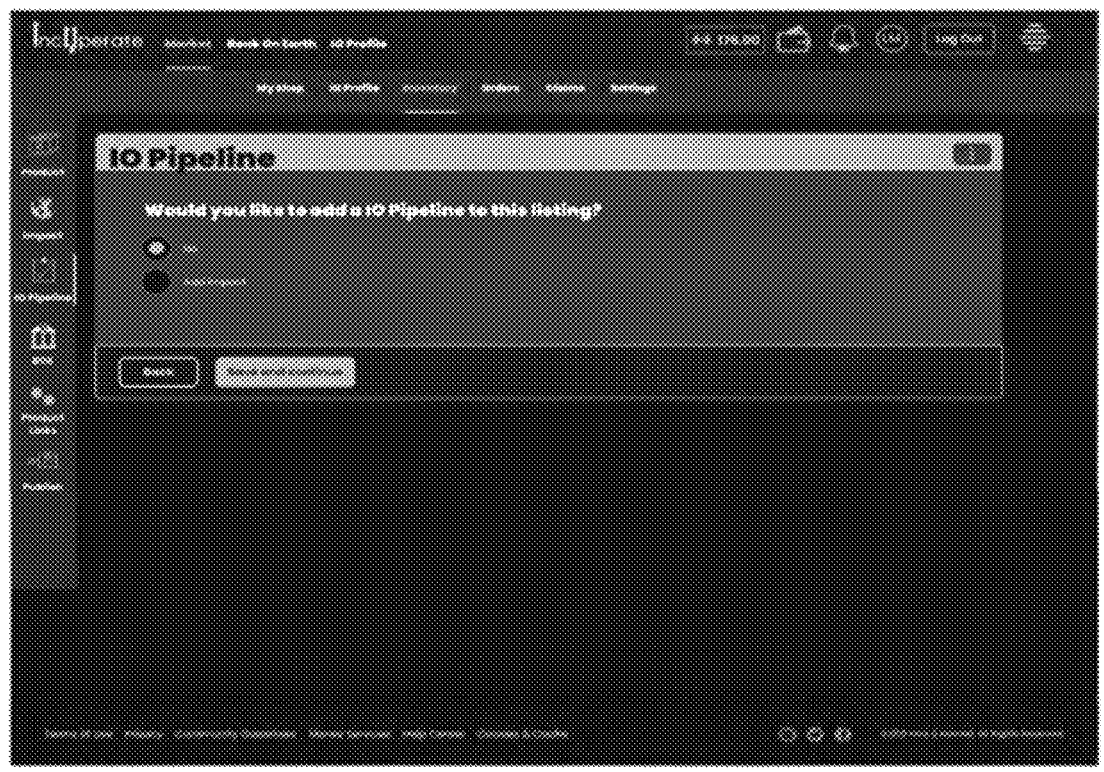
Figure 6V:
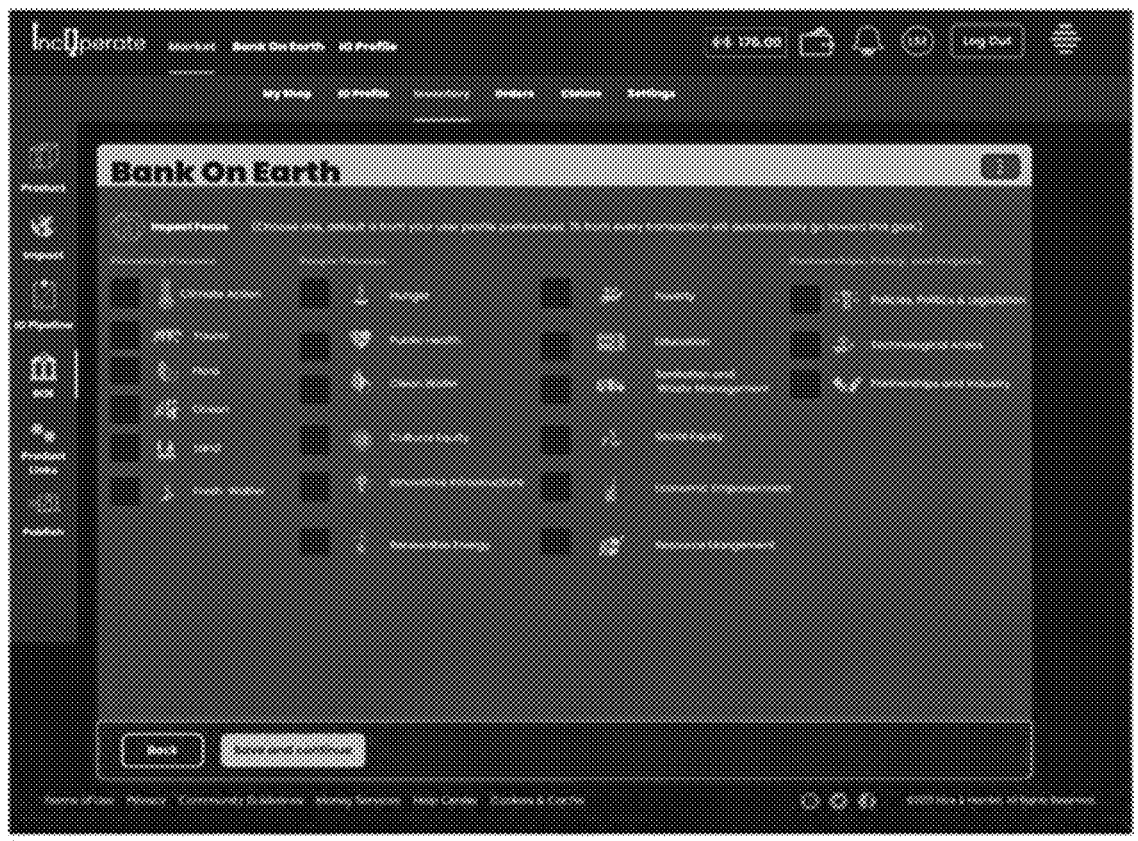
Figure 6W:
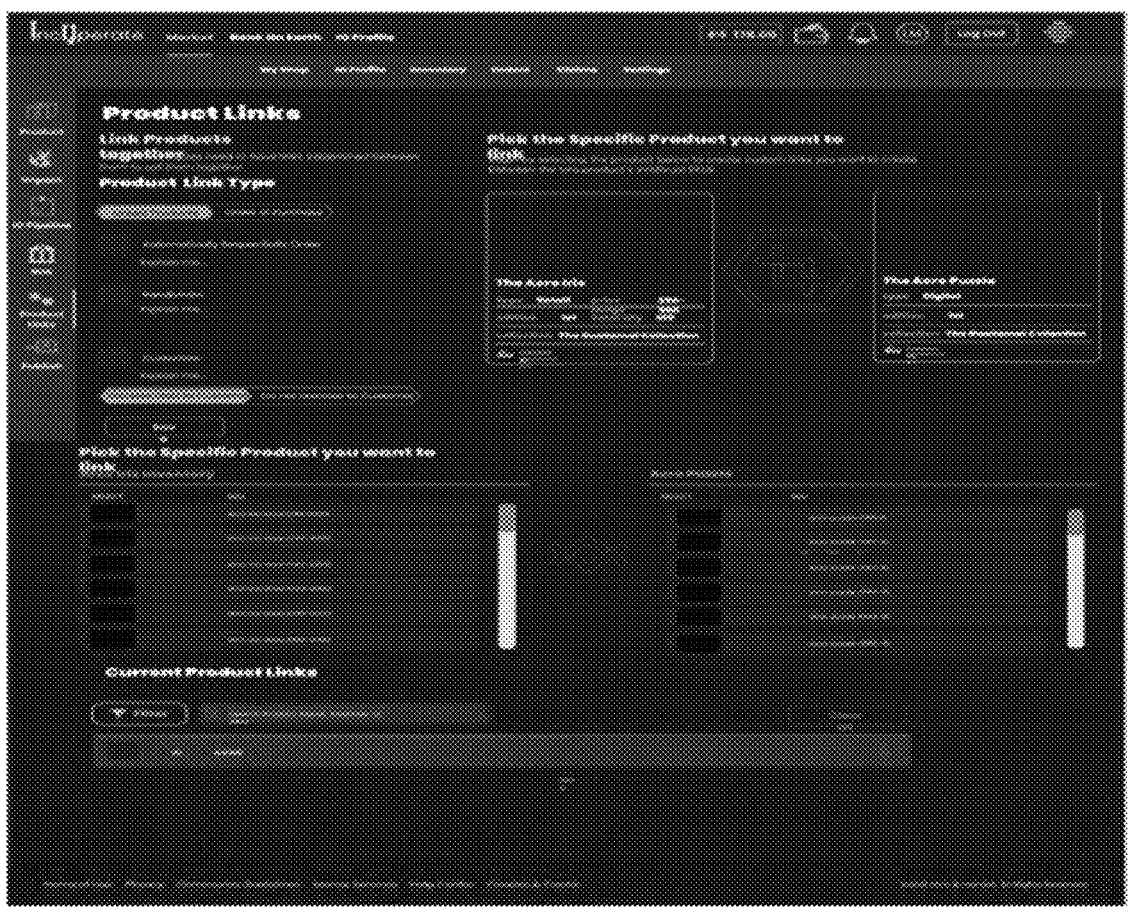
Figure 6X:
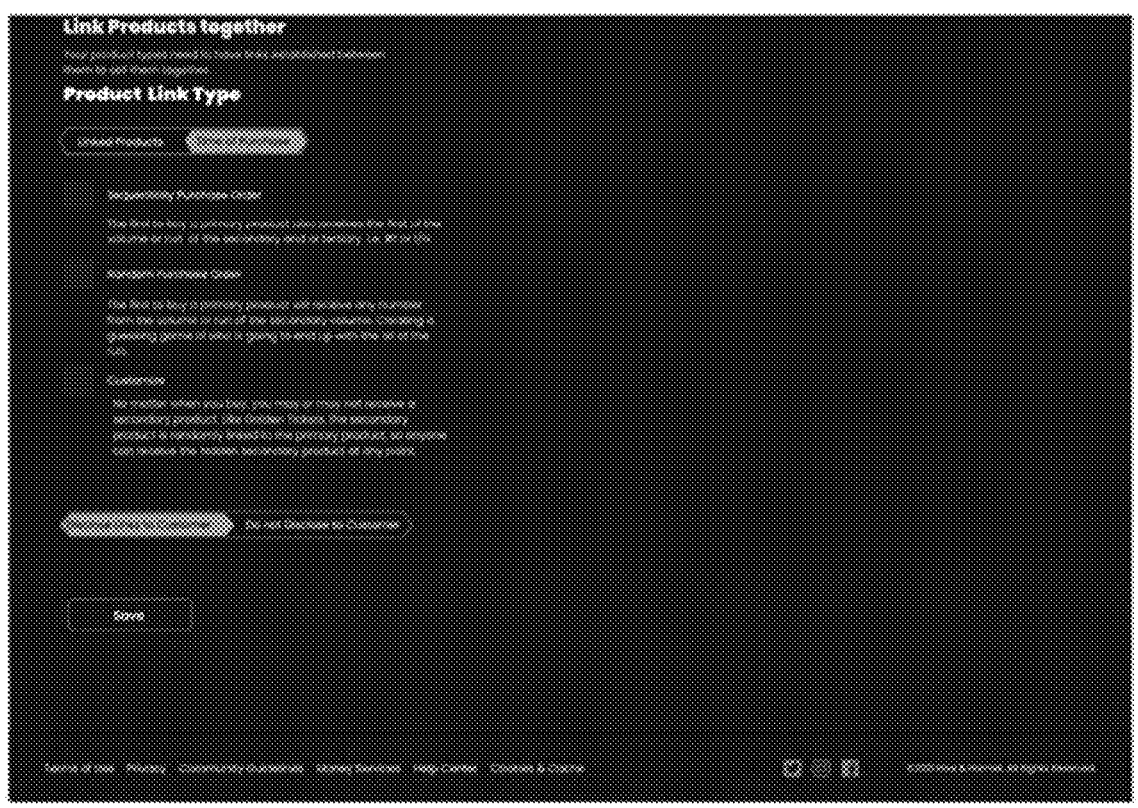

FIGS. 6a to 6x illustrate a process of product creation, according to one or more embodiments. As shown in FIG. 6a, the user interface view of the digital marketplace server enables the seller to create a product under "my shop" listing. The user interface view enables the seller to select one of a product, an IO pipeline, and a wallet (e.g., Bank of Earth). The user interface view enables the seller to select the product, as the seller is willing to create the product. The user interface view, shown in FIG. 6b, enables the seller to select one of a digital product, and a physical product based on the type of the product. The user can select the digital product if the user is creating the NFT. The user can select the physical product if the user is creating the physical product. The user interface view enables the user to save and continue to the next step. The user interface view, shown in FIG. 6b, is listed under the "inventory" listing.

The product creation unit, via the user interface view shown in FIG. 6c, enables the user to add general product information and product contributors under "product details" listing. The general product information comprises at least a product name, a caption, a product stock keeping unit (SKU), and a collection to which the product belongs. The product contributors comprise a primary topic, medium, and a creative field. The primary topic describes the topic to which the contribution is done.

The product creation unit, via the user interface view shown in FIG. 6c, enables the user to add or upload a product listing or image under "media" listing. The product creation unit, via the user interface view, shown in FIG. 6c, further enables the user to add additional views and product shots of the first product. The product creation unit, via the user interface view, shown in FIG. 6c, enables the user to publish and highlight the sales offer.

The product creation unit, via the user interface view shown in FIG. 6d, enables the user to create a product anatomy for one of the first product, and the first service. The product creation unit, via the user interface view shown in FIG. 6e, enables the user to dissect the product anatomy into various parts and select at least one part of the product anatomy of one of the first product and the first service. The product creation unit, via the user interface view shown in FIG. 6e, enables the user to create interactive labels on at least one part selected. The product creation unit, via the user interface view, enables the user to hyperlink the interactive labels with at least one of but not limited to an activity, an impact, an outcome, a description, a research material, a report, a study, a recommendation, and an end user instruction manual relevant to one of the first product and the first service.

The product creation unit, via the user interface view shown in FIG. 6e, enables the user to add an impact and link the impact to one of the first product, and the first service. The product creation unit, via the user interface view shown in FIG. 6f, enables the user to add impact name, describe the impact, list impact outcome, and add product life cycle. The product life cycle enables the user to one of add material, add package, and add source. The product creation unit, via the user interface view shown in FIG. 6g, enables the user to label the parts.

The product creation unit, via the user interface view shown in FIG. 6h, enables the user to define product attributes of the physical product. The product creation unit, via the user interface view shown in FIG. 6h, enables the user to define the product specification and product attributes of the first product for sales offer such as size and or color and secondly add product. The product specification comprises launch information, product class information, quantity information, and a price of the first product or the first service. The product class information defines the product class to which the product belongs. The quantity information defines how many products are listed for sale.

The product creation unit, via the user interface view shown in FIG. 6i, enables the user to make a sales offer for the physical product. In an embodiment, the product creation unit, via the user interface view shown in FIG. 6i, enables the user to make the sales offer for the physical product that has two variations of product attribute (e.g., size) with each variation having a quantity and price. In an embodiment, the product creation unit enables the seller to make the sales offer for the physical product that has any number of variations (e.g., n number of variations) of product attribute. The product creation unit, via the user interface view shown in FIG. 6j, enables the user to make the sales offer for the physical product that has two variations of another product attribute (e.g., color) in addition to product attribute "size" with each variation having a quantity and price. In an embodiment, the product creation unit enables the seller to make the sales offer for the physical product that has any number of variations (e.g., n number of variations) of another product attribute. The product creation unit further monitors the dropdown selected by the user and updates the dropdown in order to reduce any missing entry. The product creation unit, via the user interface view shown in FIG. 6k, enables the user (i.e., seller) to add shipping options. The product creation unit, via the user interface view shown in FIG. 6k, enables the user to set the shipping details that are to be rendered on the digital platform. The product creation unit creates a cryptographically secured product identification serial number to the first product via a blockchain network and lists this on the digital platform.

The product creation unit, via the user interface view shown in FIG. 6l, enables the user to create one of a second product and a second service on the digital platform. The second product may be a digital product. In an embodiment, the second product may also be the physical product. The second service may be a digital service. In an embodiment, the second product may also be a physical service. The product creation unit, via the user interface view shown in FIG. 6l, enables the user to select the additional product type to be listed on the digital platform. The second product can be linked to the first product. The second service can be linked to the first service. The product creation unit creates a second cryptographically secured product identification serial number to one of the second product and the second service via the blockchain network and lists this on the digital platform.

The product creation unit, via the user interface view shown in FIG. 6m, enables the user to add general product information and product contributors for one of the second product and the second service under "product details" listing. The general product information comprises at least a product name, a caption, a product stock keeping unit (SKU), and a collection to which the second product belongs. The product contributors comprise a primary topic, medium, and a creative field. The primary topic describes the topic to which the contribution is done.

The product creation unit, via the user interface view shown in FIG. 6n, enables the user to add or upload a product listing or image of one of the second product and the second service under "media" listing. The product creation unit, via the user interface view, shown in FIG. 6n, further enables the user to add additional views and product shots of the second product. The product creation unit, via the user interface view, shown in FIG. 6n, enables the user to publish and highlight the sales offer of the second product.

The product creation unit, via the user interface view shown in FIG. 6o, enables the user to create a product anatomy for one of the second product and the second service. The product creation unit, via the user interface view shown in FIG. 6o, enables the user to dissect the product anatomy into various parts and select at least one part of the product anatomy of one of the second product and the second service. The product creation unit, via the user interface view shown in FIG. 6o, enables the user to create interactive labels on at least one part selected. The product creation unit, via the user interface view, enables the user to hyperlink the interactive labels with at least one of but not limited to an activity, an impact, an outcome, a description, a research material, a report, a study, a recommendation, and an end user instruction manual relevant to one of the second product and the second service.

The product creation unit, via the user interface view shown in FIG. 6o, enables the user to add an impact and link the impact to one of the second product and the second service. The product creation unit, via the user interface view shown in FIG. 6p, enables the user to add impact name, describe the impact, list impact outcome, and add product life cycle. The product life cycle enables the user to one of add material, add package, and add source. The product creation unit, via the user interface view shown in FIG. 6q, enables the user to label the parts.

The product creation unit, via the user interface view shown in FIG. 6r, enables the user to define product attributes of the second product (e.g., the digital product). The product creation unit, via the user interface view shown in FIG. 6r, enables the user to define the product specification and product attributes of the second product for sales offer such as size and or color and secondarily add product. The product specification comprises launch information, product class information, quantity information, and a price of the first product or the first service. The product class information defines the product class to which the product belongs. The quantity information defines how many products are listed for sale.

The product creation unit, via the user interface view shown in FIG. 6s, enables the user to make a sales offer for the digital product. In an embodiment, the product creation unit, via the user interface view shown in FIG. 6s, enables the user to set an individual price of the specific item in the run. The product creation unit, via the user interface view shown in FIG. 6j, enables the user to make the sales offer for the physical product that has two variations of another product attribute (e.g., color) in addition to product attribute "size" with each variation having a quantity and price. The product creation unit further monitors the dropdown selected by the user and updates the dropdown in order to reduce any missing entry. The product creation unit creates a cryptographically secured product identification serial number to the first product via a blockchain network and lists this on the digital platform. The product creation unit, via the user interface view shown in FIG. 6t, further enables the user to create the third product. The product creation unit further enables the user to create the third product in an analogous way of how the first product and the second product were created.

The impact creation unit, via the user interface as shown in FIG. 6u, enables the user to sequentially create an impact and links the impact to the products as soon as the products are created. The information received from the seller may comprise the impact information. The impact information may be the information from the seller that indicates to which impact the product should be linked. The impact may be defined by the digital platform. The impact may be a fundraising program for a particular purpose. The impact may create an awareness to the society. The impact may comprise one of an impact wallet. The impact wallet may be associated with the impact program. The money credited to the impact wallet is contributed towards the impact associated therewith.

The IO pipeline creation unit, via the user interface as shown in FIG. 6u, enables the user to sequentially create an IO pipeline and links the impact to the products as soon as the products are created. The IO pipeline creation unit subsequently enables the user to create the IO pipeline and define the activities. The impact creation unit, via the user interface as shown in FIG. 6v, enables the user to select an impact wallet for the products that are created. The impact creation unit, via the user interface as shown in FIG. 6v, receives the selection done by the user and links the products to the impact wallet selected. The product linking unit, via the user interface as shown in FIG. 6w, enables the user to link the products and depicts the linked products based on the type of product linking opted. The product linking unit, via the user interface as shown in FIG. 6x, depicts the inventory of the linked products and enables the user to alter product linking disclosure settings. The product linking disclosure settings provides "disclose links to customer" and "do not disclose to customer" options. The "disclose links to customer" option when selected by the user discloses the product links to the customer. The "do not disclose to customer" option when selected by the user does not disclose the product links to the customer.

Figure 7:
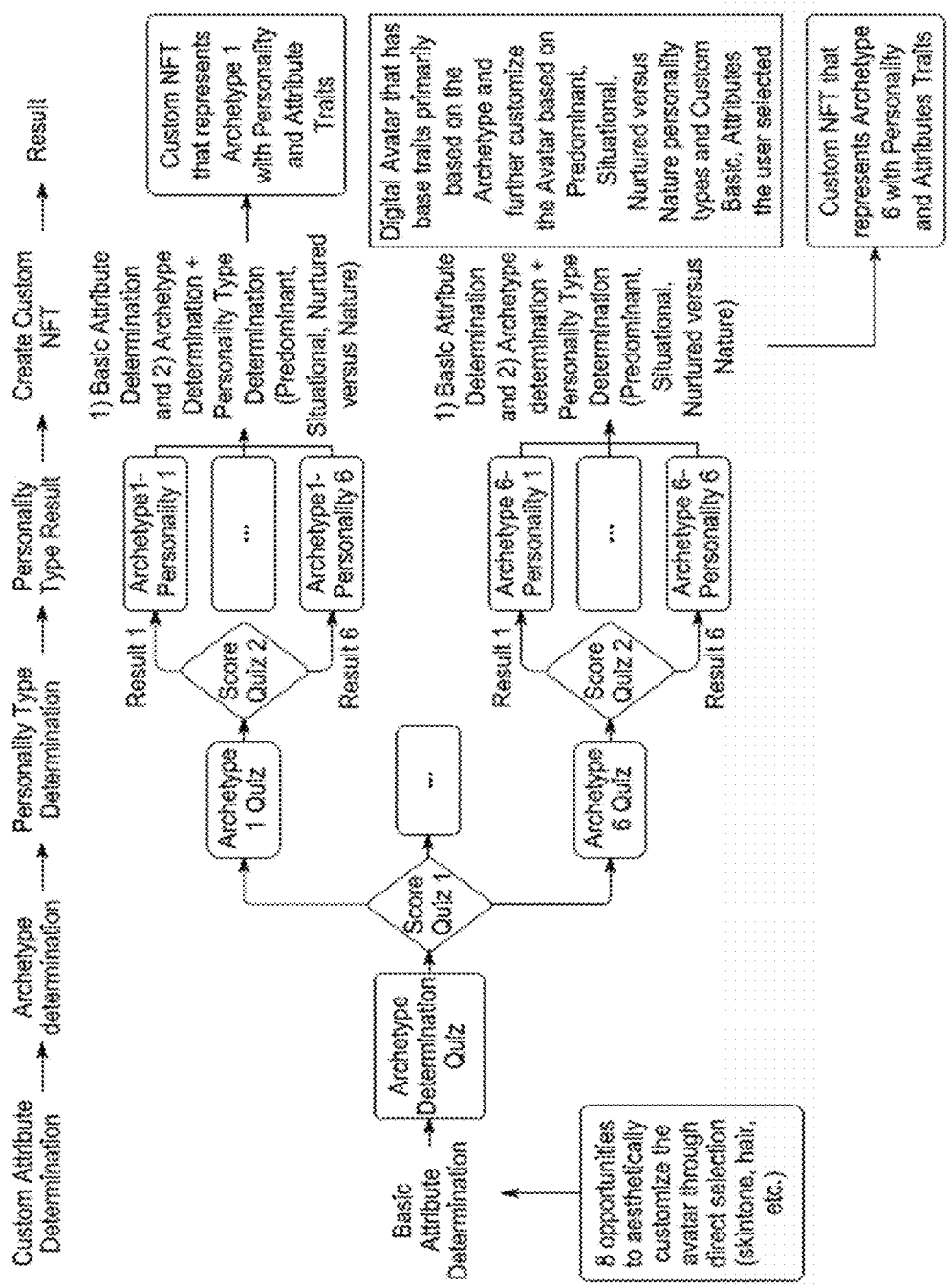
FIG. 7 illustrates a top level process flow of generated non-fungible tokens (NFTs), according to one or more embodiments.

FIG. 7 illustrates a top level process flow of generated non-fungible tokens (NFT), according to one or more embodiments. The system described in the present disclosure enables the user to customize the NFTs based on providing responses to one of an avatar quiz, and an impact oriented (IO) survey. An IO survey unit renders the avatar quiz first, then the IO survey is rendered to the user. The IO survey unit generates the IO survey questions based on a template and or custom built. The IO survey unit further enables the user to configure the settings of the quiz/survey. The IO survey unit receives the responses from the user and verifies the responses. The IO rewarding unit enables the user to customize the NFT upon verifying and confirming the accuracy of the responses received from the user. The IO rewarding unit also monitors the time taken for providing the responses by the user. The IO rewarding unit may enable the user to uniquely customize the NFT as soon as the user provides the response accurately and within optimal time.

The process described herein, as shown in FIG. 7, enables the user to progressively customize the outcome of the NFT. The process awards the user for participation in the avatar Quiz or the IO survey by allowing them to customize the outcome of the NFT. The IO rewarding unit evaluates the consumer's Proof of Work value by monitoring the time taken and effort to respond to all the questions of the quiz. The IO rewarding unit evaluates the brand's Proof of Work value by monitoring the time to create the questions and the responses they get from the consumers.

Every question, rendered by the IO survey unit, in the IO survey or the avatar quiz has a predetermined set of responses. Each response corresponds to a visual element, enabling greater variance in permutations as you advance down the list of questions. The quiz, rendered by the IO survey unit, comprises two parts. The first part allows the user to customize their custom NFT with 6 traits (questions) that update customization features that are made visible in real time. The second part consists of 2 quizzes. The first quiz is 10 questions that establish one of the 6 types that primarily identify the user's traits. The second quiz is determined by the type which results from the first quiz. The end result of both parts result in the customized NFT.

The IO rewarding unit, upon verifying that the user has responded to the first part, provides the user to customize the NFT. The IO rewarding unit, upon verifying that the user has responded to the second part, enables the end result of taking the quiz. The result of the quiz further customized the NFT by adding more unique traits for the top 3 subtypes of the primary type based on the result of the second quiz. The IO rewarding unit provides the generated NFT as a specific permutation from 7 trillion variations, when the questionnaire or quiz is completed. The IO survey unit may also limit the participation to the IO quiz only to limited users. The IO rewarding unit rewards the unique series of NFT that are custom generated to each user on the digital platform who are participating in the limited participation IO quiz.

The IO rewarding unit dictates the total number of variations of an avatar that NFT can generate, by using a unique scoring mechanism and determining relational nature between the questionnaire and its corresponding responses. The generated NFTs are not realized or available in its completed state until the quiz has been finished. The generated NFT are generated as a result of the user participation. The IO rewarding unit provides the generated NFT as the IO reward when the user provides the responses to the IO survey, or to the avatar quiz, or executes and completes the activities defined by the IO pipeline.

The IO survey unit creates the avatar quiz. The avatar quiz comprises a plurality of questions. The number of questions determines the number of opportunities to customize a specific visual aspect of the final composition of the NFT. For instance, the IO rewarding unit enables the user to customize several types of hairstyles to an NFT upon responding to a first question. The IO rewarding unit enables the user to customize another aspect, like the eye color, so on and so forth, until all predetermined aspects get defined by the user by completing the entire set of questions in the quiz. The quiz progressively further qualifies the final expression of the outcome NFT.

Each question, rendered by the IO survey unit, can have as many responses to define as many choices as felt necessary by the quiz master/content creator. No limits on the number of questions or the number of responses each question can have. Limit relational nature of the responses to customization options is in a direct 1:1 ratio, i.e., every answer choice only qualifies one attribute addition to the outcome NFT. The impact focus contribution unit is configured to use the customized NFT to raise money through the sales of the NFT for personal or the digital marketplace wallet.

The top level process flow shown in FIG. 7 comprises three major sections such as a custom attribute determination, archetype determination, and personality type determination. The user has to navigate and respond to the above mentioned three sections to filter through and generate a free, personalized NFT. The IO survey unit, via the custom attribute determination section, enables the user to aesthetically customize the avatar (i.e., NFT) through direct selection of attributes such as hair tone, skin, color, etc. The IO survey unit, via the archetype determination section, enables the user to respond to a series of 15 multiple choice questions. Each multiple choice question, rendered by the IO rewarding unit, contains six response options. The IO survey unit analyzes the response received from the user and determines one of six archetypes. The IO survey unit renders a first set of consecutive questions with multiple choice responses (e.g., six multiple choice responses) depending on one of the six archetypes achieved. The IO survey unit determines the personality type of the user depending on the response of each multiple choice question. The IO survey unit communicates the responses and the determinations to the IO rewarding unit. The IO rewarding unit enables the user to customize the NFT (e.g., digital avatar) based on basic attribute determination, archetype determination, and personality type determination. The IO rewarding unit further enables the user to customize the digital avatar based on Predominant, Situational, nurtured versus Nature personality types and Custom Basic Attributes the user selected.

Figure 8A:
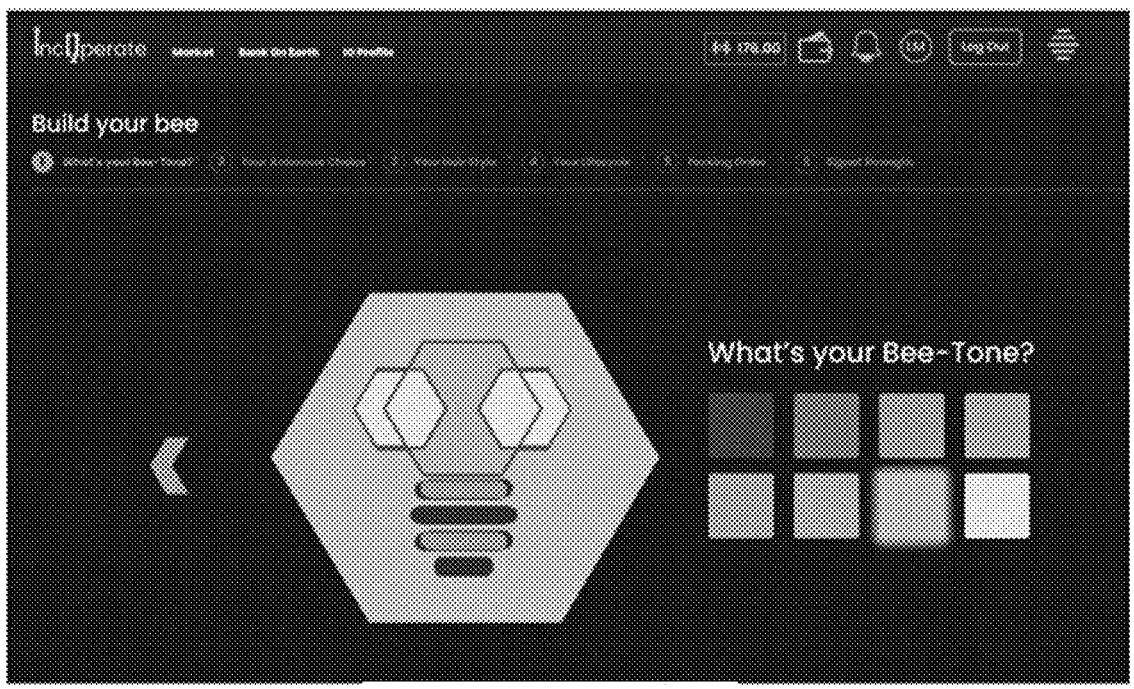
FIGS. 8a-8f illustrate a sequential flow of screens showing customization of an NFT, according to one or more embodiments.
Figure 8B:
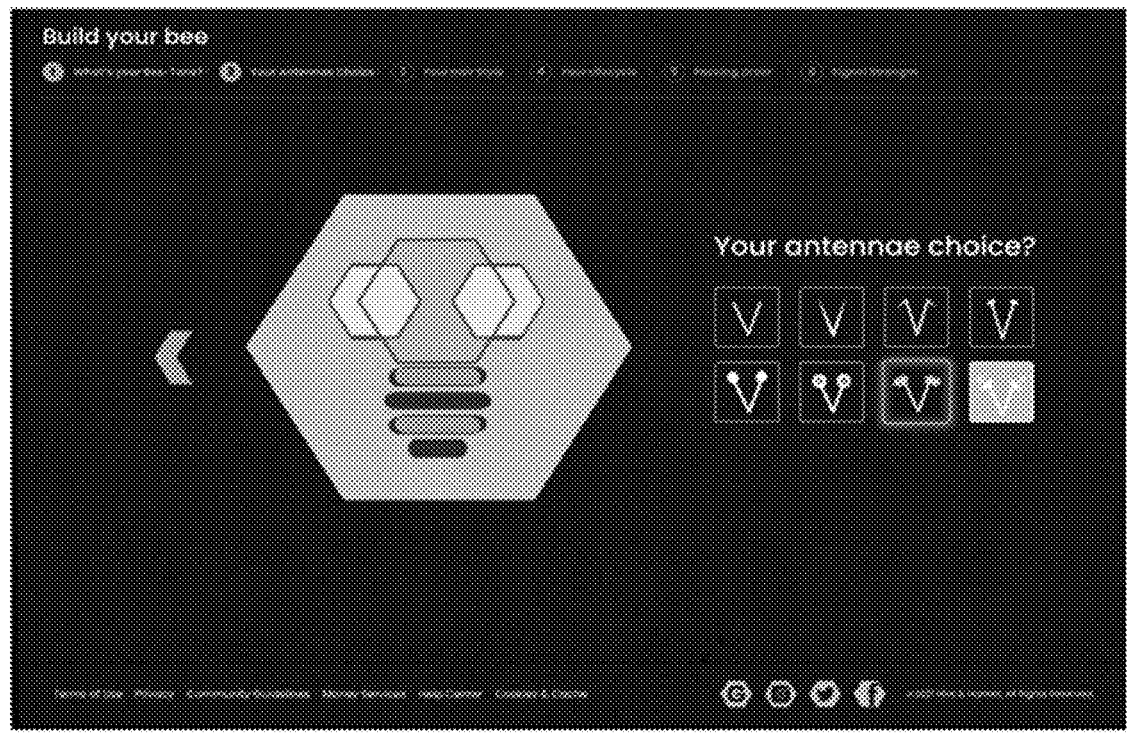
Figure 8C:
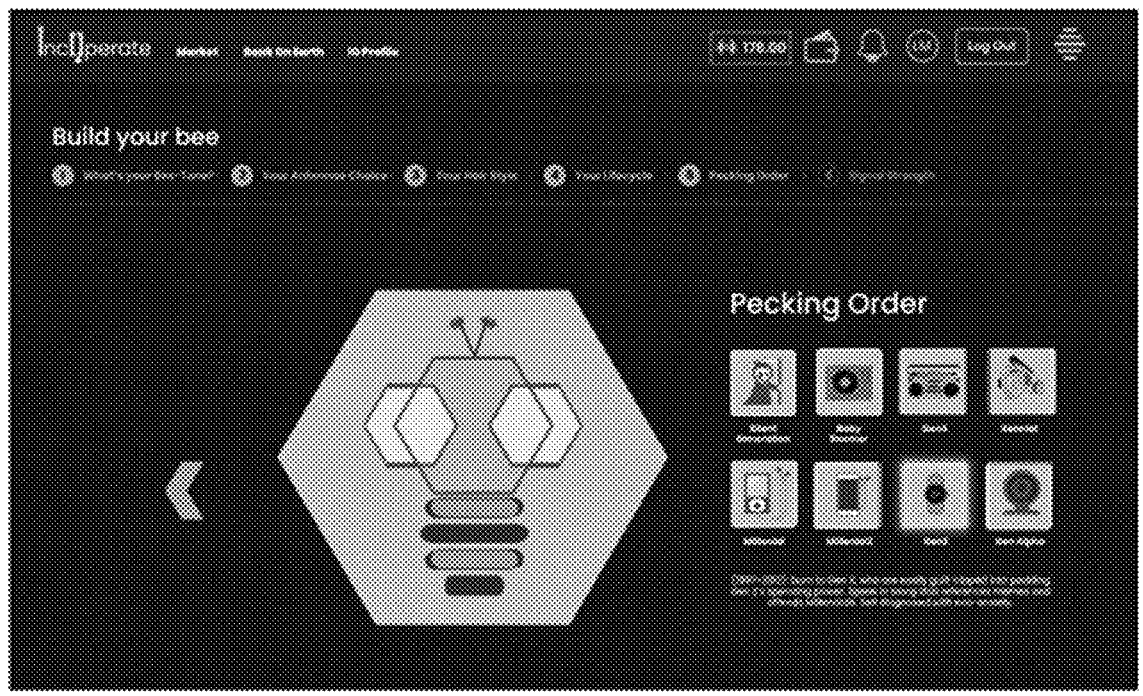

FIGS. 8a-8f illustrate a sequential flow of screens showing customization of an NFT, according to one or more embodiments. The cryptographically secured digital asset creator enables the user to build an avatar as shown in FIG. 8a. The cryptographically secured digital asset creator, via the user interface shown in FIG. 8a, enables the user to customize a first attribute (e.g., customize a bee tone for a bee avatar). The cryptographically secured digital asset creator, via the user interface shown in FIGS. 8b and 8c, enables the user to customize a second attribute (e.g., select a bee antenna for the bee avatar and customize the bee avatar). The cryptographically secured digital asset creator may also enable the user to select a third attribute (e.g., hairstyle), a fourth attribute (e.g., a life cycle), and a fifth attribute (e.g., pecking order) and customize the avatar. In an embodiment, the cryptographically secured digital asset creator may enable the user to customize up to nth attribute (e.g., body, wing, stinger, antennae, hair, lifestyle, signal strength, pecking order, etc.).

Figure 8D:
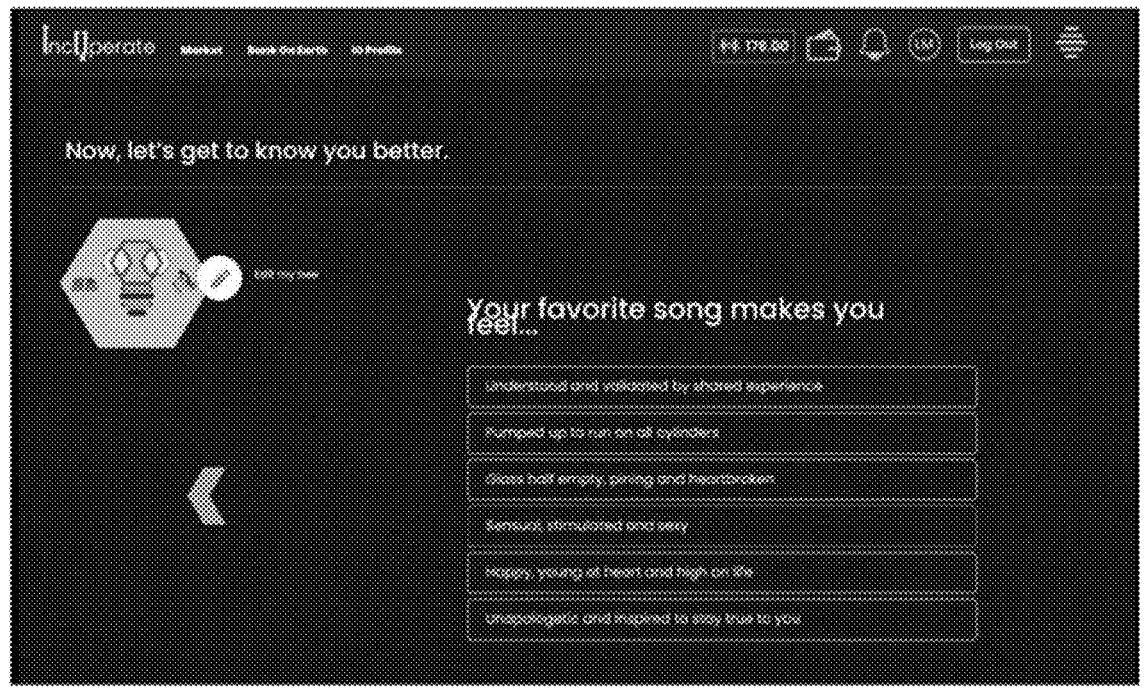
Figure 8E:
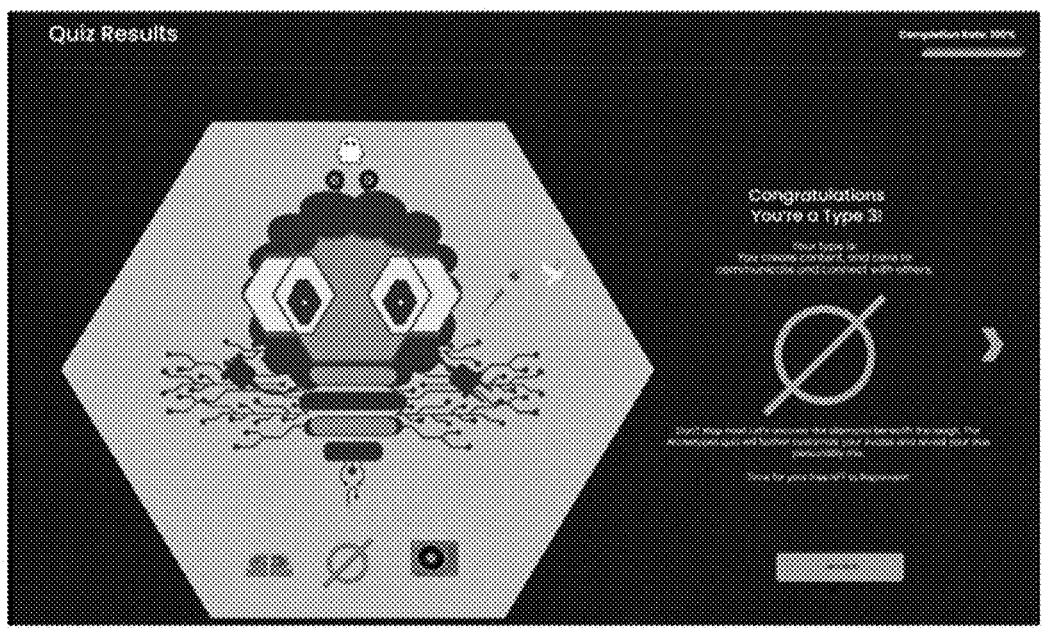
Figure 8F:
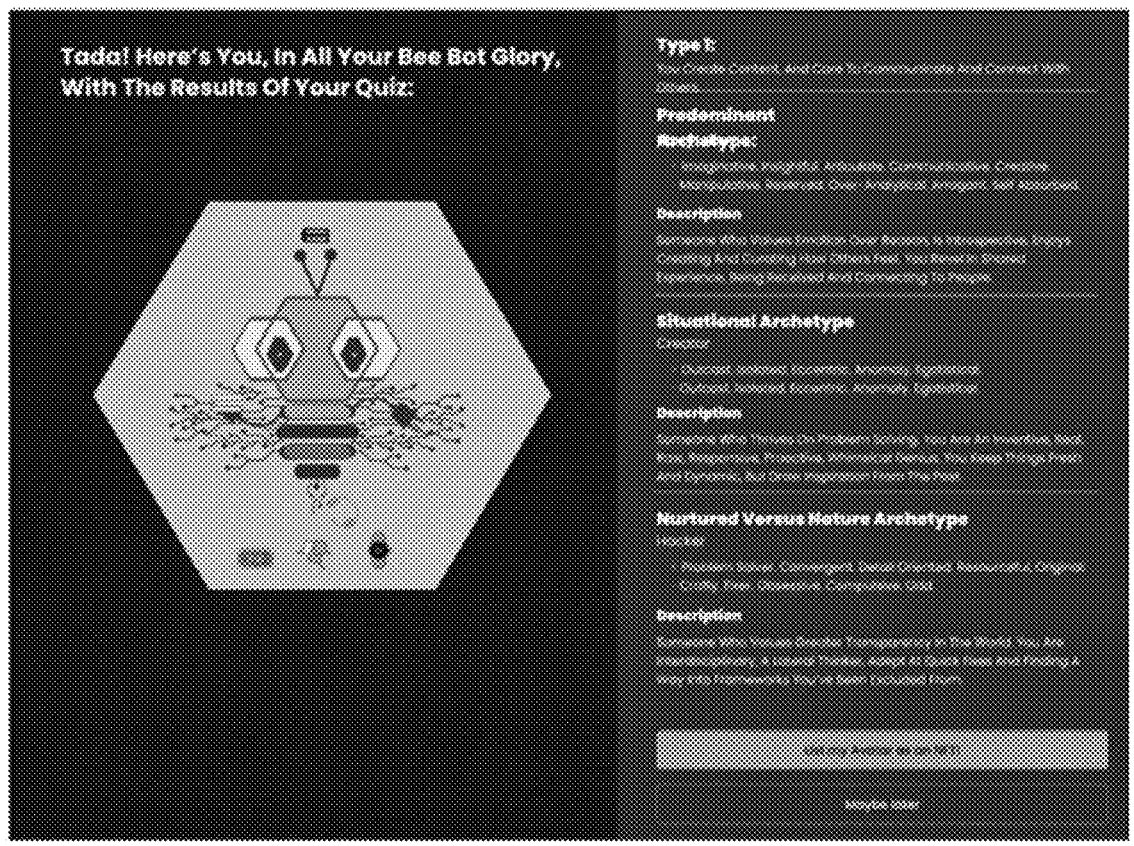

The cryptographically secured digital asset creator further renders a question, as shown in FIG. 8d, to the user and receives the response from the user. The question may be taken from a template (e.g., Your favorite song makes you feel?). The cryptographically secured digital asset creator, based on the above customization and responses, determines the personality type of the user as shown in FIG. 8e. The cryptographically secured digital asset creator finally renders the generated NFT based on the responses and customizations received from the user as shown in FIG. 8f. The cryptographically secured digital asset creator enables the seller to further customize the avatar upon receiving the responses to the question raised. The cryptographically secured digital asset creator can render n number of questions. The cryptographically secured digital asset creator can enable the seller to make n number of customizations upon receiving the responses to the n number of questions.

FIG. 9a-9m illustrate a smart contract based clearing house associated with a digital marketplace, according to one or more embodiments. The digital marketplace described herein in the present disclosure comprises a smart contract based clearinghouse for payments and impact contributions. The smart contract based clearinghouse may be locally called as "Bank on Earth". The smart contract based clearinghouse comprises two main vaults such as a first vault (impact vault) and a second vault (offset vault). Each main vault contains 3 sub-vaults. The first vault contains: Planetary, People and Problems Without Borders, which collectively contains 24 unique impact wallets. The second vault contains the Carbon, Energy and Water offset wallets. The smart contract based clearing house contributes at least 1% of funds toward the 27 wallets for every sales transaction on the digital marketplace platform. The smart contract based clearing house creating balances gets reinvested into the world through non-profit projects and foundational grants to make our collective future brighter than our past.

The digital marketplace defines the 27 impacts during the product creation process. The smart contract based clearing house enables the seller to select which impact the seller likes to support at the time of sale. Each transaction on the platform is structured on a smart contract that captures predefined percent (e.g., one percent) of each transaction's purchase price toward an impact focus wallet within the smart contract based clearing house based on the seller's preference.

The first vault comprises 24 impact wallets. The 24 wallets are broadly categorized into a first wallet (e.g., planetary pillar wallet), a second wallet (e.g., a people pillar wallet), and a third wallet (e.g., a problems without borders pillar wallet). The planetary pillar wallet comprises a climate action wallet, a fauna wallet, a flora wallet, an Ocean wallet, a land wallet, and a freshwater wallet. The people pillar wallet comprises a hunger wallet, a poverty wallet, a renewable energy wallet, an economic empowerment wallet, a public health wallet, an education wallet, a social equity (reduce inequality, gender equality, social justice) wallet, a cultural equity (indigenous rights, historical preservation, marginalized cultures) wallet, a clean water wallet, a waste management and sanitation wallet, an innovative infrastructure (Smart Cities) wallet, and a resource resilience and recovery wallet. The problems without borders pillar wallet comprises a partnerships and industry wallet, a politics, policy and legislation wallet, an enabling access wallet, an international crises wallet, a religious charities wallet, and a cradle to cradle wallet.

The second vault (i.e., offset vault) comprises 3 offset wallets such as a carbon wallet, an energy wallet, and a water wallet. Each of the three wallets reflect real time balances based on impact contribution commitments made from product sales on the digital marketplace.

Each offset vault wallet comprises a calculator that ascertains the unit value for a contribution, i.e., 1 ton=x Hex/Dollars, 1 kilowatt=X Hex/Dollars, 1 gallon=X Hex/Dollars. The smart contract based clearing house enables the seller to choose to offset one, two or all three of their offsets vaults that creates the product. The smart contract based clearing house further enables the seller to specify the exact percentage above the smart contract mandated 1% minimum, as their preferred allocation amount per transaction.

The smart contract based clearing house, via the carbon offset wallet, provides the user the ability to offset the carbon footprint of brands and their products. The smart contract based clearing house enables the user to realize the offset of the carbon footprint by integrating this wallet into either the product creation process (where the brand can choose to pay for the carbon offset while creating the listing) or pass the bucks onto the consumer (leaving it to the consumer to discern).

The smart contract based clearing house, via the energy offset wallet, provides the user the ability to offset the energy footprint of brands and their products. The smart contract based clearing house enables the user to realize the offset of the energy footprint by integrating this wallet into either the product creation process or checkout process. Organizations working to lower their emissions footprint have a variety of mitigation options at their disposal, including activities to reduce their direct emissions, activities to reduce indirect emissions like energy efficiency measures and switching to green power, and paying for external reductions.

Electricity usage offset can be calculated by dividing the amount of electricity the sun (solar system) produces from the total amount of electricity used in a home for that year. For example, the electricity grid system produces 12,200 Kilowatt-hours (KWh), and home usage is 16,100 kWh. 12,200 divided by 16,100=76% electricity usage offset.

The smart contract based clearing house, via the water offset wallet, enables the seller to contribute and offset water by a particular diversion of water. The smart contract based clearing house enables the seller to align with Water Restoration Certificates (WRC) programs that help brands (sellers) offset their water consumption.

Figure 9A:
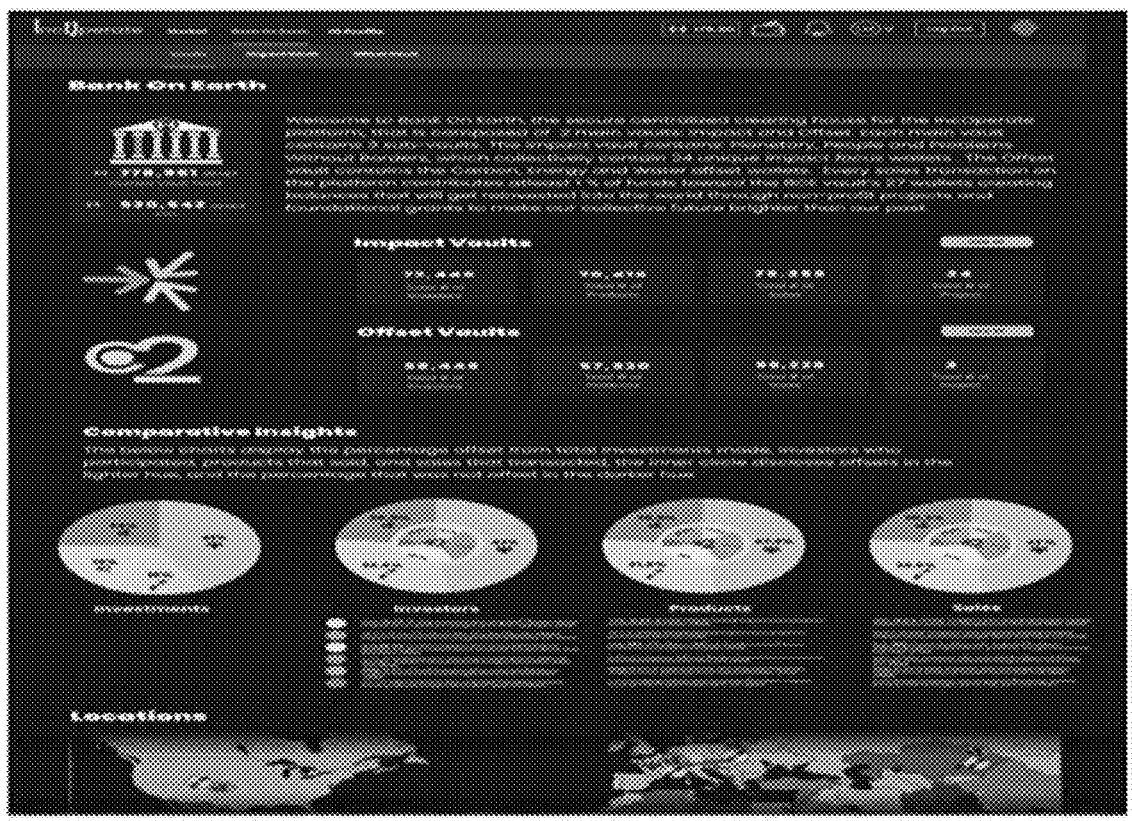
Figure 9B:
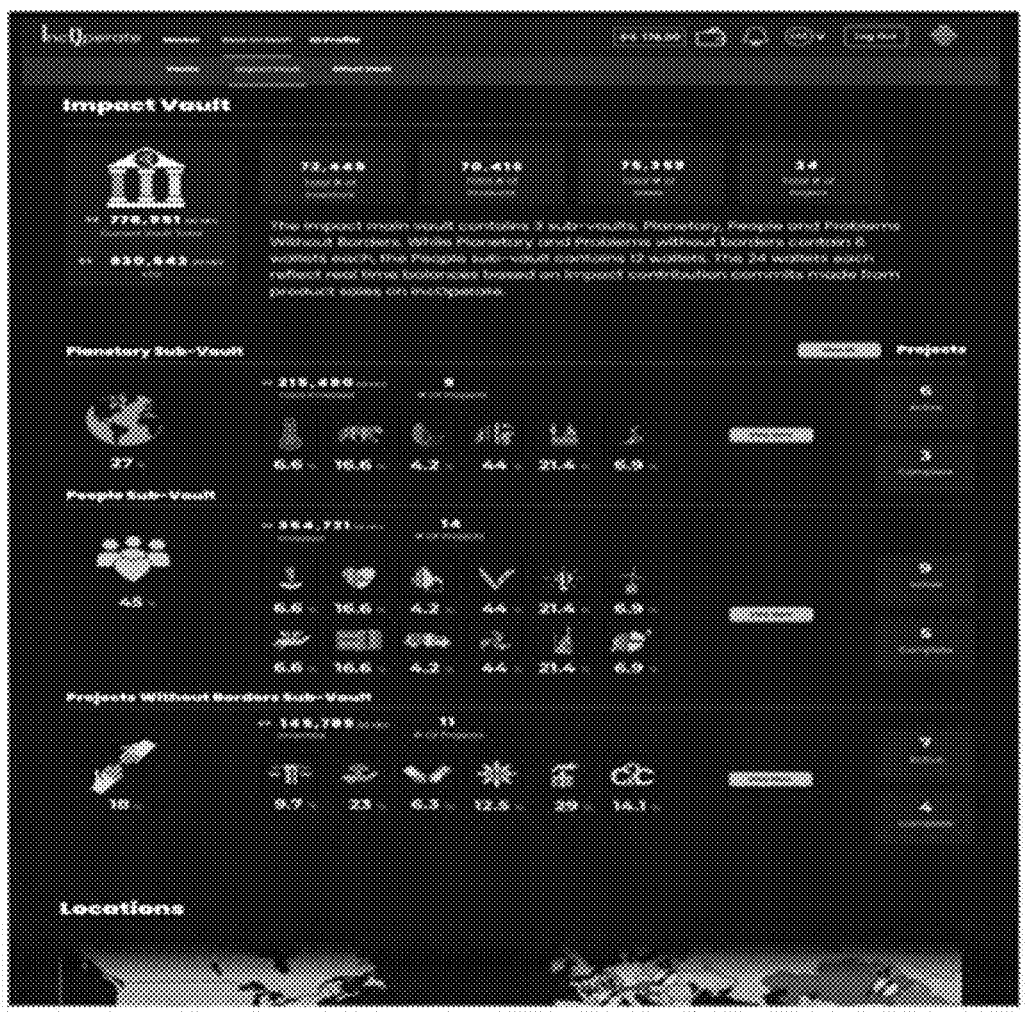
Figure 9C:
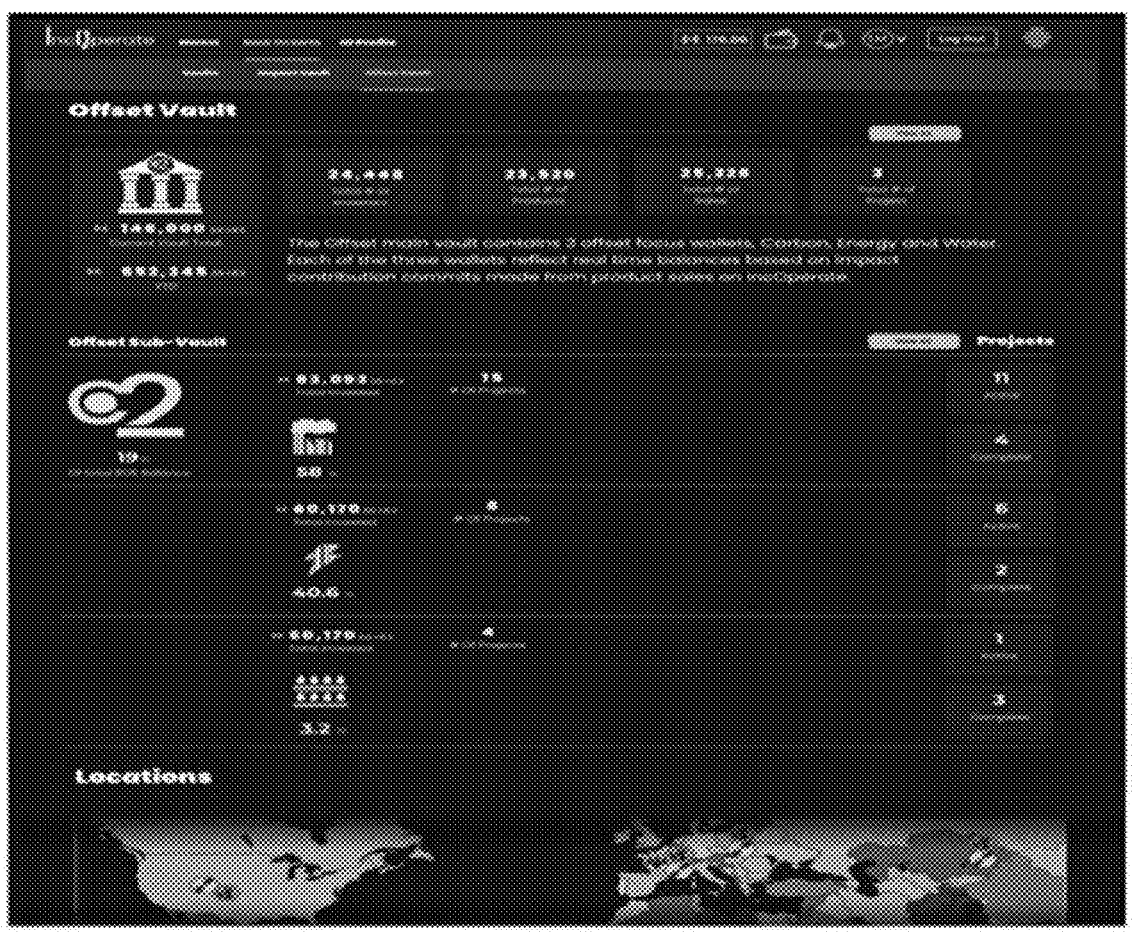
Figure 9D:
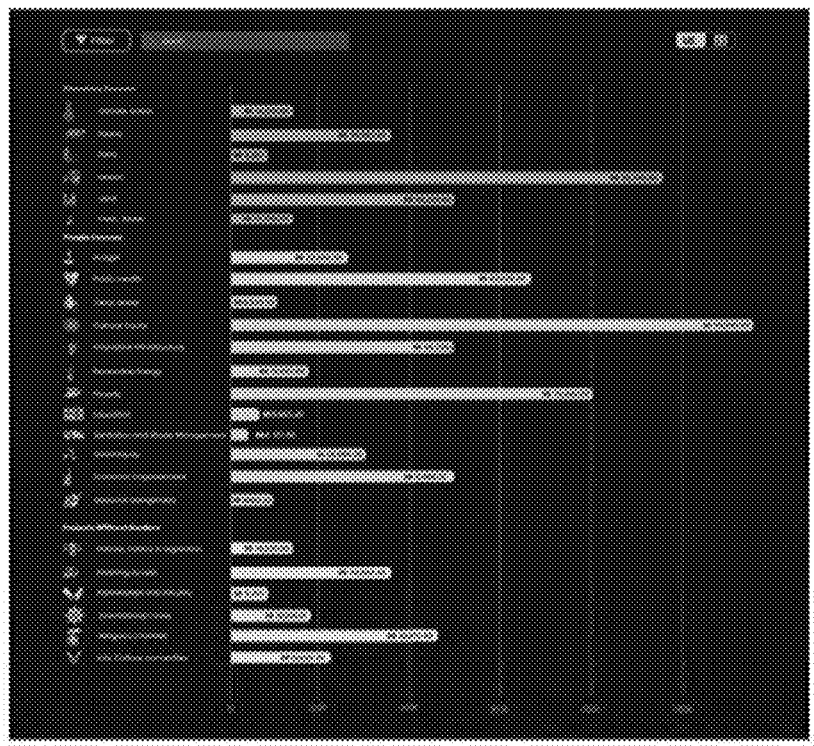
Figure 9E:
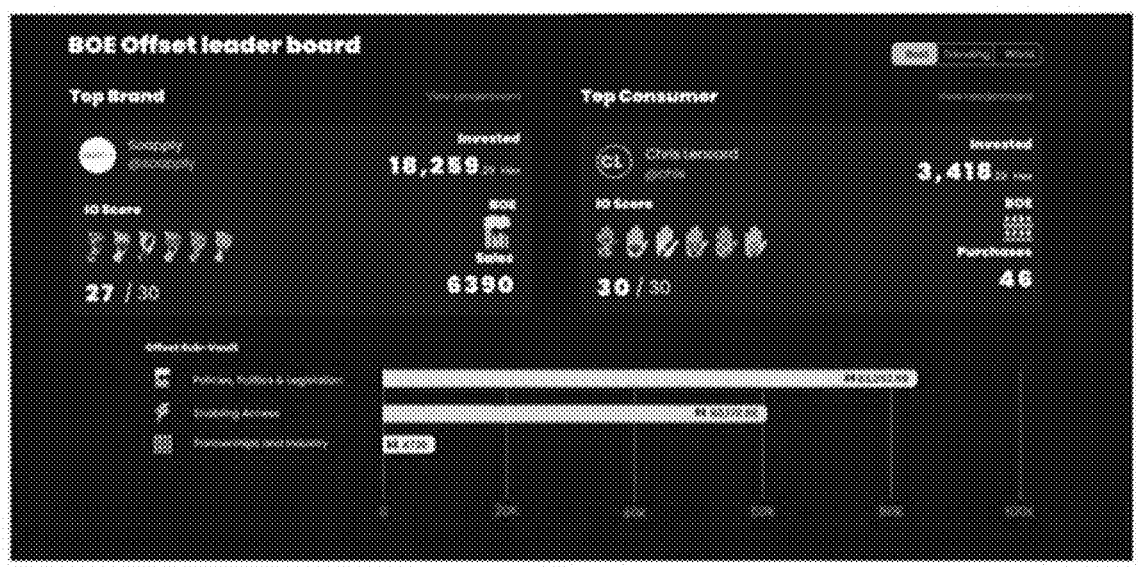
Figure 9F:
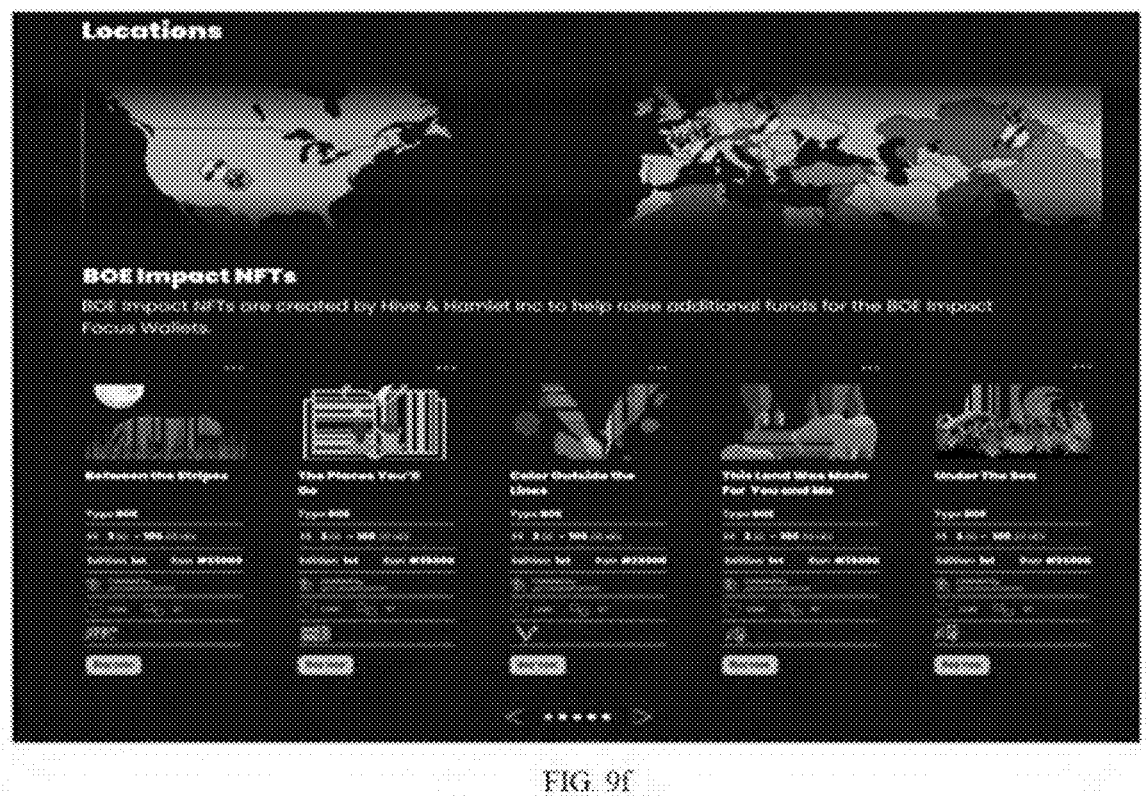

Each WRC represents 1,000 gallons of water that is registered and protected so it cannot be sold or traded. FIGS. 9a-9c shows the charts that display the percentage offset from total investments made, investors who participated, products that sold, and sales that transacted. The inner circle discloses offsets in the lighter hue, and the percentage that was not offset is in the darker hue. The impact contribution unit, through the user interface shown in FIG. 9d, depicts live bar graphs plotting funding raised by each wallet in real time. The live and interactive bar graphs will help both brands and consumers track where all the impact projects are taking place in the world. The impact contribution unit opens out the full map when accessing the landing page, allowing users to navigate to all countries where impact projects are located by clicking into each wallet icon marker as shown in FIG. 9f FIG. 9e depicts the smart contract based clearing house's offset leader board. FIG. 9e depicts the top consumer and the top seller investing or contributing to the impacts.

The smart contract based clearing house comprising multiple virtual wallets enables the seller to track and display in real time the predefined currency (e.g., US dollar) amounts aggregating toward each impact, and where the predefined currency amounts are coming in from. The smart contract executed enables this by executing a purchase function for every product listing (e.g., digital product or physical product) on the digital marketplace. The purchase action may debit a predefined percent of every transaction fund to the smart contract based clearing house wallet.

The smart contract based clearing house shows the current balance of all wallets for each Impact, a map of Impacts funded each year and any additional details needed to account for funding and usage. The smart contract based clearing house renders detailed information for each Impact. The detailed information comprises total funding raised, total number of times funding contributions were added, and top contributions. The detailed information further comprises a timeline of funding contributions. The timeline of funding contributions displays specific details such as a buyer who purchased, a seller who created and listed the product, sale price of the product purchased, percent of contribution allocated to impact, and total amount of Hex contributed.

Figure 9G:
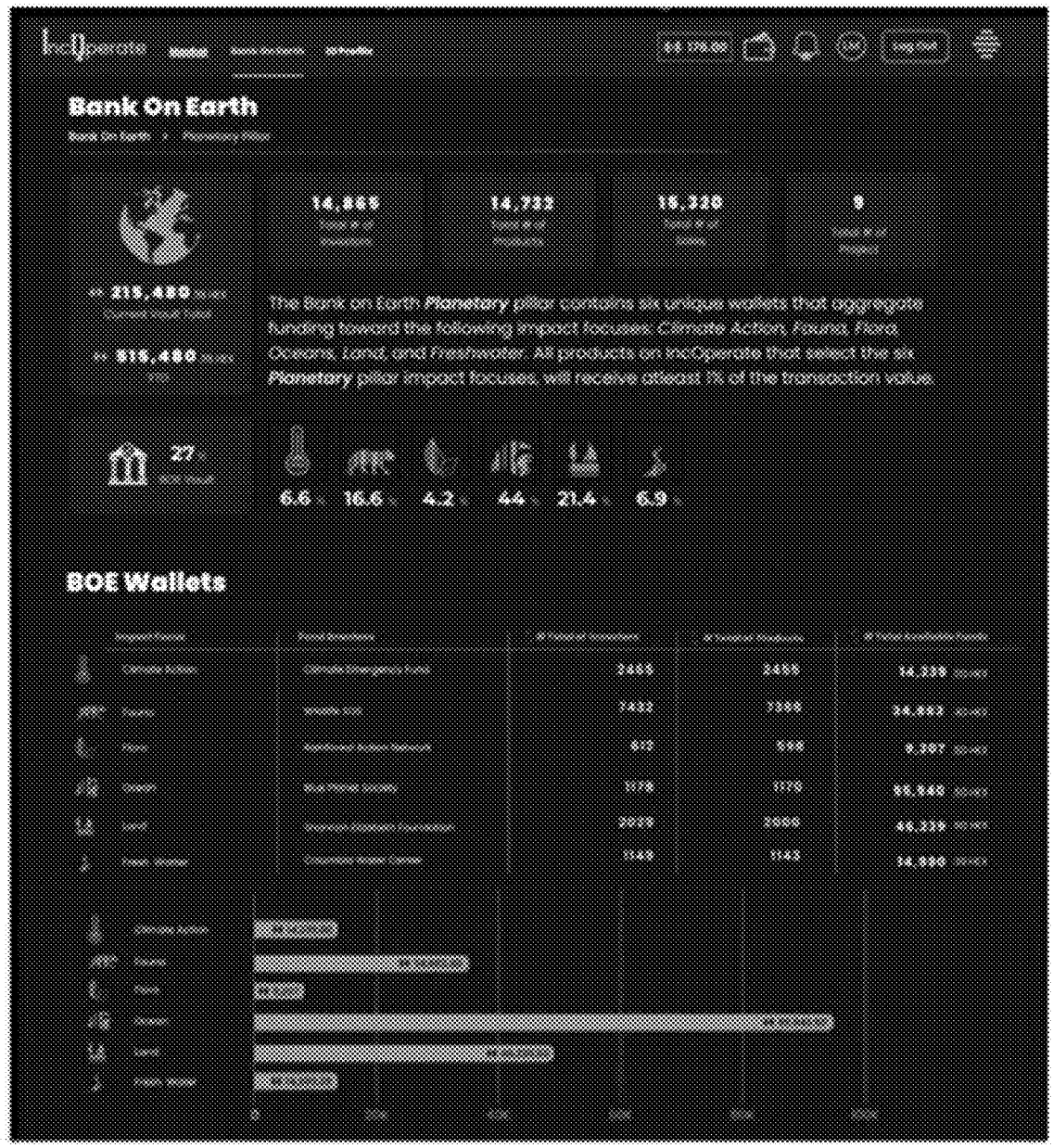
Figure 9H:
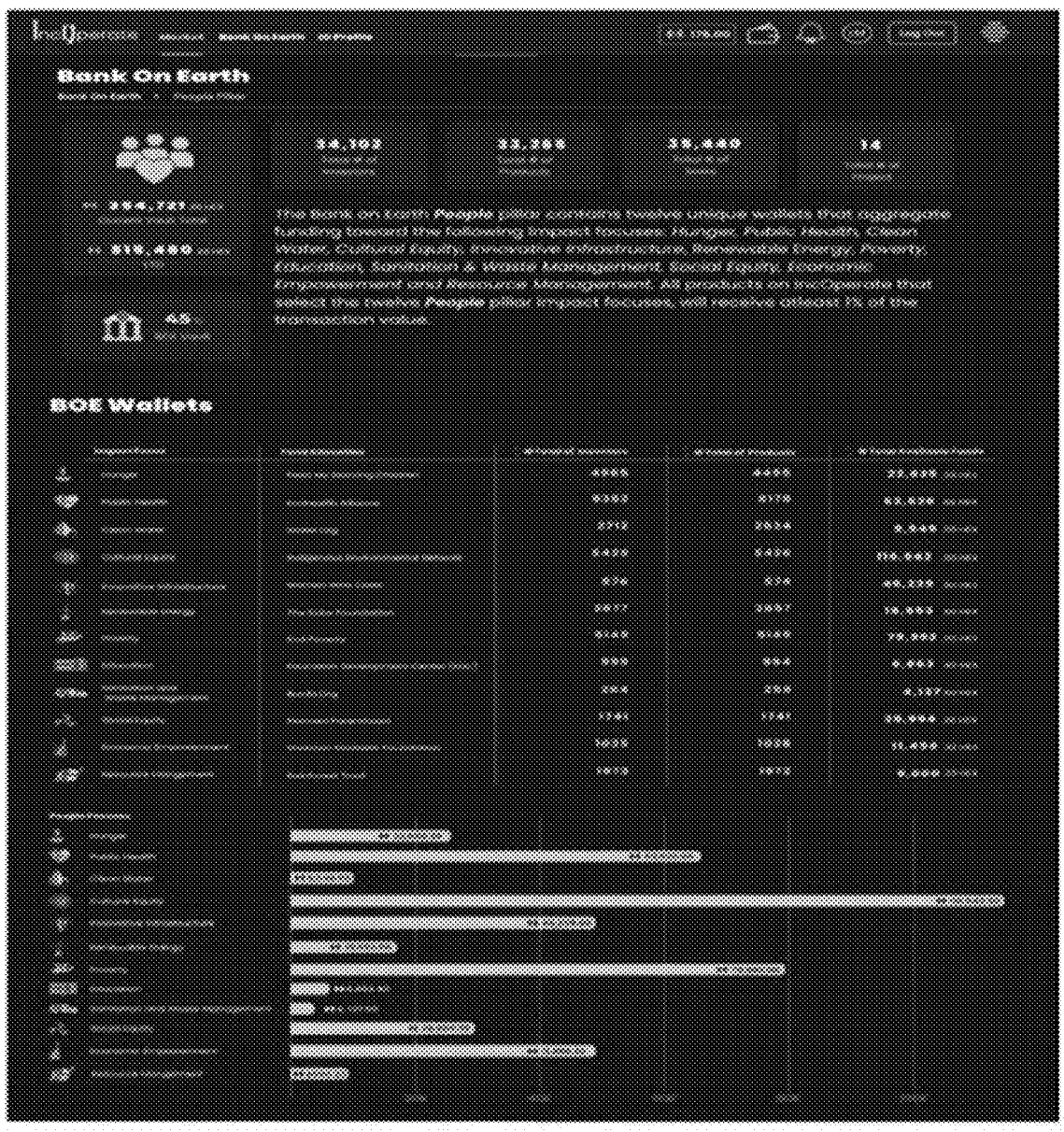
Figure 9I:
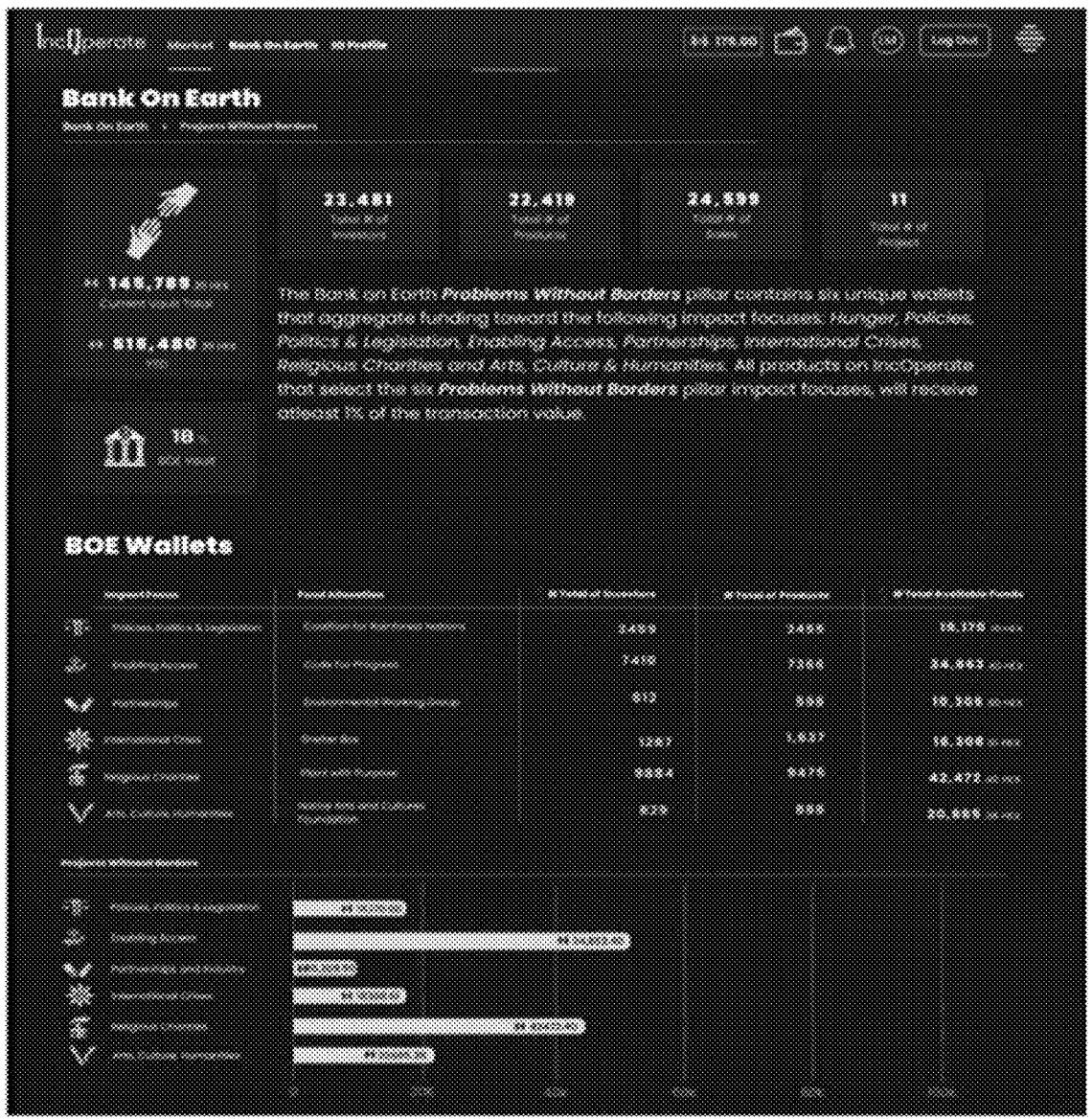
Figure 9J:
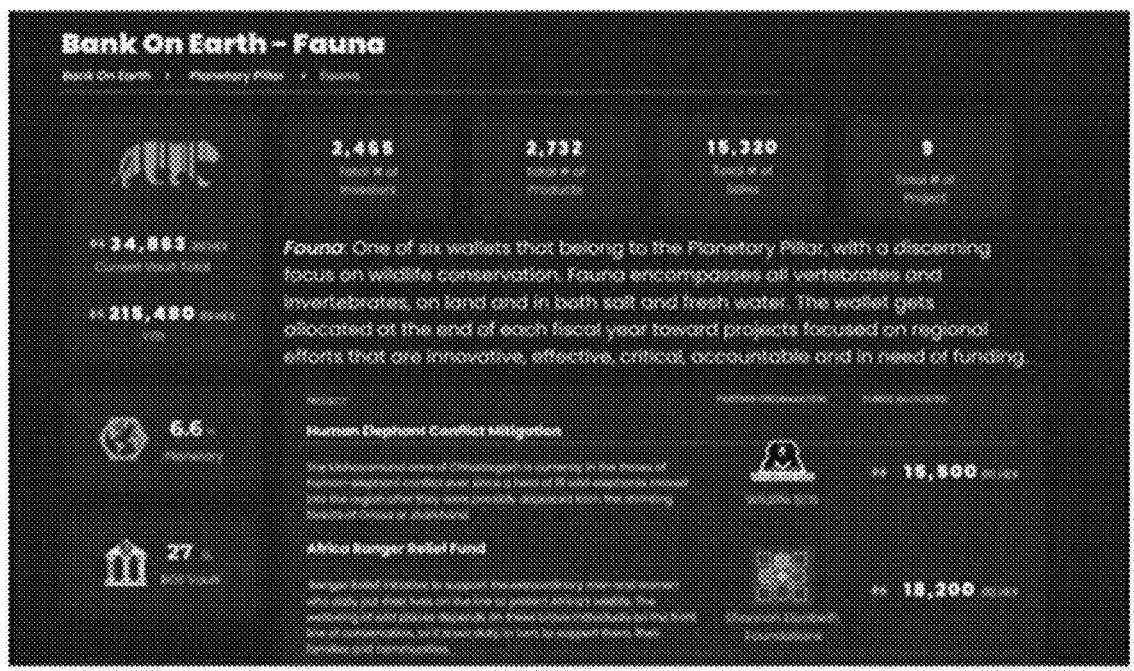
Figure 9K:
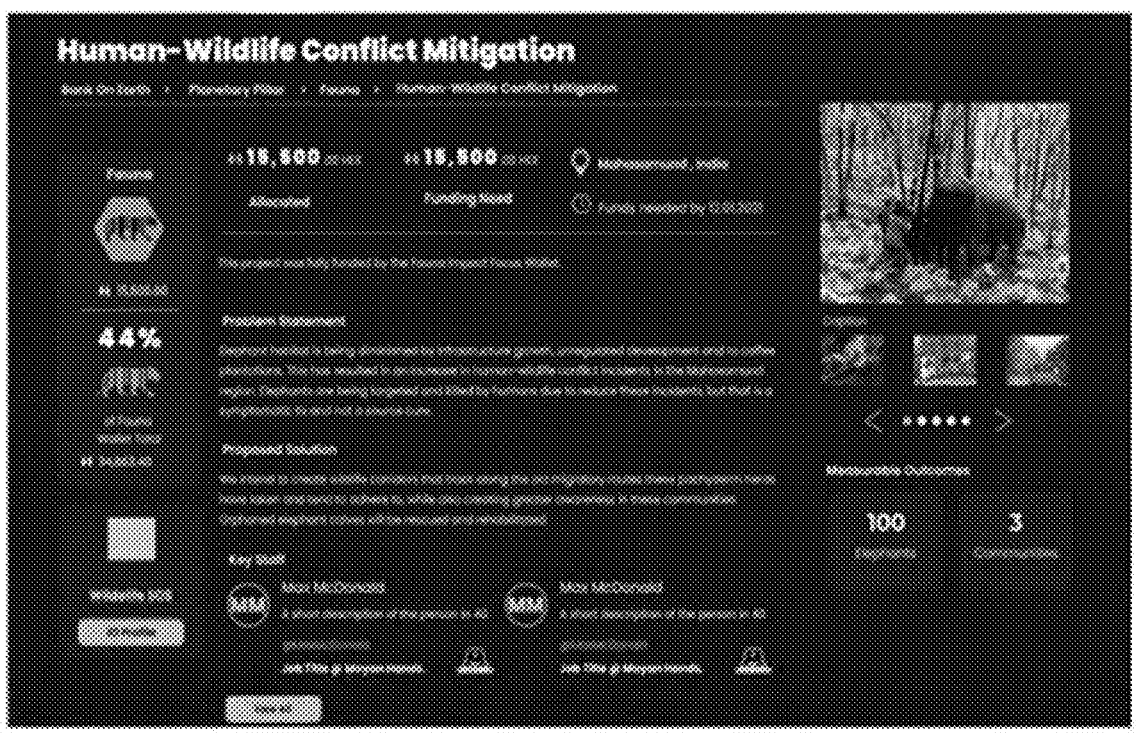
Figure 9I:
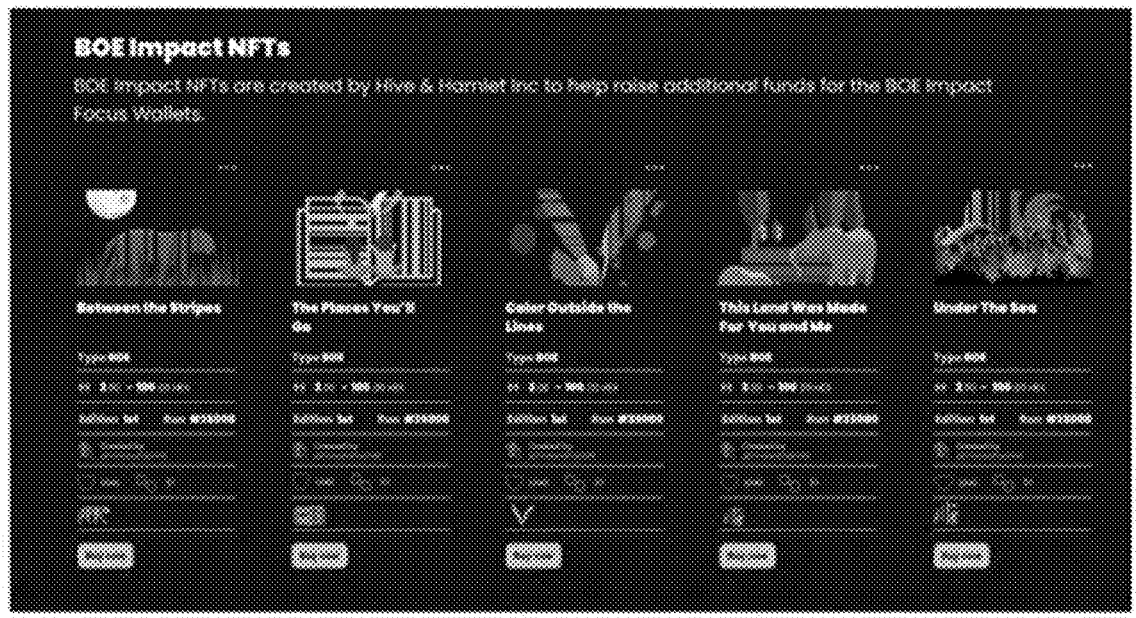
Figure 9M:
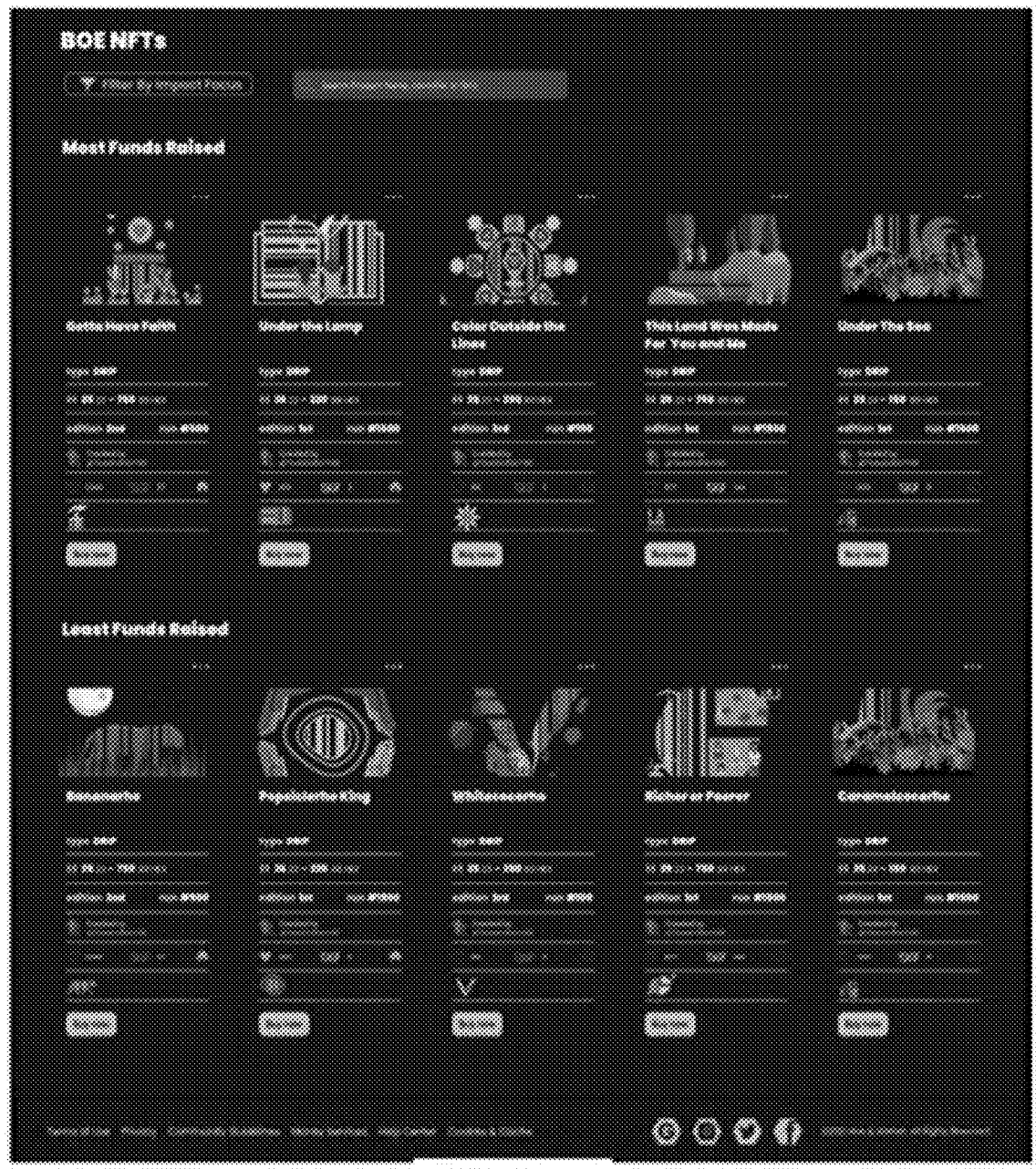

FIGS. 9g, 9h, and 9i depicts the respective pillars of the smart contract based clearing house when the user has accessed the respective pillars (planetary pillar, people pillar and problem without borders pillar). The impact contribution unit, via the user interface shown in FIG. 9j, enables the seller to view project wise of the respective pillar. The impact contribution unit, via the user interface shown in FIG. 9j, enables users to click on the projects funded under the impact in order to investigate each project in greater detail. The impact contribution unit, via the user interface shown in FIG. 9k, discloses metrics around what the money achieves, and what it gets spent on under the respective projects.

The smart contract based clearing house enables the seller to assign an NFT for each of the 24 wallets to help raise funds for the respective impacts associated therewith. The NFTs will be listed as shown in the product details page of FIG. 9l when filtered by impact. The NFTs incur additional charges at the point of purchase, in the form of sales tax and transaction fees. The cryptographically secured digital asset creator enables the seller to generate the NFT that contributes to the wallets associated with the smart contract based clearing house. In an embodiment, the NFT generated may contribute a predefined percentage of amount (upon sale of the NFT) directly to the wallet using the smart contract and not to the seller. The impact contribution unit ensures that the NFT has to have symbolic and or artistic association or make a reference to the Impact. For example, for Fauna, the NFT created has to be a creative or conceptual take on the definition of the term "fauna". The impact contribution unit further ensures that 100% of the profits have to be oriented to the impact assigned. The NFT may be sold as a collection by the host system.

FIG. 10a-10d illustrate interactive e-catalog collections according to one or more embodiments. The interactive e-catalog holds a list of products. The catalog creating unit creates the interactive e-catalog split into at least one of a collection category, a cluster category, a relisting category, a product category, recommendation category, NFT category, favorites category, a trending category, an IO score category, and an history category. The catalog creating unit further enables the user (e.g., buyer, seller) to interact with the interactive e-catalog and sort at least one category of the interactive e-catalog. The interactive e-catalog enables the user to filter and retrieve the desired products. The interactive e-catalog is a compendium of all product listings in their respective collections in a user-friendly digital book. The interactive e-catalog enables the user to quickly access and notice conveniently what collectibles and products they own. The interactive e-catalog enables the user to quickly access what is available to them still given their past purchase behavior and preferences.

Figure 10A:
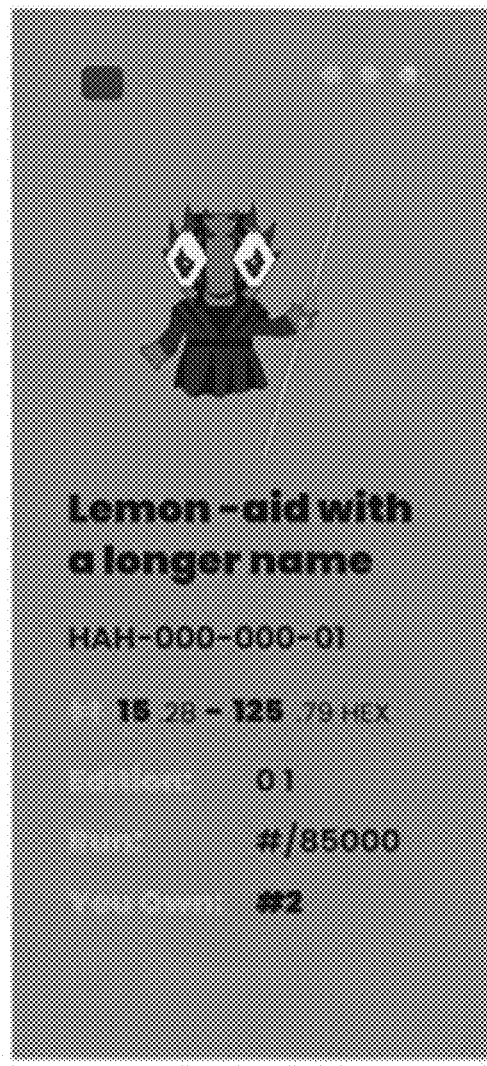
FIGS. 10a-10d illustrate interactive e-catalog collections according to one or more embodiments.
Figure 10B:
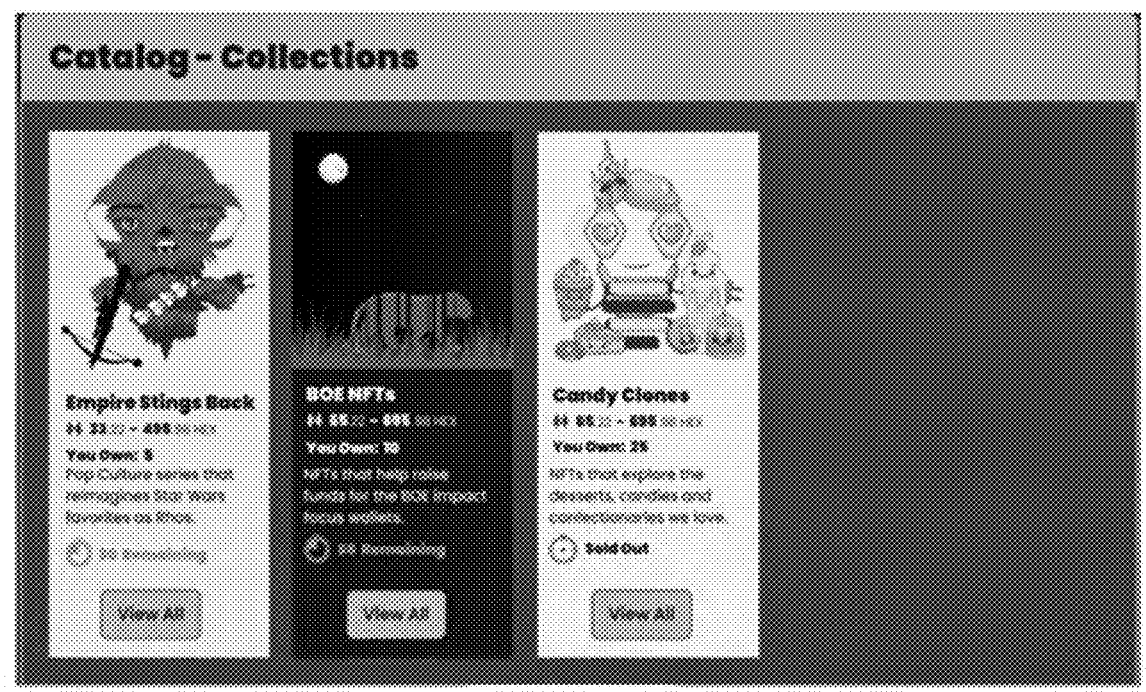
Figure 10C:
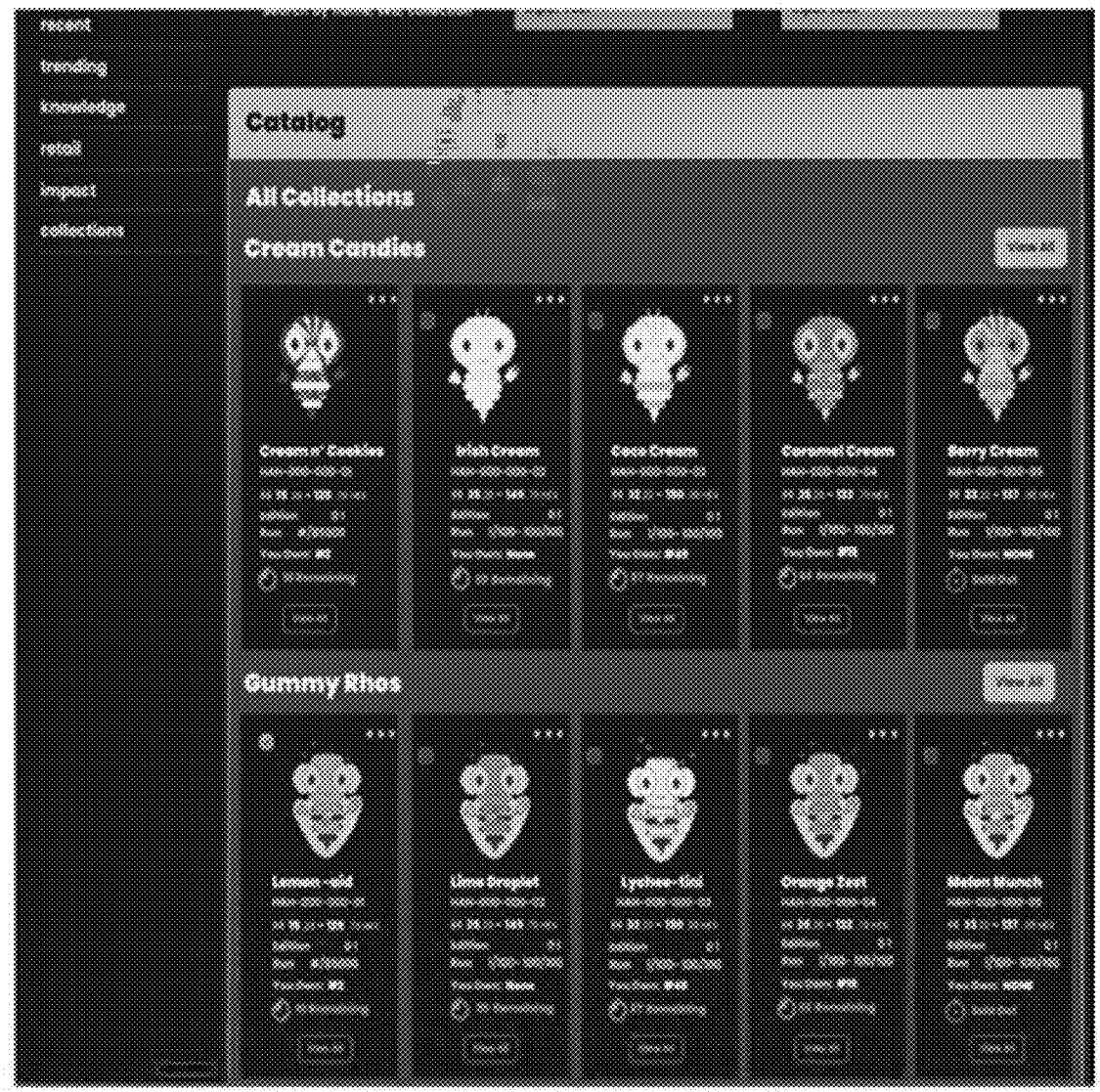
Figure 10D:
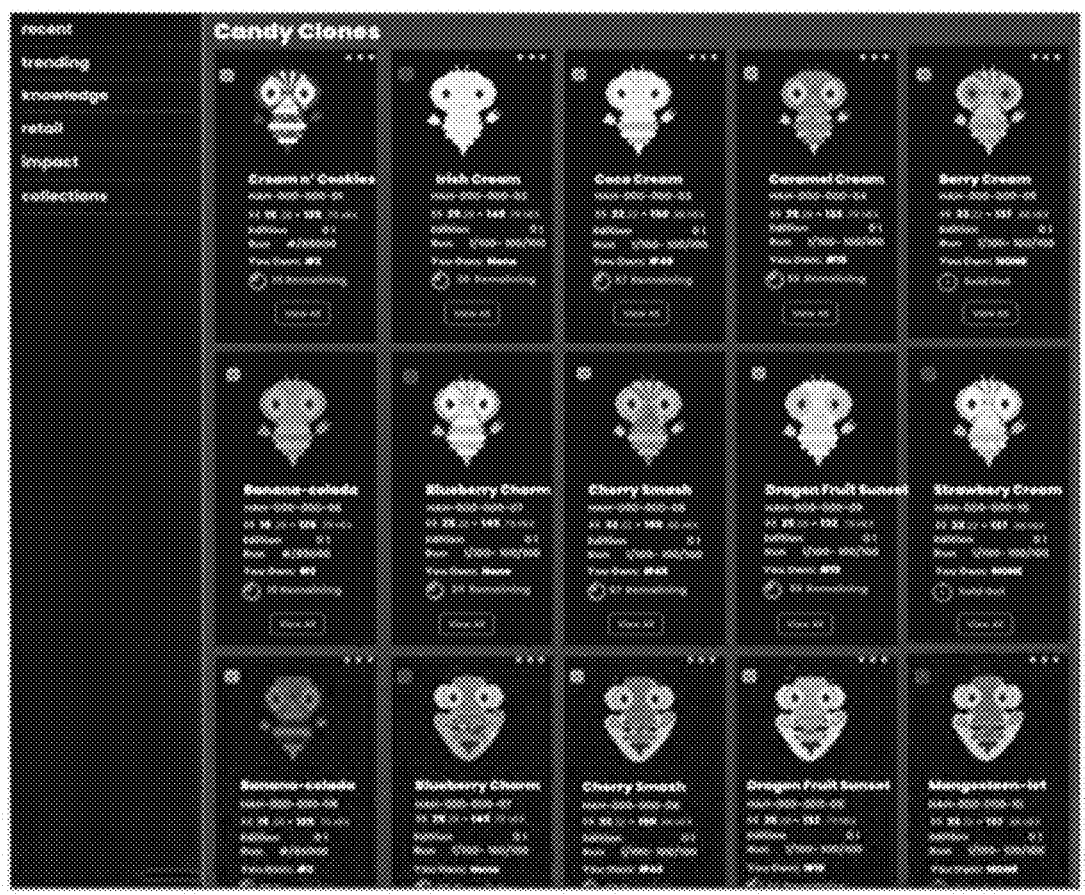

FIG. 10a-10c depicts interactive e-catalog collections. FIG. 10d depicts an example item in one of the consumer and seller interactive e-catalog. FIG. 10d further depicts a run size of the NFT, an edition of the NFT, and the number of NFTs owned by the user. (e.g., buyer and seller). The cryptographically secured digital asset creator enables the user to customize the background color specific to the account or shop. The catalog creating unit enables the user, via the user interface views as shown in FIG. 10a-10c, to click into the catalog and open each collection. The catalog creating unit then opens up that specific collection when the user clicks on that specific collection. The catalog creating unit retrieves all items and collections contained within that interactive catalog collection. The catalog creating unit further depicts the catalog collections with a check mark on the respective collections which are already owned by the user.

Figure 11:
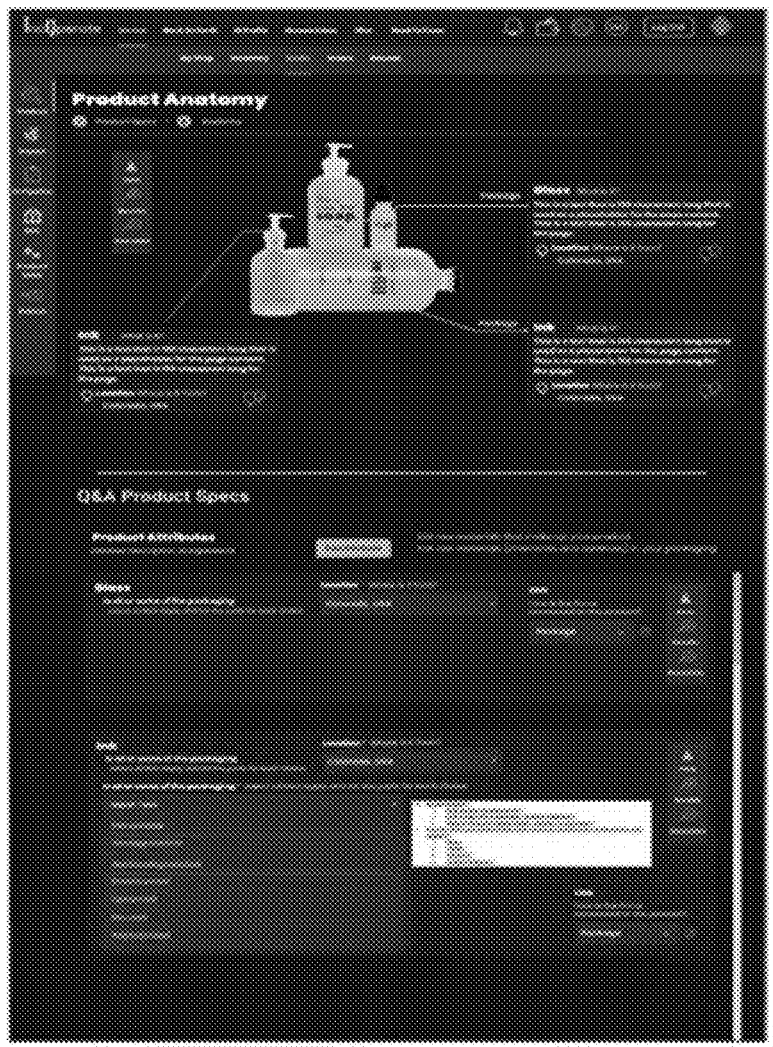
FIG. 11 illustrates a product anatomy creation, according to one or more embodiments.

FIG. 11 illustrates a product anatomy creation, according to one or more embodiments. The product creation unit enables the seller to create a product anatomy and disseminate educational content to make consumers be able to make more informed decisions and buy from sustainable sources. The product creation unit further enables the seller to create the product anatomy and expose information that is normally hidden from consumers at the cost of consumer health, people, and planet. The product creation unit, via the product anatomy, renders the contents to be viewed in the simplest, most coherent, efficient manner by a user as shown in FIG. 11. The product creation unit enables the seller to integrate at least one of basic definition, expected performance, activity timeline, application use cases, task based learning modules, assessments, and evaluations into the product (listed for sale) that can be interacted with intuitively.

The product creation unit, via the product anatomy, allows the seller to create a systematic diagram of the product to be listed for sale. The product creation unit enables the user to dissect to get a complete picture of everything that makes a single unit of the product. The product creation unit, via the product anatomy, allows the consumer to dissect every part of the product to understand how it is sourced, created, and assembled. The product anatomy provides awareness and educates the consumers regarding the packaging choices, emissions, pollutions, etc. that the product leaves into the world. The product anatomy provides meaningful information to the consumer about the product at the time of purchase, so that the consumer can make a wise decision.

The product creation unit enables the seller to mark and label the entire product. The product creation unit enables the seller to click on the uploaded image and add a focus. The user can then click on the location of the image corresponding to the label the seller wants to create. In an embodiment, the product creation unit enables the seller to create multiple focuses and have a shared root topic (i.e., raw materials making your packaging would list under Root Topic "Packaging" "Waste" "Oceans" and or "Pollution"). If the seller uses marine debris to build your packaging and materials that constitute your product (e.g., soap), these will be listed under Root Topic "Cosmetics". If the seller has not listed all the relevant root topics during product create process, the production creation unit now enables the seller to add the other Roots such as "Summary", "Why" (e.g., Why we choose this, what other options are available/being used, what is better for you, how the worst choice affects Impacts+Planet), Ingredients in Detail (e.g., Ink).

The product creation unit enables the seller to add interactive labels and describe the product in detail. The product creation unit enables the seller to label every part of the product image, list raw materials that make up the product and list raw materials (e.g., chemicals and additives) in your packaging. These details provide deep insights to the customers. The product creation unit enables the seller to add details regarding packaging such as one of recyclable, biodegradable, non-biodegradable, downcycled, upcycled, reused, and repurposed. The product creation unit enables the seller to add interactive labels and add information for questions such as "Is the product built around obsolescence?", "Is the product built to last with sustainable, durable materials?". Further the product creation unit enables the seller to add information for questions such as "Does the product require frequent replacements, updates or upgrades?" "How far does the product travel from source to manufacturer to wholesaler and retailer?", etc.

Figure 12A:
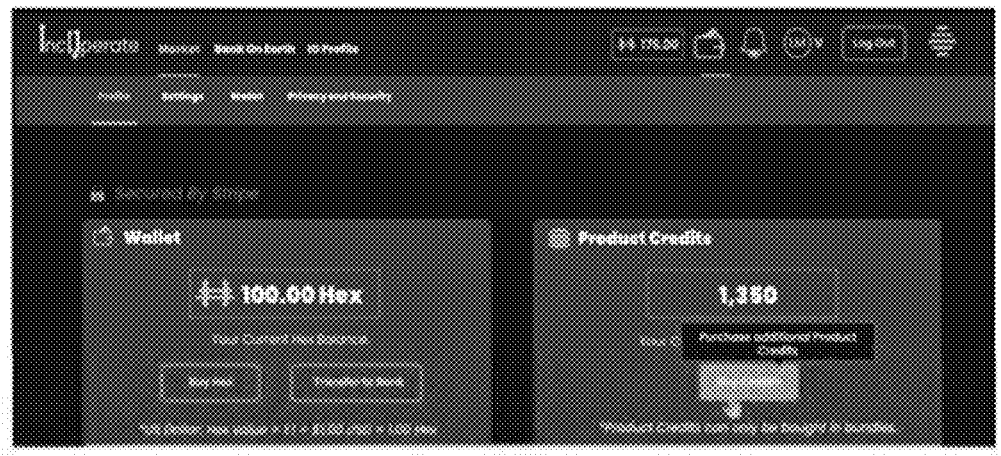
FIG. 12a-12b illustrate user interface views of purchasing IO tokens, according to one or more embodiments.
Figure 12B:

FIG. 12a-12b illustrate user interface views of purchasing IO tokens, according to one or more embodiments. The product creation unit enables the user to purchase IO tokens. The IO tokens can be used to create/mint and list products. IO Tokens are non-refundable in part, but a bundle can be voided so long as no tokens from it have been utilized. Bundle tokens cannot be returned partially, as the only way to gain discounts on listing fees and minting fees is to buy in bulk. IO tokens provide a way to make listing fees and NFT minting fees nominal. The IO tokens combine the listing fees and NFT minting fees into bundles. The bundles allow for quarterly renewing listing fees to drop based on the volume at which a shop runs its business.

The IO tokens incentivize economies of scale, and cut slack for the companies with larger turnovers versus smaller businesses who do not want to spend more than is necessary to launch their limited inventory.

The product creation unit enables the user to purchase IO tokens to create any of the product listing types. The IO tokens give the ability to charge the same for each product type, i.e., IO Pipeline, NFT, physical goods, digital products, etc. The product creation unit credits the IO tokens to the wallet of the seller. The product creation unit enables the seller to purchase the IO tokens as needed in different volumes that correspond to the quantity of product a seller intends to publish to the digital marketplace. The product creation unit further notifies the seller to pay a renewal fee for the unsold products listed. The renewal fee is charged per quarter of the year. The minting of the IO tokens provides the benefits such as reduced listing and minting fees per product, and enables economies of scale.

The minting of the IO tokens further provides the following benefits. The IO tokens encourage larger volumes of product churn by incentivizing their expression with lower renewal listing fees based on the bundle volume purchased. The IO tokens allow physical products to embrace the economies of scale that digital products would benefit from by modeling them around the same outcome parameters: i.e., for digital goods (Editions and Run Sizes), and for Physical Goods, (Launches and Volumes), both can be intentional and modeled around the most viable renewal fees. The IO tokens are catered simultaneously to both large and small turn overs and company sizes by connecting the bundle size to the renewal cost. The IO tokens enable nominal buy-ins for smaller businesses who do not want to spend more than is necessary to launch their limited inventory. The IO tokens also cut down the cost of paying more overhead cost per product in renewal listings if the item does not sell. The IO Tokens are eventually utilized to cover publishing and licensing fees for content on other applications.

The product creation unit enables the seller to choose the bundle that best fits their inventory volume when the seller elects to buy more IO tokens as shown in the user interface view FIG. 12a. The product creation unit, via the user interface view shown in FIG. 12b, enables the user to select the bundle and confirm purchase. The product creation unit then enables the user to upload the images and create the product listing onto the digital marketplace.

The product creation unit enables the seller to create an interactive label that directly overlays on their product shots to qualify and or justify their raw material and packaging choices. The product creation unit, via the product anatomy, enables the seller to explain choices that might seem counterintuitive to naive consumers. The product creation unit, via the product anatomy, enables the seller to link these interactive labels that offer insight into the product's anatomy to "Need to Know" information packets. "Need To Know" packets can consist of activities, research material, essays from those involved in product development, DIY recipes, recommendations, reports, studies and so much more. When a brand links "Need to Know" which has thus far been used in the pejorative (as a term that denotes exclusivity around information, which for many implies lying by omission), a brand commits to sharing information the public was previously not privy to in real time during point of sale.

The product creation unit enables the seller to answer all the questions hyperlinked to the interactive labels. The digital marketplace server monitors the number of answers and insights provided to the hyperlinked labels using one of artificial intelligence and machine learning. The digital marketplace server provides greater visibility to those products having higher amounts of transparency and providing deeper insights about the product to the consumers. The product creation unit enables the seller to label the parts with information such as properties, packaging, design, intention, use, technique, material, etc.

Figure 13:
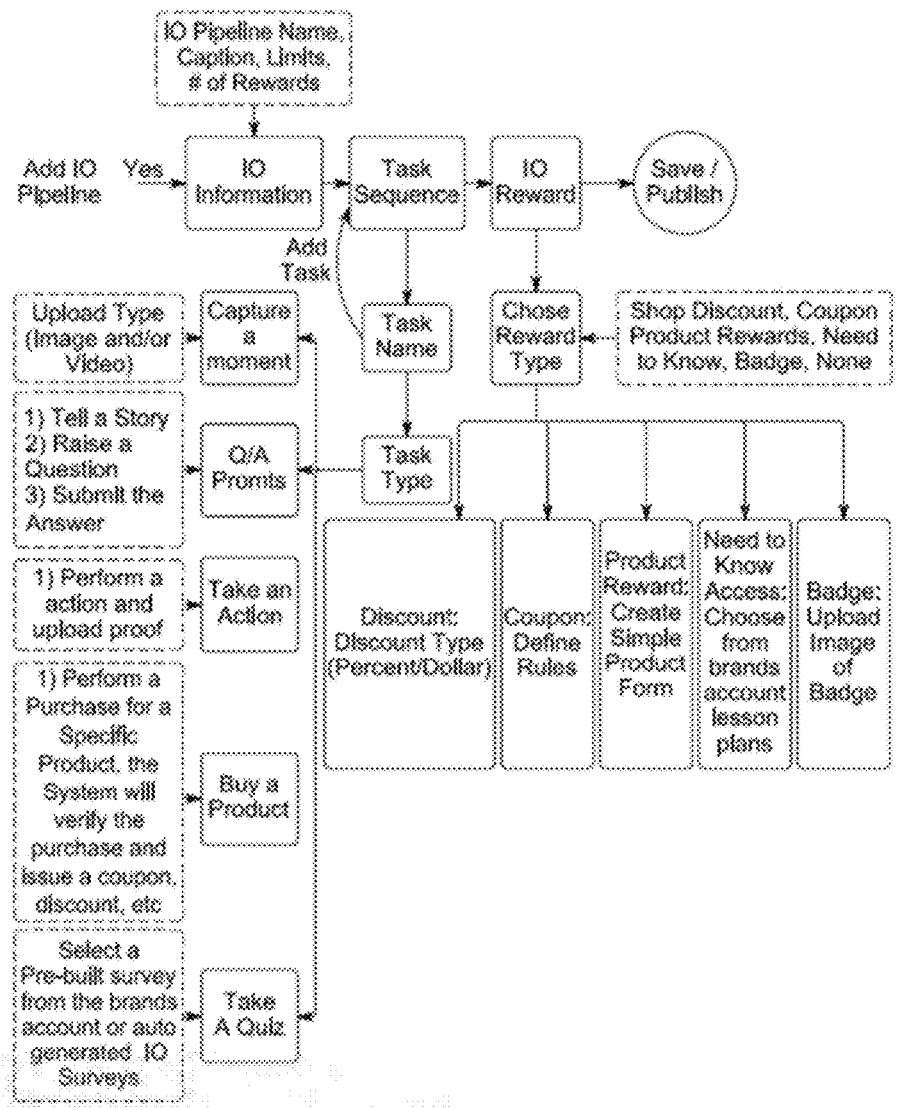
FIG. 13 illustrates an interactive outcome (IO) pipeline creation, according to one or more embodiments.

FIG. 13 illustrates an interactive outcome (IO) pipeline creation, according to one or more embodiments. The IO pipeline creation unit enables the seller to add/create the IO pipeline. Then the IO pipeline creation unit receives and analyzes IO information received from the seller. The IO information comprises IO pipeline, name, caption, limits, number of rewards, etc. The IO pipeline creation unit then generates a task sequence based on the IO information received. The pipeline creation unit then defines a task name. The pipeline creation unit then defines a task type.

The task type may comprise at least one of but not limited to capture a moment, question/answer prompts, take an action, buy a product, and take a quiz. The IO pipeline creation unit defines a task for the user to upload an image and a video under the "capture the moment" task type. The IO pipeline creation unit defines a task to the user to at least one of tell a story, raise a question, and submit the answer under the "Q/A prompts". The IO pipeline creation unit defines a task to the user to perform an action and upload a proof under the "take an action" task type. The IO pipeline creation unit defines a task to the user to perform a purchase for a specific product, and the system will verify and credit coupons under the "buy the product" task type. The IO pipeline creation unit defines a task to the user to select a pre-built survey from the seller's account or auto generated IO surveys under "take the quiz" task type. The pipeline creation unit enables the user to select one of the task types listed above. The IO pipeline creation unit then defines the sequence of tasks based on the task type selected.

The IO pipeline creation unit then verifies and confirms the completion of the tasks defined to the user. The IO pipeline creation unit displays the IO Pipeline tasks on the Product Details Page with the product offerings (Linked & Non-Linked), product details, Impact, IO pipeline, IO Profile, and more detailed information about the brand. The IO pipeline creation unit shows all tasks in the pipelines, and any rewards. The IO pipeline creation unit enables the seller to complete each task sequentially in the order. The completion of each task unlocks the ability to complete the next one. The IO pipeline creation unit displays the task name, task type and any relevant information associated with the task type for each task in the sequence. The IO pipeline creation unit then communicates to the IO rewarding unit. The IO rewarding unit then provides an IO reward to the user upon confirmation of the completion of the tasks. The IO rewarding unit then chooses reward type based on the tasks completed. The reward types comprise at least one of shop discount, coupon, product reward, need to know, badge, etc. The badge is earned as a proof of participation and acts as social currency. The badge cannot be listed for sale. A collectible is an NFT that can be listed for sale and used to raise money for self. The IO pipeline then records the tasks executed off chain and records it in the distributed blockchain ledger.

Figure 14A:
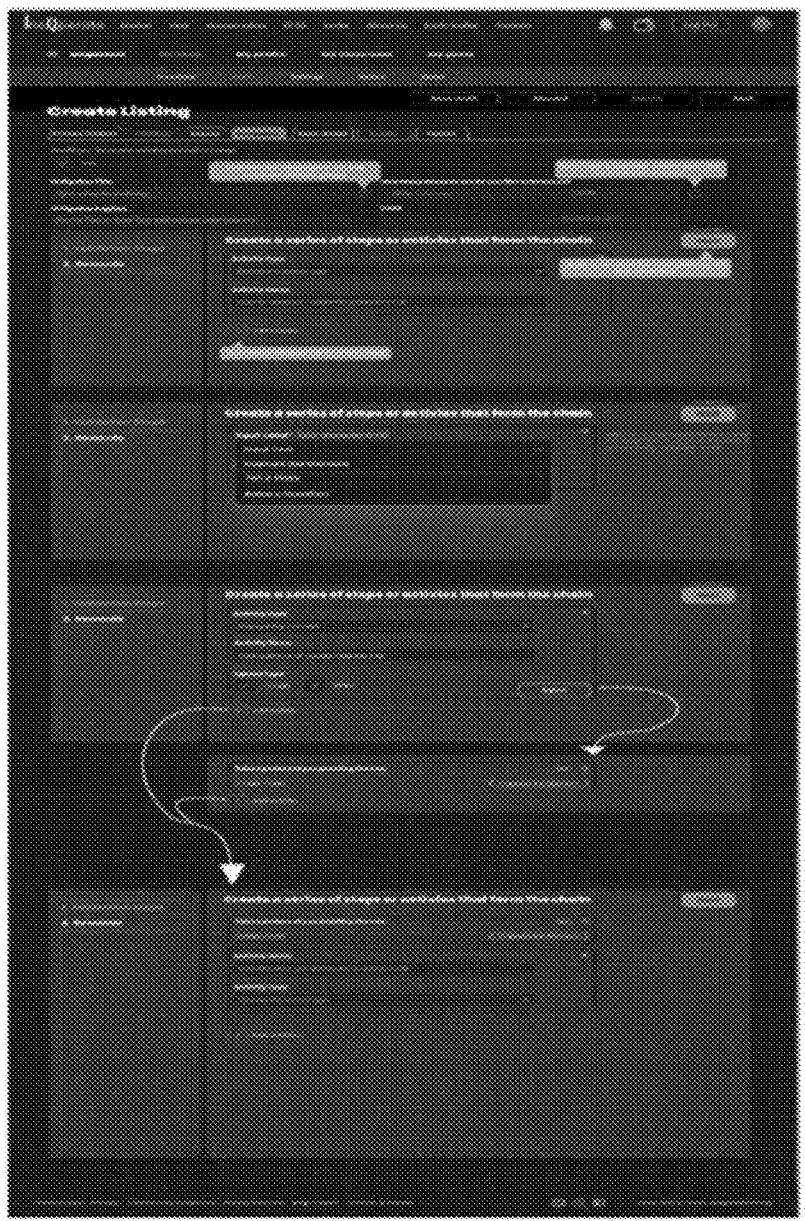
FIGS. 14a and 14b illustrate user interface views of an interactive outcome (IO) pipeline, according to one or more embodiments.
Figure 14B:
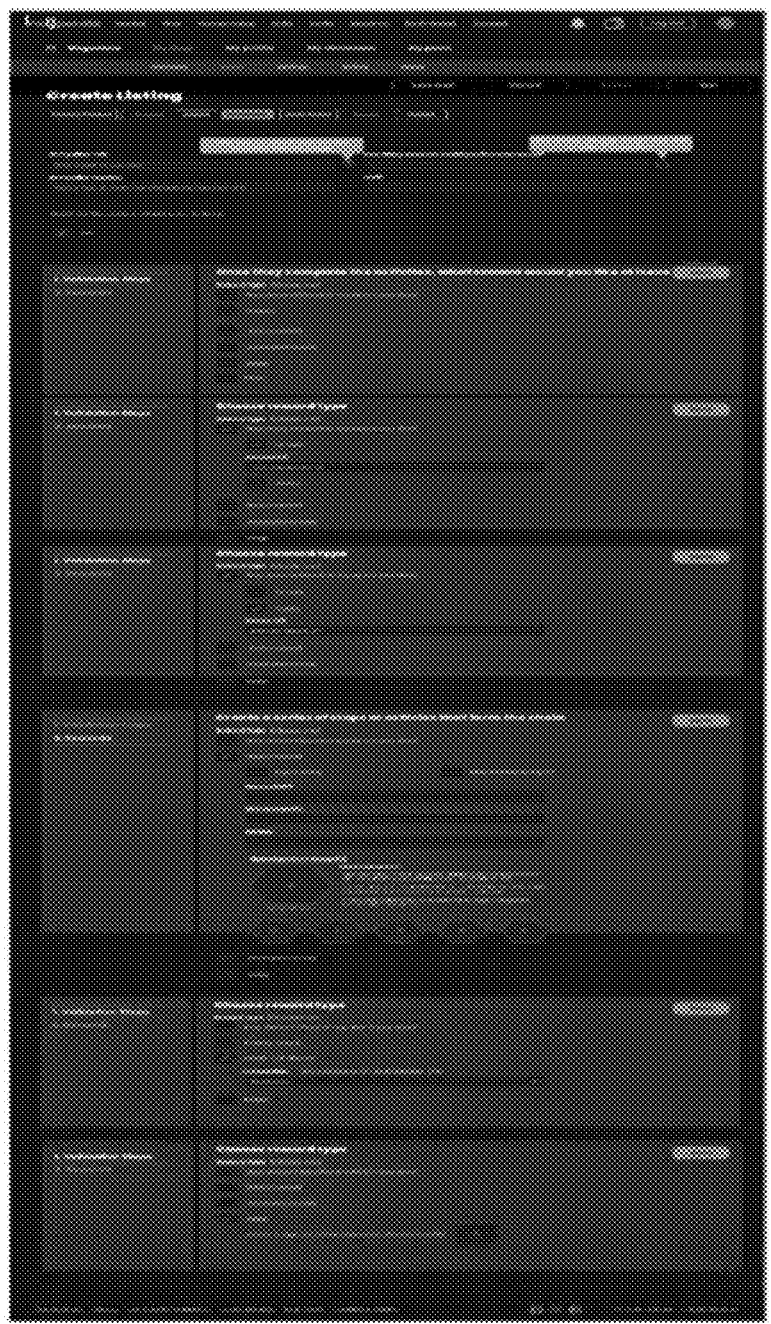

FIGS. 14a, and 14b illustrate user interface views of an interactive outcome (IO) pipeline, according to one or more embodiments. The IO pipeline creation unit allows a brand to create a structured, linear, flow-sequence of tasks that they want their end consumers to take in exchange for a reward incentive that encourages further participation. The IO pipeline is a way for brands to get consumers to provide off chain proof of work through a sequence of tasks that create impactful interactions.

The IO pipeline creation unit, as shown in FIGS. 14a and 14b, displays the IO Pipeline tasks on the Product Details Page with the product offerings (Linked & Non-Linked), product details, Impact, IO pipeline, IO Profile, and more detailed information about the brand. The IO pipeline creation unit shows all tasks in the pipelines, and any rewards. The IO pipeline creation unit enables the seller to complete each task sequentially in the order. The completion of each task unlocks the ability to complete the next one. The IO pipeline creation unit displays the task name, task type and any relevant information associated with the task type for each task in the sequence. The IO pipeline creation unit then communicates to the IO rewarding unit.

Figure 15A:
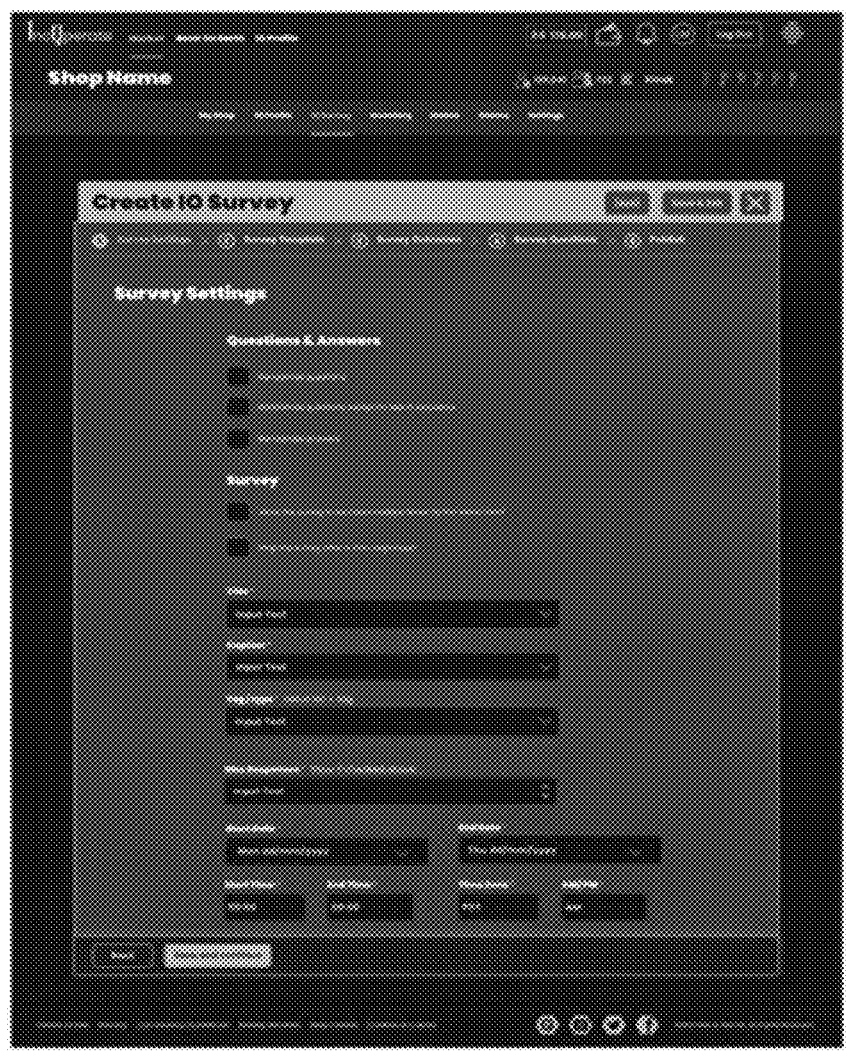
FIGS. 15a-15c illustrate user interface views of configuring an impact oriented (IO) survey, according to one or more embodiments.
Figure 15B:
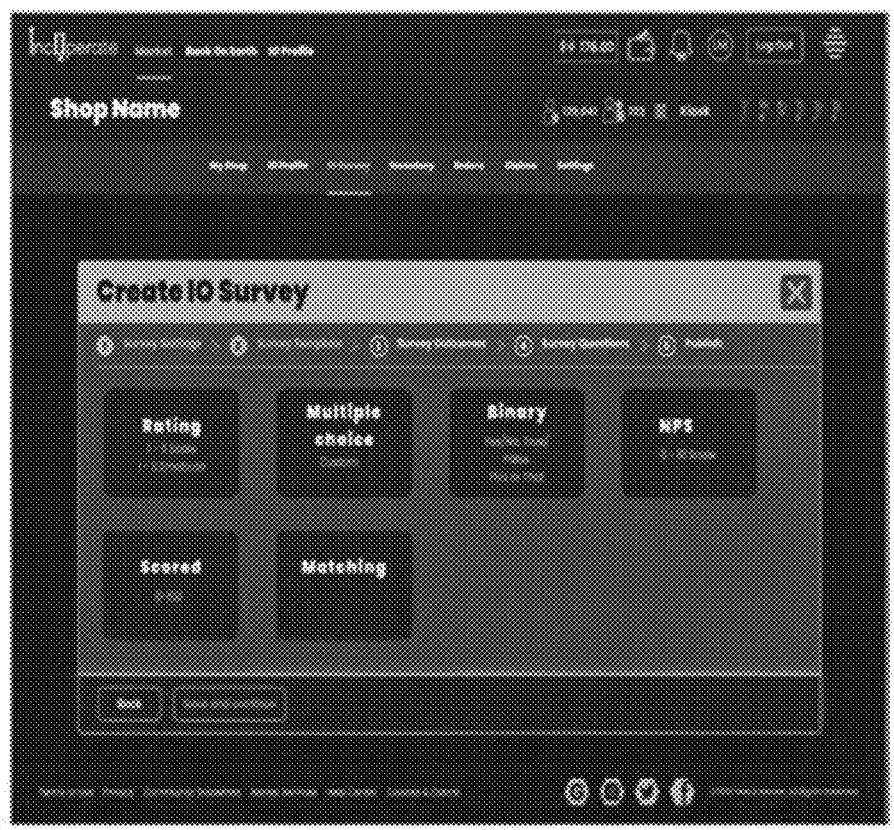
Figure 15C:
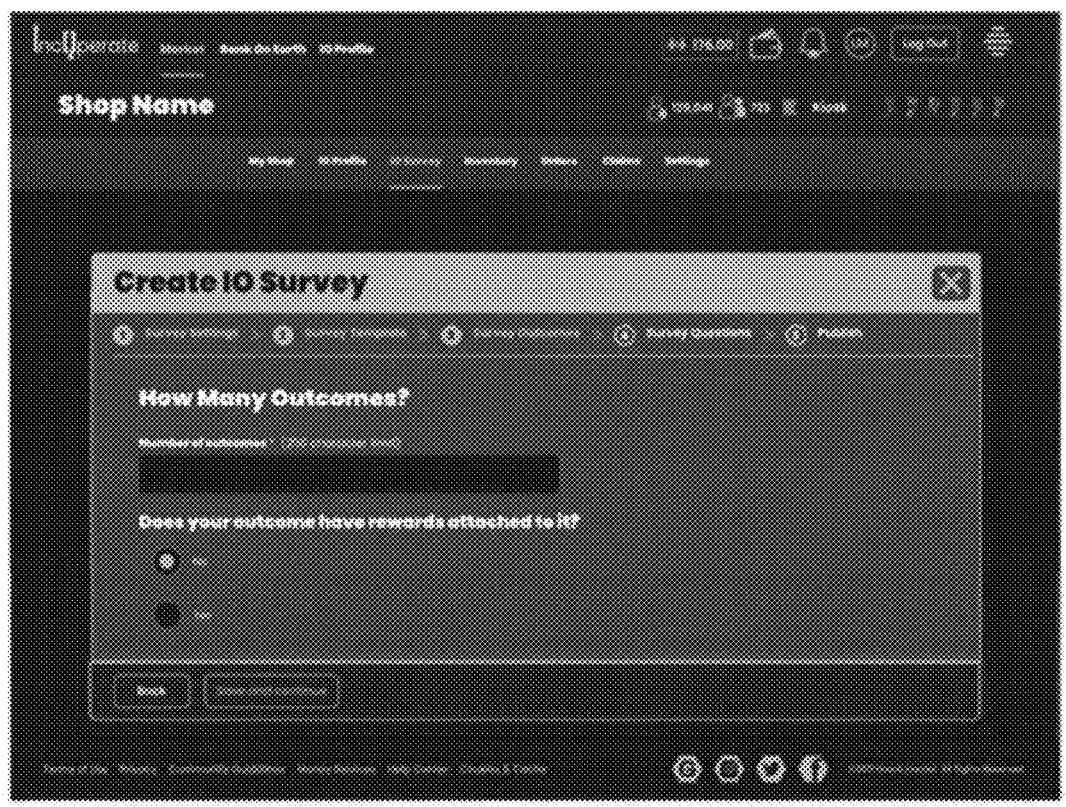

FIG. 15a-15c illustrate user interface views of configuring an impact oriented (IO) survey, according to one or more embodiments. The IO survey unit enables the brands the ability to create interesting, interactive quizzes/surveys that result in quality insights and actual rewards that foster customer goodwill and continued participation. The IO survey unit enables brands to structure interesting quiz/surveys. The IO rewarding unit then dispenses IO rewards to consumers who participate in them. The IO survey unit creates the quiz/surveys from a template or custom built. The IO survey unit further depicts a brand logo and a name on top of the screen to give an immersive brand experience in the digital marketplace. The IO survey yields rewards such as access codes to unique offerings, NFTs, generated NFTs, discounts, coupons, etc. to the user.

FIG. 15a depicts the user interface view that enables the user to configure the settings of the IO survey. The IO survey unit depicts the user interface view shown in FIG. 15a and enables the user to select an option under "questions and answers". The options comprise "randomize questions", "randomize questions except for last", and "randomize answers". The IO survey unit further enables the user to select an option under "survey" and set a logic. The options comprise "allow the survey to be taken multiple times by the same user?", and "Stop the survey after a max time". The IO survey unit, via user interface view in FIG. 15a, enables the seller to provide title, caption, type, max responses, start date, end date, start time, end time, time zone, am/pm.

The IO survey unit, via user interface view in FIG. 15b, enables the user to select the template to create the IO survey. The IO survey unit enables the user to select the template from the options such as net promoter score (NPS), rating, scored, binary, standard, matching. The NPS type quiz receives responses in 0-10 scale. The result of the NPS score would be the % of promoters (participants who answered 9-10 the most)–% of detractors (participants who answered 1-6 the most) resulting in the NPS "Score" i.e., NPS=% of promoters–% of detractors=has to equal or be greater than 50.

The scored quiz receives a response in the point system 1-100 that is grouped into ranges. Each point range dictates an outcome. The rating type quiz receives responses in 1-5 scale. 1-5 scale can be numbers and/or emoticons. The binary quiz receives responses as yes or no, or true or false, or this or that. The matching quiz enables the user to match labels with response images, labels, or similar content. For instance, the matching quiz provides two columns A and B of multiple choices of images, words or phrases, and the user has to connect the right content choice from column A with the corresponding description response in Column B. For another instance, a series of images, words or phrases are provided with a larger sample size of responses, (like a word or image cloud) some of which would be the right match, and the response field is where you drag and drop from the word cloud. The multiple choice quiz provides both the response and questions as images. The rating scale has to be defined. The rating scale can either start at 1 or at an upper limit. The Number of ranges has to equal the number of outcomes in the matching quiz.

The IO survey unit, via the user interface shown in FIG. 15c, defines the outcomes. The user interface shown in FIG. 15c enables the user to define the no. of outcomes and indicate whether the outcome has reward attached to it. The IO survey unit, via the user interface shown in The IO rewarding unit enables the user to set the reward for each outcome. The IO survey unit, via the user interface, further enables the user to add questions to the IO survey.

The IO survey unit automatically synchronizes the end consumer's profile information to the responses when the user enters into the Quiz/survey. The IO survey unit publicly displays the brand's aggregate results to the IO profile when the Quiz/survey limit is reached. The IO survey unit enables the brand to disclose results of the Quiz/survey questionnaire, and the individual responses to the questionnaire subject to consent by the end consumer.

Figure 16A:
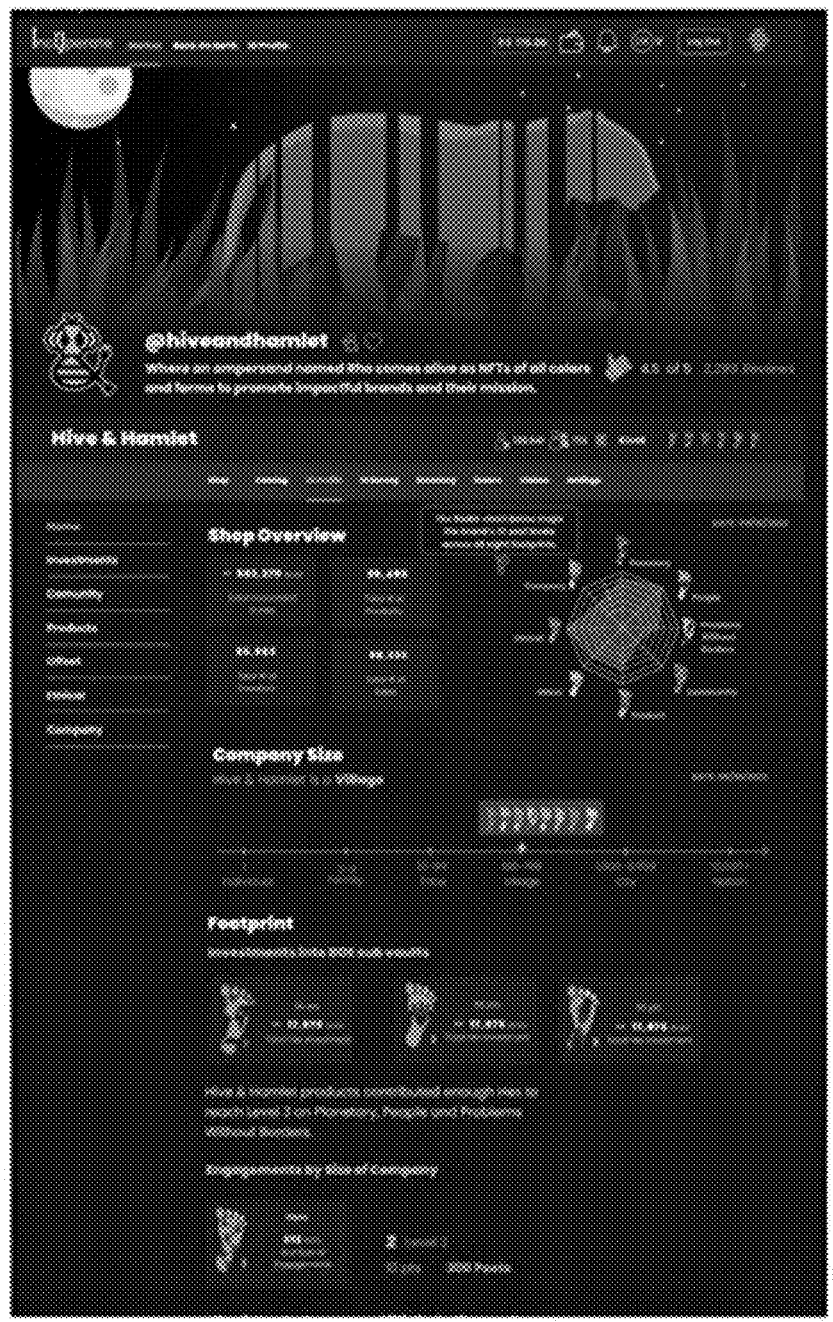
FIGS. 16a and 16b illustrate an IO profile of a brand, according to one or more embodiments.
Figure 16B:
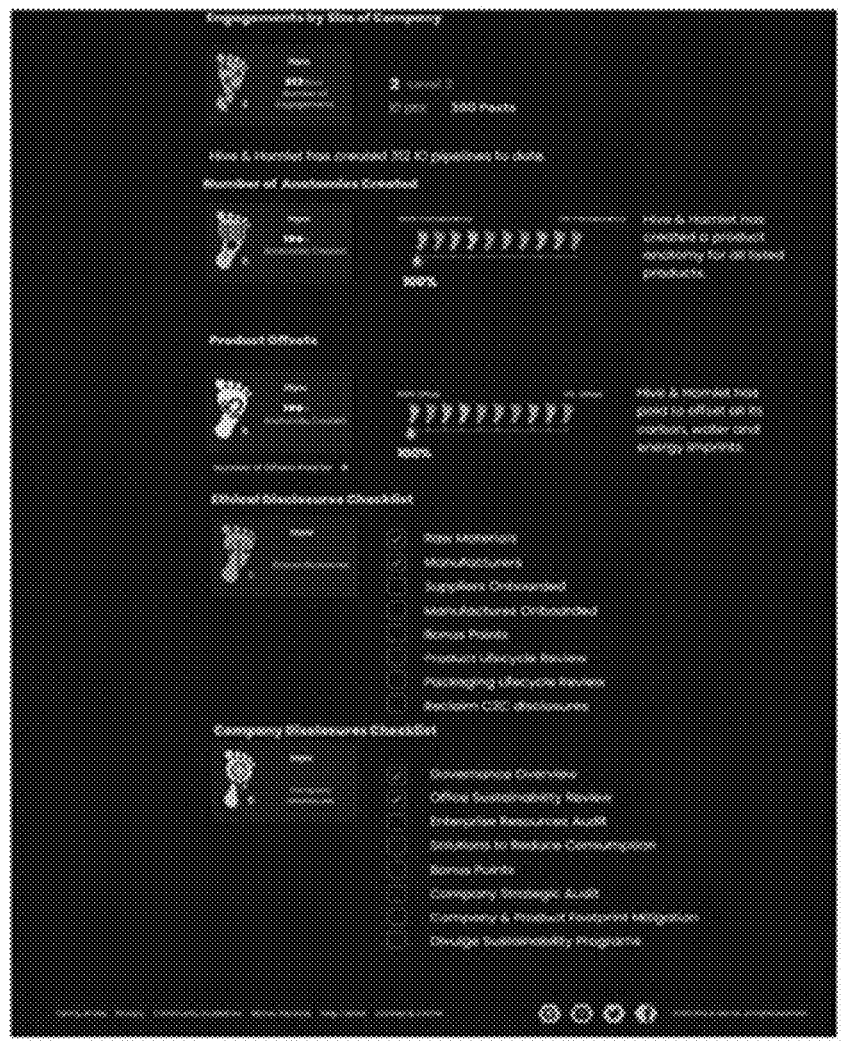

FIGS. 16a and 16b illustrate an IO profile of a brand, according to one or more embodiments. The profile creating unit creates an impact oriented (IO) profile as shown in FIGS. 16a and 16b for at least one of the seller, and the buyer. The profile creating unit creates the IO profile of the seller based on at least one of valid public data available, contents submitted by the seller, and the seller's activity upon creating a shop on the digital platform. The profile creating unit is configured to create the IO profile just based on the valid and authenticated information from the valid public sources. The valid public data comprises preferences of the seller. The preferences of the seller may be extracted based on purchase history or search history of the seller. The contents submitted by the seller comprises the information provided by the seller. The profile creating unit utilizes the information collected from public sources initially to populate the digital marketplace with the IO profiles of the sellers (i.e., brands). The profile creating unit seeds an IO Profile database with companies that exist today using public data sources to create the IO Profiles of established brands. The IO Profiles of established brands are used to catalog established brands that exist.

The profile creating unit further enables the user (e.g., buyer, seller, visitor, etc.) to start contributing to the IO profile of the seller with contents such as gratitude, complaints, hacks, etc. The profile creating unit further enables the user to add reviews in the form of IO Audits. The profile creating unit further updates the IO profile based on the user contributed contents. The profile creating unit further dynamically updates the IO profile as soon as there is an update in the user contributed contents. As the user contributes contents, the profile creating unit updates the IO profile in parallel. The profile creating unit assigns an ownership of an IO profile to a brand as soon as the brand submits the proof of the brand ownership. The profile creating unit enables only enterprises to submit the proof of the brand ownership. The profile creating unit assigns the ownership of the IO profile to the brand when Secure Identity verification, and uploading supporting documentation and business licenses, etc. are completed by the brand. In an embodiment, profile creating unit assigns management of the IO profile to the digital marketplace server. The IO Profile and ownership are used in any future endeavors of the digital marketplace that are related to needing a brand profile and ownership/management in any way.

The profile creating unit updates the IO profile of at least one of the seller, and the buyer. The profile creating unit tracks an activity performed by the seller that can alter information in the IO profile. The profile creating unit then records the activity through the blockchain network and updates the IO profile based on the activity executed. The profile creating unit utilizes a utilitarian function at the end of quarter or on a regular basis to create updates on the IO profile of the brands and consumers alike. The IO profile is rendered to at least one of a buyer, a third party, and a community member. The IO profile shows the public view of the shop's IO Profile, and it is standing on and off the platform. The IO profile offers an overview of the seller's (i.e., brand's) footprints and their overall value to society, planet, consumers. The IO profile of the user enables the user to quickly access the favorites. The IO profile is a place where a user can describe things about their individual selves to others in the community. The IO profile comprises form fields such as: "About Me" "Favorite Shops" "Avatar" "Location" "Interests" "Birthdate" "Websites" "Gender" "Social Media Links" "Faith". The IO profile further enables the user to customize their profile with a cover photo and profile picture. The IO profile further comprises impact oriented (IO) seals, reviews, etc.

The IO profile of the seller is different from the IO profile of the buyer. The profile creating unit creates the IO profile of the buyer based on at least one of a search history, a purchase history, and a Wishlist of the buyer. The IO profile of the seller is created when any public information can be found on a brand (i.e., seller or shop) name. The IO profile of the seller exists and builds out on the digital platform based on third party audits and consumer feedback irrespective of the seller claiming his profile. If the user signs up with a username that matches a username from the brand profile, then the digital marketplace server may prompt the user to claim the brand. The seller can also sign up for an account to manage the brand profile. The seller may be a brand. The profile creating unit enables the seller to claim the brand that has begun to build from public domain information once the seller signs up. For example, NIKE® can claim its Nike profile, and begin to build on, rehabilitate or evolve their engagement through that profile in an effort to own their whole story. The sellers who are not in the public domain may need to create the IO profile.

The profile creating unit further enables the seller, who has the ownership of their brand profile on the digital marketplace via a valid account and proof of ownership can edit the IO profile. The profile creating unit further enables the seller to add to the record (similar to WIKIPEDIA® edits) in ways only with source justification (cite source of content) with a minimum of two validations from the public. The profile creating unit enables the seller to submit a stream of subsequent submissions. The profile creating unit enables the user to view the IO profile in a single thread, along with the edit history of each IO profile field.

The IO profile enables the user to search within the entire directory of IO profiles and shows a dashboard. The dashboard comprises trending IO profiles, most recently added IO profiles, corrections to IO profiles, shop levels, and review ratings. The IO profile enables the user to access more details when the user performs one of searching the IO profile, selecting the IO profile that appears, and opening a link to the IO profile. The profile creating unit IO displays the IO Seals, IO Review Rating (e.g., the aggregate 5 star rating) on the IO Profile details page. The IO profile also shows a list of brief details of the recent reviews for the IO Profile. The profile creating unit enables the user to add a Review for the IO Profile they are viewing. The IO profile appears as easily accessible in all pages referencing the brand including Shop homepage, Product Details Page. The profile creating unit enables the user to access more details on the IO profile when the user searches for the IO Profile, selects one that appears on the dashboard, and opens a link.

The profile creating unit displays the shop levels on the IO profile details page. The profile creating unit categorizes the shop levels into one of pop up, kiosk, boutique, super store, and mega store. The profile creating unit categorizes the shop level of the IO profile as "pop up" when the shop comprises less than 10 total products and less than 25 total sales. The profile creating unit categorizes the shop level of the IO profile as "kiosk" when the shop comprises at least 20 total products, 75 total sales, and 2 total product types. The profile creating unit categorizes the shop level of the IO profile as "boutique" when the shop comprises at least 100 total products, and 100 total sales. The profile creating unit categorizes the shop level of the IO profile as "super store" when the shop comprises at least 250 total products, 5000 total sales, and 3 total product types. The profile creating unit categorizes the shop level of the IO profile as "mega store" when the shop comprises at least 500 total products, 10000 total sales, and 4 total product types.

Figure 17A:
FIGS. 17a and 17b illustrate an IO seal of the brand and consumer, respectively, according to one or more embodiments.
Figure 17B:

FIGS. 17a and 17b illustrate an IO seal of the brand and consumer, respectively, according to one or more embodiments. The profile creating unit provides IO seals to the IO profiles when the shop hits quotas and fulfills deliverables. The IO seals have five levels to their expression, and they show up once the first level has been achieved. The IO seal level will increase, 1 through 5, sequentially based on brand disclosures or actions. The profile creating unit registers the IO seal in real time in the form of levels and points scored. The profile creating unit donates brand standing to the IO profile when all aspects or quotas of each IO seal are met. The IO seals are actions that need to continually be met. The profile creating unit reviews and updates the IO seals every year based on the IO audit performed on the IO profile.

The IO seals of the brand comprise a planetary footprint, a people footprint, a problems without borders footprint, a community footprint, an offset footprint, an ethical footprint, and a company footprint as shown in FIG. 17a. The IO seals of the consumer comprise a planetary handprint, a people handprint, a problems without borders handprint, a community handprint, an offset handprint, an ethical handprint, and a company handprint as shown in FIG. 17b.

The planetary footprint is provided based on contributions to planetary causes. The planetary footprint is determined based on how many IO pipelines contributed to a planetary impact, how many products contribute to Planetary BOE Impact focuses, how many nonprofit or individual contributors identifying with a planetary impact in their meta data were supported. The planetary footprint comprises a climate action footprint, a fauna footprint, a flora footprint, an ocean footprint, a land footprint, and a freshwater footprint.

The people footprint is provided based on contributions to people's causes. The people footprint is provided based on how many IO pipelines contributed to a people impact, how many products contribute to people smart contract based clearing house Impact focuses, how many nonprofit or individual contributors identifying with a people impact in their meta data were supported. The people footprint comprises a hunger footprint, a poverty footprint, a renewable energy footprint, an economic empowerment footprint, a public health footprint, an education footprint, a social equity footprint, a cultural equity footprint, a clean water footprint, a waste management and sanitation footprint, an innovative infrastructure footprint, and a resource resilience and recovery footprint.

The Problems Without Borders footprint is provided based on contributions to product sales. The Problems Without Borders footprint is determined based on: How well do you create a collaborative economy? How many Impact Focuses under this pillar do you contribute to? The Problems Without Borders footprint is provided based on playing well with others, collaborative moments in conjunction with other users on the platform, and selling products with other users. The people footprint comprises partnerships and industry footprint; a politics, policy, and legislation footprint; an enabling access footprint; an international crises footprint; a religious charities footprint; and a cradle to cradle footprint.

The community footprint is provided based on the IO Pipeline i.e., how a brand engages consumers toward realizing real world impacts. The product footprint is provided based on whether or not a brand is creating product anatomies for every one of their product listings or not. The product footprint is provided based on three counters, that track: (i) Number of products a brand creates product anatomies for (ii) Number of products a brand has listed in total (iii) number of products a brand has not created anatomies for. Points correspond to percentages. (i) % of products that have product anatomies against total products listed, (ii) % of products without anatomies. (Product anatomies created on digital marketplace)/(total #of listings)=% of products with anatomies. Formula is: 100%-% products with anatomies=% of products without anatomies.

The offset footprint tracks the amount of carbon footprint the brand creates for products listed on the digital marketplace platform. The offset footprint allows for offsite carbon footprint tracking that factors into the complete picture of how much the brand is offsetting. Second, if the brand has not chosen to offset the carbon on product creation, the consumer can choose to pay an additional amount for the purchase to offset the carbon. How much carbon does it take to create CO2?×carbon credit cost=amount of hex needs to be contributed to the carbon offset wallet. The Offset footprint requires brands to disclose the carbon, energy, and water usage for each product listing. Points will be based on three stat counters, with denominator of total products: number of products being offset, number of products not offset, and number of products devoid of reporting.

The ethical footprint is provided, by the IO profile creating unit, when a brand discloses sourcing and supply chain to the public. The ethical footprint is provided, by the IO profile creating unit, when submitting geotagged maps for their sourcing, manufacturing, and distribution footprint (For E.g., Urban Kitchen shares which brewery it gets its beer from, where it gets its pork, etc. to show local footprint). This would need to be acknowledged or counter validated by the suppliers and third party audits. The ethical footprint is provided, by the IO profile creating unit, when the brands not only disclose sourcing and supply chain data for the product development, but also have those suppliers onboarded to the platform as verifiable entities that can then take part in future smart contract executions as "Product Contributors". The ethical footprint allows the brands to streamline their value chain on the platform and adapt their current footprint to a more streamlined expression on the digital platform. The ethical footprint also entails any programs the brand has committed to, that help reclaim waste generated by their packaging that cannot be easily recycled.

The ethical footprint is provided by the IO profile creating unit based on tax havens, governance, ethics, culture, and sustainability. The ethical footprint is provided by the IO profile creating unit, based on determining the following: Does the business have the necessary support and infrastructure to develop a strong sustainability program? Does the daily office space walk the talk? Does the office building recycle? What does it recycle? What soap is being used in the office cafeteria in the kitchen? Smart bulbs? Water conservation? Single use cups and disposable plastics allowed? How far is the company's daily in-house footprint sustainable? In the form of a publicly viewable checklist. Fair wages? Ethical treatment of labor? The ethical footprint seal lights up in five levels based on the number of items checked on the list. The ethical footprint requires the brand to actively disclose insights on the governance, and daily logistical commitment to sustainability, etc. Brand Profile Standing is defined by both User Generated Content (UGC) Reviews (Green Stars) and IO Audits and Assessment from the digital marketplace. Brand Profile Standing focuses on the Audits. The audit is issued through IO seals.

Each of the eight IO Audits are composed of five levels, i.e., 1-5. Each level earns a user a corresponding number of points. Fulfilling level one, earns the user 5 points. Fulfilling level two earns the user 10 points. Fulfilling level three earns 15 points. Fulfilling level four earns 20 points. Fulfilling level five earns the user 25 points. A bonus of 25 points is awarded to all brands that reach Level 3 on all footprints. Since small businesses will have quite different capacities, the number of contributions and actions are tied to the size of the company.

The size of the company will determine the numbers they would need to reach to level up and acquire a balanced footprint score. Stage/Size of company is measured by number of employees as shown below.

Individual 1
Family 2-9
Tribe 10-99
Village 100-999
City 1000-9999
Nation 10000+

IO Metrics of the brand is composed of eight categories or "footprints" of evaluation. Each footprint is composed of five levels of scrutiny that come with corresponding points. Each footprint requires total transparency and proactive disclosures from the brand. Content submitted by a brand can be challenged by third parties.

The consumer IO score is calculated using IO audit metrics. IO Audit Metrics are calculated as handprints across eight categories as mentioned above. The first three handprints are earned based on contribution quotas, the fourth based on activity quotas. Fifth, sixth, seventh and eighth are all calculated as a percentage of total purchases made in favor of each footprint. As a consumer earns their handprints, the IO seals will show up on their profile with their IO Level and IO score.

Consumer metrics are calibrated on a scale, like brands, but handprints are based on Spending Power. Consumer IO Seals, unlike brand IO seals, are based on whether a consumer puts their money into supporting the brands that have the footprint that correspond to their values. i.e., verifying if a consumer says they care about planetary impacts, do they actually make an effort to buy from brands that own the "planetary footprint?"

Figure 18:
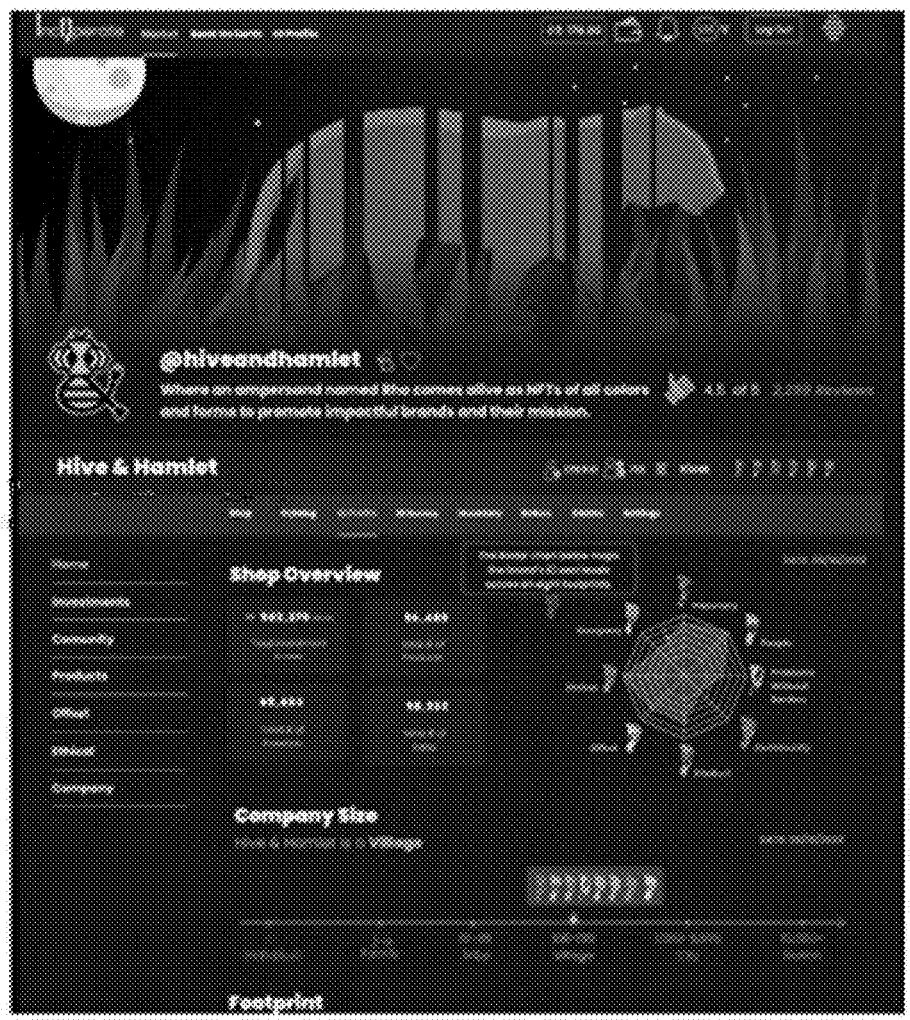
FIG. 18 illustrates an IO profile of the brand, according to one or more embodiments.

FIG. 18 illustrates an IO profile of the brand, according to one or more embodiments. The IO profile of the brand shown in FIG. 18 comprises a handle name of the user (@handlename). The IO profile may be created in the digital platform based on valid public data available, and contents submitted by the seller. The profile creating unit enables the user to edit the handle when the seller claims the IO profile, an obvious handle will get assigned to the account. The IO profile further depicts the type of shop created by the user. The type of the shop comprises Governmental Agency, Enterprise, Non Profit, Individual, Cooperative, Academic Institution (Profit/Nonprofit?). The profile creating unit activates the type of the shop field when the seller claims the IO profile.

The IO profile further depicts the impact to which brand is committed to contribute. The IO profile further depicts the stage/size of the company. The stage/size of the company is measured by the number of employees. The IO profile creating unit categorizes the stage of the company as "individual" when the company has one employee. The IO profile creating unit categorizes the stage of the company as "family" when the company has two-nine employees. The IO profile creating unit categorizes the stage of the company as "tribe" when the company has ten to ninety nine employees. The IO profile creating unit categorizes the stage of the company as "village" when the company has one hundred to nine hundred ninety nine employees. The IO profile creating unit categorizes the stage of the company as "city" when the company has one thousand to nine thousand nine hundred ninety nine employees. The IO profile creating unit categorizes the stage of the company as "nation" when the company has ten thousand or more employees.

The IO profile creating unit creates the IO profile to all companies that have valid public data available that will compile the following fields to populate the initial profile. The IO profile creating unit enables the seller to update the following fields when the seller has the ownership of the IO profile. The IO profile creating unit tracks the activities made by the seller to update the IO profile and records the activities of the blockchain distributed ledger. The profile creating unit enables the user (who does not claim ownership) to create a new IO Profile for a brand that does not exist. The profile creating unit records the activities to the change history and any further changes by any user including the system on the distributed blockchain ledger. The profile creating unit automatically creates the IO Profile, the change history indicates that the IO profile is created by the system.

The IO profile is populated using the following fields: Name, Type of Company (Limited Liability Company LLC, Limited Liability Partnership LLP, Corporation, Nonprofit 501c3, Tax-exempt 501c4, etc.), Logo, Slogan/Moto, Caption, Industry Sector, Head Quarters HQ, Location of Formation, Manufacture, Website, Membership of, Certifications, Awards Received, Product/Services, Materials, Suppliers, Packaging Details, Waste Footprint, Recycling/Landfill, Total Number of employees, Members (Board, Chairman, Employees, etc.), Net Profit, Total Revenue, Social Media, Total Assets (Security and Exchange Commission SEC Reporting), Stock Exchange Ticker, Total Equity, Owned By, Subsidy of, etc.

Figure 19G:
FIGS. 19a-19p illustrate IO footprints and IO handprints, according to one or more embodiments.
Figure 19H:
Figure 19I:
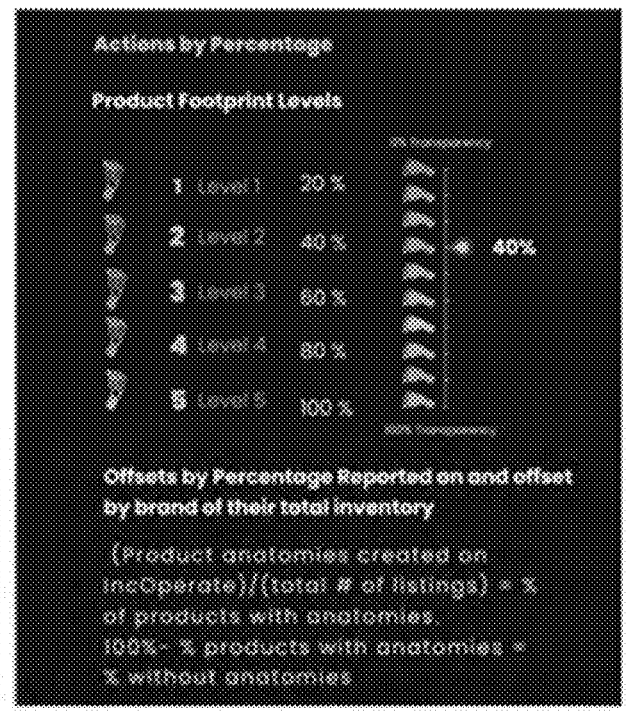
Figure 19J:
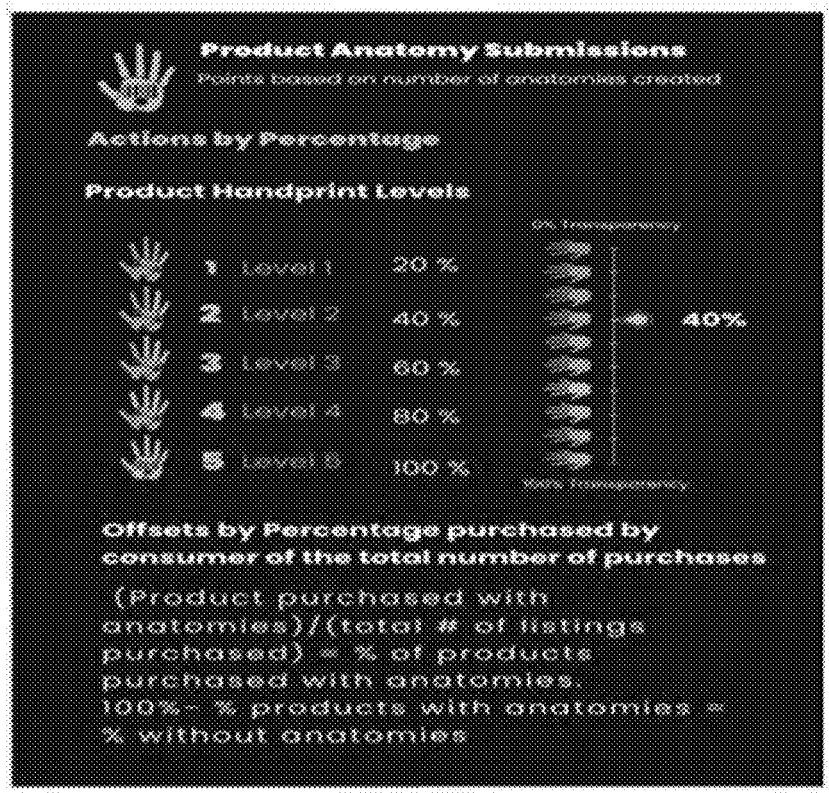
Figure 19K:
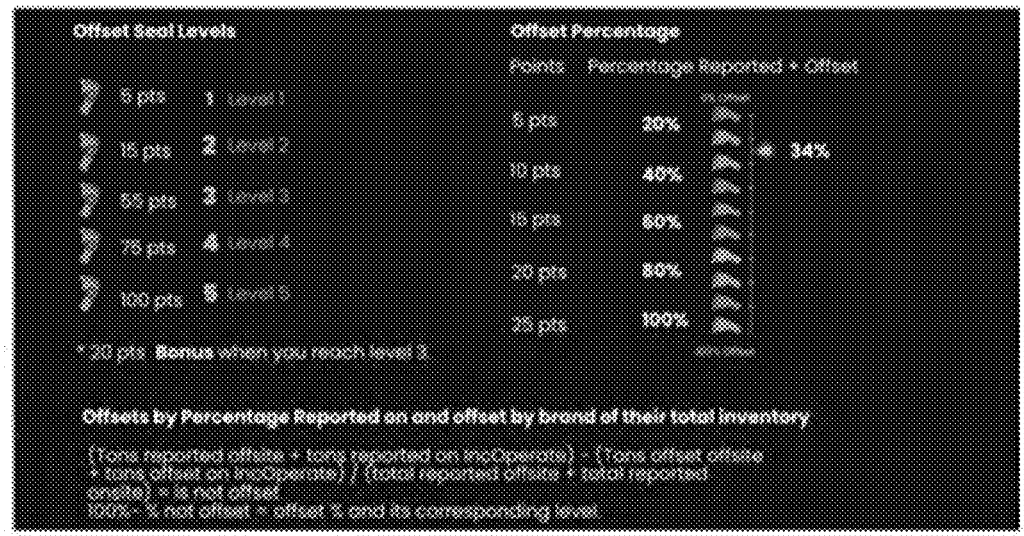
Figure 19L:
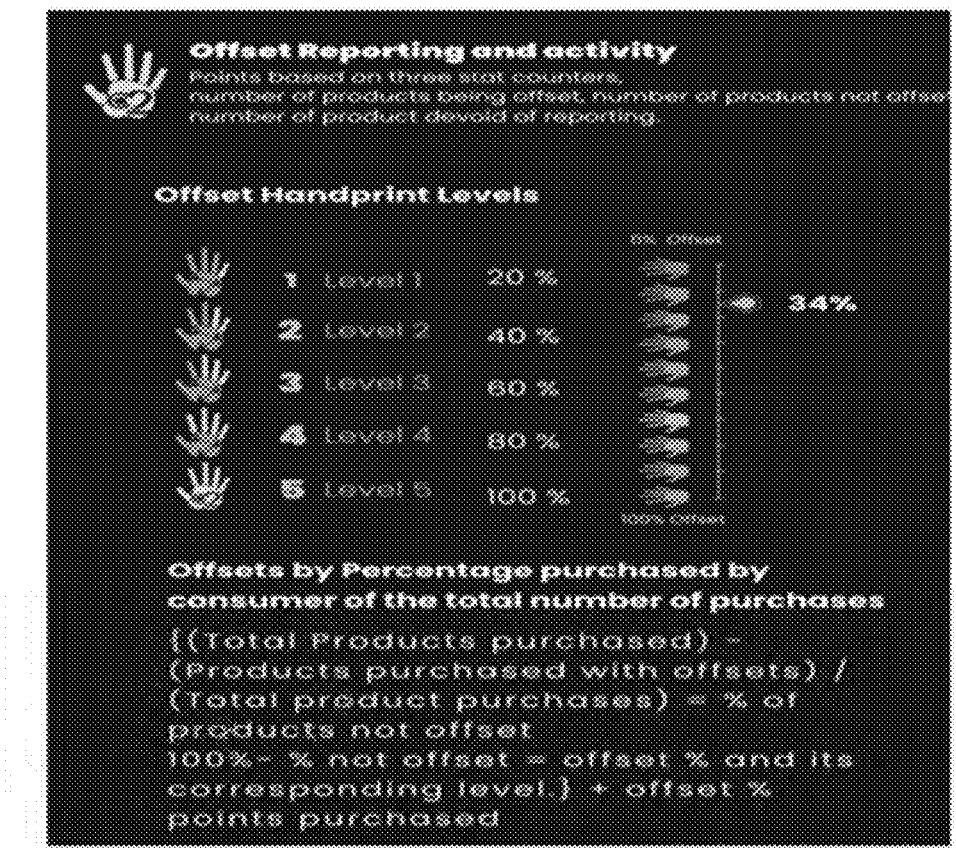
Figure 19M:
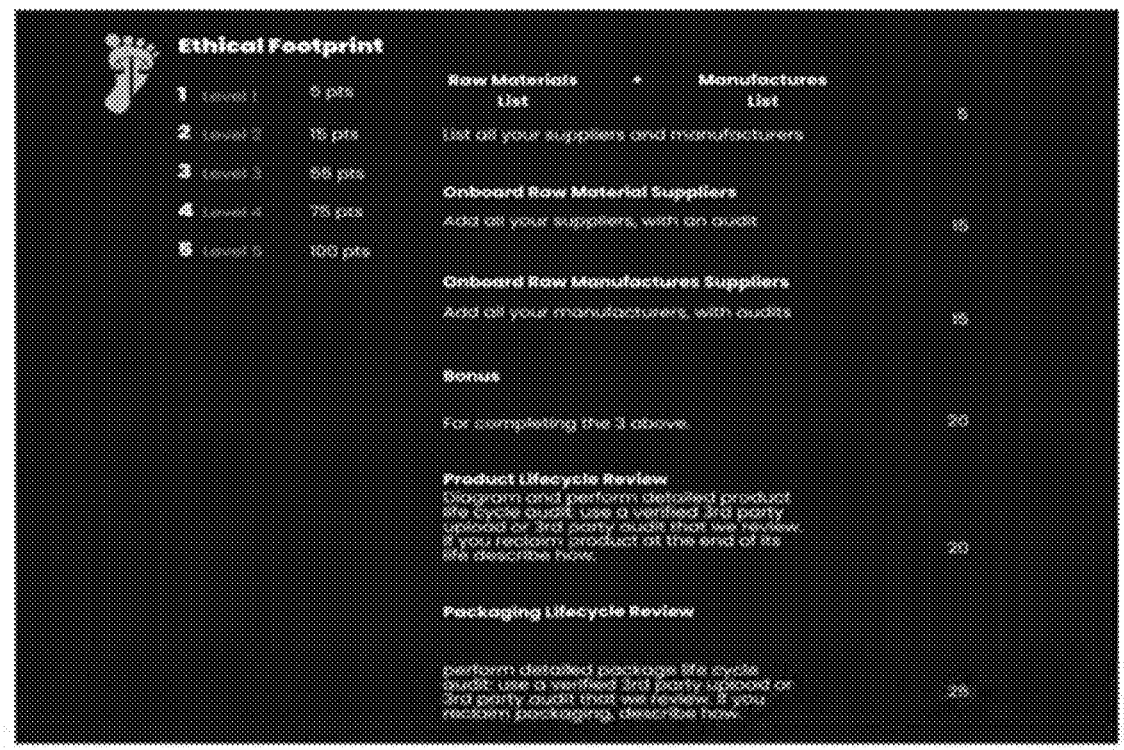
Figure 19N:
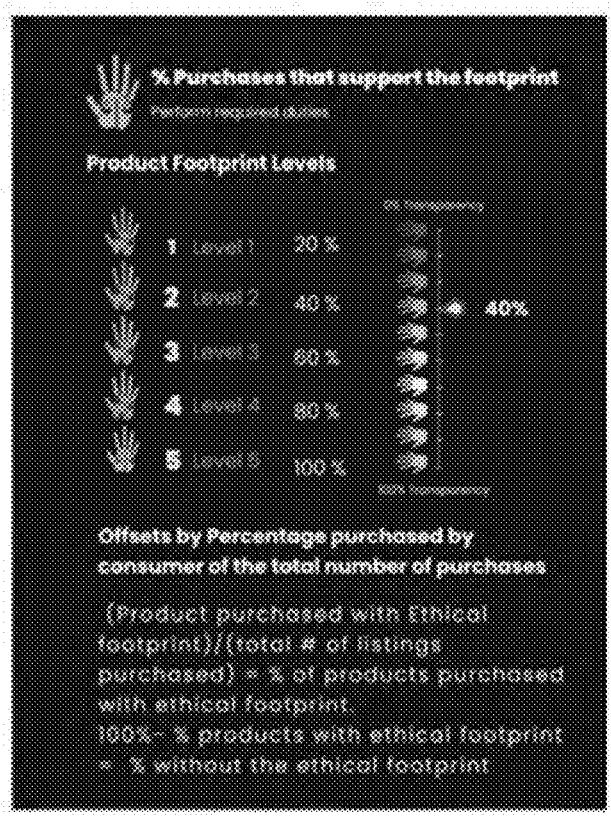
Figure 19O:
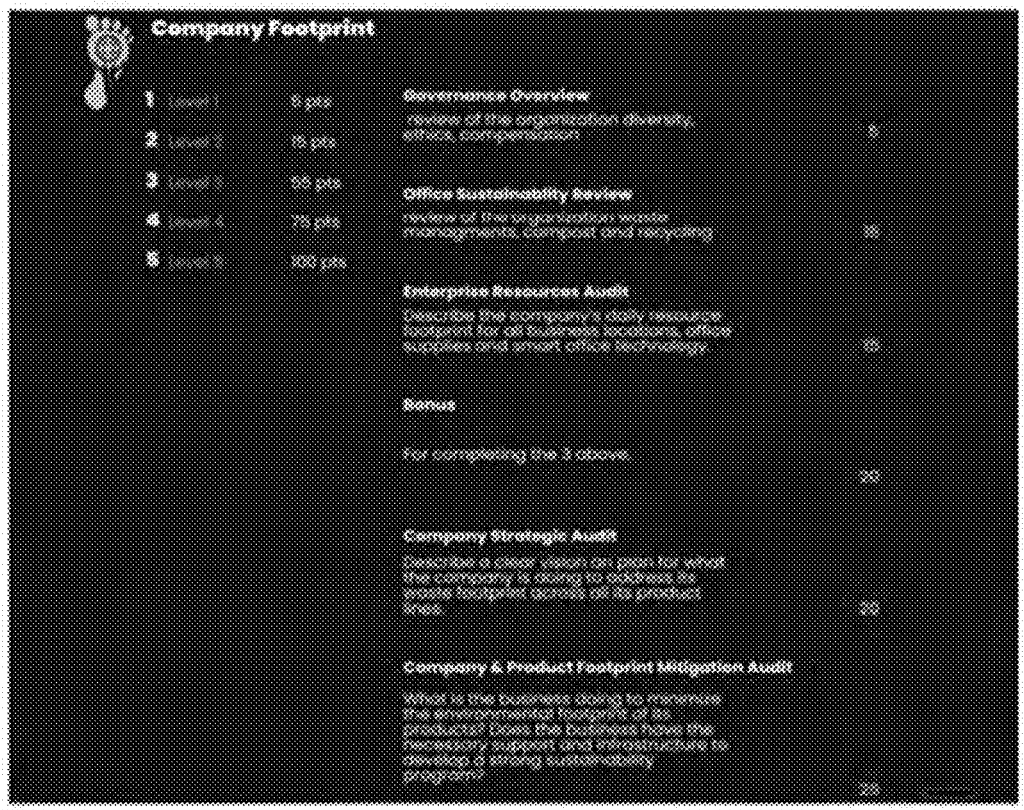
Figure 19P:
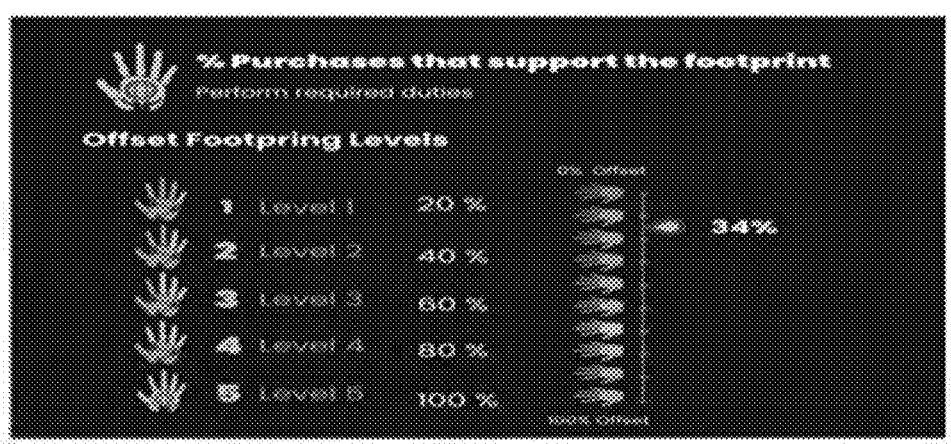

FIGS. 19a-19p illustrate IO footprints and IO handprints, according to one or more embodiments. The audit unit provides the IO footprints to the seller as an indication of achieving a target. The audit unit provides the IO handprints to the consumer as an indication of achieving a target. The footprints are provided to the brand based on investments by size of company. The handprints are provided to the consumer based on investments by spending power. FIG. 19a illustrates targets for achieving a planetary footprint by the brand. FIG. 19b illustrates targets for achieving a planetary handprint by the consumer. FIG. 19c illustrates targets for achieving a people footprint by the brand. FIG. 19d illustrates targets for achieving a people handprint by the consumer. FIG. 19e illustrates targets for achieving a problem without borders footprint by the brand. FIG. 19f illustrates targets for achieving a problem without borders handprint by the consumer. FIG. 19g illustrates targets for achieving a community footprint by the brand. FIG. 19h illustrates targets for achieving a community handprint by the consumer. FIG. 19i illustrates targets for achieving a product footprint by the brand. FIG. 19j illustrates targets for achieving a product handprint by the consumer. FIG. 19k illustrates targets for achieving an offset footprint by the brand. FIG. 19l illustrates targets for achieving an offset handprint by the consumer.

FIG. 19m illustrates targets for achieving an ethical footprint by the brand. The ethical footprint provides the way for the seller to map a brand's footprint regionally and globally based on their business size, to understand their carbon footprint, and sustainability capacity. The Ethical footprint enables the brand to entail any programs the brand has committed to, that help reclaim waste generated by their packaging that cannot be easily recycled. The IO profile creating unit requires information for the following questions to provide the level 1 ethical footprint. List raw materials used in your product creation, add more raw materials, add raw materials sources to this map by dropping geotags on each list item, tell us about how you source your raw materials: How many people procure your raw materials? Are your raw materials coming from source or do they have to be processed at a hub, from various sources? What makes the way you source your raw materials ethical? What makes the raw materials you use sustainable? Is there any negative impact/s associated with your sourcing? Are you able to do anything to mitigate the negative impact/s?

How do you transport your raw materials? How far do you transport your raw materials? What is the carbon footprint of shipping your raw materials? Do you do anything to offset this footprint? How? Upload supporting documentation. Where is your product made? List of cities and countries. Name your Manufacturers. Tell us about your manufacturing process: How many people work on your production line? What makes your manufacturing process ethical? What makes your manufacturing process sustainable? Is there any negative impact/s associated with the manufacturing process? Are you able to do anything to mitigate the negative impact/s? How do you transport your products? What is the carbon footprint of shipping your products to the final retail destinations? How many destinations do you retail your products from? (List cities, countries). FIG. 19n illustrates targets for achieving an ethical handprint by the consumer. The IO profile creating provides the ethical handprint based on the percentage of products purchased by the consumer. The formula is: (Product purchased with Ethical footprint)/(total #of listings purchased)=% of products purchased with ethical footprint.

FIG. 19o illustrates targets for achieving a company footprint by the brand. The ethical footprint has various levels. The IO profile creating unit requires information regarding actively disclosing insights on the governance and daily logistical commitment to sustainability. For each level, the IO profile creating unit requires a list of details by rendering a list of questions to the brand. Based on the brand's response, the ethical footprint is established to the brand at a certain level.

FIG. 19p illustrates targets for achieving a company handprint by the consumer. The IO profile creating unit provides the ethical footprint seal to the consumer based on the percentage of products purchased by the consumer. The formula is: (Total Products purchased)−(Products purchased with the Company Footprint)/(Total product purchases)=% of products purchased with the Company handprint.

Figure 20:
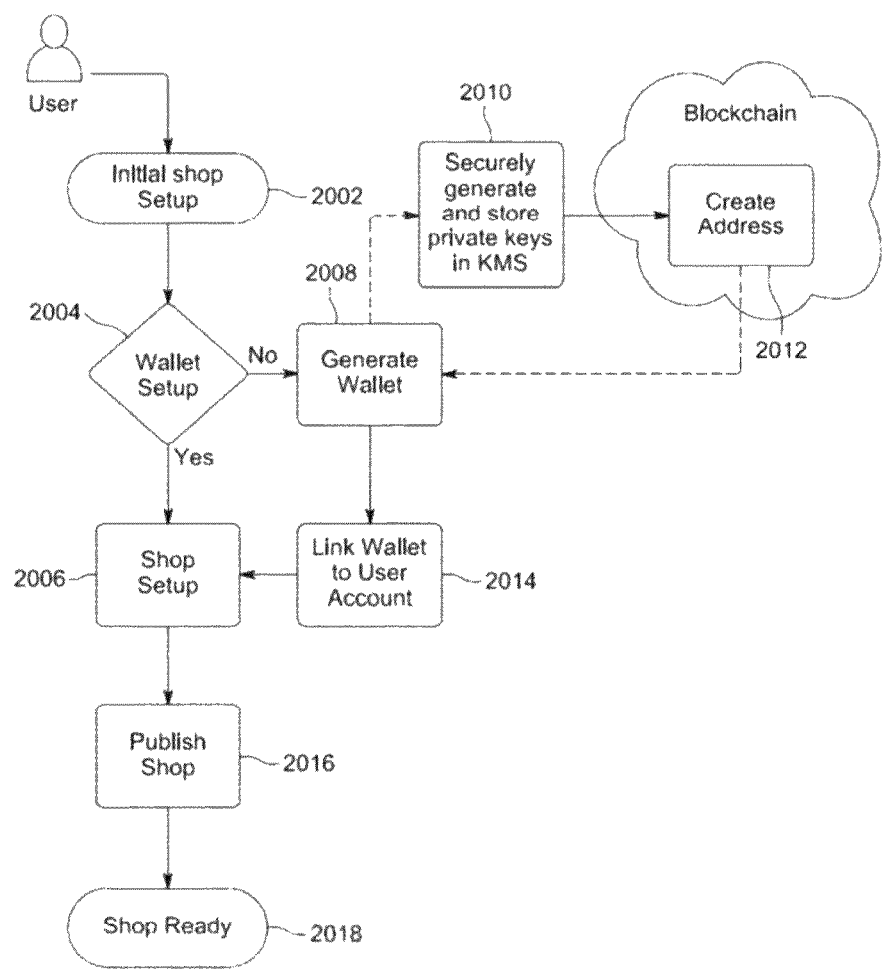
FIG. 20 shows a diagrammatic illustration of the functional structure of a decentralized shop setup for creating, securing, and exchanging cryptographic digital assets, according to one or more embodiments.

FIG. 20 shows a diagrammatic illustration of the functional structure of a decentralized shop setup for creating, securing, and exchanging cryptographic digital assets, according to one or more embodiments. At step 2002, the digital marketplace server receives inputs from a seller and enables the seller to initialize shop setup. In an embodiment, the digital marketplace server comprises a shop setup unit that enables the seller to set up the shop on the digital platform. To set up the shop on the digital platform, the user has to first set up a wallet on the digital platform.

At step 2004, the digital marketplace server, via the wallet setup unit, enables the seller to set up the wallet. If the wallet already exists to a user account, the shop setup unit enables the seller to set up the shop as shown in step 2006. At step 2008, the wallet setup unit generates the wallet if the wallet does not exist in the user account. The wallet generated is linked to a blockchain distributed ledger network. The wallet setup unit then enables the wallet to securely generate and store private keys in the key management system (KMS) as shown in step 2010. At step 2012, the wallet setup unit creates a cryptographically secured address to the wallet on the blockchain network. Once the cryptographically secured digital address has been created, the wallet setup is completed and linked to the blockchain network.

At step 2014, the wallet generated is linked to the user account. Once the wallet is generated and linked to the user account, the user can perform a transaction (e.g., purchase, transfer digital asset, make an impact contribution, perform an activity, etc.) via the wallet. As the wallet is connected to the blockchain network, the transactions or activities happening on the wallet are recorded onto the blockchain network. At step 2006, the shop setup is complete as soon as the wallet is set up and linked to the user account. At step 2016, the shop setup enables the seller to publish the shop on the digital platform. At step 2018, the shop is ready, and the seller can list products onto the digital platform for sale or any other activity.

Figure 21:
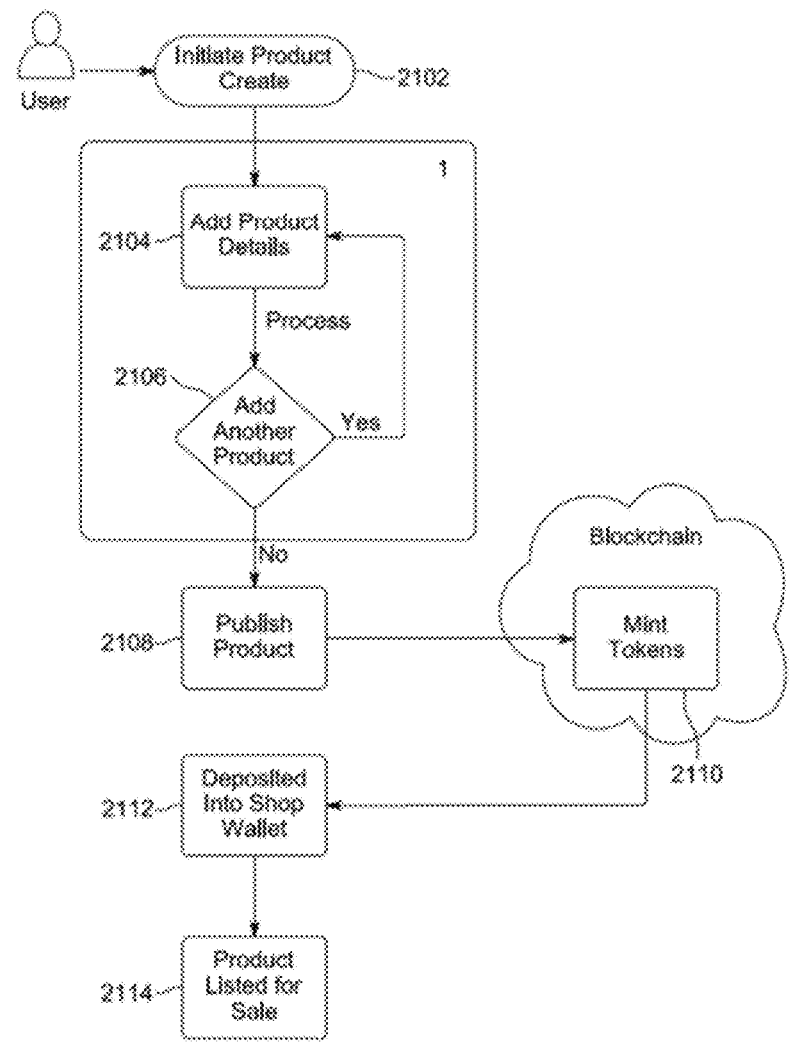
FIG. 21 shows a diagrammatic illustration of a decentralized product creation, according to one or more embodiments.

FIG. 21 shows a diagrammatic illustration of a decentralized product creation, according to one or more embodiments. At step 2102, the product creation unit provides a user interface view (as shown in FIG. 6a) and enables a seller to initiate a product creation. At step 2104, the product creation unit provides user interface views (as shown in FIGS. 6b to 6x) and enables the seller to add product details of one of a first product and a first service. At step 2106, the product creation unit provides user interface views (as shown in FIGS. 6b to 6x) and enables the seller to add product details of one of a second product and a second service. In an embodiment, the product creation unit communicates to a product linking unit. The product linking unit may then link the products created on the digital platform. The product linking unit may then link the products based on any of the product linking methods described in the present disclosure.

At step 2108, the product creation unit may then enable the seller to publish the product as soon as the products are created. The product creation unit requires mining impact oriented (IO) tokens to publish the created product onto the digital platform. At step 2110, the product creation unit mints the IO tokens as soon as the seller purchases the IO tokens as needed. At step 2112, the minted IO tokens are deposited into the wallet of the seller who has purchased it. The minted IO tokens permit the seller to list the product listings onto the digital platform. At step 2114, based on the IO tokens available on the shop's wallet, the products are listed for sale. In an embodiment, the product creation unit enables the seller to renew and pay the fees for the products that are already listed and not sold to date.

Figure 22:
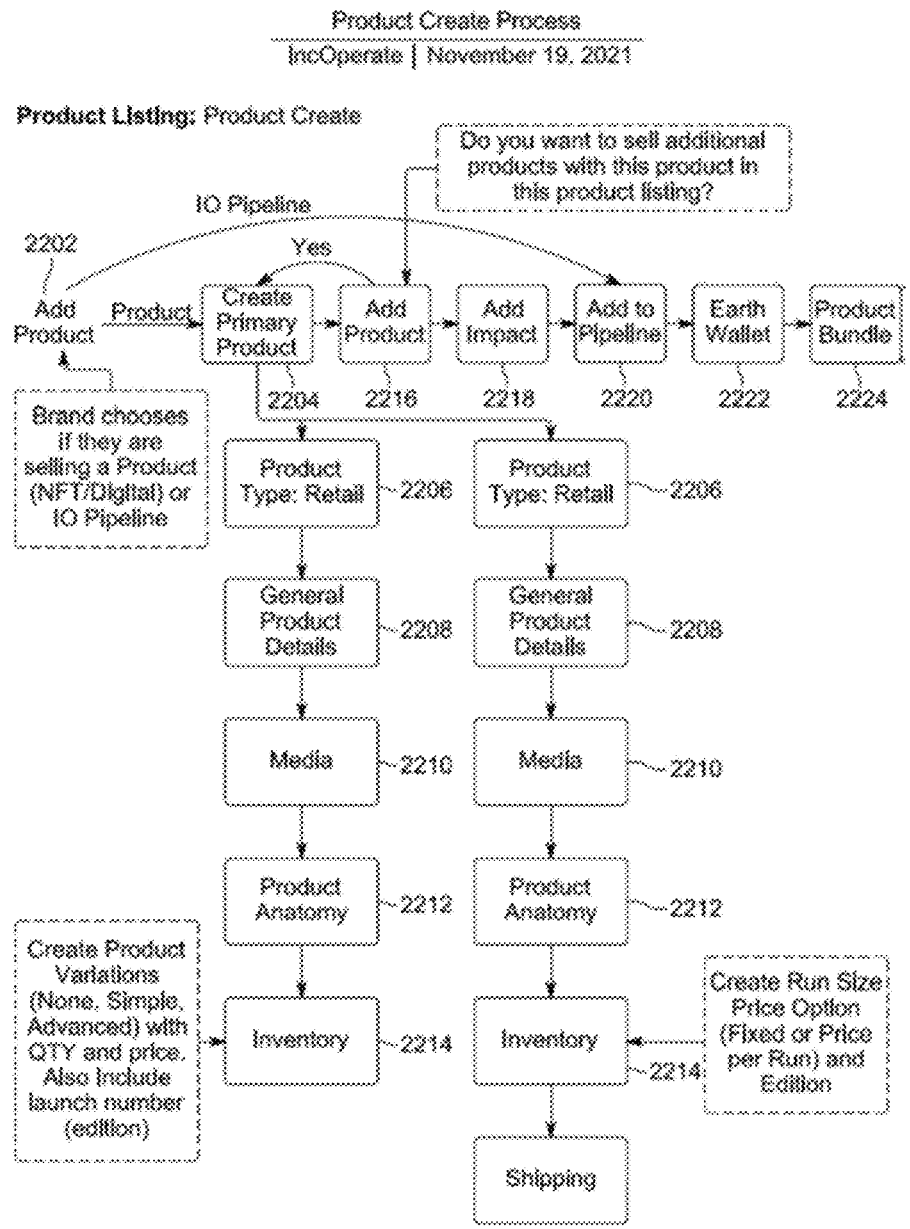
FIG. 22 illustrates a flow diagram of the detailed product creation process, according to one or more embodiments.

FIG. 22 illustrates a flow diagram of the detailed product creation process, according to one or more embodiments. At step 2202, a product creation unit enables a seller to add one of a first product and a first service. The first product and/or the first service may be created based on one of first product information and first service information. The seller has to select one of a product type that the seller is willing to create. The seller can also create an IO pipeline through the digital platform. The IO pipeline defines a sequence of tasks that are to be executed by a buyer or a user to incentivize the buyer.

At step 2204, the primary product (e.g., the first product and the first service) is created based on the first product information and the first service information. The product creation requires following information to create the one of the first product and the first service. At step 2206, the product creation unit receives product type information (e.g., retail, digital, etc.) from the seller. At step 2208, the product creation unit receives general product details from the seller. The general product details information comprises at least a product name, a caption, a product stock keeping unit (SKU), and a collection to which the product belongs. At step 2210, the product creation unit receives media information from the seller. The media information comprises impact to which the product is linked. The media information further comprises any information of the product that can contribute to overcome issues of environment or society. At step 2212, the product creation unit enables the seller to create a product anatomy. The product creation unit enables the seller to create a systematic diagram and dissect the systematic diagram into various parts. The product creation unit then allows the seller to create an interactive label on the various parts. The product creation unit further enables the seller to hyperlink the interactive labels with information that may educate the consumer regarding the product and its impact to the environment and society. At step 2214, the product creation unit enables the seller to list the products on the inventory of the seller. The product creation unit receives the information such as product variations, quantity, price variations, color variations, launch, etc. to list one of the first product and the first service of the retail type product. The product creation unit receives the information such as run size, edition, price option (fixed or variable), etc. to list one of the first product and the first service of the digital type product. In an embodiment, the product creation unit enables the seller to create the primary product as one of the retail product and the digital product as shown in FIG. 22. At step 2216, the product creation unit receives shipping information for the physical product (e.g., retail product type).

At step 2218, the product creation unit enables the seller to add the products created onto the digital platform. At step 2220, the product listing unit enables the seller to add additional products and link with the primary products in the product listing. The product linking enables the seller to advertise more products to the consumer. The product linking can also display product combos that may be useful for the consumers. At step 2222, the impact creation unit enables the seller to add the impact and link the products to the impact. At step 2224, the pipeline creation unit enables the seller to create the IO pipeline. The IO pipeline defines a sequence of tasks that are to be executed by the consumer. The user device of the seller is connected to a smart contract based clearing house. At step 2226, the smart contract based clearing house is configured. The smart contract based clearing house may comprise a wallet. At step 2226, the product creation unit enables the seller to create a product bundle based on his/her product inventory to mint impact oriented (IO) tokens. The IO tokens are mandatory to list the product onto the digital platform.

Figure 23:
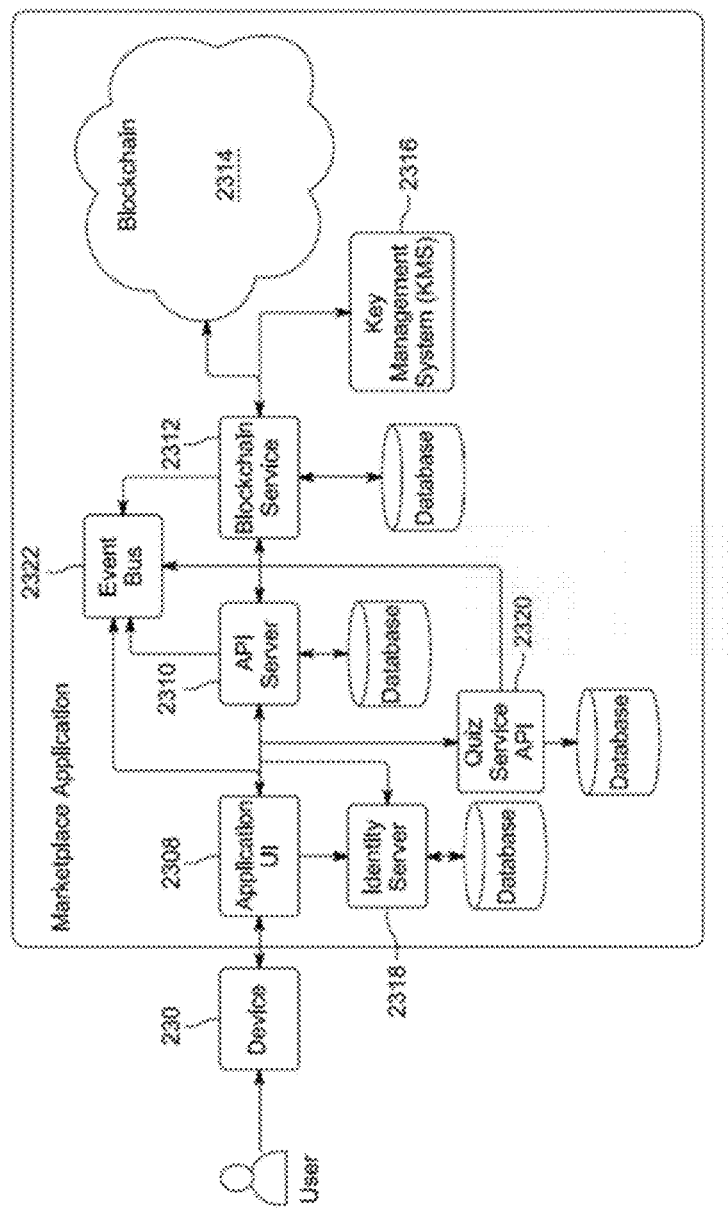
FIG. 23 illustrates a diagrammatic illustration of a system according to one or more embodiments.

FIG. 23 illustrates a diagrammatic illustration of a system according to one or more embodiments. The system comprises a user device 2302, and a digital marketplace server 2306 communicatively coupled with each other. The user device 2302 and the digital marketplace server 2306 are communicatively coupled via a network. The network may be a wired network or a wireless network. The digital marketplace server 2306 comprises an application user interface (UI) 2308, an application programming interface (API) server 2310, a blockchain service 2312, a blockchain network 2314, and a key management system 2316. The digital marketplace server 2306 further comprises an identity server 2318, a quiz service API 2320, and an event bus 2322.

The application user interface 2308 is configured to provide user interface views to the user and enables the user to interact with the digital marketplace server 2306. The user may be one of a seller, a buyer and a visitor who just navigates menus of the digital marketplace. The API server 2310 is a lightweight Web application that allows the users to create and expose data APIs from data, without the need for custom development. The API server 2310 executes activities initiated by the user through the user interface. The API server 2310 is communicatively coupled to the blockchain network 2314 via the blockchain service 2312. The blockchain network 2314 is a distributed immutable ledger network capable of recording all activities.

The Key Management System (KMS) 2316 provides unified key management and encryption services across multiload and hybrid infrastructures. The Key Management System (KMS) 2316 is a utility that centralizes the management of encryption keys. The KMS 2316 allows administrators to create, delete and control keys that encrypt data stored in the databases and products. The identity Server 2318 is a framework and a hostable component that allows implementing single sign-on and access control for modern web applications and APIs. The quiz service API 2320 is configured to render quiz service on the digital platform to the user. The quiz service may be one of an avatar quiz, and an impact oriented (IO) survey. The event bus 2322 is a mechanism that allows different components to connect and communicate with each other without knowing each other. A component can send an event to the event bus 2322 without knowing who will pick up or how many components are going to pick up.

Figure 24:
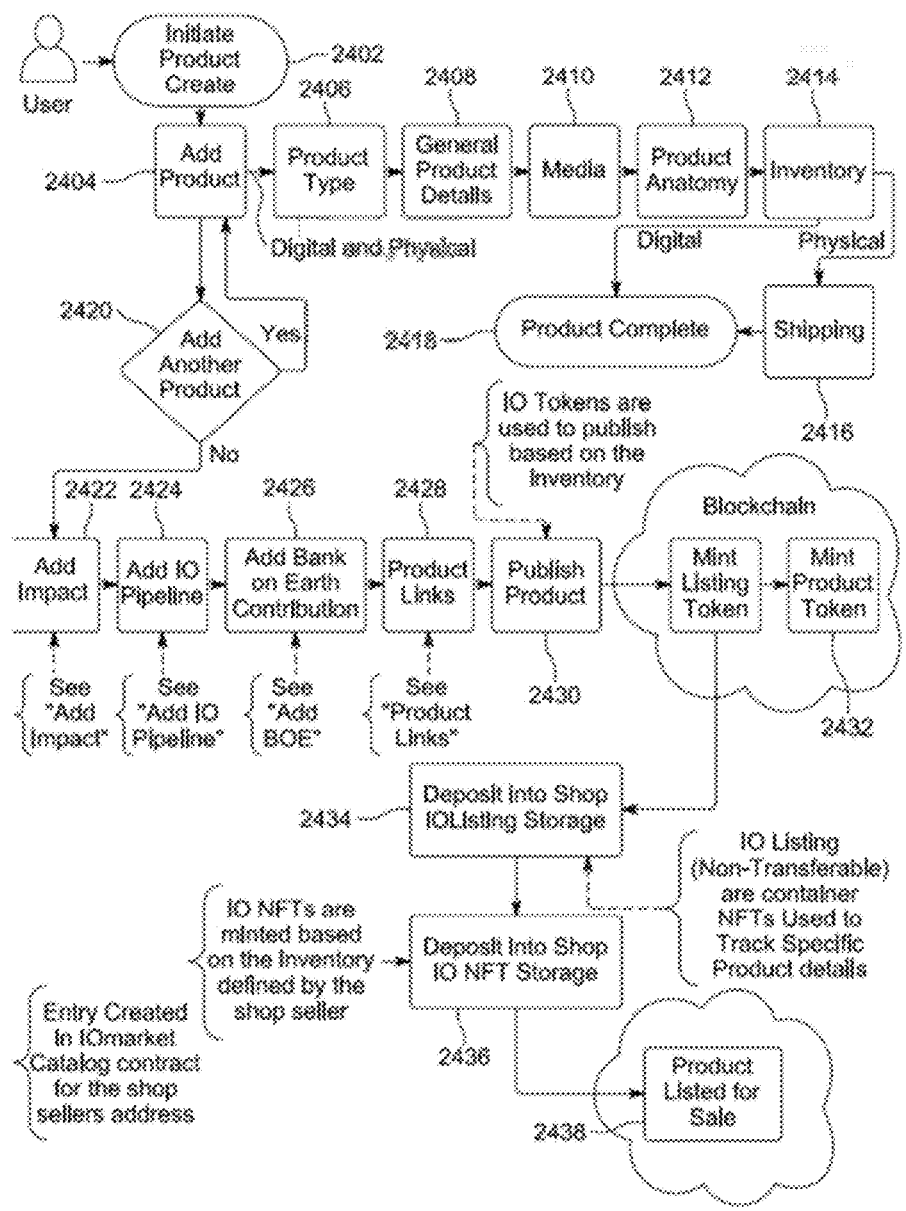
FIG. 24 illustrates a detailed product creation, according to one or more embodiments.

FIG. 24 illustrates a detailed product creation, according to one or more embodiments. At step 2402, a product creation unit enables a seller to initiate a product creation by providing a user interface view as shown in FIG. 6a. The steps illustrated in FIGS. 2404, 2406, 2408, 2410, 2412, 2414, 2416, 2418, 2420, 2422, and 2426 are described already clearly in the description of FIGS. 6b to 6x and description of FIG. 22. At step 2428, the product linking unit is configured to establish product links between the products and product types established. The product linking unit may establish the product links based on the type of the product linking selected.

At step 2430, the product is set to be published on the digital platform. At step 2432, the product creation unit requires an IO token to list products on the digital platform. At step 2432, both listing token and product tokens are minted to list the products on the digital platform. In an embodiment, the IO tokens are minted based on the bundles selected by the seller. At step 2434, the products are deposited into shop IO listing storage. At step 2436, the NFTs are deposited into shop IO NFT storage. At step 2438, the products created are listed for sale on to the digital platform through the blockchain network. The blockchain records all the activities into the immutable distributed ledger.

Figure 25A:
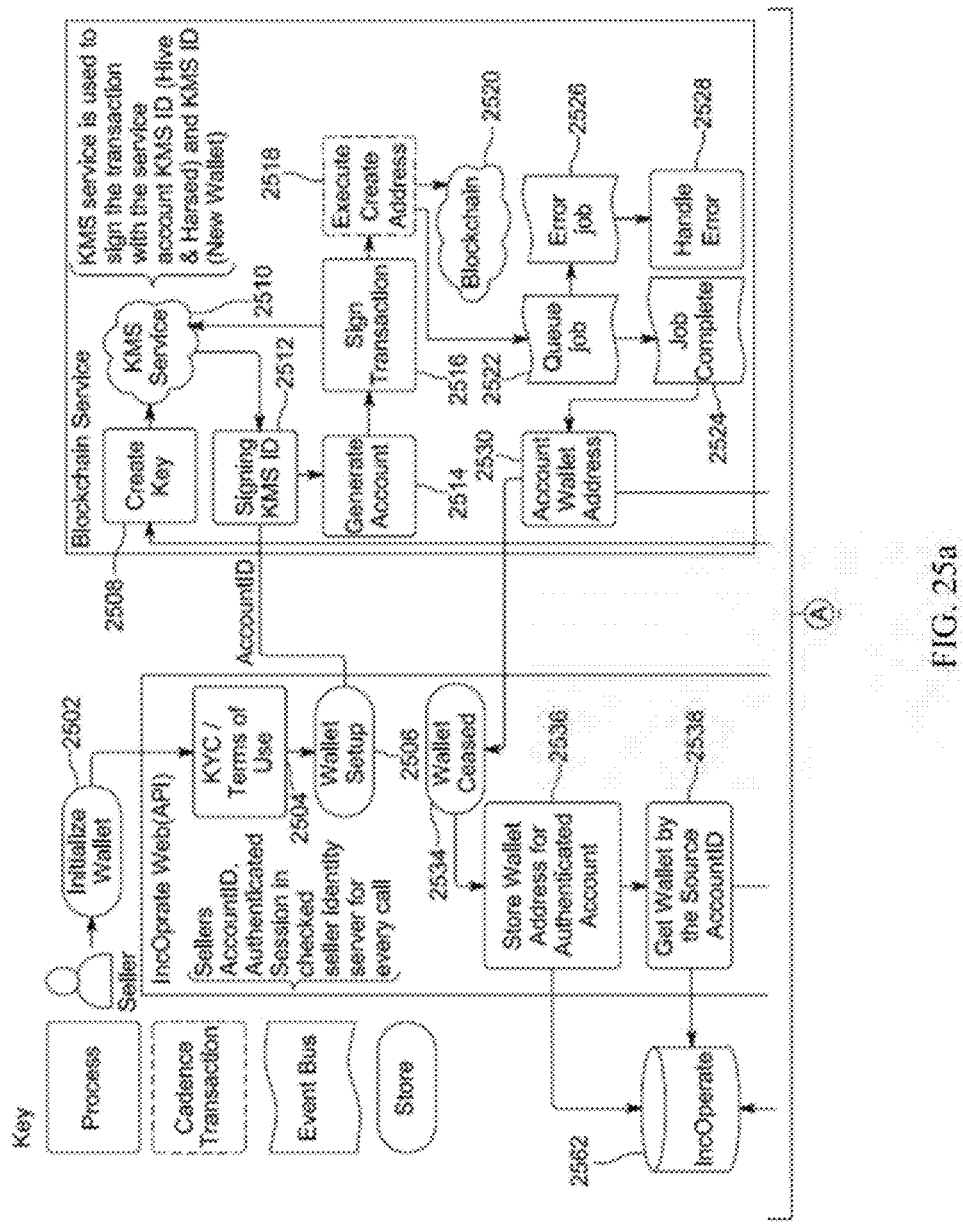
FIG. 25A and FIG. 25B illustrate a process of setting up a buyer account wallet, according to one or more embodiments.
Figure 25B:
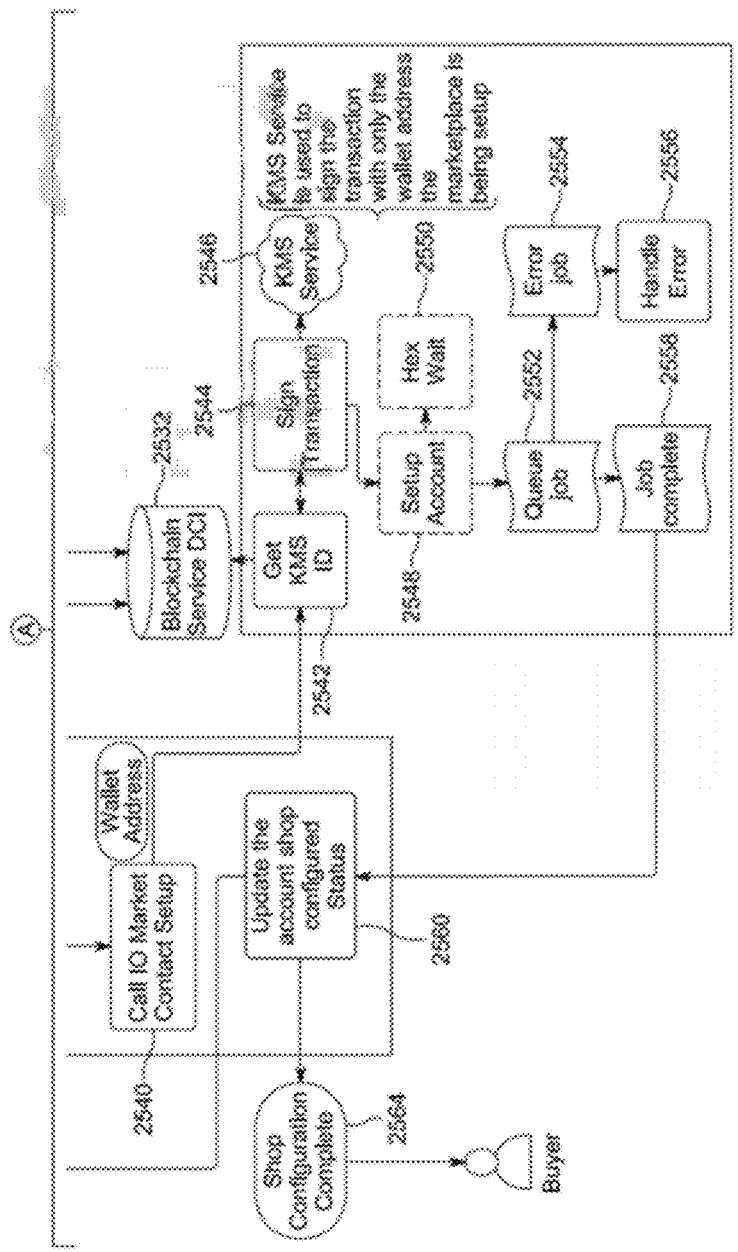

FIG. 25A and FIG. 25B illustrate a process of setting up a buyer account wallet, according to one or more embodiments. At step 2502, a wallet is initialized by a seller through a wallet setup unit. At step 2504, the wallet setup unit renders know your customer (KYC) and terms of service to the seller before setting up the wallet. The know your customer (KYC) and terms of service is rendered to make the seller aware of the terms and conditions. At step 2506, the wallet setup unit receives an input from the seller through the user interface and sets up the wallet.

At step 2508, the key is created in a blockchain network as soon as the wallet setup is initiated. At step 2510, the key created is communicated to a key management system (KMS). The KMS allows administrators to create, delete and control keys that encrypt data stored in the databases and products. At step 2512, the KMS ID is stored. The account ID is communicated to store the KMS ID. At step 2514, an account is generated for the wallet of the seller. At step 2516, the seller signs a transaction as soon as the account is generated. The transaction is regarding creating an address for the wallet. At step 2518, an address creation is executed to create an address for the wallet in the blockchain. The address is communicated to the blockchain at step 2520. At step 2522, the job of creating the address is kept in queue when there are more jobs to be executed.

At step 2524, the job may be executed and completed. At step 2526, the jobs which are not executed are declared as error jobs. At step 2528, the error jobs are handled by the wallet setup unit. At step 2530, an account wallet address is created. At step 2532, the account wallet address is communicated and stored in the blockchain service database. The wallet is created, and the wallet address is assigned to the wallet at step 2534. The wallet address is stored for authenticated accounts at step 2536. At step 2538, the wallet set up unit gets the wallet by session account ID from the seller. The wallet belonging to the account is retrieved. At step 2540, the wallet setup unit calls for an IO market contract setup. At step 2542, the KMS ID is received from the blockchain service database when the wallet setup unit calls for the IO market contract setup.

At step 2544, a request for signing the transaction is communicated to the KMS. KMS is used to sign the transaction with only the wallet address, the marketplace is being set up at step 2546. The transaction herein is for setting up an account for a shop at step 2548. At step 2550, a hex vault is configured for the account created. At step 2552, the account setup may be in queue if there are more pending jobs to be executed. At step 2554, the job may become an error if there are any pending activities to be executed. At step 2556, the wallet setup unit handles the error job. At step 2558, the job is complete. At step 2560, the shop account has been set up. The shop account configured status is updated to the digital marketplace server database at step 2562. At step 2564, the shop configuration is completed, and the shop is listed to the user for any transaction.

Figure 26A:
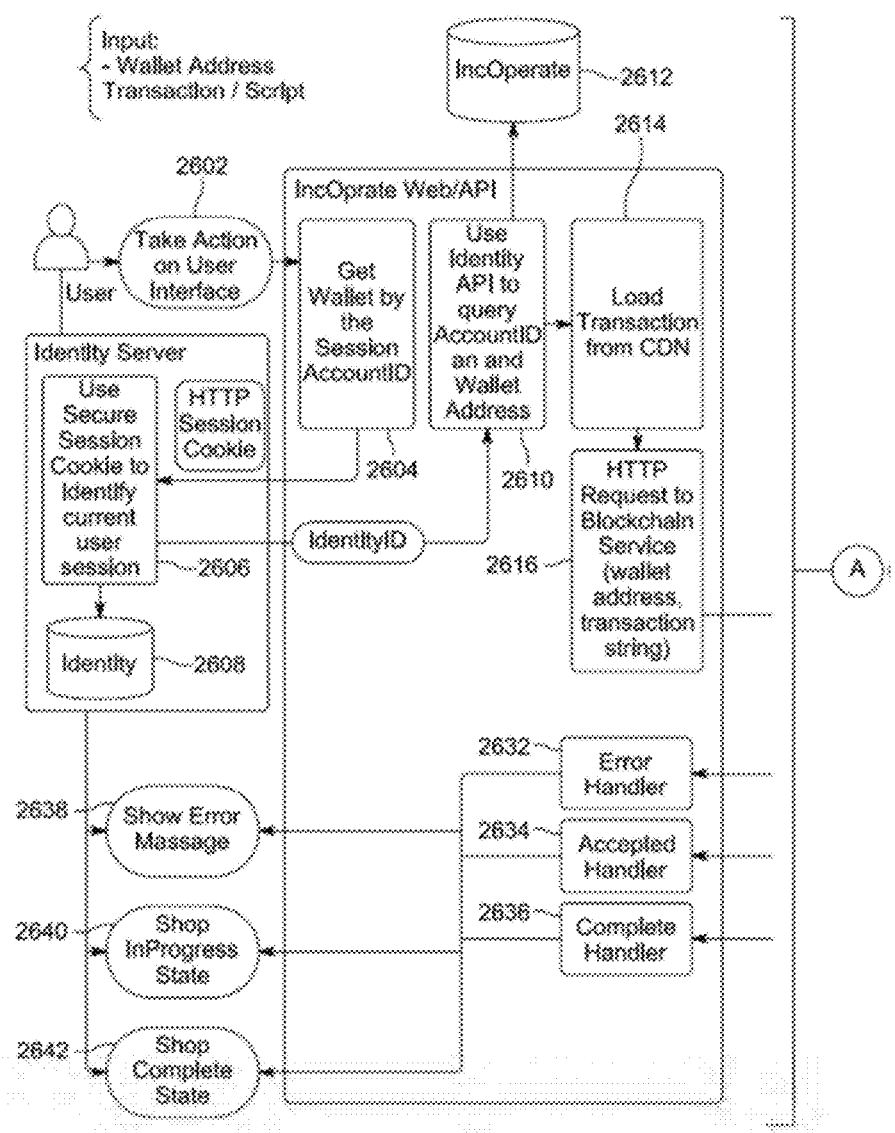
FIG. 26A and FIG. 26B illustrate a process of executing a transaction using a blockchain, API, and UI, according to one or more embodiments.
Figure 26B:
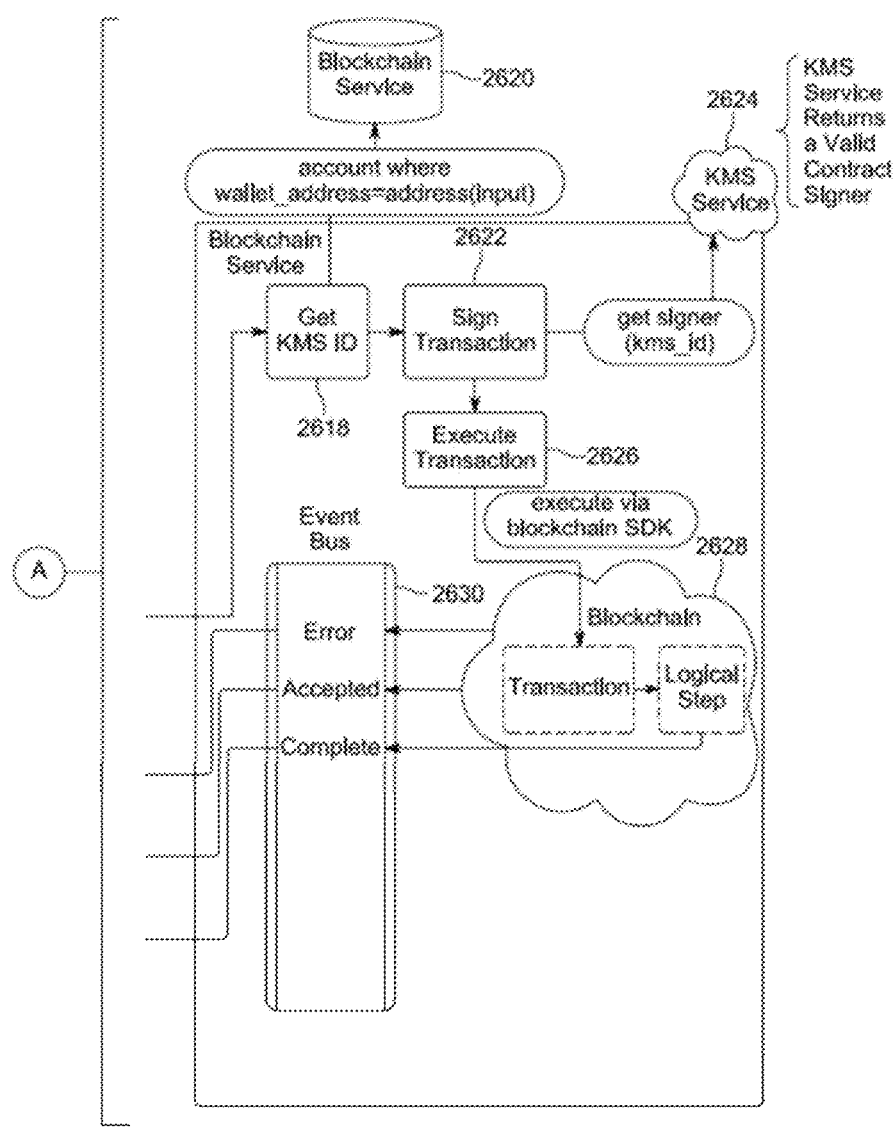

FIG. 26A and FIG. 26B illustrate a process of executing a transaction using a blockchain, API, and UI, according to one or more embodiments. At step 2602, a user is enabled to take an action via the user interface (UI). The action may be a shop creation or any transaction on the shop. At step 2604, the digital marketplace server receives wallet information by using session account ID. At step 2606, an identity server uses a secure session cookie to identify the current user session. At step 2608, the identity server receives the secure session cookie from a database associated with the identity server.

At step 2610, the digital marketplace server uses identity application programming interface (API) to query an account Id and wallet address. At step 2612, the account Id and wallet address is received from a database associated with the digital market server. At step 2614, the digital market server loads a transaction from a content delivery network (CDN). At step 2616, an HTTP request is communicated to blockchain service regarding the loaded transaction using wallet address and transaction string. At step 2618, the blockchain service gets KMS (Key management system) ID. At step 2620, the KMS request is communicated to the blockchain service and the KMS ID is received in return.

At step 2622, a request to sign the transaction is communicated to the KMS service. At step 2624, the KMS service returns a valid contract signer. At step 2626, as soon as the transaction is signed, the transaction is executed. At step 2628, the transaction is executed via a blockchain software development kit. The transaction is executed via logical steps. At step 2630, the event bus receives transaction status information from the blockchain. The transaction status information may be an error, accepted, and completed. The event bus communicates respective transaction status information to respective components to further process the transaction. At step 2632, the error handler receives the error transaction from the event bus and executes it accordingly. At step 2634, the accepted handler receives the accepted transaction from the event bus for further processing. At step 2636, the complete handler receives the complete handler from the event bus. At step 2638, an error message is displayed to the user. At step 2640, a shop in progress state is rendered to the user. At step 2642, a shop complete state is rendered to the user.

Figure 27A:
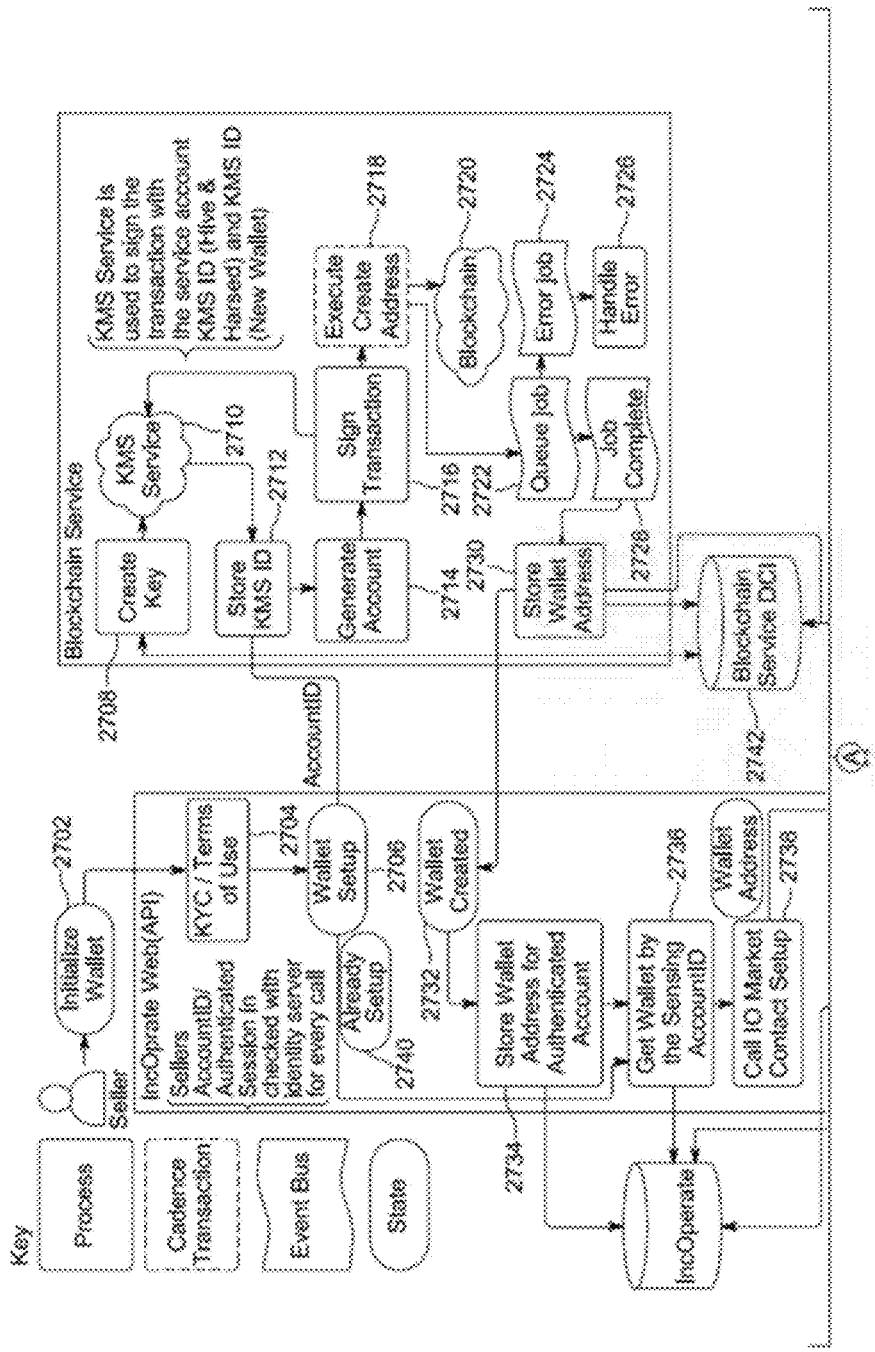
FIG. 27A and FIG. 27B illustrate a process of setting up a seller account wallet according to one or more embodiments.
Figure 27B:
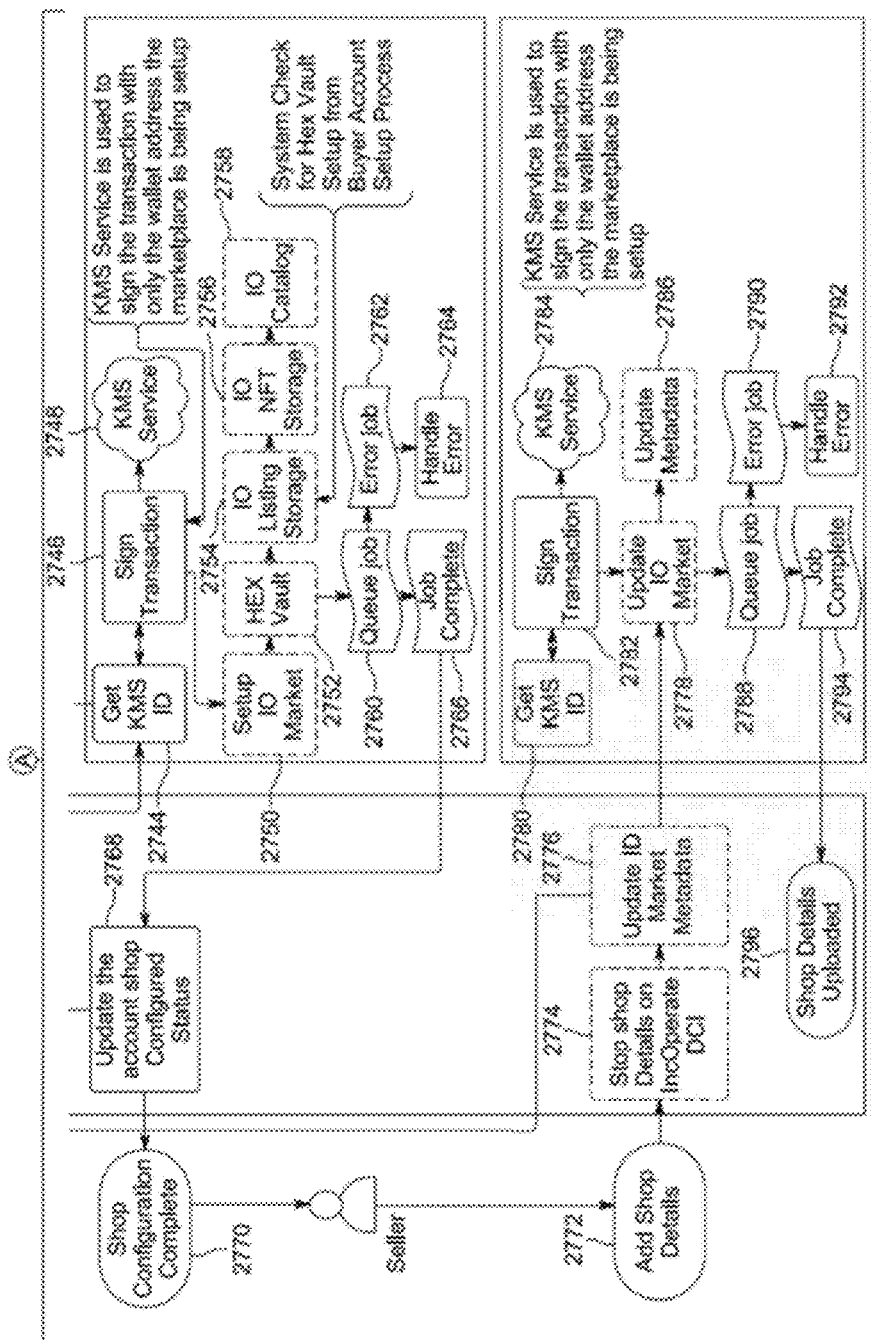

FIG. 27A and FIG. 27B illustrate a process of setting up a seller account wallet according to one or more embodiments. At step 2702, a wallet is initialized by a seller through a wallet setup unit. At step 2704, the wallet setup unit renders know your customer (KYC) and terms of service to the seller before setting up the wallet. The know your customer (KYC) and terms of service is rendered to make the seller aware of the terms and conditions. At step 2706, the wallet setup unit receives an input from the seller through the user interface and sets up the wallet. If the wallet is set up already as in step 2740, then the process directly proceeds to step 2736 as shown in FIG. 27A and FIG. 27B.

At step 2708, the key is created in a blockchain network as soon as the wallet setup is initiated. At step 2710, the key created is communicated to a key management system (KMS). The KMS allows administrators to create, delete and control keys that encrypt data stored in the databases and products. At step 2712, the KMS ID is stored. The account ID is communicated to store the KMS ID. At step 2714, an account is generated for the wallet of the seller. At step 2716, a request for signing a transaction is executed. Transaction Signing is a security step that controls and verifies transaction credentials by creating a one-time confirmation code for a single transaction via Digital Secure Key or Secure Key. The transaction is regarding creating an address for the wallet. At step 2718, an address creation is executed to create an address for the wallet in the blockchain. The address is communicated to the blockchain at step 2720. At step 2722, the job of creating the address is kept in queue when there are more jobs to be executed.

At step 2724, the jobs which are not executed are declared as error jobs. At step 2726, the error jobs are handled by the wallet setup unit. At step 2728, the job may be executed and completed. At step 2730, an account wallet address is stored within the blockchain service. At step 2732, an account wallet is created. The wallet address is stored for an authenticated account at step 2734. At step 2736, the wallet set up unit gets the wallet by session account ID from the seller. The wallet belonging to the account is retrieved. At step 2738, the wallet setup unit calls for an IO market contract setup. At step 2742, the account wallet address is communicated and stored in the blockchain service database. At step 2744, the KMS ID is received from the blockchain service database when the wallet setup unit calls for the IO market contract setup.

At step 2746, a request for signing the transaction is communicated to the KMS. KMS is used to sign the transaction with only the wallet address; the marketplace is being set up at step 2748. The transaction herein is for setting up an IO market at step 2750. At step 2752, a hex vault is configured for the account created. At step 2754, an IO listing storage transaction is executed. At step 2756, an IO NFT storage transaction is executed. At step 2758, an IO catalog transaction is executed. At step 2760, the job of setting up the IO market is kept in queue when there are more jobs to be executed. At step 2762, the jobs which are not executed are declared as error jobs. At step 2764, the error jobs are handled by the wallet setup unit. At step 2766, the job may be executed and completed.

At step 2768, the account shop configured status is updated to the digital market server. At step 2770, the shop configuration is complete. The account shop configured status is updated to the digital market server database. At step 2772, the seller is enabled to update the shop details once the shop configuration is complete. At step 2774, the shop details are recorded onto the digital market server database. At step 2776, the IO market metadata is updated to the digital market server. At step 2776, the IO market is updated based on the shop details. At step 2780, the KMS ID is received for the transaction IO market update. At step 2782, a request for signing a transaction is communicated to a KMS service. Transaction Signing is a security step that controls and verifies transaction credentials by creating a one-time confirmation code for a single transaction via Digital Secure Key or Secure Key. At step 2784, KMS is used to sign the transaction with only the wallet address; the marketplace is being set up.

At step 2786, an updated metadata transaction is executed. At step 2788, the transaction of updating the IO market is kept in queue when there are more jobs in the queue. At step 2790, the jobs which are not executed are declared as error jobs. At step 2792, the error jobs are handled by the wallet setup unit. At step 2794, the jobs may be executed and completed. At step 2796, the shop details are updated in the digital market server.

Figure 28:
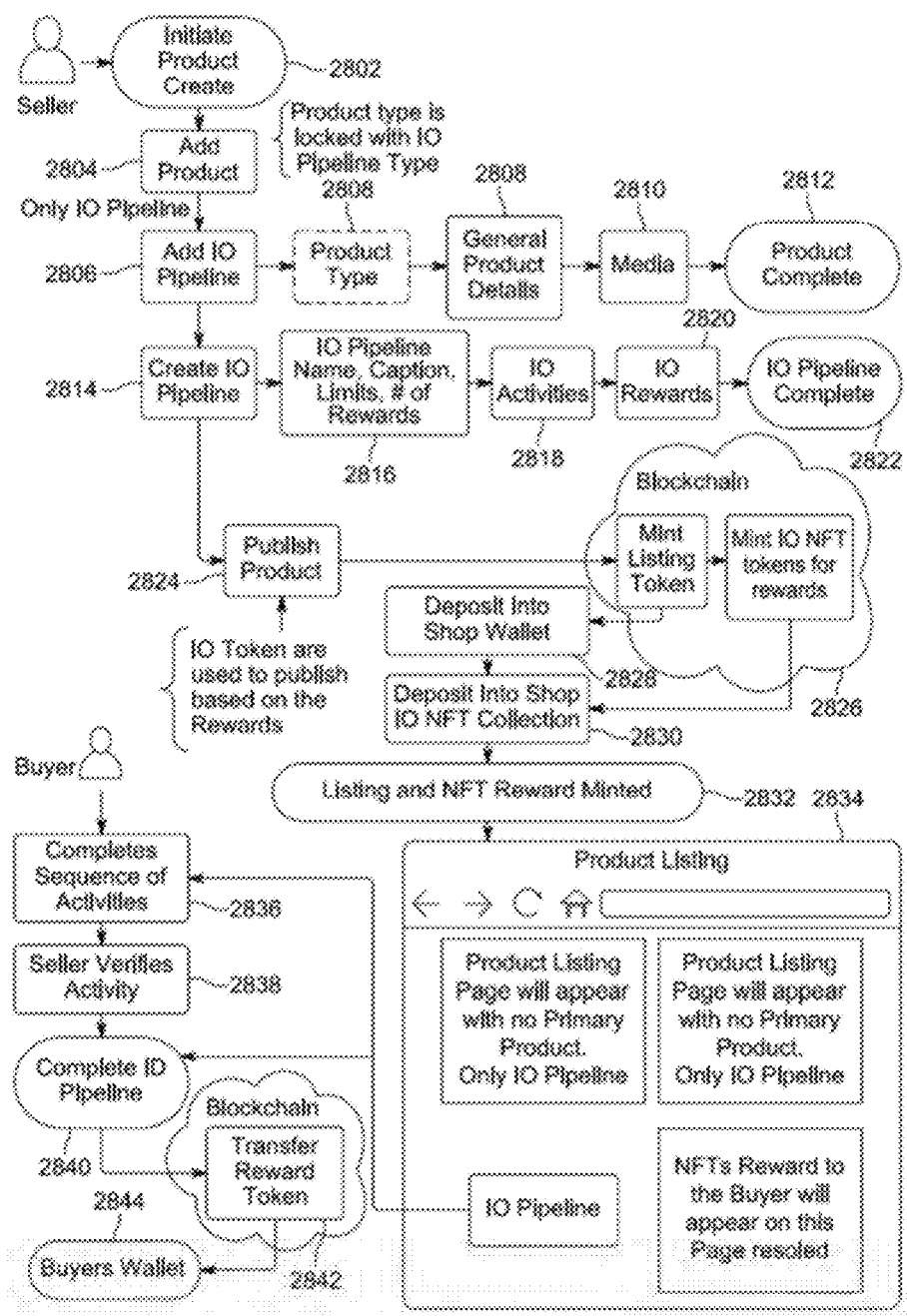
FIG. 28 illustrates a process of creating an interactive outcome (IO) pipeline, according to one or more embodiments.

FIG. 28 illustrates a process of creating an interactive outcome (IO) pipeline, according to one or more embodiments. At step 2802, a product creation unit enables sellers to initiate a product creation process via a user interface shown in FIG. 6a. The product herein in this case is the IO pipeline. At step 2804, the product creation unit enables the seller to create the product. At step 2806, the product creation unit enables the seller to add the IO pipeline. At step 2808, the product creation unit enables the seller to select the product type to be created. The product creation unit locks the product type to be selected for the pipeline creation. At step 2808, the product creation enables the seller to add general product details of the IO pipeline as shown in FIGS. 6a to 6x.

At step 2810, the product creation unit enables the seller to add media details like impact, etc. At step 2812, the product creation is complete. At step 2814, the IO pipeline creation is initiated. At step 2816, the product creation unit enables the seller to add pipeline name, caption, limits, no. of rewards assigned, etc. At step 2818, the product creation unit enables the seller to define IO activities. At step 2820, the product creation unit enables the seller to add IO reward details. At step 2822, the pipeline creation is complete as soon as the IO rewards are defined.

At step 2824, the product is published. The product published herein is the IO pipeline. At step 2826, the blockchain mints the listing tokens required to publish the product on the digital platform and the IO NFT tokens for rewards. The listing tokens are listed into the shop wallet at 2830. The IO NFT tokens are listed into the IO NFT collection. At step 2832, the listing tokens and the NFT rewards are minted. At step 2834, the product listing page displays the IO pipeline and the IO NFT rewarded to the buyer. No products will appear on this page as the IO pipeline is defined herein as the product during the product creation. At step 2836, the buyer is enabled to view the IO pipeline and execute the sequence of activities. At step 2838, the seller verifies the sequence of activities completed by the buyer. At step 2840, the IO pipeline is completed as soon as the seller verifies the activities executed by the buyer. At step 2842, the reward token is transferred to the blockchain network. At step 2844, the rewards are credited into the buyer's wallet for executing and completing the sequence of tasks defined in the IO pipeline.

Figure 29:
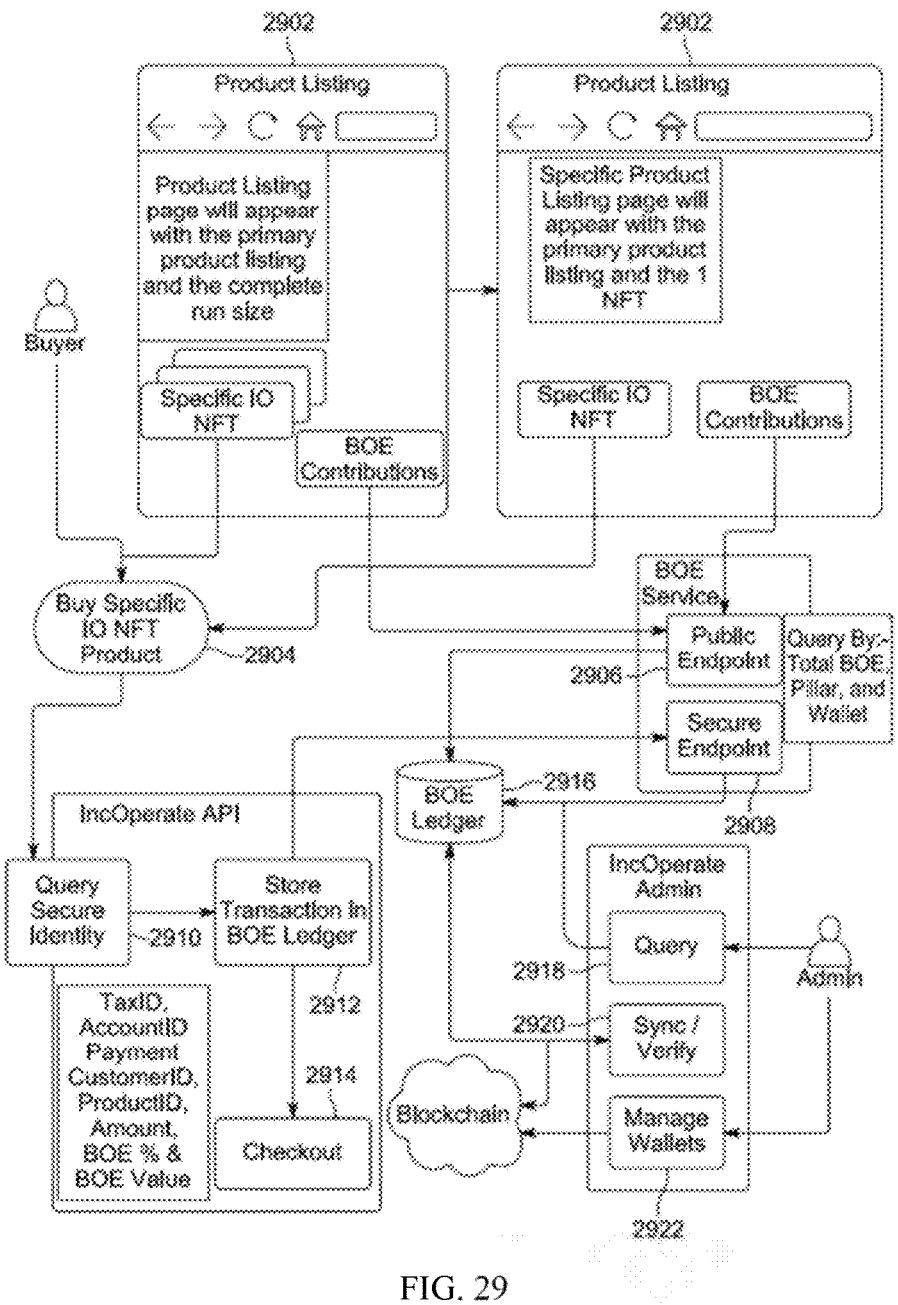
FIG. 29 illustrates a smart contract based clearing house ledger, according to one or more embodiments.

FIG. 29 illustrates a smart contract based clearing house ledger, according to one or more embodiments. At step 2902, a product listing page is tendered to a buyer. The product listing page of a shop may list one of a primary product listing and complete run size, and a primary product and an NFT. At step 2904, the buyer executes the activity of buying specific IO NFT products from the product listing page. At step 2906, contributions to smart contract based clearing house are stored in a public endpoint of the smart contract based clearing house. The public endpoint for a managed instance enables data access to your managed instance from outside the virtual network. At step 2908, transactions are stored in a secured endpoint of the smart contract based clearing house.

At step 2910, a query is sent to a secure identity. The secure identity is an entity that can be used to define a permission on a secured item, so that only authenticated users who are allowed to access this item can see it in its original repository or query results. At step 2912, the transactions are stored to the smart contract based clearing house ledger via the secure endpoint. At step 2914, the buyer may checkout once the transaction is completed. At step 2916, the smart contract based clearing house ledger records all the information from the public endpoint and the secured endpoint. At step 2918, an administrator of the digital marketplace server is enabled to query any information from the smart contract based clearing house ledger. At step 2920, the smart contract based clearing house ledger may synchronize and verify with the digital marketplace server. The blockchain network may also synchronize and verify the information with the digital market server. At step 2922, the administrator is enabled to manage wallets on the blockchain network. The administrator may modify, add, or delete any wallets on the digital market server.

Figure 30:
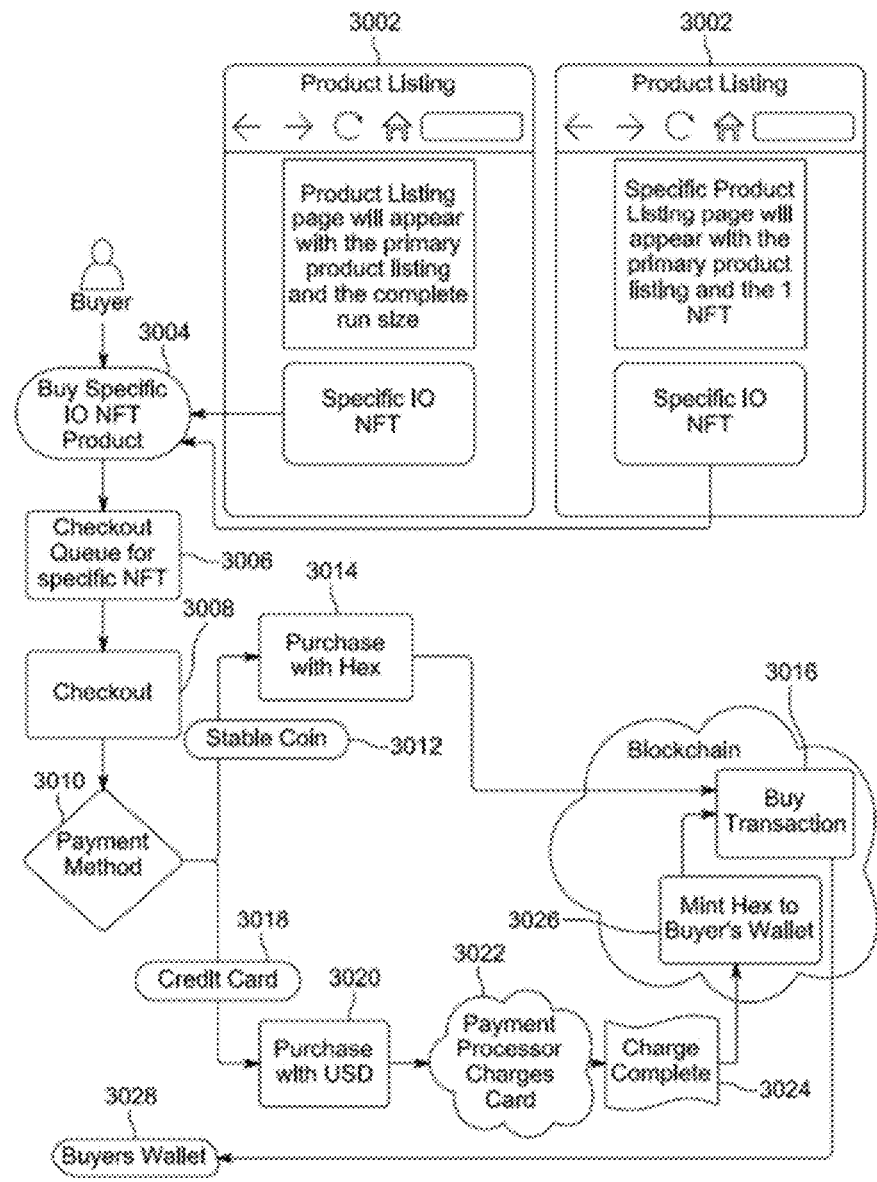
FIG. 30 illustrates a purchase process flow from a buyer perspective, according to one or more embodiments.

FIG. 30 illustrates a purchase process flow from a buyer perspective, according to one or more embodiments. At step 3002, the product listing page of a digital platform is rendered to a buyer. The product listing page may list one of a primary product and complete run size and a primary product and one NFT. At step 3004, the buyer is enabled to buy specific IO NFT products from the product listing page. At step 3006, the NFT gets queued to the checkout queue. At step 3008, the buyer is enabled to check out the product chosen.

At step 3010, the buyer is enabled to make payment for the product chosen. At step 3012, the payment may be done by the buyer using a stable coin. At step 3014, the buyer is enabled to purchase with hex using the stable coin. At step 3016, the buying transaction takes place within the blockchain network. At step 3018, the payment may be done by the buyer using a credit card. At step 3020, the buyer is enabled to purchase the product with USD using the credit card. At step 3022, the payment is processed, and the credit card is charged for the purchase transaction. At step 3024, the payment is complete, and the amount is charged from the credit card. At step 3026, the hex is minted into the buyer's wallet. At step 3016, the transaction is executed, and purchase is done through the blockchain network. At step 3028, the buyer's wallet is updated once the purchase transaction is completely over.

The foregoing disclosure provides illustration and description but is not intended to be exhaustive or to limit the implementations to the precise form disclosed. Modifications and variations are possible in light of the above disclosure or may be acquired from practice of the implementations.

Those skilled in the art will appreciate that the invention may be practiced in network computing environments with many types of computer system configurations including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, etc. The invention may also be practiced in distributed system environments where local and remote computer systems, which are linked (either by hardwired data links, wireless data links, or by a combination of hardwired and wireless data links) through a network, both perform tasks. In a distributed system environment, program modules or units may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Although the present embodiments have been described with reference to specific example embodiments, it will be evident that various modifications and changes may be made to these embodiments without departing from the broader spirit and scope of the various embodiments. For example, the various devices, units, and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structures and methods may be embodied using transistors, logic gates, and electrical circuits (e.g., application specific integrated (ASIC) circuitry and/or Digital Signal Processor (DSP) circuitry).

In addition, it will be appreciated that the various operations, processes, and methods disclosed herein may be embodied in a non-transitory machine-readable medium and/or a system. Accordingly, the specification and drawings are to be regarded in an illustrative rather than a restrictive sense.

INCORPORATION BY REFERENCE

All publications, patents, and patent applications cited in this Specification are hereby incorporated by reference in their entirety, including:

US2020/0273048A1 entitled "Systems and methods for provisioning cryptographic digital assets for blockchain-secured retail products";
US2020/0160320A1 entitled "System and method for authorizing blockchain network transactions";
US2019/0012660A1 entitled "Systems and methods for providing an architecture for an internet-based marketplace";
US2021/0201336A1 entitled "Apparatus and method for managing branded digital items";
US2021/0256070A1 entitled "Non-fungible Token (NFT)";
US2021/0319429A1 entitled "Tokenization Platform";
US2021/0082044A1 entitled "Distributed ledger lending systems having a smart contract architecture and methods therefor";
U.S. Pat. No. 11,113,754B2 entitled "Event-based distribution of cryptographically secured digital assets";
WO2020/123464A1 entitled "Decentralized marketplace and ecosystem powered by blockchain-based document delivery, collaboration, and dissemination";
US2021/0279695A1 entitled "Systems and methods for item acquisition by selection of a virtual object placed in a digital environment";
WO2020/198409A1 entitled "Secure token-based exchange of pollution credits for the reduction of worldwide pollution";
US2019/0392489A1 entitled "Blockchain tracking and managing of a transaction incented by a merchant donation to a consumer affinity";
WO2021/041746A1 entitled "Stable digital token processing and encryption on blockchain"; and
AU2021104965A4 entitled "Methods, Systems and software platform for facilitating charitable donation payments within one or more digital donation devices".

What is claimed is:

1. A method comprising:
    receiving, by a server, one of first product information and first service information, through a blockchain network, from a seller;
    creating, by the server, one of a first product and a first service, through the blockchain network, on a digital platform;
    listing, by the server, product details of one of the first product and the first service, using the blockchain network, on the digital platform;
    dynamically assigning and publishing, by the server, a price of one of the first product, and the first service based on combination of one of an edition, and a launch, and one of a run size, and a volume of one of the first product and the first service using a smart contract;
    receiving, by the server, impact information through the blockchain network;
    creating, by the server, an impact focus and linking the impact focus to one of the first product, and the first service based on the impact information; and
    publishing, by the server, the impact focus on the digital platform;
    receiving, by the server, from a computing device associated with a buyer, an indication that the buyer has executed a first activity with respect to one of the first product and the first service through the digital platform;
    receiving, by the server, from the computing device, a cryptographically secured owner identification (ID) code associated with the buyer;
    receiving, by the server, from the computing device, confirmation of completion of the first activity executed by the buyer;
    determining, by the server, a cryptographically secured digital asset ID code corresponding to the completion of the first activity, wherein the cryptographically secured digital asset ID code is representative of a cryptographically secured digital asset;

transmitting, by the server, a cryptographic block to a distributed blockchain ledger to record transfer of the cryptographically secured digital asset to the buyer, the cryptographic block comprising the cryptographically secured digital asset ID code and the cryptographically secured owner ID code;

minting, by the server, an impact oriented (IO) market smart contract through the distributed blockchain ledger;

defining, by the server, a second activity for the cryptographically secured digital asset listed through the impact oriented (IO) market smart contract;

issuing, by the server, an impact oriented (IO) punch card and crediting a punch to the impact oriented (IO) punch card at a predefined position upon completing the second activity defined;

verifying, by the server, an execution and completion of the second activity by monitoring the punch in the impact oriented (IO) punch card, wherein the IO punch card comprises the punch in designated position to represent data regarding the execution and completion of the second activity; and generating, by the server, an impact oriented (IO) reward outcome to the buyer, wherein the method comprises interacting, by the server, with the seller, buyer, and a third party.

2. The method of claim 1, wherein the cryptographically secured digital asset comprises one of a non-fungible token (NFT), an access code to unique offering, and a coupon.

3. The method of claim 1, further comprising:
rendering an interactive outcome pipeline to the buyer, wherein the interactive outcome pipeline enables the buyer to execute a sequence of tasks;
verifying the execution and completion of the sequence of tasks by the buyer; and
documenting and recording the sequence of tasks executed by the buyer using the blockchain distributed ledger.

4. The method of claim 1, further comprising:
creating an interactive e-catalog, wherein the interactive e-catalog holds a list of products;
splitting the interactive e-catalog into at least one of a collection category, a cluster category, a relisting category, a product category, recommendation category, NFT category, favorites category, a trending category, an impact oriented (IO) score category, and an history category; and
enabling the buyer to interact with the interactive e-catalog and to sort at least one category of the interactive e-catalog;
evaluating an impact oriented (IO) profile of a seller in real-time; and
calculating impact oriented (IO) metrics associated with the impact oriented (IO) profile based on the evaluation of the impact oriented (IO) profile in real-time;
calculating an impact oriented (IO) score using the impact oriented (IO) metrics associated with the impact oriented (IO) profile; and
sorting and displaying the impact oriented (IO) profile of the seller based on the impact oriented (IO) score.

5. The method of claim 1, further comprising:
creating an impact oriented (IO) profile for the buyer based on the first activity executed by the buyer on the digital platform;
tracking the first activity by the buyer that alters information in the impact oriented (IO) profile;

recording the first activity, through the blockchain distributed ledger; and
updating the impact oriented (IO) profile of the buyer based on the first activity.

6. The method of claim 5, further comprising:
Performing an impact oriented (IO) audit on the first activity performed by the buyer, and the impact oriented (IO) profile of the buyer in real-time; and
determining impact oriented (IO) metrics achieved by the impact oriented (IO) profile as impact oriented (IO) handprints based on the impact oriented (IO) audit, wherein the impact oriented (IO) handprints comprise at least one of a planetary handprint, a people handprint, a problems without borders handprint, a community handprint, a product handprint, an offset handprint, an ethical handprint, and a company handprint.

7. The method of claim 1, further comprising:
creating a quiz relevant to a business of a seller based on at least one of valid public data available, and contents submitted by the seller;
rendering the quiz to the buyer, wherein the quiz comprises a first part, and a second part; and
receiving a response to at least one of the first part and the second part of the quiz from the buyer.

8. The method of claim 7, further comprising:
enabling the buyer to manually customize a non-fungible token (NFT) upon receiving the response to the first part of the quiz; and
automatically customizing an NFT upon receiving the response to the second part of the quiz based on the response received.

9. The method of claim 8, wherein automatically customizing the NFT upon receiving the response to the second part of the quiz comprises:
creating a unique series of the NFT based on the response to the quiz and time taken by the buyer to complete the quiz.

10. The method of claim 7, further comprising:
providing an impact oriented (IO) reward to the buyer upon receiving the response to the quiz from the buyer, wherein the impact oriented (IO) reward comprises an access code to unique offering, NFT, generated NFT, a discount, and a coupon.

11. The method of claim 1, further comprising:
creating an impact oriented (IO) survey relevant to a business of a seller obtained from one of a template, and a customized based on one of first product information and first service information, wherein the impact oriented (IO) survey comprises a plurality of questions that provides quality insights to the buyer.

12. A system comprising:
a server that comprises a memory, and a processor communicatively coupled to the memory, the processor is operable to
receive one of first product information and first service information, through a blockchain network, from a seller;
create one of a first product and a first service, through the blockchain network, on a digital platform;
list product details of one of the first product and the first service, using the blockchain network, on the digital platform;
dynamically assign and publish a price of one of the first product, and the first service based on combination of one of an edition, and a launch, and one of a run size, and a volume of one of the first product and the first service using a smart contract;

receive impact information through the blockchain network;
create an impact focus and linking the impact focus to one of the first product, and the first service based on the impact information; and
publish the impact focus on the digital platform;
receive, from a computing device associated with a buyer, an indication that the buyer has executed a first activity with respect to one of the first product and the first service through the digital platform;
receive, from the computing device, a cryptographically secured owner identification (ID) code associated with the buyer;
receive, from the computing device, confirmation of completion of the first activity executed by the buyer;
determine a cryptographically secured digital asset ID code corresponding to the completion of the first activity, wherein the cryptographically secured digital asset ID code is representative of a cryptographically secured digital asset;
transmit a cryptographic block to a distributed blockchain ledger to record transfer of the cryptographically secured digital asset to the buyer, the cryptographic block comprising the cryptographically secured digital asset ID code and the cryptographically secured owner ID code;
mint an impact oriented (IO) market smart contract through the distributed blockchain ledger;
define a second activity for the cryptographically secured digital asset listed through the impact oriented (IO) market smart contract;
issue an impact oriented (IO) punch card and credit a punch to the impact oriented (IO) punch card at a predefined position upon completing the second activity defined;
verify an execution and completion of the second activity by monitoring the punch in the impact oriented (IO) punch card, wherein the IO punch card comprises the punch in designated position to represent data regarding the execution and completion of the second activity; and
generate an impact oriented (IO) reward outcome to the buyer,
wherein the server interacts with the seller, buyer, and a third party.

* * * * *